(12) United States Patent
Ahmed et al.

(10) Patent No.: US 10,040,996 B2
(45) Date of Patent: *Aug. 7, 2018

(54) CLAY SOIL SITE PREPARATION FOR BUILDING STRUCTURES

(71) Applicant: KING FAHD UNIVERSITY OF PETROLEUM AND MINERALS, Dhahran (SA)

(72) Inventors: Habib Ur-Rehman Ahmed, Dhahran (SA); Sahel Nishat Abduljauwad, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/487,153

(22) Filed: Apr. 13, 2017

(65) Prior Publication Data
US 2017/0260450 A1   Sep. 14, 2017

Related U.S. Application Data

(63) Continuation of application No. 15/134,474, filed on Apr. 21, 2016, now Pat. No. 9,670,409.

(60) Provisional application No. 62/387,166, filed on Dec. 23, 2015.

(51) Int. Cl.
*E02D 3/12* (2006.01)
*C09K 17/06* (2006.01)
(Continued)

(52) U.S. Cl.
CPC ............... *C09K 17/06* (2013.01); *B09C 1/08* (2013.01); *C09K 17/02* (2013.01); *E02D 3/12* (2013.01); *E02D 31/10* (2013.01); *B09C 2101/00* (2013.01)

(58) Field of Classification Search
CPC ......... E02D 3/12; B09C 1/08; B09C 2101/00; C09K 17/06; C09K 17/02
See application file for complete search history.

(56) References Cited

U.S. PATENT DOCUMENTS

| 3,980,490 A | 9/1976 | Schneider |
| 5,122,012 A | 6/1992 | Walker, Jr. |

(Continued)

FOREIGN PATENT DOCUMENTS

JP        2014-85177        5/2014

OTHER PUBLICATIONS

E.S. Boek et al., "Monte Carlo Molecular Modeling Studies of Hydrated Li-, Na-, and K-Smectites: Understanding the Role of Potassium as a Clay Swelling Inhibitor", http://pubs.acs.org/doi/abs/10.1021/ja00155a025, Dec. 1995, pp. 12608-12617.

(Continued)

*Primary Examiner* — Frederick L Lagman
(74) *Attorney, Agent, or Firm* — Oblon, McClelland, Maier & Neustadt, L.L.P.

(57) ABSTRACT

A method of reducing the swell potential of an expansive clayey soil comprising expansive clay mineral(s) at a proportion of the total weight of the expansive clayey soil ($P_{ECM}$). The method includes (a) calculating a first amount of a swelling reduction agent to be incorporated into the expansive clayey soil to form a first swelling reduction agent incorporated expansive clayey soil with a reduced swell potential no greater than a pre-set level T with a nano-level constitutive modeling based on the water content and the CEC of the expansive clayey soil and $P_{ECM}$. The swelling reduction agent is at least one selected from calcite, gypsum, potassium chloride, a composition comprising exchangeable $K^+$, a composition comprising exchangeable $Ca^{2+}$, and/or a composition comprising exchangeable $Mg^{2+}$, and (b) incor- (Continued)

porating the first amount of the swelling reduction agent into the expansive clayey soil to form the first swelling reduction agent incorporated expansive clayey soil.

8 Claims, 213 Drawing Sheets

(51) Int. Cl.
*C09K 17/02* (2006.01)
*E02D 31/10* (2006.01)
*B09C 1/08* (2006.01)

(56) References Cited

U.S. PATENT DOCUMENTS

| | | | |
|---|---|---|---|
| 5,228,808 | A | 7/1993 | McKennon |
| 5,336,022 | A | 8/1994 | McKennon |
| 9,670,409 | B1 * | 6/2017 | Ahmed .................. C09K 17/06 |
| 2004/0195182 | A1 | 10/2004 | Elliott |
| 2016/0289559 | A1 | 10/2016 | Madduri |

OTHER PUBLICATIONS

P. Mignon et al., "Ab initio molecular dynamics study of the hydration of Li+, Na+ and K+ in a montmorillonite model. Influence of isomorphic substitution", http://pubs.rsc.org/en/Content/ArticleLanding/2010/CP/b915689e#IdivAbstract, 2010, pp. 688-697.

E. E. Alonso, et al., "Groundwater Effects in Geotechnical Engineering,General Report", Proceedings 9$^{th}$ European Conference on Soil Mechanics and Foundation Engineering, vol. 3, (1987), pp. 1087-1146.

E. E Alonso, et al., "A constitutive model for partially saturated soils", Geotechnique, vol. 40, No. 3, (1990), pp. 405-430.

E. E. Alonso, et al., "Modeling the mechanical behavior of expansive Clays", Engineering Geology, vol. 54, (1999), pp. 173-183.

R. J. Arnott, "Particle sizes of clay minerals by small-angle x-ray scattering", The American Mineralogist, vol. 50, (1965), pp. 1563-1575.

L. Guimarães, et al., "A chemo-mechanical constitutive model accounting for cation exchange in expansive clays", Geotechnique, vol. 63. No. 3, (2013), pp. 221-234.

M. Sanchez, et al., "A double structure generalized plasticity model for expansive materials", International Journal for Numerical and Analytical Methods in Geomechanics, vol. 29, Issue 8, (2005), pp. 751-787.

W. Sun, et al., "Coupled modeling of hydro-mechanical behavior of unsaturated compacted expansive soils", International Journal of Numerical and Analytical Methods in Geomechanics, vol. 36, No. 8, (2011), pp. 1002-1022.

* cited by examiner

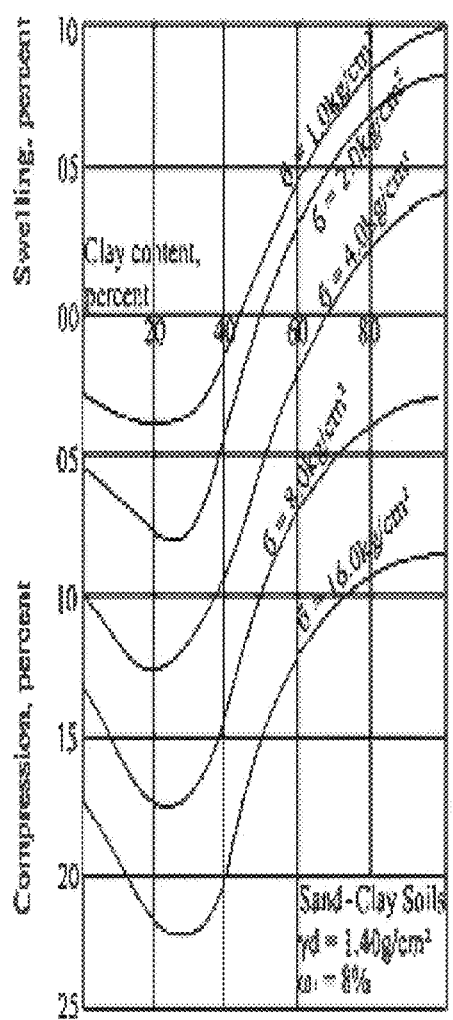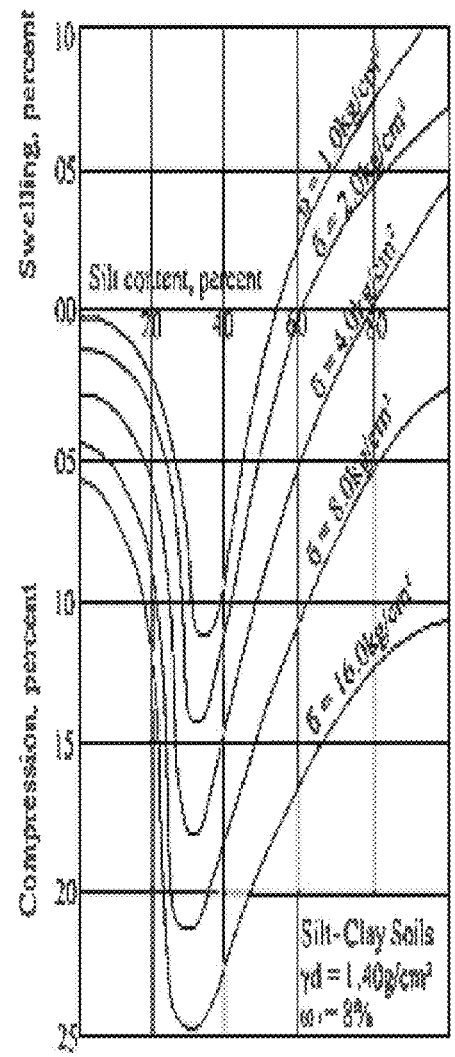
Figure 1A
PRIOR ART
Figure 1B
PRIOR ART

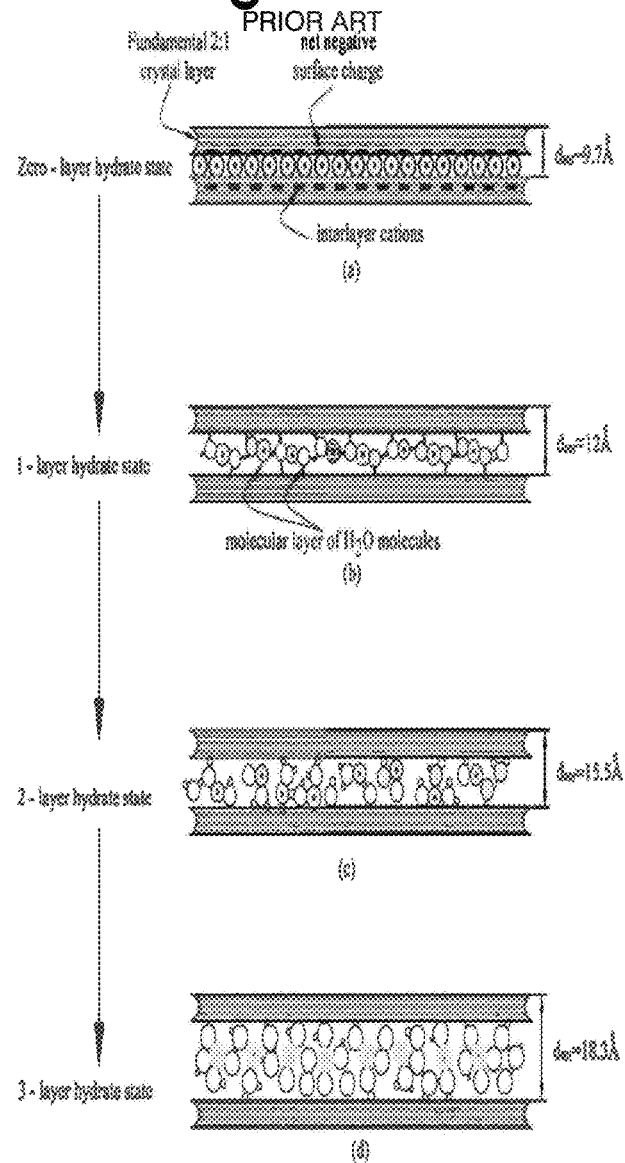

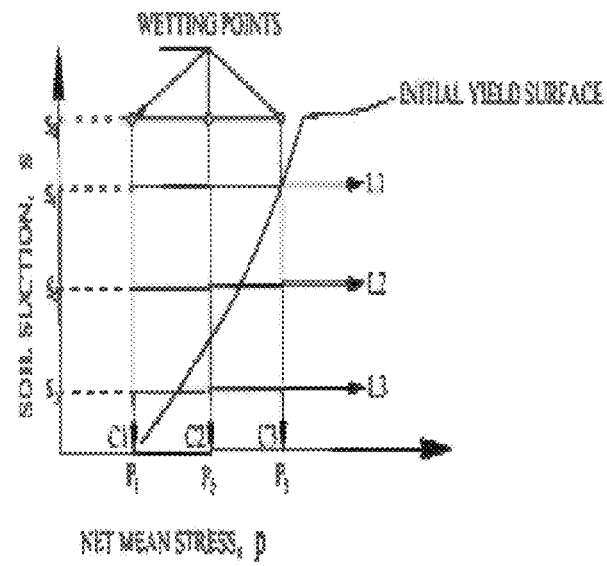
Figure 14A
PRIOR ART
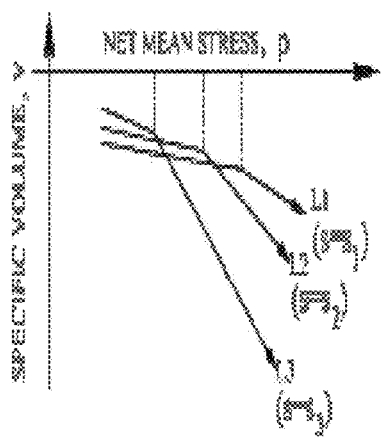 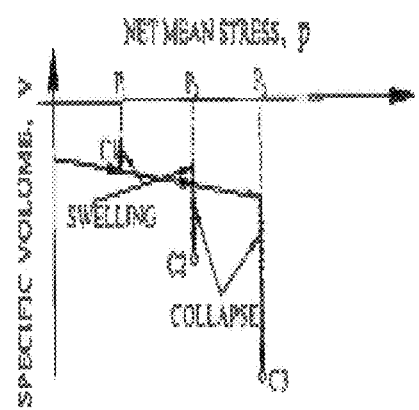
Figure 14B
PRIOR ART
Figure 14C
PRIOR ART

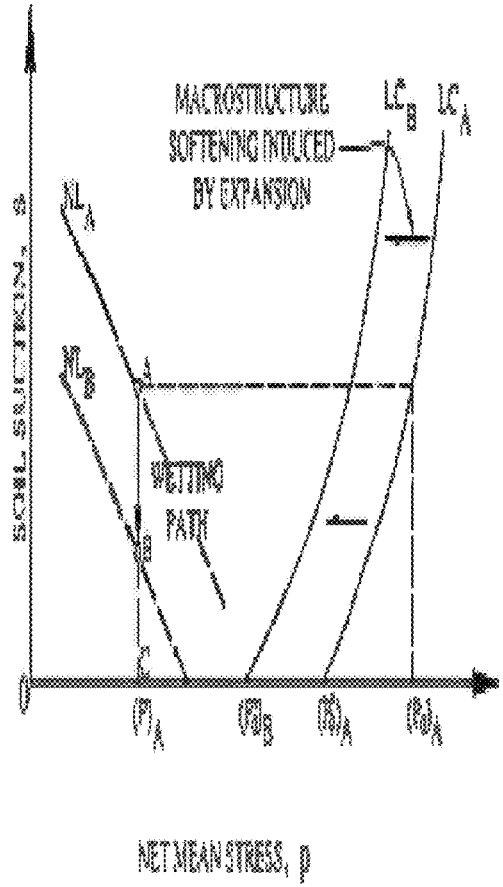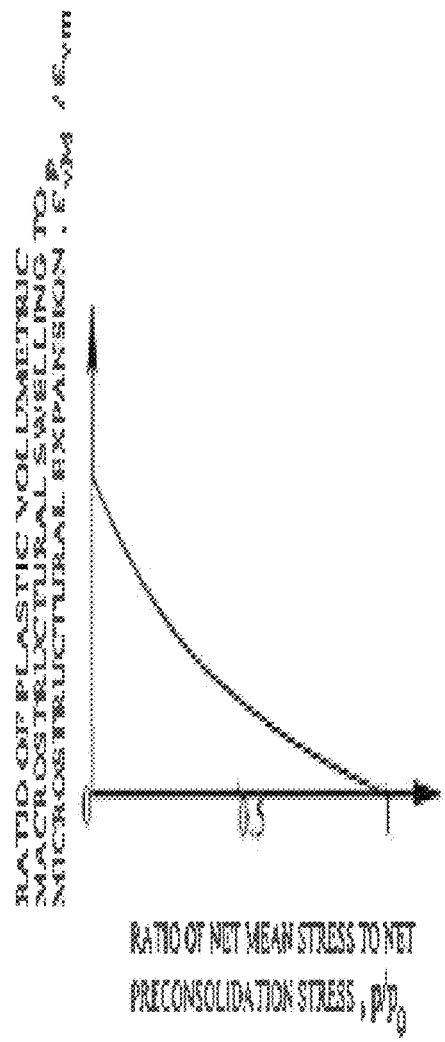
Figure 18A
PRIOR ART
Figure 18B
PRIOR ART

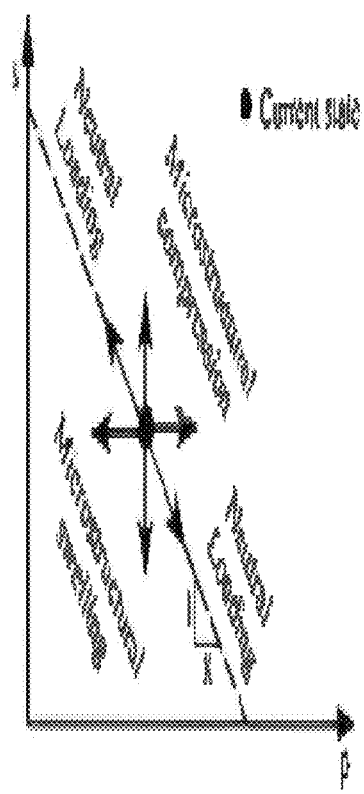
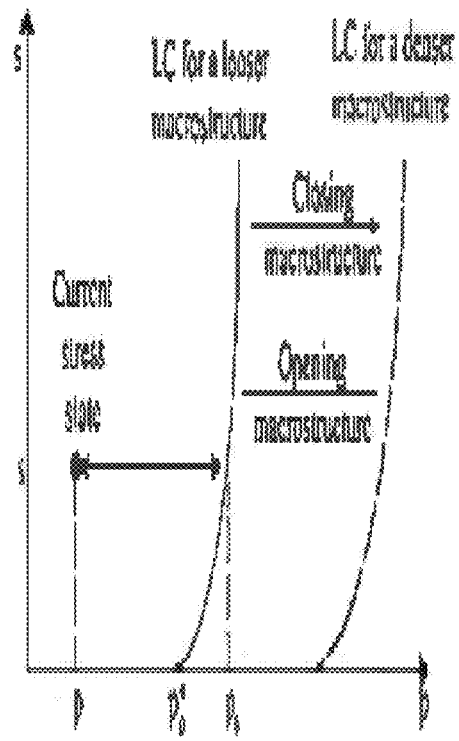
Figure 21A
PRIOR ART
Figure 21B
PRIOR ART

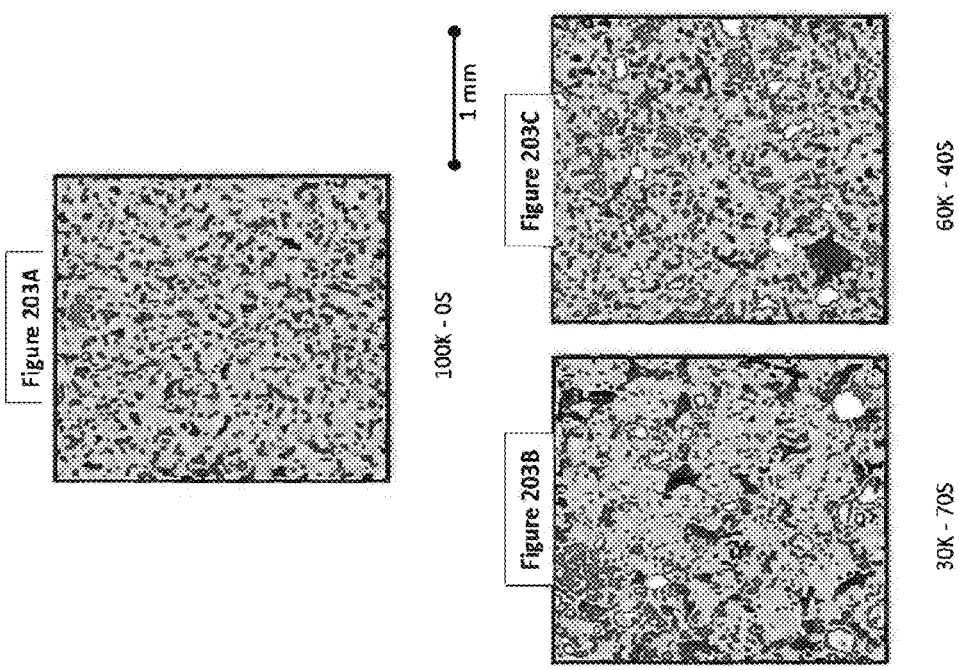

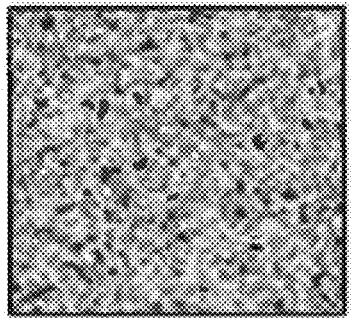
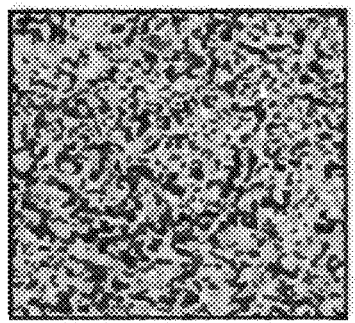
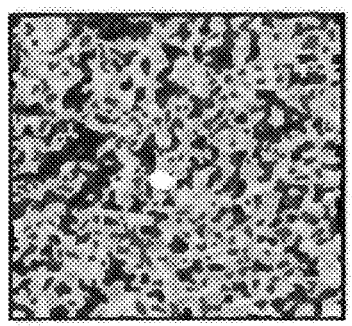

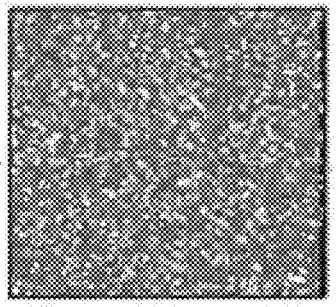
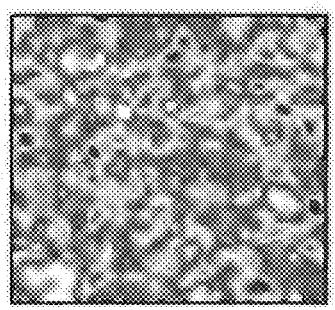
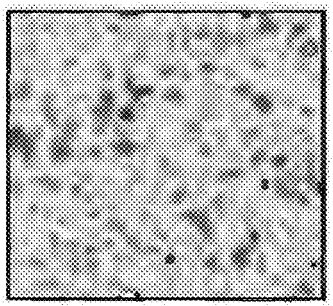
Figure 205A 100Na-M - 0S
Figure 205C 60Na-M - 40S
Figure 205B 30Na-M - 70S 100Ca-M - 0S 60Ca-M - 40S 30Ca-M - 70S

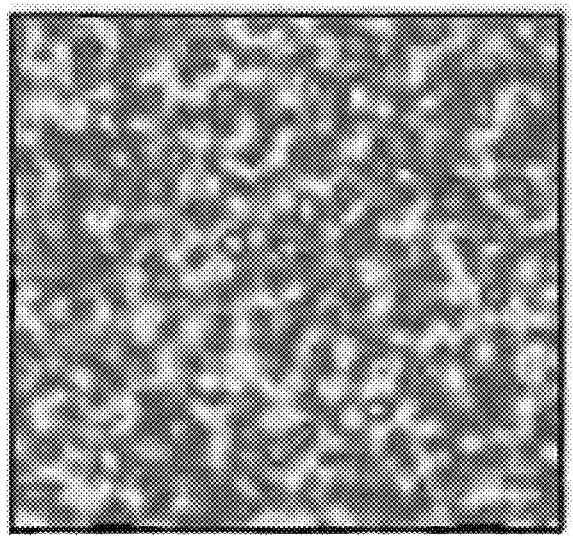
Figure 209A
Pre Swelling
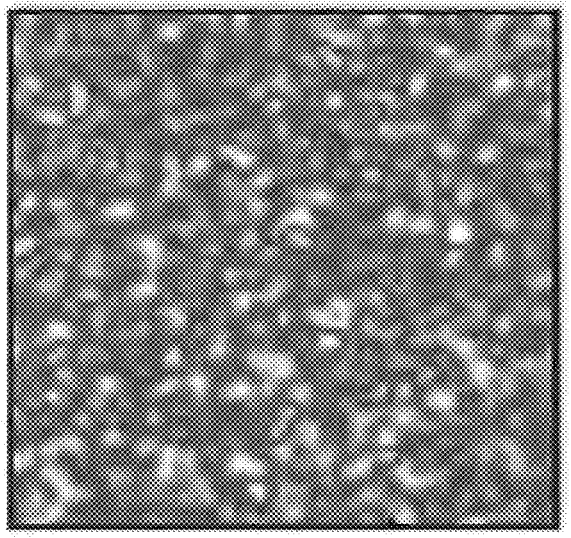
Figure 209B
Post Swelling
1 mm

CLAY SOIL SITE PREPARATION FOR BUILDING STRUCTURES

CROSS-REFERENCE TO RELATED APPLICATIONS

The present application is a continuation application of Ser. No. 15/134,474, now allowed.

This application claims the benefit of U.S. Provisional Application No. 62/387,166, filed Dec. 23, 2015, incorporated herein by reference in its entirety. The present disclosure incorporates by reference in its entirety the following thesis: Molecular Level Modeling of Natural and Compacted Expansive Clays, January 2015, by Habib-Ur-Rehman Ahmed, King Fand University of Petroleum & Minerals, Dhahran-31261, Saudi Arabia.

BACKGROUND OF THE INVENTION

Technical Field

The present disclosure relates to methods of reducing the swell potential of an expansive clayey soil. More specifically, the present disclosure relates to methods of reducing the swell potential of an expansive clayey soil comprising at least one expansive clay mineral with the aid of a nano-level constitutive modeling and preferably with a swelling reduction agent selected from calcite, gypsum, potassium chloride, a composition comprising exchangeable $K^+$, a composition comprising exchangeable $Ca^{2+}$, a composition comprising exchangeable $Mg^{2+}$, and a combination thereof.

of the structures founded on such strata. The expansive clays become highly erratic in behavior especially when present in unsaturated/partially saturated state having fluctuations of the saturation levels. More challenging is the fact that foundations of most civil engineering structures are generally placed in the partially saturated soil zones with a continuously varying degree of saturation with the environmental and weather conditions. The American Society of Civil Engineers (ASCE, 2013) estimates that 25% of all the homes in the United States suffer some extent of damage by expansive soils and an estimate shows that in a typical year in the United States these soils cause a financial loss to property owners greater than other natural disasters such as earthquakes, floods, hurricanes and tornadoes combined. Expansive soils are also commonly present in the Kingdom of Saudi Arabia and concentrate mostly in the populated cities. These expansive soil deposits present in the Kingdom of Saudi Arabia contain high percentages of expansive clay minerals (Table 1). High percentages of the expansive clay minerals result in high to very high swell potential of these soil deposits (Table 2). Consequently, structural and functional damage to the structures of the entire housing complexes by expansive clays is quite common in several areas of KSA. Empirical and experimental based solutions and formulae to predict the expansive potential of these soils have not been able to provide a comprehensive understanding for the various possible variations in the fabric and structure of the natural and compacted expansive clay soils.

TABLE 1

Mineralogical analysis of expansive clay deposits in the Kingdom of Saudi Arabia (Hameed, 1991).

| Sample No. | Location | BH/TP No. | Depth (m) | Mineral type (% composition) |
|---|---|---|---|---|
| 1 | Al-Khars, Al-Hasa | BH-9 | 2.5-2.7 | C(50), Q(10), P(8), K(5), I(9), S(7) |
| 2 | Mahasen-Aramco, Al-Hasa | BH-13 | 20-2.25 | C(34), Q(16), P(8), K(3), I(31), S(4), St(4) |
| 3 | Al-Hamadiya | BH-11 | 1.0-1.3 | C(35), Q(10), P(8), K(3), I(30), S(8), St(5) |
| 4 | Al-Salehiya | BH-12 | 2.4-2.7 | C(19), Q(19), P(4), K(4), I(47), D(1), S(8) |
| 5 | Al-Khars, Al-Hasa | TP-7 | 1.1 | C(39), Q(11), P(10), K(11), I(19), S(6), St(4) |
| 6 | Al-Naathel, Al-Hasa | TP-11 | 2.0-2.2 | C(61), Q(24), P(6), K(3), S(6) |
| 7 | Mahasen-Aramco, Al-Hasa | TP-11 | 2.0-2.2 | C(27), Q(19), P(10), K(5), I(32), S(4), St(3) |
| 8 | Housing Area | BH-1 | 3.8 | Q(9), P(9), S(30), St(12), T, I(40) |
| 9 | Housing Area | BH-3 | 1.8-2.1 | Q(7), K(<1), S(25), St(10), D(32), I |
| 10 | Umm Al-Sabek | BH-6 | 0.45-0.6 | Q(4), K(<1), P(2), S(13), G(11), D(48), I(22) |
| 11 | Umm Al-Hammam | BH-8 | 5.6-5.75 | C(<1), Q(10), P(11), D(<1), S(39), I(39) |

C = Calcite
Q = Quartz
P = Palygorslite
St = Sepiolite
S = Smectite
K = Kaolimite
I = Illite
D = Dolomite
G = Gypsum
T = Talc Description of the Related Art The "background" description provided herein is for the purpose of generally presenting the context of the disclosure. Work of the presently named inventors, to the extent it is described in this background section, as well as aspects of the description which may not otherwise qualify as prior art at the time of filing, is neither expressly nor impliedly admitted as prior art against the present invention.

Expansive clays are widely prevalent all over the world as one of the most problematic and challenging soils. These soils undergo significant volume change with the change in the moisture regime, thereby posing problems to the stability

TABLE 2

Geotechnical properties of the expansive clay deposits in Qatif area, Kingdom of Saudi Arabia (Dafalla and Shamrani, 2012).

| Brown calcareous green and brown clay, symbol (USCS): | Property range for Al Qatif soils | |
|---|---|---|
| CH and MH | Avg. min. | Avg. max. |
| Dry unit weight, gd, kN/m$^3$ | 10 | 14 |
| Water contet, wn, % | 15 | 40 |

TABLE 2-continued

Geotechnical properties of the expansive clay deposits in Qatif area, Kingdom of Saudi Arabia (Dafalla and Shamrani, 2012).

| Brown calcareous green and brown clay, symbol (USCS): CH and MH | Property range for Al Qatif soils | |
|---|---|---|
| | Avg. min. | Avg. max. |
| Liquid limit, LL, % | 120 | 160 |
| Plastic limit, PL, % | 30 | 60 |
| Plasticity index, PI, % | 90 | 100 |
| Shrinkage limit, SL, % | 9 | 15 |
| Percent sand, % | 0 | 5 |
| Percent silt, % | 15 | 50 |
| Percent clay, % | 50 | 90 |
| Specific gravity, Gs | 2.5 | 2.6 |
| Selling pressure, kN/m$^3$ | 200 | 1000 |
| Swell percent | 2 | 20 |

Studies of the interaction of clay minerals with pore fluids and their contributions to the fabric, structure, and macroscale behavior and properties of clay minerals are critical not only in the fields of geotechnical engineering but also in geoenvironmental engineering, material sciences, pharmaceutical sciences etc. See Katti, D. R., Katti, K. S., Amaasinghe, P. M. and Pradhan, S. M. (2011), "An insight into role of clay-fluid molecular interactions on the microstructure and Macroscale properties of swelling clay", Alonso and Gens (eds), Unsaturated Soils, 2011 Taylor and Francis Group, London, incorporated herein by reference in its entirety. Since the emergence of the unsaturated geotechnical engineering, performance of numerical modeling of the realistic volume change behavior of the expansive clays is a challenge for the geotechnical engineers. Consequently, several efforts have been made to develop constitutive models for the behavior of the expansive soils by performing parametric studies mostly at the macro behavior level and to a lesser extent at a molecular level. All the developed constitutive models do not comprehensibly incorporate the coupling of the behavior at the macro, micro, and nano/molecular levels. Moreover, most of the developed constitutive models pertain to the standard expansive clay minerals compacted under controlled conditions; models covering the natural and real soil fabric do not exist.

Lack of proper understanding and knowledge of the nano/molecular level interactions of the clay minerals with pore fluids and the other non-swelling constituents have limited the development of specific constitutive models encompassing the accurate behavior under several possible combinations of clay, fluid and other non-swelling particles. This behavior becomes further complex for the swelling clays when the interaction between clay, fluid, and the non-swelling clay particles become predominant.

The swelling behavior of expansive soils is intrinsically controlled by their natural fabric and structure. Although the fabric of expansive soils is quite complex, Mitchell attempted to discretize soil fabric to be consisting of three general regimes of elementary particle arrangements as single form of particle interaction at the level of individual clay, silt, or sand particles, particle assemblage as units of particle organization having definable physical boundaries and pore spaces as fluid and/or gas filled voids within the soil fabric. See Mitchell, J. K. (2005), "Fundamentals of soil behaviour", 3rd Edition, John Wiley and Sons, Inc., New York, incorporated herein by reference in its entirety. Mitchell divided the fabric of a soil into three levels of scale as microfabric, minifabric, and macrofabric. Microfabric is defined as regular aggregations of particles and the very small pores between them; typical fabric units are up to a few tens of micrometers across. The minifabric consists of the aggregations of the microfabric and the interassemblage pores between them; minifabric being a few hundred micrometers in size. Finally, macrofabric may contain cracks, root holes, laminations, and the like that correspond to the transassemblage pores. Abduljauwad and Al-Sulaimani carried out detailed research on the swelling potential of the clay soils in Qatif area of Saudi Arabia. See Abduljauwad, S. N. and Al-Sulaimani, G. J. (1993), "Determination of Swell potential of Al-Qatif Clay", Geotechnical Testing Journal, ASCE, December 1993, pp. 469-484, incorporated herein by reference in its entirety. As a result of these studies, they found substantial differences in the swelling potential assessed from the laboratory conventional Oedometer tests, laboratory tests on large scale block samples, and field tests on the subsurface strata (Table 3). They attributed these differences to the contribution of several macro to nano level structural features that might have been masked in the small scale laboratory tests. Moreover, El Sohby and Rabba also showed that swell percentage and pressure does not have a linear relationship with the various percentages of sand and silt content (FIGS. 1A and 1B). See El Sohby, M. A. and Rabba, E. A. (1981), "Some Factors affecting the swelling of clayey soils", Geotechnical Engineering, Vol 12, page 19-39, incorporated herein by reference in its entirety.

TABLE 3

Comparison of swelling potential based on the results from the laboratory and field tests (Abduljauwad and Al-Sulaimani, 1993).

| Method | Percentage of Swell, % | Swelling Pressure kPa | Heave, mm |
|---|---|---|---|
| Oedometer | | | |
| Improved simple oedometer | 36 | 3100 | 63.9 |
| Constant volume | — | 800 | 47.5 |
| Reverse curve | 8.8 | 2000 | 58.6 |
| Suction | — | — | 36.8 |
| Triaxial | 14.3 | 420 | 39.6 |
| Simulation swelling test | 15.0 | — | 37.4 |
| Field | 15.4 | 180 | 38.4 |

Based on the premise by Mitchell and the conclusions of Abduljauwad et al. and El Sohby and Rabba, it seems that in addition to macro to nano level behavior, macro to nano level features should also be considered in the constitutive modeling of expansive clays. See Abduljauwad, S. N., Al-Sulaimani, G. J., Basunbul, I. A., and Al-Buraim, I. (1998), "Laboratory and field studies of response of structures to heave of expansive clay", Geotechnique, 48(1): 103-121, incorporated herein by reference in its entirety. Gens and Alonso presented a mathematical model for the expansive clays. See Gens, A. and Alonso, E. E. (1992), "A framework for the behavior of unsaturated expansive clays", Canadian Geotechnical Journal 29, 1013-1032 (1992), incorporated herein by reference in its entirety. Lumped fabric consisting of micro and nano level pores and idealization of a single mineral fabric attained under controlled compaction conditions by Gens and Alonso and their followers might not have led to the formulation of a complete representative behavior model.

Nano or molecular level processes may play a role in understanding the volume change behavior of expansive clays. Some studies have been conducted to simulate the swelling and/or water absorption behavior of the single or isolated expansive clay minerals, but modelling of the real/natural expansive soil fabric and its interaction with pore fluids at molecular level is still lacking. Moreover, no efforts have been directed to couple the macro and micro scale material behavior based on the findings of these molecular simulations. As molecular level modeling studies could lead to the real insights into soil behavior, it would result in the validation and/or modifications of several macroscopic (continuum) constitutive behaviors. Recent advances in numerical computational methods, high performance hardware, molecular modeling software, and experimental techniques could be used to provide the real insight into the real behavior at the molecular level.

Attempts to predict the expansive or swell potential of expansive clay minerals or expansive clayey soils comprising expansive clay minerals have not been able to provide a comprehensive understanding for the various possible variations in the fabric and structure of the natural and compacted expansive clayey soils. Since the emergence of the unsaturated geotechnical engineering, performance of numerical modeling of the realistic volume change behavior of the expansive clays is a challenge for the geotechnical engineers. Consequently, several efforts have been made to develop constitutive models for the behavior of the expansive soils by performing parametric study mostly at the macro behavior level and to quite lesser extent at molecular level. All the developed constitutive models do not comprehensibly incorporate the coupling of the behavior at the macro, micro, and nano levels. Moreover, most of the developed constitutive models pertain to the standard expansive clay minerals compacted under controlled conditions; models covering the natural and real soil fabric do not exist.

Lack of proper understanding and knowledge of the molecular and nano level interactions of the clay minerals with the pore fluids and the other non-swelling constituents have limited the development of specific constitutive models encompassing the accurate behavior under several possible combinations of clay, fluid and other non-swelling particles. This behavior becomes further complex for the swelling clays when the interaction between clay, fluid, and the non-swelling clay particles become predominant.

The present disclosure covers the general comprehension of the fabric and structure of the swelling clays, swelling mechanism, and the corresponding level of efforts in the constitutive and molecular level modeling of expansive clayey soils. All these pertinent issues related to expansive clays are discussed in detail herein.

The excessive volume change tendency of expansive clays is mainly attributed to the presence of expansive clay minerals in the soil fabric. These expansive clay minerals have got high affinity to the water and dissolved ions due to the net unbalanced electrical charges present on their surfaces. Volume change of the clay structure occurs once these expansive minerals absorb water and move from one partially saturated state to another. The volume change behavior is invariably controlled by many factors including type of clay minerals, current degree of saturation, past wetting-drying cycles, fabric and structure created during the compaction/natural deposition, presence of non-expansive minerals, their sizes, percentages and distribution in the matrix. A comprehensive constitutive model should encompass all these factors and their relative contribution to the physico-chemical-mechanical interactions at various scale levels. In order to integrate all these factors in a constitutive model, understanding the behavior of the fabric at micro and nano level and its association with the macro behavior is required.

Most of the expansive clay minerals belong to the Smectite group and their typical expandable structure consisting of alternate silicate and alumina sheets is shown in FIG. 2 (Mitchell). Each clay particle could be conceptualized as a flake/sheet like structure having dimensions of an order of nanometer with a length or width to thickness ratio of about 2000:1. See Sharma, R. S. (1998), "Mechanical Behavior of Unsaturated Highly Expansive Clays", PhD Thesis, Oxford University, UK, incorporated herein by reference in its entirety. The clay particles are also referred to as particles, lamellae or micelles at these finest levels. See Quirk, J. P. and Murray, R. S. (1991), "Towards a model for soil structural behavior", Australian Journal of Soil Research 29, 829-867; Oades, J. M. and Waters, A. G., (1991), "Aggregate hierarchy in soils", Australian Journal of Soil Research, 29, 815-828, each incorporated herein by reference in their entirety. Isomorphous substitution, broken edges, and eccentric positive and negative charge centers result in net unbalanced charges on these particles. As a result of these unbalanced charges, these clay particles or sheets combine to form platelets of each about ten sheets (100:1) (Oades and Waters). These have also been called grains, crystals or quasi-crystals (Quirk and Murray). Various bonding forces ranging from hydrogen bonds in kaolinite to van der Waals and cation bonding in montmorillonite exist in the individual clay particles or sheets. The group of platelets are present as micro-aggregates (Oades and Waters) and clusters at the microscopic level and peds, macro-aggregates (Oades and Waters) or prisms at macro level. See Thomasson, A. J. (1978), "Towards an objective classification of soil structure", Journal of Soil Science 29, 38-46; Cabidoche, Y. M. and Ruy, S. (2001), "Field shrinkage curves of a swelling clay soil: analysis of multiple structural swelling and shrinkage phases in the prisms of a vertisol", Australian Journal of Soil Research 39, 143-160, each incorporated herein by reference in their entirety.

Lambe provided a conceptual picture of the clay fabric, although his work was mainly related to the compacted clays only. See Lambe, T. W. (1958), "The structure of compacted clay", Journal of Soil Mechanics and Foundations Division, ASCE, Vol 84 (SM2), 1654, incorporated herein by reference in its entirety. He defined the bimodal fabric on dry side and massive and unimodal fabric on wet side of the optimum with the microvoids in between platelets and macrovoids in group of platelets. In his models, he identified three levels of fabric corresponding to three levels of void/fluid filled spaces, intra-platelet spaces between individual unit layers, small voids (microvoids) between individual clay platelets between larger flocs of packets of soils, and macrovoids between larger flocs and packets.

Gens and Alonso, considered as pioneers in formulating the first constitutive model framework for the expansive soils, envisaged an expansive clay fabric (FIGS. 3A, 3B and 3C). They conceptualized the structural arrangement consisting of three basic microfabric features: elementary particle arrangements or quasi-crystals, particle assemblages, and pore spaces. Gens and Alonso described the particle assemblages formed by arrays of elementary particle arrangements as matrices. In their model, pore spaces in the matrices are made up of intramatrix pores existing between elementary particle arrangements. Elementary particle arrangements join together to make aggregates resulting in a three-dimensional structure of a granular type. Both inter and intra-aggregate pore spaces exist in the aggregated structure. A further level of void space also exists in the intraelement pores separating the clay platelets in the elementary particle arrangements. They related both the expansive and collapse type of phenomena to these forms of fabric. Clay structure conceptualized by Gens and Alonso was further supported by SEM micrographs of clay samples at optimum and dry and wet sides of optimum by Delage and Graham. See Delage, P. and Graham, J. (1996), "Mechanical behavior of unsaturated soils: understanding the behavior of unsaturated soils requires reliable conceptual models", In: Alonso EE and Delage P. (eds), Proceedings of 1st International conference on Unsaturated Soils, Paris, vol. 3, Balkema Presses des Ponts et Chaussees pp. 1223-1256, incorporated herein by reference in its entirety. Conceptual clay structure in FIGS. 3A, 3B and 3C, respectively, represents the fabric on wet and dry side of optimum. However, one of major limitation in Gens and Alonso model is the consideration of the two micro level voids as one. This leads to the presence of two global levels only (intraplatelet spaces and microvoids between platelets) and contradicting the fact that microvoids and intervoid space between platelets may also be present in an unsaturated state. Therefore, their model may only be considered applicable to heavily compacted clays such as ones being used for the nuclear and other types of waste containment. Likos and Lu were the first to consider a more realistic fabric consisting of inter-aggregate, intra-aggregate (or inter-particle) and interlayer space levels. See Likos, W. J. and Lu, N. (2006), "Pore scale analysis of bulk volume change from crystalline swelling in Na+- and Ca2+-smectite", Clays and Clay Minerals, Vol. 54, No. 4, pp. 516-529, incorporated herein by reference in its entirety. Their model is shown in FIGS. 4A, 4B and 4C.

The clay fabric was also further elaborated by Sharma, defining the micro and macro structure as assemblage of particles with three levels of voids as micro, macro and intra platelet voids. His conceptual model is shown schematically in FIGS. 5A, 5B and 5C. Sanches et al. also adopted the model of Gens and Alonso considering the two general levels of structures (FIG. 6) and the assumption that microstructure is being considered as saturated at all the field conditions. See Sanchez, M., Gens, A Guimaras, L. N. and Olivella, S. (2005), "A double structure generalized plasticity model for expansive materials", International Journal for Numerical and Analytical Methods in Geomechanics, 2005, 29:751-787, incorporated herein by reference in its entirety. Pinyol et al. studied and modeled the weathering of the soft clayey rocks and also considered a model similar to the Gens and Alonso with the addition of cementation at the platelet contacts. See Pinyol, N., Vaunat, J. and Alonso, E. E. (2007), "A constitutive model for soft clayey rocks that includes weathering effects", Geotechnique 57, No. 2, 137-151, incorporated herein by reference in its entirety. They also modeled the degradation of the cementation upon cyclic loading and weathering conditions. The conceptual model prepared by them for the cyclic load simulation is shown in FIG. 7. This model could be considered a promising attempt to incorporate natural soil behavior but may be applicable to the homogenous type of clay rocks only and not to the soils consisting of multiple minerals. Moreover, Pinyol et al. did not consider the effects of presence of fissures and cracks present in the natural clay fabric. These fissures and cracks should be considered inherent part of the natural deposits and contribute significantly towards the digenesis and weathering processes.

Fityus and Buzzi discussed and reviewed the effects of the clay microfabric on the volume change of the macrofabric in the existing models. See Fityus, S. and Buzzi, O (2008), "The place of expansive clays in the framework of unsaturated soil mechanics", Applied Clay Science, Vol. 43, Issue 2, page 150-155, incorporated herein by reference in its entirety. They conceptualized clay structure as a group of aggregates and clusters into single structural element group called peds. A ped is a naturally occurring, structured soil element within a ripened (Pons and Van der Molen) heavy clay soil; that is bounded by discontinuities (typically cracks) that separate it from the adjacent elements of similar form. See Pons, L. J. and Van der Molen, W. H. (1977), "Soil genesis under dewatering regimes during 1000 years of polder development", Soil Science 116, 228-235, incorporated herein by reference in its entirety. The ped could therefore be considered as basic unit of natural heavy clay soil at the macro scale. Particle size of montmorillonite particle size being in the order of 50 to 1600 nm (Robertson et al.), it becomes difficult to characterize the structure and the pore spaces even using the most advanced and sophisticated Environmental Scanning Electron Microscope (ESEM) and X-ray Computed Tomography (CT) scanning or mercury porosimetry techniques (Fityus and Buzzi). See Robertson, H. E., Weir, A. H. and Woods, R. D. (1968), "Morphology of particles in size fractionated Na montmorillonite", Clays and Clay Minerals 16, 239-247, incorporated herein by reference in its entirety. Both naturally occurring soils and soils created from the consolidation of slurries have a very small pore size of an order of 3-10 nm and air entry value of 80-100 MPa as reported by Alymore and Quirk, Oades and Waters, Villar, and Meunier. See Alymore, L. A. G. and Quirk, J. P. (1962), "The structural status of clay systems", In: Swineford, A. (Ed.), Proceedings of the 9th National Conference on Clays and Clay Minerals, Lafayette, Ind., pp. 104-130; Villar, M. V. (2000), "Thermo-hydro-mechanical characterization of a bentonite from Cabode Gata", PhD Thesis, Universidad Complutense, Madrid, Spain; Meunier, A. (2006) "Why are clays minerals small", Clay Minerals 41, 551-566, each incorporated herein by reference in their entirety. Based on this fact, saturation of the peds pass through drying and shrinkage cycles without any water loss and complete saturation is ensured at all the field suction values. However, Terzaghi's saturation and effective stress concepts could not be considered applicable to the saturated peds (Lambe and Whitman; Sridharan and Venkatappa; Heuckel. See Lambe, T. W., Whitman, R. V. (1959), "The role of effective stress in the behavior of expansive soils", First Annual Soil Mechanics Conference, Colorado School of Mines, pp. 33-65; Sridharan, A., Venkatappa R. G. (1973), "Mechanisms controlling volume change of saturated clays and the role of the effective stress concept", Geotechnique 23, 359-382; Hueckel, T. A. (1992), "Water-mineral interaction in hygromechanics of clays exposed to environmental loads: a mixture-theory approach", Workshop on Stress Partitioning in Engineered Clay Barriers, May 29-31, 1991, Duke University, Durham, N.C. 1071-1086, each incorporated herein by reference in their entirety. The structure envisioned as saturated soil peds separated by air-filled macroscopic desiccation cracks (FIG. 8) confirms that it cannot be modeled either as continuum or as unsaturated soils due to non-existence of surface films and water bridges.

Likos and Wayllace studied the porosity evolution of free and confined bentonite during the phase of the interlayer hydration. See Likos, W. J., Wayllace, A. (2010), "Porosity Evolution of Free and Confined Bentonites During Interlayer Hydration" Clays and Clay Minerals, Vol. 58 (3), pp. 399-414, incorporated herein by reference in its entirety. They came up with a bimodal porosity model developed for Wyoming bentonite using SEM image of the compacted bentonite. The schematic sketch of the model at several levels is shown in FIGS. 9A, 9B, 9C, 9D, and 9E. Hueckel, while presenting his mixture theory approach for water-mineral interaction in clays under environmental loads provided in a schematic sketch various forms of water in high density clayey soil. His concept of various forms of water and the corresponding pores in a natural soil deposit are shown in FIG. 10.

In addition to the fabric visualization of the expansive clayey soils, another important input required in any molecular level modeling/simulation is the size of the fundamental/smallest clay mineral crystallites. Several researchers have come up with a fundamental size ranging from as small as 100 Å (Longuet-Escard et al.) to much greater than 1000 Å. See Longuet-Escard, J., Mering, J., and Brindley, G. (1960), "Analysis of hk bands of montmorillonite", C. R. Acad, Sci, Paris 251, 106-108, incorporated herein by reference in its entirety. Most probable reason for such wide range of clay mineral crystallite is the method used for the determination of the size. It has been observed that at most of the times, the imaging or mapping methods involve use of dry specimens. In dry form, the crystallites most probably get fused at the edges and ends and grow into larger crystallites. Moreover, flocculated fabric may also be responsible for such discrepancy. Therefore, the techniques involving the wet specimens such as ESEM and in the dispersed fabric form could provide the real fundamental crystallite size for clay minerals.

The above discussions on the fabric of clays being conceptualized in the existing constitutive models reveal that there are several underlying simplified assumptions that obscure the real behavioral contribution from several levels. This fact is particularly true for the molecular/nano level contributions to macro level behavior. All the existing models ignore the molecular level considerations in their assumed clay fabric and hence its fundamental role in the overall behavior of expansive clays.

Highly charged clay particles/platelets make bonds with water and the dissolved ions to satisfy their charges and consequently an expansion of their structures occurs. These expanded structures have a tendency to collapse i compress shrink upon loss of water. Clay particle-water interaction theories date back to early 20th century when Guoy and Chapman came up with their diffuse double layer (DDL) theory. See Gouy, G. (1910), "Sur la constitution de la charge electrique a la surface d'un electrolyte", Annales de Physique (Paris), Serie 4, 9, 457-468; Chapman, D. I. (1913), "A contribution to the theory of electrocapillarity", Philosophical magazine, Vol. 25 (6), 475-481, each incorporated herein by reference in their entirety. This theory was later on further refined by Stern. See Stern S. (1924), "Modification in Diffuse Double Layer Theory", Z. Elektrochem., Vol. 30, p. 508, incorporated herein by reference in its entirety. In order to satisfy charges, DDL develops for individual clay units and platelets and is schematically shown in FIG. 11. DDL can successively model the effects of cation valence, dielectric constant, electrolyte concentration, and temperature. However, there are certain limitations associated with DDL such as cations are being considered as point charges, DDL may not develop in highly compacted soils and there is less likelihood of presence of parallel clay particles in real clay fabric. Recently, Wayllace developed a general understanding of the structure of the swelling clay minerals, short and long-term water adsorption mechanisms, and influences of particle and pore fabric on swelling behavior using the porosity evolution model developed by Likos and Lu; the model is conceptually shown in FIG. 12. See Wayllace, A. (2008), "Volume change and swelling pressure of expansive clay in the Crystalline swelling regime", PhD Thesis, University of Missouri, US, incorporated herein by reference in its entirety.

Wayllace divided the water adsorption phenomenon of the clay minerals into three micro-scale mechanisms as hydration, capillarity, and osmosis. Hydration and osmosis play a central role in two main clay swelling processes i.e. crystalline and osmotic swelling (Marshall; Van Olphen; madsen and Muller-Vonmoos). See Marshall, C. E. (1949) "The Colloid Chemistry of the Silicate Minerals", New York: Academic Press, P. 54; Van Olphen, H. (1977), "An introduction to clay colloid chemistry", 2nd ed. New York: John Wiley and Sons; Madsen, F. T. and Muller-Vonmoos, M. (1989), "The swelling behavior of clays", Applied Clay Science 4:143-56, each incorporated herein by reference in their entirety. Capillary mechanism is responsible only for the provision of the water for other major and short-ranged water adsorption mechanisms (Snethen et al.; Miller). See Snethen, D. R., Johnson, L. D. and Patrick, D. M. (1977), "An Investigation of the Natural Microscale Mechanisms That Cause Volume Change in Expansive Clays" Federal Highway Administration Report No. FHWA-RD-77-75; Miller, D. J. (1996) "Osmotic suction as a valid stress state variable in unsaturated soils" Ph.D. dissertation, Colorado State University, Fort Collins, Colo., each incorporated herein by reference in their entirety. Wayllace emphasized the importance of the crystalline or type-I swelling as the key mechanism leading to a better understanding of the swelling behavior. Crystalline swelling is a process whereby expandable 2:1 phyllosilicates sequentially intercalate one, two, three or four discrete layers of $H_2O$ molecules between the mineral interlayer (Norrish) shown schematically in FIG. 13. See Norrish, K. (1954), "The Swelling of Montmorillonite", Transaction Faraday Society 18: pp. 120-134, incorporated herein by reference in its entirety. Type-II swelling mechanism involves the hydration of the cations dissolved in the water layers. For example, Van Olphen calculated that for Ca-montmorillonite, the pressure associated with removing the water from the fourth, third, second, and first hydration states were 20,000 kPa, 125,000 kPa, 250,000 kPa, and 600,000 kPa, respectively. See Van Olphen, H. (1963), "Compaction of Clay Sediments in the Range of Molecular Particle Distances", Clays and Clay Minerals, Vol. 11, pp. 178-187, incorporated herein by reference in its entirety.

Osmotic theory has also been used to explain the swelling characteristics of the clay particles (Bolt). See Bolt, G. H. (1956), "Physico-chemical Analysis of the Compressibility of Pure Clays", Geotechnique, Vol. 6, No. 2, pp. 86-93, incorporated herein by reference in its entirety. An equilibrium analysis is carried out between the unit layers, clay platelets, and water by balancing the external and internal forces in order to achieve the maximum number of layers in a platelet. In order to maintain equilibrium, water flows from low concentration (bulk water) to higher concentration of ions (DDL water) and increases the pressure in the DDL. This high pressure in turn causes the tendency to have a reverse flow till a balance is reached.

Few efforts have also been made at nano level to model the swelling mechanism of the swelling clays. The results of these studies are in some cases in contradiction of the general understanding of the swelling clays. This emphasizes the need for nano level modelling and consequently refinement and augmentation of the existing micro and macro scale models.

Swell potential modeling of expansive clays have been carried out by several researchers with an objective of formulating the representative constitutive models. In this regards, efforts have been made at macro, micro, and nano/molecular levels to constitute behavior models for the expansive clays. Most of the constitutive modeling studies have been carried out at macro/micro levels and the simulations have been performed at nano/molecular level.

Constitutive model of expansive clays could be considered as a special case of the general constitutive models for the unsaturated soils. In the realm of unsaturated soils, Matyas and Radhakrishna could be considered as the pioneers to create the concept of state (constitutive) surfaces relating the void ratio and degree of saturation with the state parameters net stress, p and suction, s. See Matyas, E. I. and Radhakrishna, H. S. (1968), "Volume change characteristics of partially saturated soils", Geotechnique, Vol. 18 (4), 432-448, incorporated herein by reference in its entirety. These surfaces are characterized by one of the very basic observation of the wetting induced swelling at low mean net stress while wetting induced collapse/compression at high mean net stress. The idea of state surfaces was, later on, extended and developed by Fredlund and Morgenstern and Fredlund and was called State Surface Approach (SSA). See Fredlund, D. G. and Morgenstern, N. R. (1977), "Stress state variables for unsaturated soils", Journal of Geotechnical Engineering Division, ASCE, Vol. 103(GT5), 447-466; Fredlund, D. G. (1979), "Appropriate concepts and technology for unsaturated soils", Canadian Geotechnical Journal, Vol. 16, 121-139, each incorporated herein by reference in their entirety. The equations suggested by the authors represent the planar surfaces and are limited by the fact that these do not account for the wetting induced collapse and swelling. Moreover these are valid only for monotonic loading and not for wetting and drying cycles. In addition, as stated above, no distinction can be made between elastic and plastic strains as these are only representative of the elastic zones. However, Fredlund (1979) suggested that these relations could be representative of the elasto-plastic strains if constants are functions of stress state. Later on, Lloret and Alonson proposed state surfaces relating void ratio and degree of saturation. See Lloret, A. and Alonso, E. E. (1985), "State surfaces for partially saturated soils", Proc 11th Conference on Soil Mechanics and Foundation Engineering, Sand Francisco, Vol. 2, 557-562, incorporated herein by reference in its entirety. Although these relations represent surfaces that can simulate the wetting induced compression and swelling behavior but these were again valid only over a limited stress interval.

Alonso et al. (1987) were the first ones to present an integrated volumetric and shear strength elasto-plastic framework of the unsaturated soils. See Alonso, E. E., Gens, A. and Hight, D. W. (1987), "Special Problem Soils, General Report", Proceedings 9th European Conference on Soil Mechanics, Dublin, Vol. 3, 1087-1146, incorporated herein by reference in its entirety. The qualitative framework was further developed into its mathematical form by Alonso et al. (1990) in their landmark paper and was named Barcelona Basic Model (BBM). See Alonso, E. E., Gens, A. and Josa, A. (1990), "A constitutive model for partially saturated soils", Geotechnique, Vol. 40(3), 405-430, incorporated herein by reference in its entirety. It would be quite correct to state that all the recent models for unsaturated expansive and non-expansive soils are based on the same core of the BBM. Alonso et al. (1990) provided a complete mathematical formulation of the critical state based model for non-expansive or slightly expansive unsaturated soils. Four state variables i.e., mean net stress, suction, deviator stress, and the specific volume were used to formulate the model. The projection of the yield surface on p-s space (isotropic stress space) is a curved line known as Load-Collapse (LC) curve and shown in FIGS. 14A, 14B, 14C and 15. Plastic compression at high stress level upon wetting is modeled in a similar way as the plastic compression after crossing the yield point and change of specific volume upon plastic yielding. Volumetric decrease as a result of the increase in suction is delimited by the yield surface or limiting line of Suction Increase (SI) shown in FIGS. 15A, 15B, 15C, and 15D. Both SI and LC together mark the area characterized as elastic zone. They used the modified cam clay model as the interface with the saturated counterpart. Therefore, yield surface is an ellipse in anisotropic states in q:p plane at all suctions (FIG. 16). Although non-linearity of the shear strength is well established but for the sake of the simplicity for the initial model, it has been taken as linear. Their proposed shear strength equation collapses to the one proposed by Fredlund (1979) when c'=0. They proposed non-associated flow rule model to match well with the Ko conditions of saturated sand. Ten soil constants are required for the development of the model while current soil state is defined as p, q, s and v or p, q, s and p(0). The model developed by Alonso et al. (1990) is volumetric in nature only and no consideration of mechanical behavior is taken in the model. Simplifying assumptions adopted in the model are the use of straight lines for the e-ln p relationships (implying a continuous increase of the collapse strains upon wetting) and the linear increase of apparent cohesion with suction. Moreover, no hydraulic hysteresis has been incorporated in the model. In spite of its basic nature, BBM was quite able to define several typical behaviors of unsaturated soils such as the variation of wetting-induced swelling or collapse strains depending on the magnitude of applied stresses, the reversal of volumetric strains observed during wetting-induced collapse, the increase of shear strength with the increase in suction, stress path independency associated with wetting paths and the opposite when the stress path involves drying or the apparent increase of pre-consolidation stress with suction. BBM became a basis for its specific and advanced model for the expansive soils, BExM.

As BBM was developed for the non-expansive or slightly expansive soils, Gens and Alonso provided a breakthrough in the provision of a conceptual model encompassing the behavior model for expansive clays. The model was based on the behavior of an extension of the BBM. This model covers the limitation of the BBM to model the large strain behavior of expansive soils and hence introduced a microstructure model to be coupled with the macrostructure model of Alonso et al. (1990). In their coupled models, soil structure has been divided into two distinct levels i.e. micro and macro. Microstructure consists of quasi-crystals, particles assemblages, and pore spaces, while assemblages together formulate matrix in which large sized sand and silt particles are embedded. The extended model incorporates a microfabric of clay particles and aggregations embedded into an overall macrofabric of silt and sand size particles. The elementary particles group together to form aggregations and resulting in granular type of structure. The pores sizes in the formulated structure are present both as intra and inter aggregations. They considered microfabric to be only affected by the local stresses and hence effective stress principles may be applicable and volume change in microfabric to be reversible and unaffected by strain in the macrofabric. This assumption leads to the fact that if sum of net stress and suction (p+s) remains constant, then no change in overall volume would occur and the stress state moves on a line known as neutral line (FIG. 17). The microfabric in their model is essentially considered saturated even if the overall saturation of the soil fabric is not achieved. Although, micro structural level behavior remains generally independent of the macrostructure behavior and is basically controlled by the physicochemical processes causing volume variations, there is an obvious interaction and this has been covered in the extended model by coupling of the micro and macro structure (FIGS. 18A and 18B). Therefore, the extended model for expansive clays should consist of three elements as soil behavior at macroscale, behavior at microscale, and the coupling between the two levels. One of the major limitations of the Gens and Alonso model was the assumption regarding the permanent saturation of the microfabric as that does not seem to be realistic as microvoids/inter platelet voids may remain unsaturated as well. The permanent saturation of the microfabric may be considered valid only for the intraplatelet fabric only. Moreover, this model was mainly conceptual in nature and no detailed mathematical formulation was provided till a complete mathematical model by Alonso et al. (1999), named as Barcelona Expansive Model (BExM). See Alonso, E. E Vaunat, J., Gens, A. (1999), "Modeling the mechanical behavior of expansive Clays", Eng Geol 1999; 54:173-83, incorporated herein by reference in its entirety.

Up to this stage, it is clear that modeling of expansive clays require consideration of three basic elements: microstructure model, macrostructure model and the interaction in the form of coupling functions. From Gens and Alonso model onwards, both the micro and macro level models of the unsaturated soils were mostly handled independently by several researchers. However, most of the researchers worked towards the development and improvement of the unsaturated soil model for non-expansive soils, while only few accomplished some improvements and variations in the expansive clays model.

Alonso et al. (1999) had a landmark contribution in expansive clays model by developing a mathematical model for expansive clays based on the concepts developed in the models of Alonso et al. (1990) and Gens and Alonso. Two additional yield surfaces, one for plastic yielding caused by suction increase (SI) and the other by suction decease (SD), were introduced (FIGS. 19 and 20). These surfaces are parallel to the neutral loading line in the space of net mean stress versus suction, and are coupled to the LC surface through two experimentally determined functions. The model by Alonso et al. (1999) is able to predict the irreversible expansion caused by wetting at low stresses and shrinkage at high stresses. In this model, macro-structural plastic volumetric change causes a corresponding change in the location of the LC. When the macro-structure becomes looser, the macro-structural yield surface shrinks. When the structure becomes denser, the elastic domain increases and LC expands. A coupling therefore exists between yield surfaces LC, SI and SD (FIGS. 19 and 20). However, irreversible change of degree of saturation during cyclic wetting and drying was not considered in the model of Gens and Alonso or of Alonso et al. (1999) and this has remained one the major limitation of these models even to the present.

After Alonso et al. (1999) BExM, major contribution towards the development of the expansive clay models was done by Sanchez et al. who formulated an expansive clays model considering concepts of classical and generalized plasticity theories and is shown in FIGS. 21A and 21B. They developed generalized stress-strain rate equations from the concept of a framework of multi-dissipative materials. This framework provides a consistent and formal approach when there are several sources of energy dissipation and is well suited for the modeling of generalized stress reversals. They used a generalized plasticity model for the materials that show irrecoverable deformations upon reloading and also to include the behavior of soils under cyclic loading when they exhibit irreversible deformation in loading, unloading, and reloading. They were successful in modeling the typical aspects of the behavior observed in expansive soils under generalized stress paths including suction and stress changes. The authors attributed significant advantages in using generalized plasticity theory to model the plastic mechanism related to the interaction between two levels of pores structures.

Sanchez et al. formulated the model in the space of stresses, suction and temperature; and implemented the double structure approach in a finite element program CODE BRIGHT. The mechanical law of this model is able to model the macropore invasion induced by microstructure expansion, when conditions of high confinement prevail considering negative values of the function fs for high values of p=po (FIGS. 21 and 22). In FIG. 22, point at which both interaction curves meet, indicated as E; is the equilibrium point. This point represents the state of the material for which no cumulative deformations are observed after cycles of suction changes.

Next major contribution in the modeling of expansive clays could be considered by Pinyol et al. who investigated the dual nature of Claystone by developing independent constitutive models for their rock-like and clay-like behavior. Claystone acts like a Rock when present in the unweathered state while it behaves as Soil in its weathered state. The authors attributed this dual behavior to the presence of basic clay matrix and the quasi-brittle cementation at the microstructure level. They considered the matrix behavior by the elasto-plastic double structure model proposed by Gens and Alonso and Alonso et al. (1999), while cementation/bonding was modeled using the damage mechanics based model. They demonstrated the effectiveness of the developed integrated models through the data generated through experimentation. Models by Pinyol et al. could also be considered a substantial contribution in modeling the natural homogenous types of clay.

The challenge with BExM is that the micro parameters and the function coupling the micro and macro structural strains are difficult to determine experimentally. Moreover, BExM is mainly concentrating on the stress-strain and strength behavior without considering the water retention behavior of the expansive soils. In this respect, several models have been developed for unsaturated soils but no such effort has been made for expansive soils. Sun and Sun developed an elasto-plastic constitutive model for predicting the hydraulic and mechanical behavior of unsaturated expansive soils based on an existing hydro-mechanical model for unsaturated non-expansive soils. See Sun, W. and Sun, D. (2011), "Coupled modeling of hydro-mechanical behavior of unsaturated compacted expansive soils", International Journal of Numerical and Analytical Methods in Geomechanics, Vol. 36, Issue 8, page 1002-1022, incorporated herein by reference in its entirety. They basically developed the first macroscopic elastoplastic model for unsaturated expansive soils and also introduced the concept of equivalent void ratio curve to distinguish between the yield curve and plastic potential curve. Basis is the experimental data and the model developed for unsaturated non-expansive soils. This model incorporates the coupled hydro-mechanical effect of degree of saturation on the mechanical behavior and void ratio on the water-retention behavior. Sun and Sun argued that compression index of swelling clays have been found to be increasing with increase in suction while it decreases with increase in suction for unsaturated non-expansive soils. This is a fundamental difference among the compressibility behavior of the unsaturated non-expansive and expansive soils. Their hydro-mechanically coupled elastoplastic model can predict the hydraulic and mechanical behavior of unsaturated expansive soils. While developing that model, they assumed that pore air and pore-water are continuous throughout the soil voids which are basically true for some regime of water content (degree of saturation) only. Besides being a macroscopic model, this is in fact a major limitation of the model.

Guimaraes et al. may be considered as the pioneer in the formulation of a chemo-mechanical model for the expansive clays with due consideration of the contribution from cation content, osmotic suction, and the cation exchange. See Guimares, L. D., Gens, A., Sanchez, M., and Olivella, S. (2013), "A chemo-mechanical constitutive model accounting for cation exchange in expansive clays", Geotechnique 63, No. 3, 221-234, incorporated herein by reference in its entirety. Their model is a contribution to the microstructure model in the double-structure approach used by Sanchez et al. Their main assumption regarding the elastic or reversibility of the microstructure behavior remains the same. They introduced additional parameters for the microstructure to be incorporated into the constitutive model. Although, the model is quite capable of predicting the behavior of saturated and unsaturated behavior, but most of the basis is through the indirect inferences from macro level studies and no input from molecular level has been incorporated.

Expansive clay minerals are nano-materials and nano-mechanics concepts can be used to improve fundamental understanding of the behavior and predict the volumetric changes under the desired boundary and stress conditions. By obtaining molecular-scale material properties, the macro-scale material behavior can be obtained, with limited input parameters and with great accuracy and details.

For the purpose of molecular/nano level simulations, most commonly adopted technique is the Molecular Dynamics (MD). MD is a computational method which calculates the time dependent behavior of a molecular system. MD is based on Newton's second law of motion and provides a trajectory which specifies the variation of position and velocity of individual atoms in a molecular system with time. In this technique, Individual atoms are characterized by balls with bonds represented as springs. A variety of springs are introduced that capture stretching, angular rotation, and torsion non-bonded interactions are modeled as van der Waals and electrostatic. In MD, individual atoms would be represented by the balls and the connecting major bonds as springs, while non-bonded interactions among the molecules would be represented by the van der Waal's and electrostatics. The potential energy of the system is then calculated using a force-field and is used to calculate the trajectory of the atoms in a molecular system. Force-field (Brooks et al.) is generally given by (see Brooks, B. R., Bruccoleri, R. E., Olafson, B. D., States, D. J., Swaminathan, S., Karplus, M. (1983), "CHARMM: A program for macromolecular energy, minmimization, and dynamics calculations", J. Comp. Chem. 4, 187-217, incorporated herein by reference in its entirety):

$$E_{Total} = E_{coul} + E_{VDW} + E_{Bond\ Stretch} + E_{Angle\ Bend} + E_{Torsion} \quad 2\text{-}1$$

where $$E_{coul} = \frac{e^2}{4\pi\varepsilon_o} \sum_{i \neq j} \frac{q_i q_j}{r_{ij}}$$

-continued $$E_{VDW} = \sum_{i \neq j} D_o \left[ \left[ \frac{R_o}{r_{ij}} \right]^{12} - 2 \left[ \frac{R_o}{r_{ij}} \right]^{5} \right]$$

$$E_{Bond\ Stretch} = k_1 (r - r_o)^2$$

Skipper et al. performed the swelling simulation of various clay minerals using Monte Carlo (MC) simulation technique. See Skipper, N. T., Sposito, G., and Chang, F. R. (1995a), "Monte Carlo simulations of interlayer molecular structure in swelling clay minerals 1. Methodology", Clays and Clay Minerals, Vol. 43, No. 3, pp. 285-293, Skipper, N. T., Sposito, G., and Chang, F. R. (1995b), "Monte Carlo simulations of interlayer molecular structure in swelling clay minerals 1. Monolayer Hydrates", Clays and Clay Minerals, Vol. 43, No. 3, pp. 294-303, each incorporated herein by reference in their entirety. They used MONTE, (Skipper) software for the purpose. See Skipper, N. T. (1992), "MONTE User's Manual", Technical Report, Department of Chemistry, University of Cambridge, UK, incorporated herein by reference in its entirety. They explained the methodology and the simulation details in two of their consecutive papers (Skipper et al.), respectively. They defined the atomic positions and the corresponding effective charges of the clay minerals for the simulation purpose. The outcome of the study showed that Monte Carlo simulations of the Wyoming-type montmorillonite and vermiculite have resulted in layer spacings, average potential energies, and molecular structure that are consistent with the experimental findings.

Karaborni et al. was one of the early researchers who adopted MD for the nano level simulations. See Karaborni, S., Smit, B., Heidug, W. Urai, E. and van Oort, (1996), "The Swelling of Clays: Molecular Simulations of the Hydration of Montmorillonite", Science, Vol. 271, 23 Feb. 1996, 1102-1104, incorporated herein by reference in its entirety. They performed molecular dynamics and Monte Carlo simulations to study the lattice expansion mechanism of the Na-montmorillonite (FIG. 23). The simulation results revealed and confirmed the generally accepted theory of four stable states at lattice basal spacings of 9.7, 12.0, 15.5 and 18.3 Å respectively. They also proved that swelling percentages and the swelling sites in the stable form of the Na-montmorillonite are generally in good quantitative agreement with the previous studies. The swelling process resulted in the development of one, three, and then five water layers. This anomalous behavior has been found to be contradicting the general concept of formation of hydrated cations layers of one, two, three, four etc. in Na-montmorillonite. They also theorized that relative amount of water adsorbed by Na-montmorillonite is a result of the balance between the hydrogen bonding between water and the tetrahedral sheets of the clay and water adsorption in the clay hexagonal cavities. Based on this theory, they defined the stable states to be those where one of the interaction becomes dominant, while an unstable state to be one where a 'frustration effect' is created due to the predominance of both the phenomena simultaneously. They attributed higher swelling potential of Na-montmorillonite to this phenomenon. Therefore, a transition would be required from one orientation of water molecules to a second in order to cause expansion to the clay structure. Clearly, this transition requires lesser free volume of water and is quite easy to take place than the one with the addition of the simultaneous complete layers of water molecules.

Katti et al. (2005) conducted Molecular Dynamics (MD) study of the interlayer response of pyrophyllite under the influence of water and cations in the interlayer. See Katti, D. R., Schmidt, S., Ghosh, P., and Katti, K. S., (2005), "Modeling Response of Pyrophyllite Clay Interlayer to Applied Stress Using Steered Molecular Dynamics", Clays and Clay Minerals, Vol. 52, n2, 171-178, incorporated herein by reference in its entirety. They used NAMD (Phillips et al.) and VMD software to perform interactive simulations and these were simulated on the North Dakota State University 32 processor parallel computer system. See Phillips, J. C Braun, R., Wang, W., Gumbart, J., Tajkhorshid, E., Villa, E., Chipot, C., Skeel, R. D., Kale, L., and Schulten, K (2005), "Scalable molecular dynamics with NAMD", Journal of Computational Chemistry, 26(16), 1781-1802, incorporated herein by reference in its entirety. One of the major parts of the study was to transform the Consistent Force Field (CFF) parameters earlier developed by Teppen et al. to CHARMm force field parameters. See Teppen, B. J., Rasmussen, K., Bertsch, P. M., Miler, D. M., and Schafer, L. (1997), "Molecular dynamics modeling of clay minerals. 1. Gibbsite, kaolinite, pyrophyllite, and beidellite", Journal of Physical Chemistry B, 101, 1579-1587, incorporated herein by reference in its entirety. These were later on used with the NAMD software. Basic pyrophyllite model and the force applied model developed by the authors are respectively shown in FIGS. 24 and 25. In this study, forces were applied on the clay surfaces ranging from 0 pN to 160 pN simulating an equivalent stresses of 0 to 1.65 GPa. The authors concluded that deformation of the clay layers observed in this stress range is only ~1.6% compared to ~12.9% for the interlayer. The modulus of the interlayer and the two-clay-layer unit were found to be 13.18 GPa and 54.56 GPa, respectively.

Wang et al. (2007) studied the elastic properties of several minerals including quartz, albite, calcite, montmorillonite, kaolinite and palygorskite through MD technique. See Wang, J., Sharma A. and Gutierrez, S. M. (2007), "Nanoscale Simulations of Rock and Clay Minerals", ASCE Geotechnical Special Publication 173: Advances in Measurement and Modeling of Soil Behavior Geo-Denver 2007: New Peaks in Geotechnics, incorporated herein by reference in its entirety. They modeled these minerals using both bonded and non-bonded interatomic contributions. The interatomic bonding energies, used in the molecular simulation, are expressed in the following Newtonian form as below:

$$m_i \frac{d^2 r_i}{dt^2} = F_i \qquad 2\text{-}2$$

The force $F_1$ acting on a particle i is calculated from the interatomic potential function U (r, $r_1$, $r_2$, $r_N$ . . . )

$$F_i = \frac{\partial U(r_i, r_2, \ldots r_N)}{\partial r_i}. \quad i = 1, 2, \ldots N \qquad 2\text{-}3$$

Dynamics of the system is dominated only by the interatomic potential function U that is representative of the atomic interaction owing to the complex quantum effects occurring at the subatomic level. They utilized the most commonly adopted pair-wise potentials inclusive of Lennard-Jones (LJ) and Morse potentials, as in the following equations:

$$U(r_i, r_j) = U(r) = 4\varepsilon\left[\left(\frac{\sigma}{r}\right)^{12} - \left(\frac{\sigma}{r}\right)^6\right], \qquad 2\text{-}4$$

$r = |r_{ij}| = |r_i - r_j|$. (LJ potential)

$$U(r) = \varepsilon[e^{2\beta(\rho - r)} - 2e^{\beta(\rho - r)}]. \text{ (Morse potential)} \qquad 2\text{-}5$$

The potential function used by Sato et al. and Ichikawa et al. for the simulation of several clay minerals was used to simulate the specific minerals. See Sato, H., Yamagishi, A. and Kawamura, K. (2001), "Molecular simulation for flexibility of a single clay layer", Journal of Physics Chemistry, vol. B 105, 7990-7997; Ichikawa, Y Kawamura, K., Fuji, N. and Nattavut, T. (2002), "Molecular dynamics and multiscale homogenization analysis of seepage-diffusion problem in bentonite clay", International Journal of Numerical Methods in Engineering 2002; 54:1717-1749, each incorporated herein by reference in their entirety. The function is composed of several potentials such as Coulomb (attractive or repulsive), Born-Mayer-Higgins short range repulsion, van der Waals, and Morse terms. They used TINKER software Ponder for carrying out MD simulations. See Ponder, J. W. (2011), http://dasher.wustl.edu/, Washington University, US, incorporated herein by reference in its entirety. Data input included the initial configuration of the atomic structures and the interatomic potentials assigned to the specific mineral. An NPT (constant number of particles N, pressure P, and temperature T) ensemble was used to acquire the stress-strain behavior of the simulated minerals. The results of the simulations as shown in FIG. 26 reveal a general agreement between the measured and known values of modulli for the minerals except Kaolinite. The authors have attributed the anomalously higher modulus value of Kaolinite to the molecular arrangement at the crystal lattice level.

Wang and Gutierrez (2007) conducted a molecular simulation study of dehydrated 2:1 clay minerals by changing the MD cell size and shape under the general applied stress conditions. See Wang, J., Sharma A. and Gutierrez, S. M. (2007), "Nanoscale Simulations of Rock and Clay Minerals", ASCE Geotechnical Special Publication 173: Advances in Measurement and Modeling of Soil Behavior Geo-Denver 2007: New Peaks in Geotechnics, incorporated herein by reference in its entirety. The molecular simulation method adopted by the authors considered the basic relationship between the atomic level stress tensors, including internal, external, and the simulation stress tensor. They thoroughly investigated the relaxation behavior of the dehydrated mica sheets by the incorporation of varying boundary conditions on the simulation cell. It was concluded that the degree of freedom of the simulation cell is directly related to the formation of the final crystal structure. One of the important conclusions was the shear deformation of the crystal structure in the absence of any boundary constraint. They also showed that the interlayer spacing could either be reduced or completely removed by application of the high normal pressures.

Katti et al. (2009) studied the effect of swelling and swelling pressure of the montmorillonite clay using the experimental set up and further validated the results using numerical techniques. See Katti, D. R., Matar, M. I., Katti, K. S. and Amarasinghe, P. M. (2009), "Multiscale Modeling of Swelling Clays: A Computational and Experimental Approach", KSCE Journal of Civil Engineering (2009) 13(4): 243-255, incorporated herein by reference in its entirety. They used a specially designed swelling device to control the swelling and swelling pressure of the sample and studied the clay fabric created at each specified level. They concluded that there is breakdown of the clay particles/assemblages as the swelling of the clay particles increases as a result of intake of water. They used Fourier Transform Infrared Spectroscopy (FTIR) and X-ray diffraction (XRD) techniques to study the microstructure of the swollen clays. They also used Discrete Element Method (DEM) and Steered MID based numerical techniques to model the swelling behavior of clay soils. Basic model of Na-montmorillonite with 3 water layers is shown in FIG. 27, while the plots of stress vs. interlayer strain with the variation of water content is shown in FIG. 29. Based on the experimental and numerical simulation, main conclusion of their study was there is increase in d-spacing of the clay particles as a result of the swelling and beyond certain d-spacing, particle assemblage breakdown takes place and more and more particles are exposed to swelling.

Tao et al. performed molecular dynamics simulations to investigate the role of the cations K, Na, and Ca on the stability and swelling of montmorillonite. See Tao, L Xiao-Feng, T., Yu, Z. and Tao, G. (2010), "Swelling of K+, Na+ and Ca2+-montmorillonites and hydration of interlayer cations: a molecular dynamics simulation", Chin. Phys. B Vol. 19, No. 10 (2010), incorporated herein by reference in its entirety. They used CLAYFF force field (Cygan et al.) to predict the basal spacing as a function of the water content in the interlayer. See Cygan, R. T., Liang, J. J. and Kalinichev, A. G. (2004), "Molecular Models of Hydroxide, Oxyhydroxide, and Clay Phases and the Development of a General Force Field", J. Phys. Chem. B 108 1255, incorporated herein by reference in its entirety. All MD simulations were carried out using the LAMMPS software package (Plimpton). See Plimpton, S. J. (1995), "Fast Parallel Algorithms for Short-Range Molecular Dynamics", J Comp Phys., 117, 1-19, incorporated herein by reference in its entirety. The results of the simulations showed that the swelling pattern of these simulated Montmorillonite is different than that by the corresponding K+, Na+, and Ca2+ montmorillonite (FIG. 29). The authors discovered that Ca-montmorillonite exhibits less swelling than Na- and K-montmorillonite for a given water content. The results of this study also showed that the higher the hydration energy of the interlayer cation, the greater is this difference. In particular, these results indicated that the valence of the cations has the larger impact on the behaviour of clay-water systems.

Katti et al. (2011) presented the results of modeling of molecular interactions between swelling clay and fluids and their effects on the mechanical and flow characteristics. In this study, MD simulations were conducted to study the possible interactions among clay, water, and cations present in the interlayer using MD based software NAMD (Phillips et al.) and the visualization software VMD (Humphrey et al.). See Humphrey, W., Dalke, A., and Schulten, K (1996), "VMD: Visual molecular dynamics", Journal of Molecular Graphics, 14(1), 33-35, incorporated herein by reference in its entirety. The results of the study showed an increased breakdown of the aggregated particles and their corresponding contributions towards the enhanced swelling and the swelling pressure. Generally, their results showed an agreement with the well-established and determined concepts related to the swelling mechanism of the clay minerals. They discovered that the fact that the forces among clay sheets and Na+ cations are attractive in nature in the dry state. As per their results, these attractive forces/interactions among Na+ and clay surfaces are quite pronounced even up to the presence of 8 water layers in the interlayer and water is still contributing to the attractive forces among hydrated Na+ cations and the water bounded to the clay surfaces even more than 8 water layers (FIG. 30).

Based on the deliberations above, it could be inferred that nano or molecular level processes play a central role in the understanding of the volume change behavior of the expansive clays. Although some studies have been conducted to simulate the swelling and/or water absorption behavior of the single or isolated expansive clay minerals, modeling of the real/natural expansive soil fabric and its interaction with pore fluids at molecular level is still lacking. Moreover, no efforts have been directed to couple the macro and micro scale material behavior to the findings of these molecular simulations. Based on all the above deliberations on the modeling of expansive clay soils, the following may be said:

More effort and emphasis has been directed to the development and enhancement of the unsaturated non-expansive soils models, while much lesser effort has been made towards expansive clay modeling.

Almost all the researchers involved in the unsaturated soils research have considered expansive soils as an extreme case of the unsaturated soils; rather it should be considered both as a special case of saturated soils and unsaturated soils under the complete moisture regime.

Micro and nano level fabrics, believed to have a central role in the overall behavior of expansive clays, are only partially considered in the modeling concepts. Even the partial consideration of the micro and nano level fabric is for the clays compacted/constructed under highly controlled conditions; natural clay fabrics with multiple clay minerals, silt and sand inclusions, micro fissures, cementation, over-consolidation, induration, and other such features have never been considered.

The boundary between expansive and non-expansive soils is not well defined, and more consideration is needed to better understand the behavior of slightly expansive clay soils such as broadly graded soils with small Smectite (and Illite) contents and soil dominated by non-swelling clays such as Kaolinite.

Molecular level research, at present, has just concentrated mostly on one mineral only; interaction with other minerals and macro particles is lacking.

It has been observed that the macroscopic behavior of clay mass may differ considerably from their nano-scale response, which is the major motivation for characterizing and modeling these materials using multiscale simulations.

BRIEF SUMMARY OF THE INVENTION

According to a first aspect, the present disclosure relates to a method of reducing the swell potential of an expansive clayey soil comprising at least one expansive clay mineral. The proportion of the weight of the at least one expansive clay mineral relative to the total weight of the expansive clayey soil is $P_{ECM}$. The expansive clayey soil has a water content and a cation exchange capacity (CEC) expressed in meq/100 g dry expansive clayey soil. The method includes (a) calculating a first amount of a swelling reduction agent to be incorporated into the expansive clayey soil to form a first swelling reduction agent incorporated expansive clayey soil with a reduced swell potential $S_{1i(soil)}$ that is no greater than a pre-set level T with a nano-level constitutive modeling based on the water content as an initial water content (IWC) and the cation exchange capacity (CEC) of the expansive clayey soil, wherein the first swelling reduction agent incorporated expansive clayey soil comprises a first swelling reduction agent incorporated at least one expansive clay mineral having a swell potential represented by $S_{1i(ECM)}$, wherein the swelling reduction agent is at least one selected from the group consisting of calcite, gypsum, potassium chloride, a composition comprising exchangeable $K^+$, a composition comprising exchangeable $Ca^{2+}$, and a composition comprising exchangeable $Mg^{2+}$, wherein the incorporation of the first amount of the swelling reduction agent produces a modified total cohesive energy density (TCEDm) of the first swelling reduction agent incorporated at least one expansive clay mineral calculated according to Equation (6):

$$TCEDm=0.0625(IWC)^3-3.575(IWC)^2+10.5(IWC)+ 2830+7100(C/0.1)+5050(G/0.2)+3010(KCl/0.1)+ Ca(500)+Mg(300)+K(100) \quad (6)$$

where TCEDm=modified ICED, C=Proportion of calcite weight relative to the total weight of the first swelling reduction agent incorporated expansive clayey soil×$P_{ECM}$, G=Proportion of gypsum weight relative to the total weight of the first swelling reduction agent incorporated expansive clayey soil×$P_{ECM}$, KCl=Proportion of potassium chloride weight relative to the total weight of the first swelling reduction agent incorporated expansive clayey soil×$P_{ECM}$, Ca=Proportion of the number of calcium exchangeable cation relative to the total number of exchangeable cations in the first swelling reduction agent incorporated expansive clayey soil, Mg=Proportion of the number of magnesium exchangeable cation relative to the total number of exchangeable cations in the first swelling reduction agent incorporated expansive clayey soil, K=Proportion of the number of potassium exchangeable cation relative to the total number of exchangeable cations in the first swelling reduction agent incorporated expansive clayey soil, IWC=initial water content, wherein the TCEDm of the first swelling reduction agent incorporated at least one expansive clay mineral results in $S_{1i(ECM)}$ calculated according to Equations (2), (3), and (5):

$$IDD=\{-2E-15(TCEDm)^4+5E-11(TCEDm)^3-5E-07 (TCEDm)^2+0.0023(TCEDm)-1.5378\}*1.85* (ABS(CEC-90)/90) \quad (2)$$

where IDD is initial dry density of the first swelling reduction agent incorporated at least one expansive clay mineral, $$FDD=-2E-22(TCEDm)^6+5E-18(TCEDm)^5-6E-14 (TCEDm)^4+3E-10(TCEDm)^3-7E-07(TCEDm)^2+ 0.0005(TCEDm)+0.3747 \quad (3)$$

where FDD is final dry density of the first swelling reduction agent incorporated at least one expansive clay mineral when the first swelling reduction agent incorporated at least one expansive clay mineral reaches the swell potential $S_{1i(ECM)}$, $$S_{1i(ECM)}(\%)=(FDD-IDD)/FDD*100 \quad (5);$$

and wherein the reduced swell potential of the first swelling reduction agent incorporated expansive clayey soil $S_{1i(soil)}$ equals $S_{1i(ECM)} \times P_{ECM}$, and (b) incorporating the first amount of the swelling reduction agent into the expansive clayey soil to form the first swelling reduction agent incorporated expansive clayey soil.

In one or more embodiments, the method further comprises measuring the actual swell potential of the expansive clayey soil represented by $S^*_{soil}$. In one or more embodiments, the method further comprises calculating the swell potential of the expansive clayey soil represented by $S_{soil}$ with the nano-level constitutive modeling based on the water content as an initial water content (IWC) and the cation exchange capacity (CEC) of the expansive clayey soil expressed in meq/100 g dry expansive clayey soil, wherein the at least one expansive clay mineral has a swell potential represented by $S_{ECM}$, wherein the water content of the expansive clayey soil as the initial water content (IWC) produces a modified total cohesive energy density (TCEDm) of the at least one expansive clay mineral calculated according to Equation (6) whether or not the expansive clayey soil further comprises at least one selected from the group consisting of calcite, gypsum, potassium chloride, calcium exchangeable cation, magnesium exchangeable cation, and potassium exchangeable cation before the incorporating the first amount of the swelling reduction agent:

$$TCEDm=0.0625(IWC)^3-3.575(IWC)^2+10.5(IWC)+ 2830+7100(C/0.1)+5050(G/0.2)+3010(KCl/0.1)+ Ca(500)+Mg(300)+K(100) \quad (6)$$

where TCEDm=modified ICED, C=Proportion of calcite weight relative to the total weight of the expansive clayey soil×$P_{ECM}$, G=Proportion of gypsum weight relative to the total weight of the expansive clayey soil×$P_{ECM}$, KCl=Proportion of potassium chloride weight relative to the total weight of the expansive clayey soil×$P_{ECM}$, Ca=Proportion of the number of calcium exchangeable cation relative to the total number of exchangeable cations in the expansive clayey soil, Mg=Proportion of the number of magnesium exchangeable cation relative to the total number of exchangeable cations in the expansive clayey soil, K=Proportion of the number of potassium exchangeable cation relative to the total number of exchangeable cations in the expansive clayey soil, IWC=initial water content, wherein the TCEDm of the at least one expansive clay mineral results in $S_{ECM}$ calculated according to Equations (2), (3), and (5):

$$IDD=\{-2E-15(TCEDm)^4+5E-11(TCEDm)^3-5E-07 (TCEDm)^2+0.0023(TCEDm)-1.5378\}*1.85* (ABS(CEC-90)/90) \quad (2)$$

where IDD is initial dry density of the at least one expansive clay mineral, $$FDD=-2E-22(TCEDm)^6+5E-18(TCEDm)^5-6E-14 (TCEDm)^4+3E-10(TCEDm)^3-7E-07(TCEDm)^2+ 0.0005(TCEDm)+0.3747 \quad (3)$$

where FDD is final dry density of the at least one expansive clay mineral when the at least one expansive clay mineral reaches the swell potential $S_{ECM}$, $$S_{(ECM)}(\%)=(FDD-IDD)/FDD*100 \quad (5),$$

and wherein the swell potential of the expansive clayey soil $S_{soil}$ equals $S_{ECM} \times P_{ECM}$.

In one or more embodiments, the swelling reduction agent comprises gypsum, and the gypsum is white gypsum, red gypsum, or a mixture of white gypsum and red gypsum.

In one or more embodiments, the at least one expansive clay mineral is at least one selected from the group consisting of smectite, bentonite, montmorillonite, beidellite, vermiculite, attapulgite, nontronite, illite, and chlorite.

In one or more embodiments, the expansive clayey soil further comprises sand and the method further comprises removing all or a portion of the sand from the expansive clayey soil prior to the incorporating the first amount of the swelling reduction agent into the expansive clayey soil to form the first swelling reduction agent incorporated expansive clayey soil.

In one or more embodiments, the expansive clayey soil further comprises sand and the method further comprises replacing all or a portion of the sand in the expansive clayey soil with at least one non-expansive clay mineral prior to the incorporating the first amount of the swelling reduction agent into the expansive clayey soil to form the first swelling reduction agent incorporated expansive clayey soil.

In one or more embodiments, the at least one non-expansive clay mineral is selected from the group consisting of kaolinite, mica, hydroxy interlayered vermiculite (HIV), and hydroxy interlayered smectite (HIS).

In one or more embodiments, the method further comprises measuring the actual swell potential of the first swelling reduction agent incorporated expansive clayey soil represented by $S_{1i}{}^*_{(soil)}$, and comparing $S_{1i}{}^*_{(soil)}$ with the pre-set level T.

In one or more embodiments, $S_{1i}{}^*_{(soil)}$ is greater than the pre-set level T and the method further comprises: (a) determining a water content and a cation exchange capacity (CEC) of the first swelling reduction agent incorporated expansive clayey soil, the CEC expressed in meq/100 g dry first swelling reduction agent incorporated expansive clayey soil, (b) calculating a second amount of a swelling reduction agent to be incorporated into the first swelling reduction agent incorporated expansive clayey soil to form a second swelling reduction agent incorporated expansive clayey soil with a further reduced swell potential $S_{2i(soil)}$ that is no greater than the pre-set level T with the nano-level constitutive modeling based on the water content as an initial water content (IWC) and the cation exchange capacity (CEC) of the first swelling reduction agent incorporated expansive clayey soil, wherein the second swelling reduction agent incorporated expansive clayey soil comprises a second swelling reduction agent incorporated at least one expansive clay mineral having a swell potential represented by $S_{2i(ECM)}$, wherein the swelling reduction agent is at least one selected from the group consisting of calcite, gypsum, potassium chloride, a composition comprising exchangeable $K^+$, a composition comprising exchangeable $Ca^{2+}$, and a composition comprising exchangeable $Mg^2$, wherein the incorporation of the second amount of the swelling reduction agent produces a modified total cohesive energy density (TCEDm) of the second swelling reduction agent incorporated at least one expansive clay mineral calculated according to Equation (6):

$$TCEDm=0.0625(IWC)^3-3.575(IWC)^2+10.5(IWC)+2830+7100(C/0.1)+5050(G/0.2)+3010(KCl/0.1)+Ca(500)+Mg(300)+K(100) \quad (6)$$

where TCEDm=modified TCED, C=Proportion of calcite weight relative to the total weight of the second swelling reduction agent incorporated expansive clayey soil×$P_{ECM}$, G=Proportion of gypsum weight relative to the total weight of the second swelling reduction agent incorporated expansive clayey soil×$P_{ECM}$, KCl=Proportion of potassium chloride weight relative to the total weight of the second swelling reduction agent incorporated expansive clayey soil×$P_{ECM}$, Ca=Proportion of the number of calcium exchangeable cation relative to the total number of exchangeable cations in the second swelling reduction agent incorporated expansive clayey soil, Mg=Proportion of the number of magnesium exchangeable cation relative to the total number of exchangeable cations in the second swelling reduction agent incorporated expansive clayey soil, K=Proportion of the number of potassium exchangeable cation relative to the total number of exchangeable cations in the second swelling reduction agent incorporated expansive clayey soil, IWC=initial water content, wherein the TCEDm of the second swelling reduction agent incorporated at least one expansive clay mineral results in $S_{2i(ECM)}$ calculated according to Equations (2), (3), and (5):

$$IDD=\{-2E\text{-}15(TCEDm)^4+5E\text{-}11(TCEDm)^3-5E\text{-}07(TCEDm)^2+0.0023(TCEDm)-1.5378\}*1.85*(ABS(CEC\text{-}90)/90) \quad (2)$$

where IDD is initial dry density of the second swelling reduction agent incorporated at least one expansive clay mineral, $$FDD=-2E\text{-}22(TCEDm)^6+5E\text{-}18(TCEDm)^5-6E\text{-}14(TCEDm)^4+3E\text{-}10(TCEDm)^3-7E\text{-}07(TCEDm)^2+0.0005(TCEDm)+0.3747 \quad (3)$$

where FDD is final dry density of the second swelling reduction agent incorporated at least one expansive clay mineral when the second swelling reduction agent incorporated at least one expansive clay mineral reaches the swell potential $S_{2i(ECM)}$, $$S_{2i(ECM)}(\%)=(FDD-IDD)/FDD*100 \quad (5);$$

and wherein the further reduced swell potential of the second swelling reduction agent incorporated expansive clayey soil $S_{2i(soil)}$ equals $S_{2i(ECM)} \times P_{ECM}$, and (c) incorporating the second amount of the swelling reduction agent into the first swelling reduction agent incorporated expansive clayey soil to form the second swelling reduction agent incorporated expansive clayey soil.

According to a second aspect, the present disclosure relates to another method of reducing the swell potential of an expansive clayey soil comprising at least one expansive clay mineral. The proportion of the weight of the at least one expansive clay mineral relative to the total weight of the expansive clayey soil is $P_{ECM}$. The expansive clayey soil has a first water content and a cation exchange capacity (CEC) expressed in meq/100 g dry expansive clayey soil. The method includes (a) determining a second water content of a wetted expansive clayey soil to be formed by wetting the expansive clayey soil with water, the wetted expansive clayey soil having a reduced swell potential $S_{w(soil)}$ that is no greater than a pre-set level T in accordance with a nano-level constitutive modeling based on the cation exchange capacity (CEC) of the expansive clayey soil and the second water content of the wetted expansive clayey soil as an initial water content (IWC), wherein the wetted expansive clayey soil comprises wetted at least one expansive clay mineral having the second water content and a swell potential $S_{w(ECM)}$ wherein the second water content as the initial water content (IWC) is greater than the first water content but no greater than a final water content (FWC) of the at least one expansive clay mineral when the at least one expansive clay mineral reaches the swell potential, and produces a modified total cohesive energy density (TCEDm) of the wetted at least one expansive clay mineral calculated according to Equation (6) whether or not the expansive clayey soil further comprises at least one selected from the group consisting of calcite, gypsum, potassium chloride, calcium exchangeable cation, magnesium exchangeable cation, and potassium exchangeable cation:

$$TCEDm=0.0625(IWC)^3-3.575(IWC)^2+10.5(IWC)+2830+7100(C/0.1)+5050(G/0.2)+3010(KCl/0.1)+Ca(500)+Mg(300)+K(100) \quad (6)$$

where TCEDm=modified TCED, C=Proportion of calcite weight relative to the total weight of the expansive clayey soil×$P_{ECM}$, G=Proportion of gypsum weight relative to the total weight of the expansive clayey soil×$P_{ECM}$, KCl=Proportion of potassium chloride weight relative to the total weight of the expansive clayey soil×$P_{ECM}$, Ca=Proportion of the number of calcium exchangeable cation relative to the total number of exchangeable cations in the expansive clayey soil, Mg=Proportion of the number of magnesium exchangeable cation relative to the total number of exchangeable cations in the expansive clayey soil, K=Proportion of the number of potassium exchangeable cation relative to the total number of exchangeable cations in the expansive clayey soil, IWC=initial water content, wherein the TCEDm of the wetted at least one expansive clay mineral results in $S_{w(ECM)}$ calculated according to Equations (2), (3), and (5):

$$IDD=\{-2E-15(TCEDm)^4+5E-11(TCEDm)^3-5E-07(TCEDm)^2+0.0023(TCEDm)-1.5378\}*1.85*(ABS(CEC-90)/90) \quad (2)$$

where IDD is initial dry density of the wetted at least one expansive clay mineral, $$FDD=-2E-22(TCEDm)^6+5E-18(TCEDm)^5-6E-14(TCEDm)^4+3E-10(TCEDm)^3-7E-07(TCEDm)^2+0.0005(TCEDm)+0.3747 \quad (3)$$

where FDD is final dry density of the wetted at least one expansive clay mineral when the wetted at least one expansive clay mineral reaches the swell potential $S_{w(ECM)}$, $$S_{w(ECM)}(\%)=(FDD-IDD)/FDD*100 \quad (5);$$

and wherein the reduced swell potential of the wetted expansive clayey soil $S_{w(soil)}$ equals $S_{w(ECM)} \times P_{ECM}$, and (b) wetting the expansive clayey soil with water to form the wetted expansive clayey soil having the second water content.

In one or more embodiments, the method further comprises calculating the final water content (FWC) of the at least one expansive clay mineral when the at least one expansive clay mineral reaches the swell potential with the nano-level constitutive modeling based on the first water content as an initial water content (IWC) and the cation exchange capacity (CEC) of the expansive clayey soil, wherein the at least one expansive clay mineral has a modified total cohesive energy density (TCEDm) calculated according Equation (6) whether or not the expansive clayey soil further comprises at least one selected from the group consisting of calcite, gypsum, potassium chloride, calcium exchangeable cation, magnesium exchangeable cation, and potassium exchangeable cation:

$$TCEDm=0.0625(IWC)^3-3.575(IWC)^2+10.5(IWC)+2830+7100(C/0.1)+5050(G/0.2)+3010(KCl/0.1)+Ca(500)+Mg(300)+K(100) \quad (6)$$

where TCEDm=modified TCED, C=Proportion of calcite weight relative to the total weight of the expansive clayey soil×$P_{ECM}$, G=Proportion of gypsum weight relative to the total weight of the expansive clayey soil×$P_{ECM}$, KCl=Proportion of potassium chloride weight relative to the total weight of the expansive clayey soil×$P_{ECM}$, Ca=Proportion of the number of calcium exchangeable cation relative to the total number of exchangeable cations in the expansive clayey soil, Mg=Proportion of the number of magnesium exchangeable cation relative to the total number of exchangeable cations in the expansive clayey soil, K=Proportion of the number of potassium exchangeable cation relative to the total number of exchangeable cations in the expansive clayey soil, IWC=initial water content, and wherein the TCEDm of the at least one expansive clay mineral results in the final water content (FWC) of the at least one expansive clay mineral when the at least one expansive clay mineral reaches the swell potential according to Equation (4):

$$FWC=\{1E-13(TCEDm)^4-4E-09(TCEDm)^3+4E-05(TCEDm)^2-0.2037TCEDm+369.54\}*ABS(CEC^2-90)/CEC^2*0.82 \quad (4)$$

According to a third aspect, the present disclosure relates to a method of preparing a site having an expansive clayey soil having a swell potential $S_{soil}$ between T2 and T1, where T2<T1, under a two-limit criteria or at or above a pre-set limit T* under a single limit criteria, a first water content, and a cation exchange capacity (CEC) expressed in meq/100 g dry expansive clayey soil, and comprising at least one expansive clay mineral to build a structure. The proportion of the weight of the at least one expansive clay mineral relative to the total weight of the expansive clayey soil is $P_{ECM}$. The method includes (a) calculating a first amount of a swelling reduction agent to be incorporated into the expansive clayey soil to form a first swelling reduction agent incorporated expansive clayey soil with a reduced swell potential $S_{1i(soil)}$ that is no greater than T2 or the pre-set limit T* with a nano-level constitutive modeling based on the first water content as an initial water content (IWC) and the cation exchange capacity (CEC) of the expansive clayey soil, wherein the first swelling reduction agent incorporated expansive clayey soil comprises a first swelling reduction agent incorporated at least one expansive clay mineral having a swell potential represented by $S_{1i(ECM)}$, wherein the swelling reduction agent is at least one selected from the group consisting of calcite, gypsum, potassium chloride, a composition comprising exchangeable $K^+$, a composition comprising exchangeable $Ca^{2+}$, and a composition comprising exchangeable $Mg^{2+}$, wherein the incorporation of the first amount of the swelling reduction agent produces a modified total cohesive energy density (TCEDm) of the first swelling reduction agent incorporated at least one expansive clay mineral calculated according to Equation (6):

$$TCEDm=0.0625(IWC)^3-3.575(IWC)^2+10.5(IWC)+2830+7100(C/0.1)+5050(G/0.2)+3010(KCl/0.1)+Ca(500)+Mg(300)+K(100) \quad (6)$$

where TCEDm=modified TCED, C=Proportion of calcite weight relative to the total weight of the first swelling reduction agent incorporated expansive clayey soil×$P_{ECM}$, G=Proportion of gypsum weight relative to the total weight of the first swelling reduction agent incorporated expansive clayey soil×$P_{ECM}$, KCl=Proportion of potassium chloride weight relative to the total weight of the first swelling reduction agent incorporated expansive clayey soil×$P_{ECM}$, Ca=Proportion of the number of calcium exchangeable cation relative to the total number of exchangeable cations in the first swelling reduction agent incorporated expansive clayey soil, Mg=Proportion of the number of magnesium exchangeable cation relative to the total number of exchangeable cations in the first swelling reduction agent incorporated expansive clayey soil, K=Proportion of the number of potassium exchangeable cation relative to the total number of exchangeable cations in the first swelling reduction agent incorporated expansive clayey soil, IWC=initial water content, wherein the TCEDm of the first swelling reduction agent incorporated at least one expansive clay mineral results in $S_{1i\ (ECM)}$ calculated according to Equations (2), (3), and (5):

$$IDD=\{-2E-15(TCEDm)^4+5E-11(TCEDm)^3-5E-07(TCEDm)^2+0.0023(TCEDm)-1.5378\}*1.85*(ABS(CEC-90)/90) \quad (2)$$

where IDD is initial dry density of the first swelling reduction agent incorporated at least one expansive clay mineral, $$FDD=-2E-22(TCEDm)^6+5E-18(TCEDm)^5-6E-14(TCEDm)^4+3E-10(TCEDm)^3-7E-07(TCEDm)^2+0.0005(TCEDm)+0.3747 \quad (3)$$

where FDD is final dry density of the first swelling reduction agent incorporated at least one expansive clay mineral when the first swelling reduction agent incorporated at least one expansive clay mineral reaches the swell potential $S_{1i\,(ECM)}$, $$S_{1i(ECM)}(\%)=(FDD-IDD)/FDD*100 \quad (5);$$

and wherein the reduced swell potential of the first swelling reduction agent incorporated expansive clayey soil $S_{1i(soil)}$ equals $S_{1i(ECM)} \times P_{ECM}$, and (b) incorporating the first amount of the swelling reduction agent into the expansive clayey soil at the site to form the first swelling reduction agent incorporated expansive clayey soil.

In one or more embodiments, the swelling reduction agent comprises gypsum, and the gypsum is white gypsum, red gypsum, or a mixture of white gypsum and red gypsum.

In one or more embodiments, the method further comprises incorporating into the expansive clayey soil or the first swelling reduction agent incorporated expansive clayey soil a soil stabilizing composition comprising at least one material selected from the group consisting of ground granulated blastfurnace slag (GGBS), cement, resins, fly ash, lime, pozzolana, and a mixture of lime and pozzolana to form a stabilized expansive clayey soil or a stabilized first swelling reduction agent incorporated expansive clayey soil.

In one or more embodiments, the swelling reduction agent comprises gypsum, the soil stabilizing composition comprises ground granulated blastfurnace slag (GGBS), a mixture of the gypsum and the GGBS is incorporated into the expansive clayey soil, and the weight ratio of the gypsum: the GGBS in the mixture lies in the range of 1:3 to 3:2.

In one or more embodiments, the soil stabilizing composition further comprises lime to adjust the pH of the mixture of the gypsum and the GGBS to be greater than 10.5.

In one or more embodiments, the at least one expansive clay mineral is at least one selected from the group consisting of smectite, bentonite, montmorillonite, beidellite, vermiculite, attapulgite, nontronite, illite, and chlorite.

In one or more embodiments, the expansive clayey soil further comprises sand and the method further comprises removing all or a portion of the sand from the expansive clayey soil prior to the incorporating the first amount of the swelling reduction agent into the expansive clayey soil to form the first swelling reduction agent incorporated expansive clayey soil.

In one or more embodiments, the structure is selected from the group consisting of a building foundation, a railway line foundation, a pipe, a footing, a landfill liner, a nuclear waste storage containment liner, a swimming pool, a wall, a driveway, a road, a pavement, a basement floor, and a wellbore.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1A is a graphical presentation of swelling behavior of Sand-Clay mixture (El Sohbi and Rabba, 1981).

FIG. 1B is a graphical presentation of swelling behavior of Silt-Clay mixture (El Sohbi and Rabba, 1981).

FIG. 13 is a graphical presentation of hydration process of the clay particle layers (Wayllace, 2008).

FIG. 14A is a graphical presentation of Load Collapse (LC) yield surface concept (Alonso et al., 1990).

FIG. 14B is a graphical presentation of change in specific volume corresponding to L1, L2, and L3 according to FIG. 14A (Alonso et al., 1990).

FIG. 14C is a graphical presentation of change in specific volume corresponding to C1, C2, and C3 according to FIG. 14A (Alonso et al., 1990).

FIGS. 18A and 18B are graphical presentations of coupling function in the expansive clay model (Gens and Alonso, 1992).

FIGS. 21A and 21B are graphical presentations of constitutive surface for expansive clay in the model (Sanchez et al., 2005).

FIG. 109 is a graphical presentation of XRD Results of 100% bentonite compacted on dry of OMC—pre swell conditions.

FIG. 110 is a graphical presentation of XRD Results of 100% bentonite compacted on dry of OMC—post swell conditions.

FIG. 111 is a graphical presentation of XRD Results of 100% bentonite compacted on wet of OMC—pre swell conditions.

FIG. 112 is a graphical presentation of XRD Results of 100% bentonite compacted on wet of OMC—post swell conditions.

FIG. 113 is a graphical presentation of XRD Results of 30% bentonite, 50% Calcite, and 20% Sand compacted on dry of OMC—pre swell conditions.

FIG. 114 is a graphical presentation of XRD Results of 30% bentonite, 50% Calcite, and 20% Sand compacted on dry of OMC—post swell conditions.

FIG. 115 is a graphical presentation of XRD Results of 30% bentonite, 50% Gypsum, and 20% Sand compacted on dry of OMC—pre swell conditions.

FIG. 116 is a graphical presentation of XRD Results of 30% bentonite, 50% gypsum, and 20% sand compacted on dry of OMC—post swell conditions.

FIG. 117 is a graphical presentation of XRD Results of 30% bentonite, static compaction on dry of OMC—pre swell conditions.

FIG. 118 is a graphical presentation of XRD Results of 30% bentonite, static compaction on dry of OMC—post swell conditions.

FIG. 119 is a graphical presentation of XRD Results of 30% bentonite, 30% calcite, and 40% sand compacted on dry of OMC—pre swell conditions.

FIG. 120 is a graphical presentation of XRD Results of 30% bentonite, 30% calcite, and 40% sand compacted on dry of OMC—post swell conditions.

Figure 121:
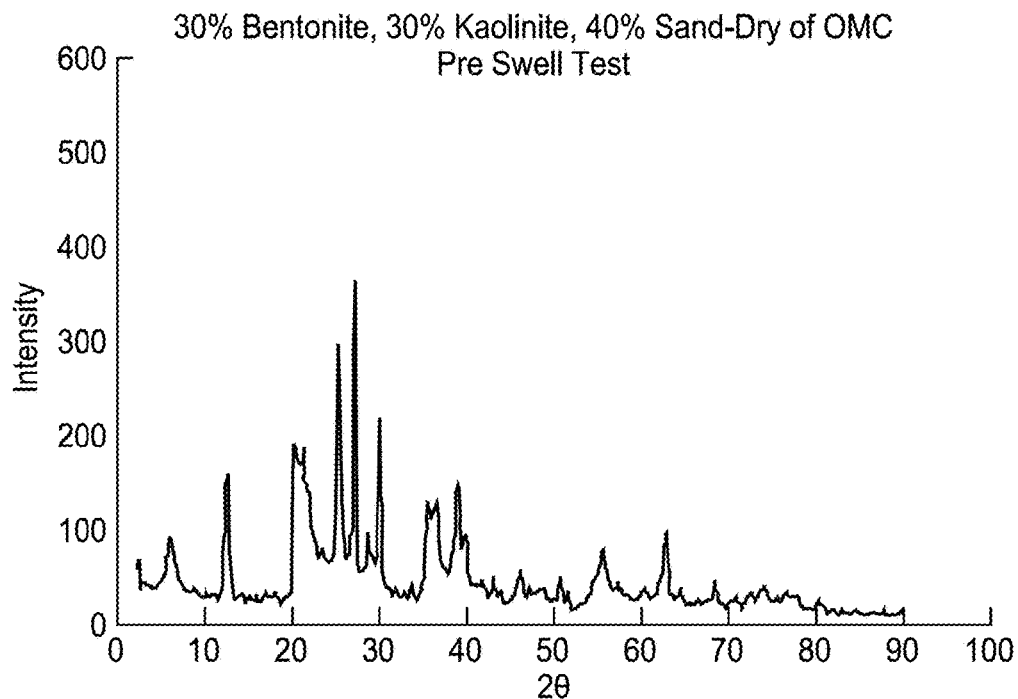

FIG. 121 is a graphical presentation of XRD Results of 30% bentonite, 30% kaolinite, and 40% sand compacted on dry of OMC—pre swell conditions.

Figure 122:
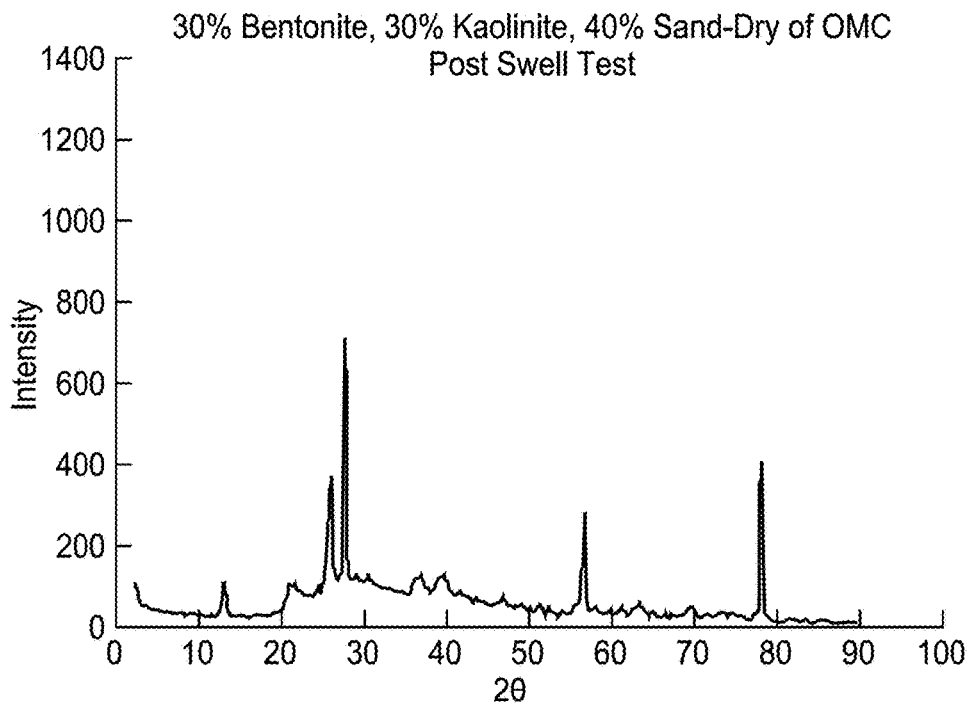

FIG. 122 is a graphical presentation of XRD Results of 30% bentonite, 30% kaolinite, and 40% sand compacted on dry of OMC—post swell conditions.

Figure 123:
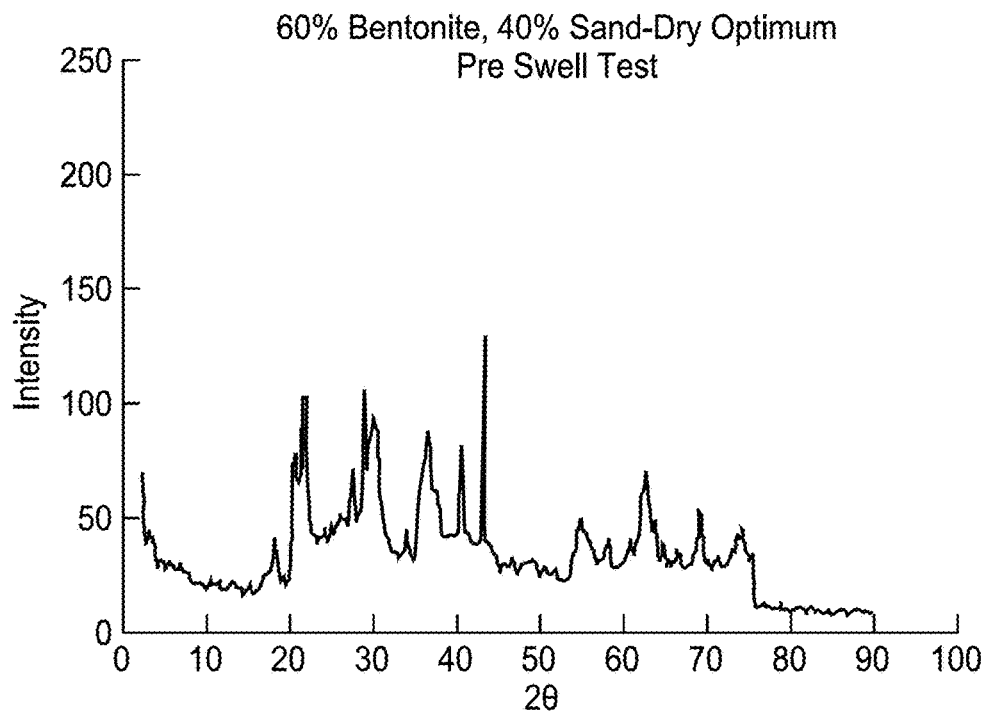

FIG. 123 is a graphical presentation of XRD Results of 60% bentonite and 40% sand compacted on dry of OMC—pre swell conditions.

Figure 124:
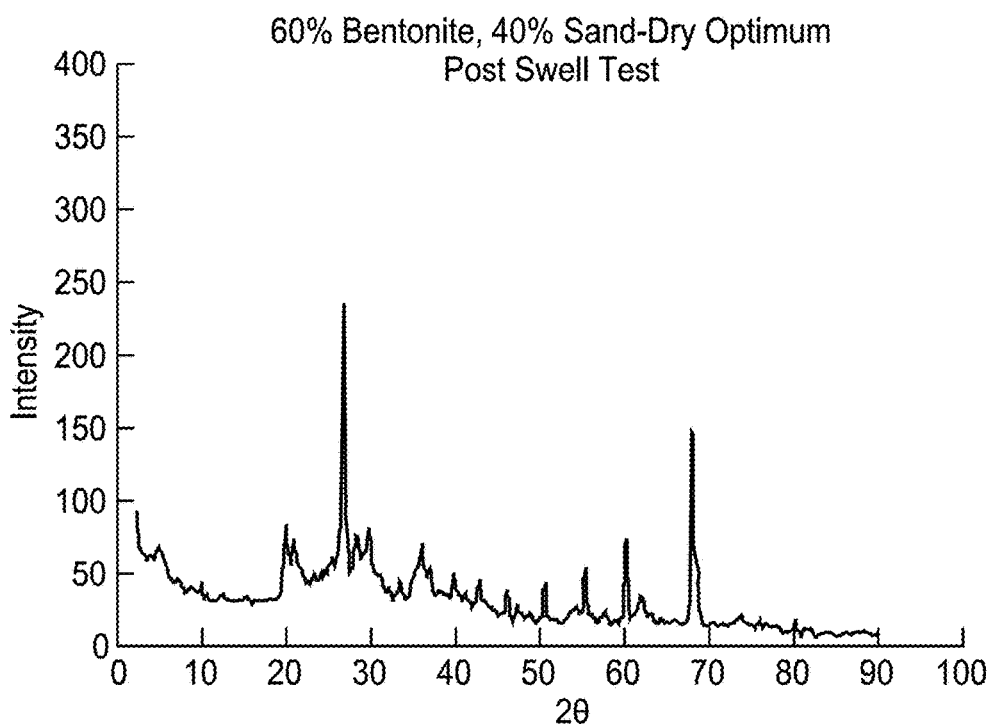

FIG. 124 is a graphical presentation of XRD Results of 60% bentonite and 40% sand compacted on dry of OMC—post swell conditions.

Figure 125:
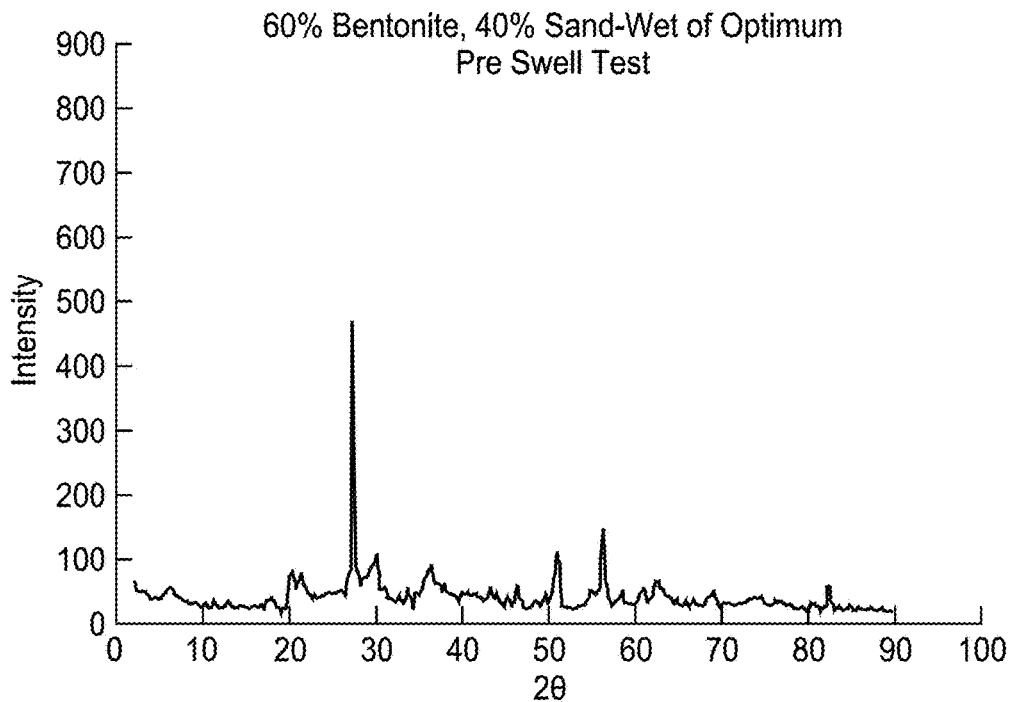

FIG. 125 is a graphical presentation of XRD Results of 60% bentonite, and 40% sand compacted on wet of OMC—pre swell conditions.

Figure 126:
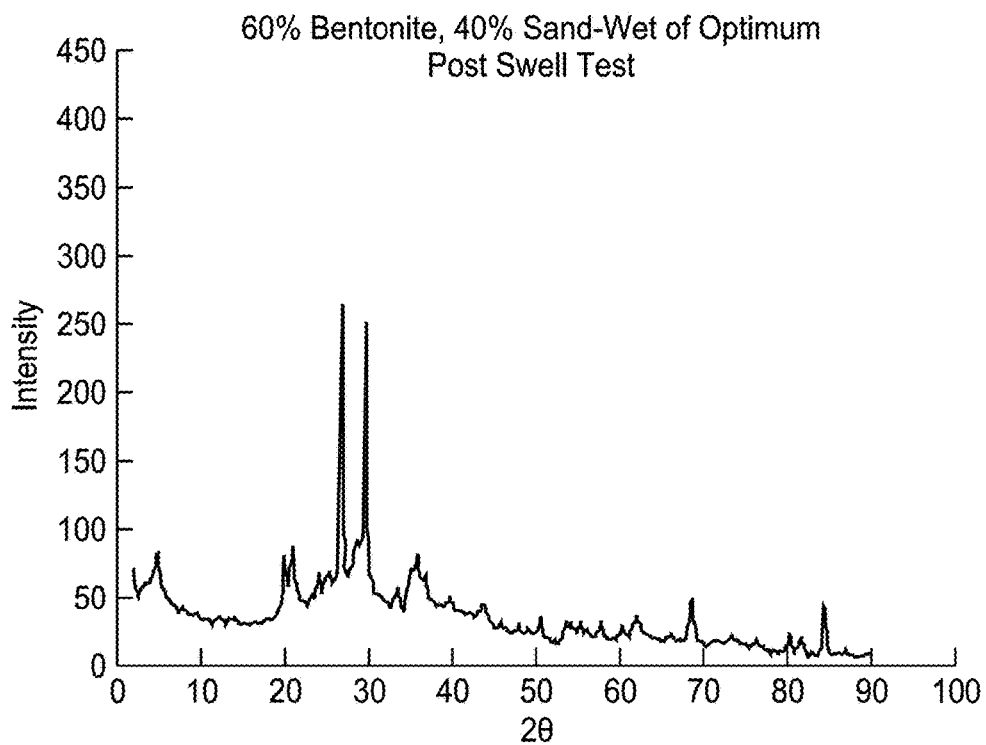

FIG. 126 is a graphical presentation of XRD Results of 60% Bentonite and 40% Sand compacted on wet of OMC—post swell conditions.

Figure 127:
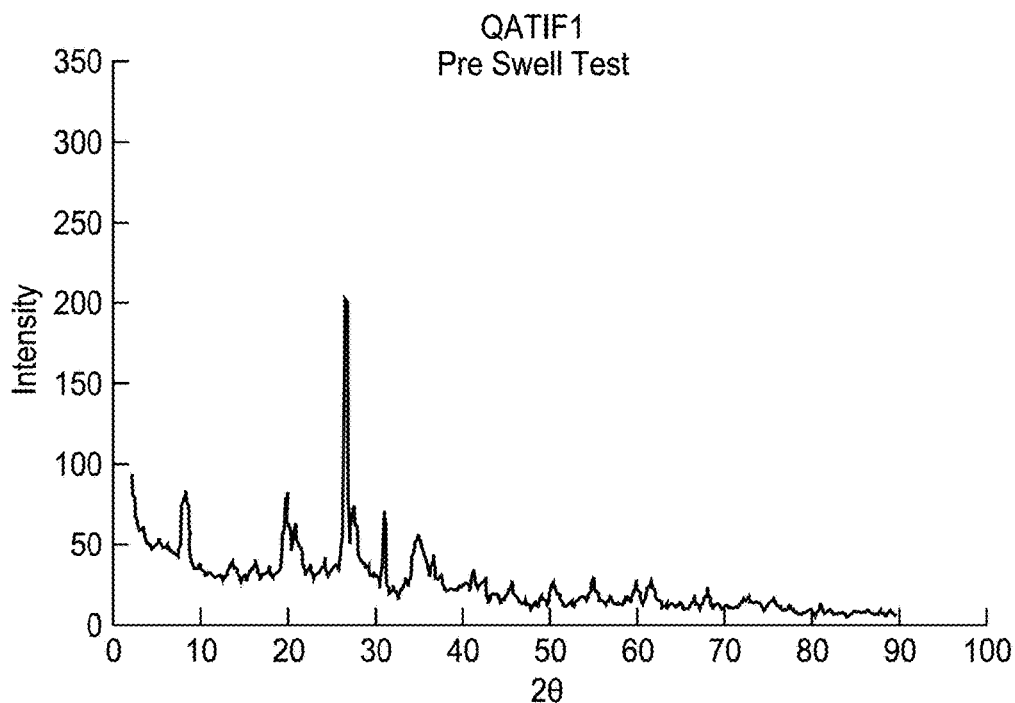

FIG. 127 is a graphical presentation of XRD Results of Qatif-1 sample at NMC—pre swell conditions.

Figure 128:
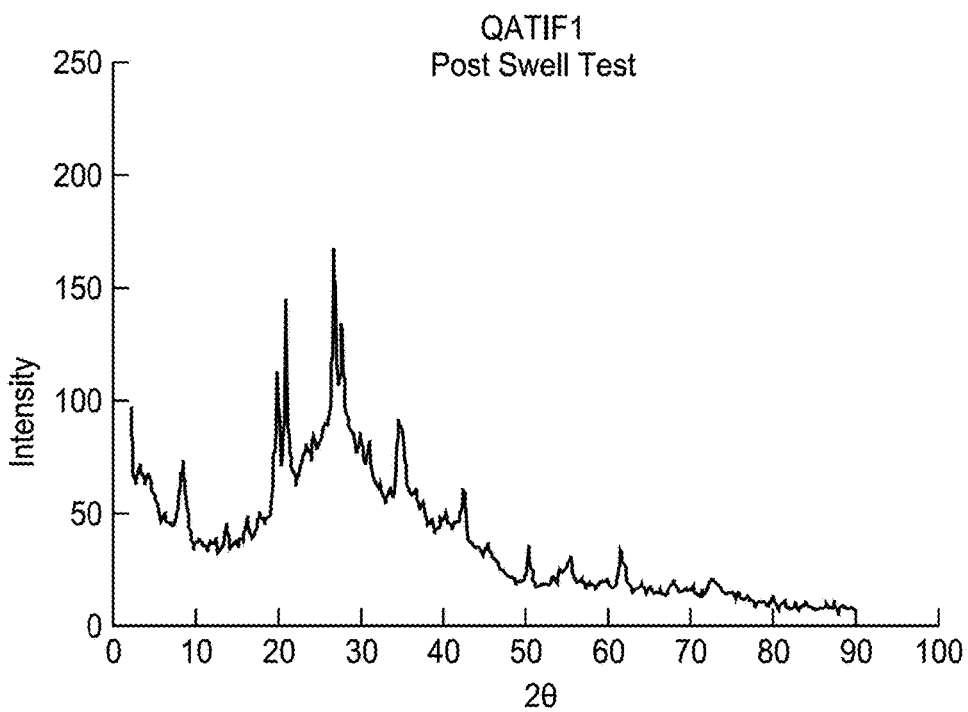

FIG. 128 is a graphical presentation of XRD Results of Qatif-1 sample at NMC—post swell conditions.

Figure 129:
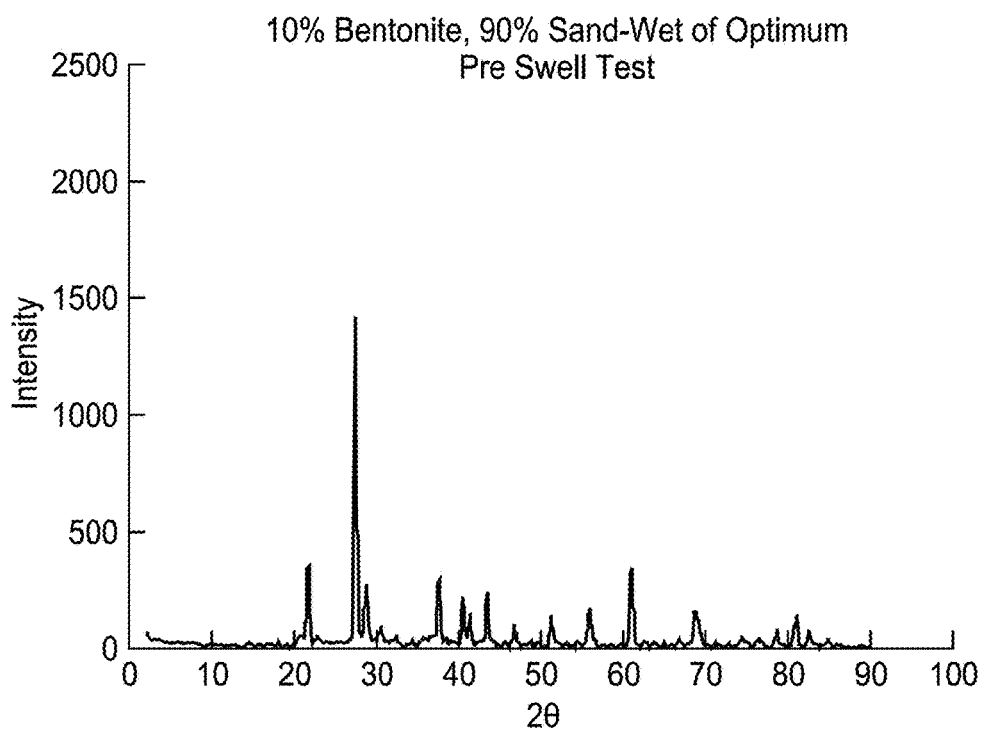

FIG. 129 is a graphical presentation of XRD Results of 10% Bentonite and 90% Sand compacted on wet of OMC—pre swell conditions.

Figure 130:
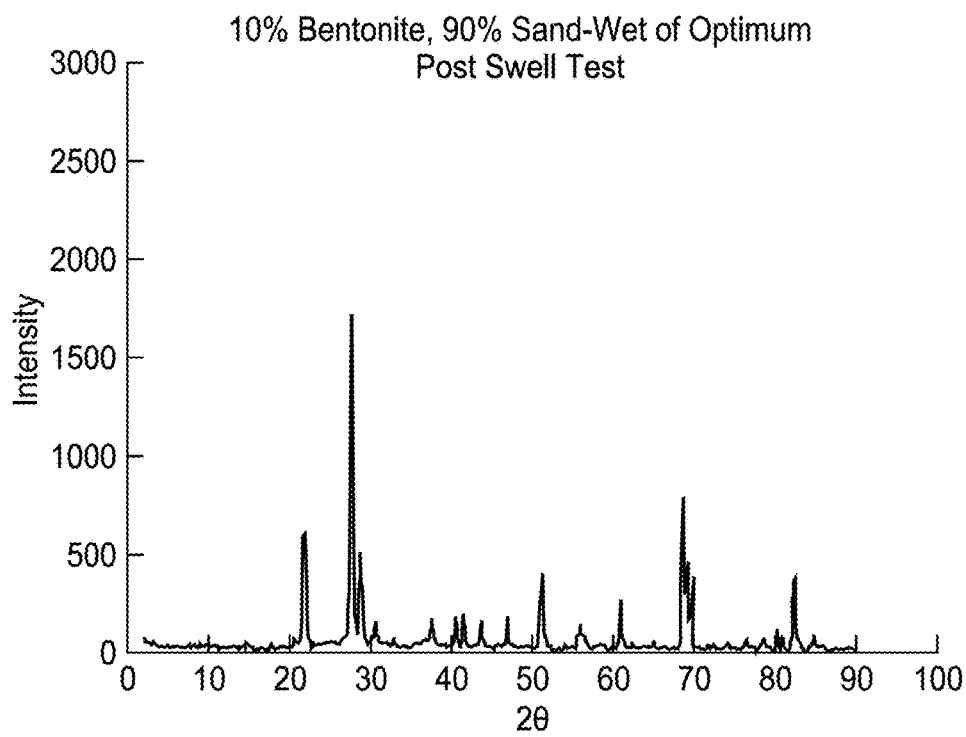

FIG. 130 is a graphical presentation of XRD Results of 10% Bentonite and 90% Sand compacted on wet of OMC—post swell conditions.

Figure 131:
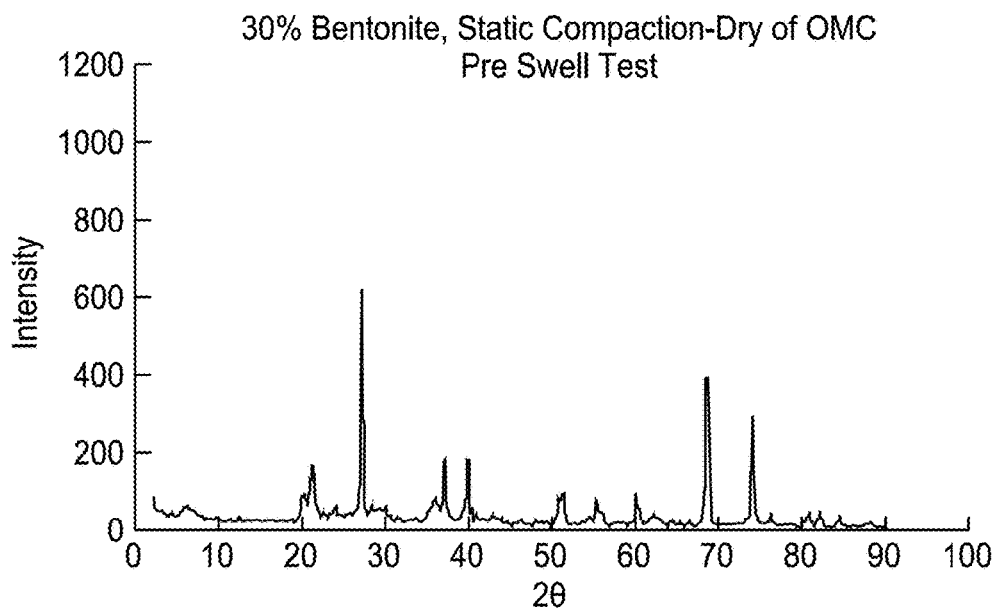

FIG. 131 is a graphical presentation of XRD Results of 30% Bentonite, 30% Gypsum, and 40% Sand compacted on dry of OMC—pre swell conditions.

Figure 132:
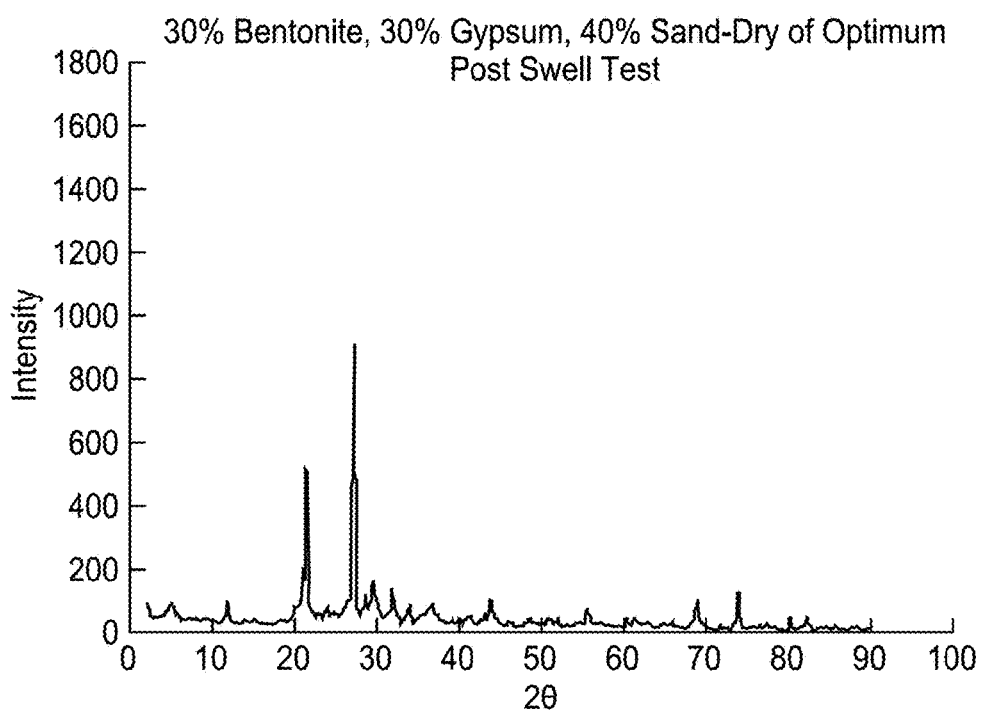

FIG. 132 is a graphical presentation of XRD Results of 30% Bentonite, 30% Gypsum, and 40% Sand compacted on dry of OMC—post swell conditions.

Figure 133:
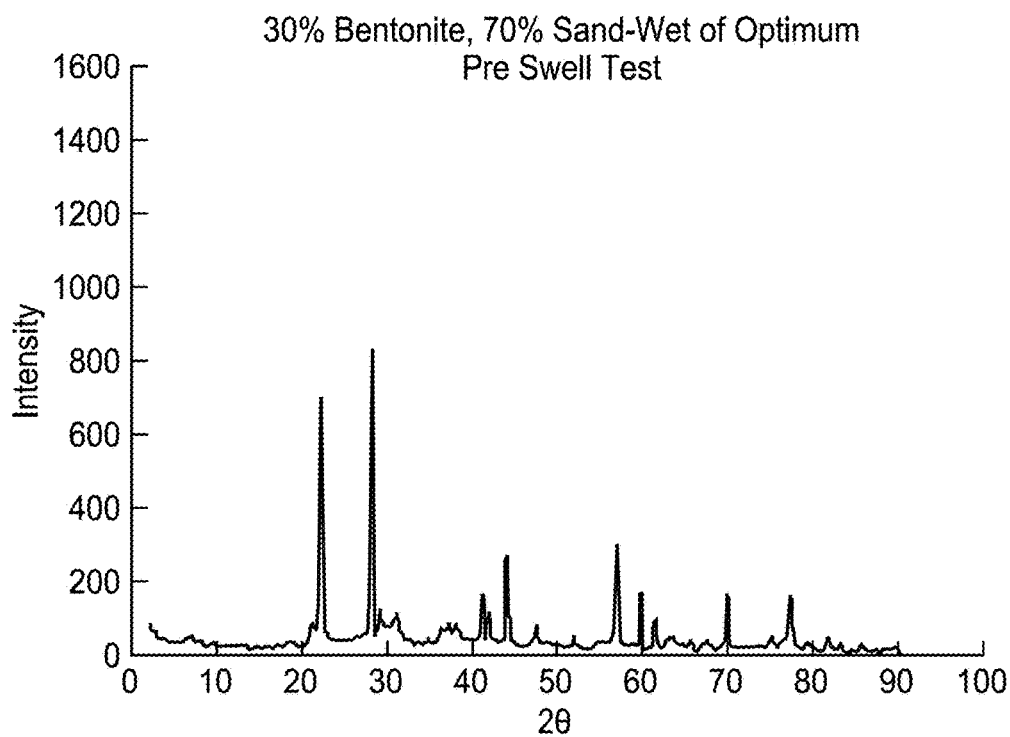

FIG. 133 is a graphical presentation of XRD Results of 30% Bentonite and 70% Sand compacted on wet of OMC—pre swell conditions.

Figure 134:
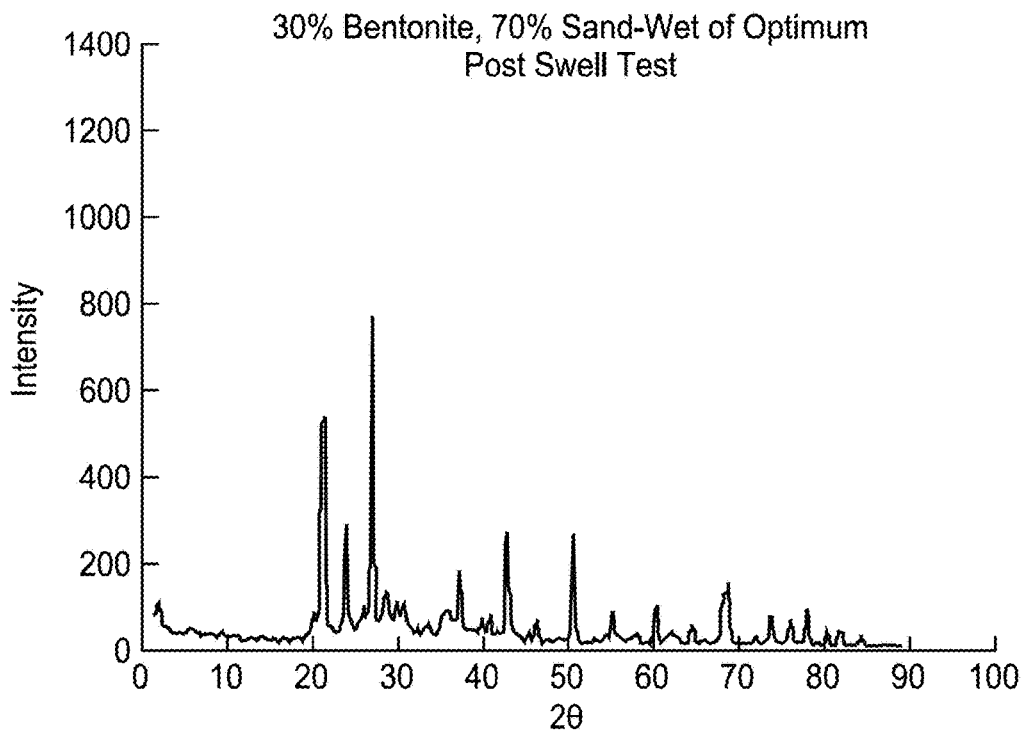

FIG. 134 is a graphical presentation of XRD Results of 30% Bentonite and 70% Sand compacted on wet of OMC—post swell conditions.

Figure 135:
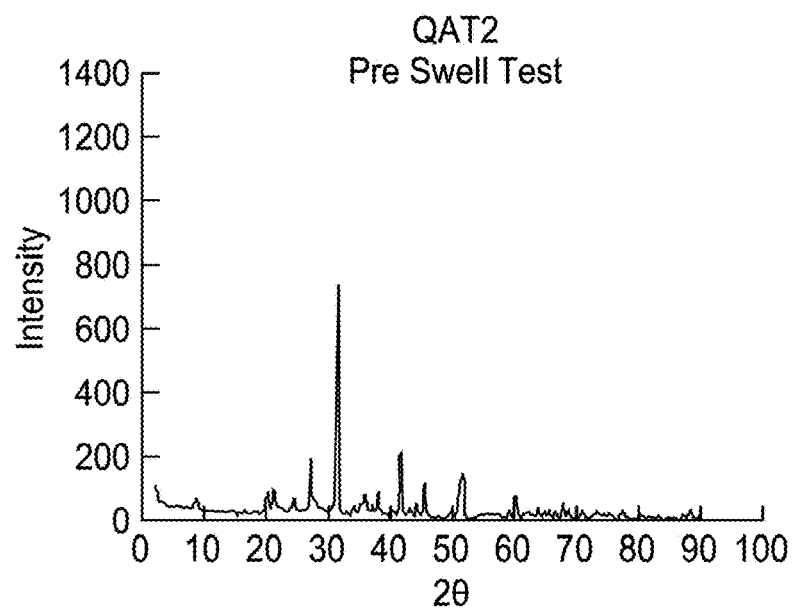

FIG. 135 is a graphical presentation of XRD Results of Qatif-2 sample at NMC—pre swell conditions.

Figure 136:
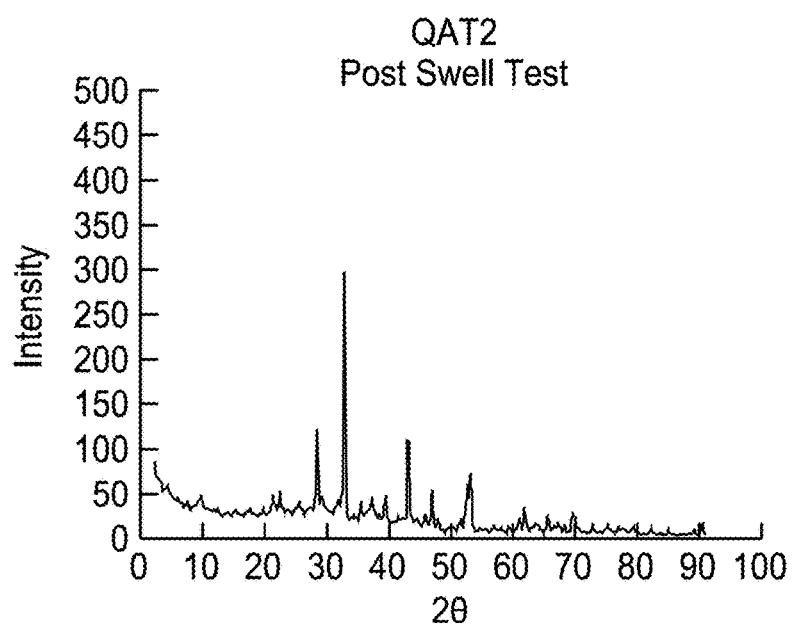

FIG. 136 is a graphical presentation of XRD Results of Qatif-2 sample at NMC—post swell conditions.

Figure 137:
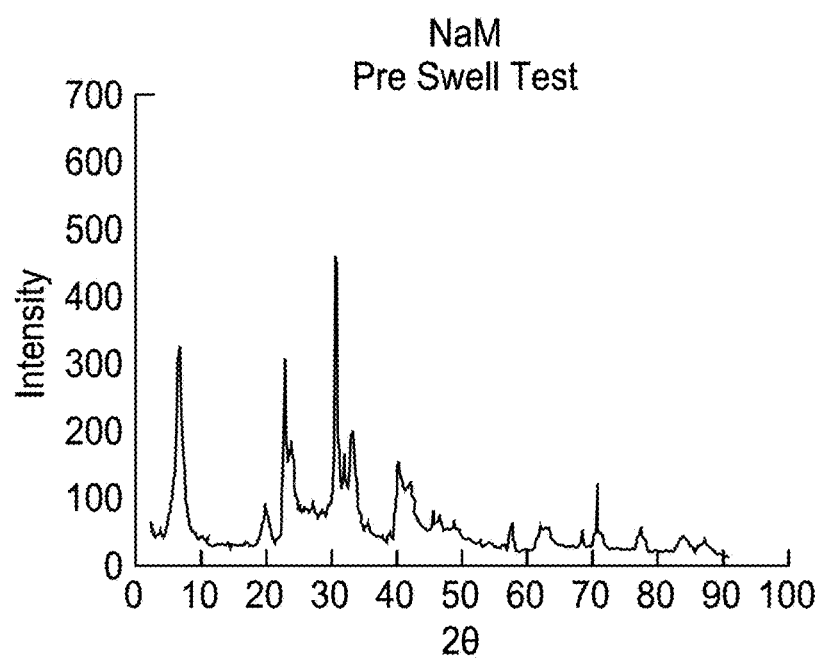

FIG. 137 is a graphical presentation of XRD Results of Na-montmorillonite from The Clay Minerals Society compacted on dry of OMC—pre swell conditions.

Figure 138:
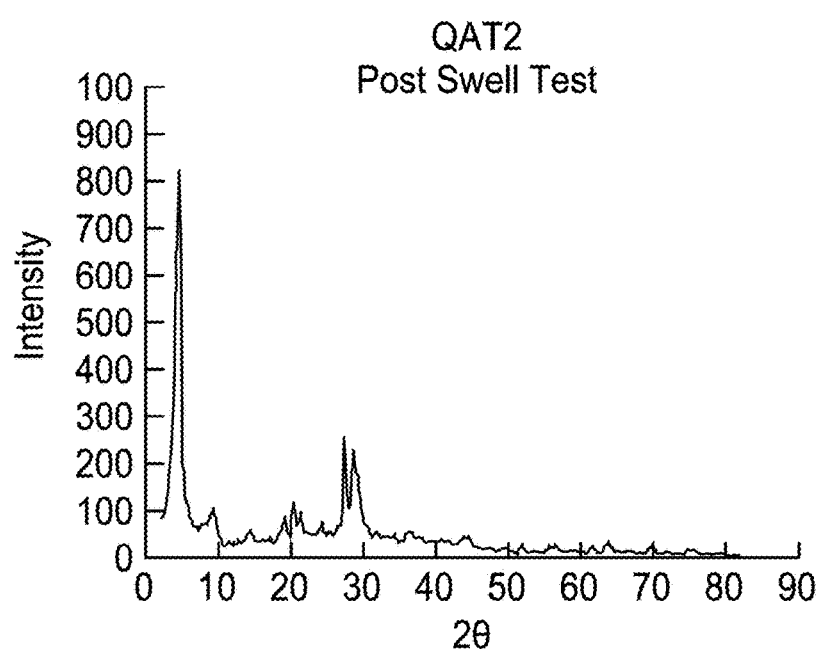

FIG. 138 is a graphical presentation of XRD Results of Na-montmorillonite from The Clay Minerals Society compacted on dry of OMC—post swell conditions.

Figure 139:
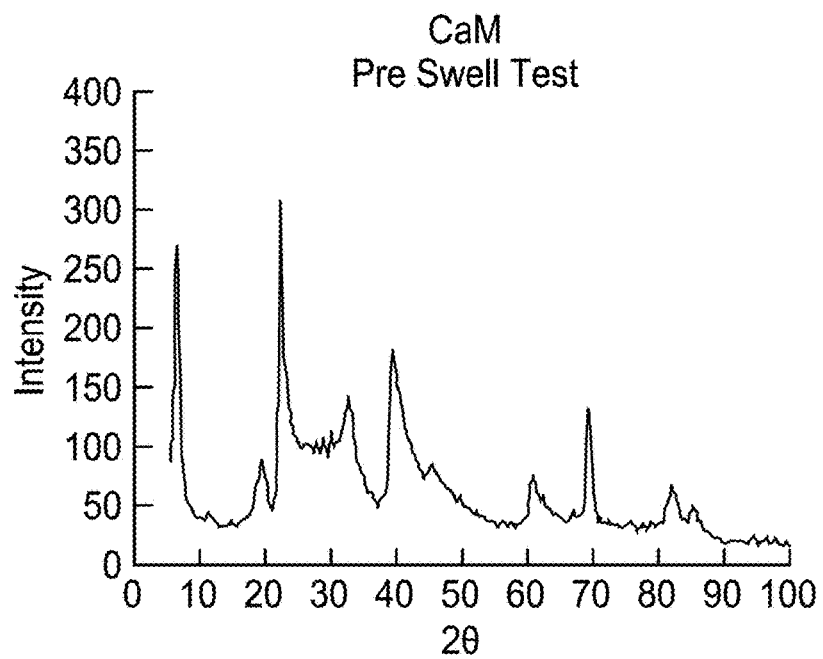

FIG. 139 is a graphical presentation of XRD Results of Ca-montmorillonite from The Clay Minerals Society compacted on dry of OMC—pre swell conditions.

Figure 140:
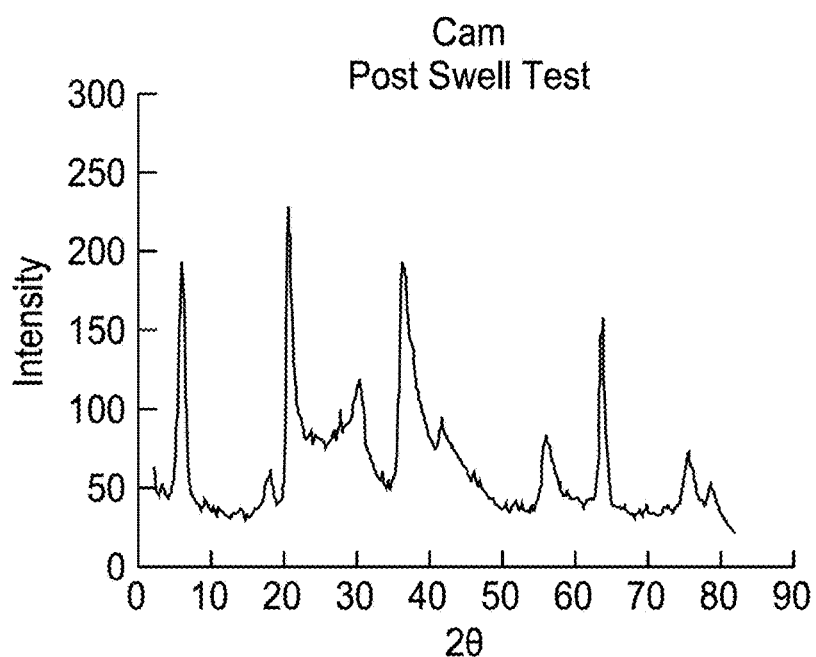

FIG. 140 is a graphical presentation of XRD Results of Ca-montmorillonite from The Clay Minerals Society compacted on dry of OMC—post swell conditions.

Figure 141:
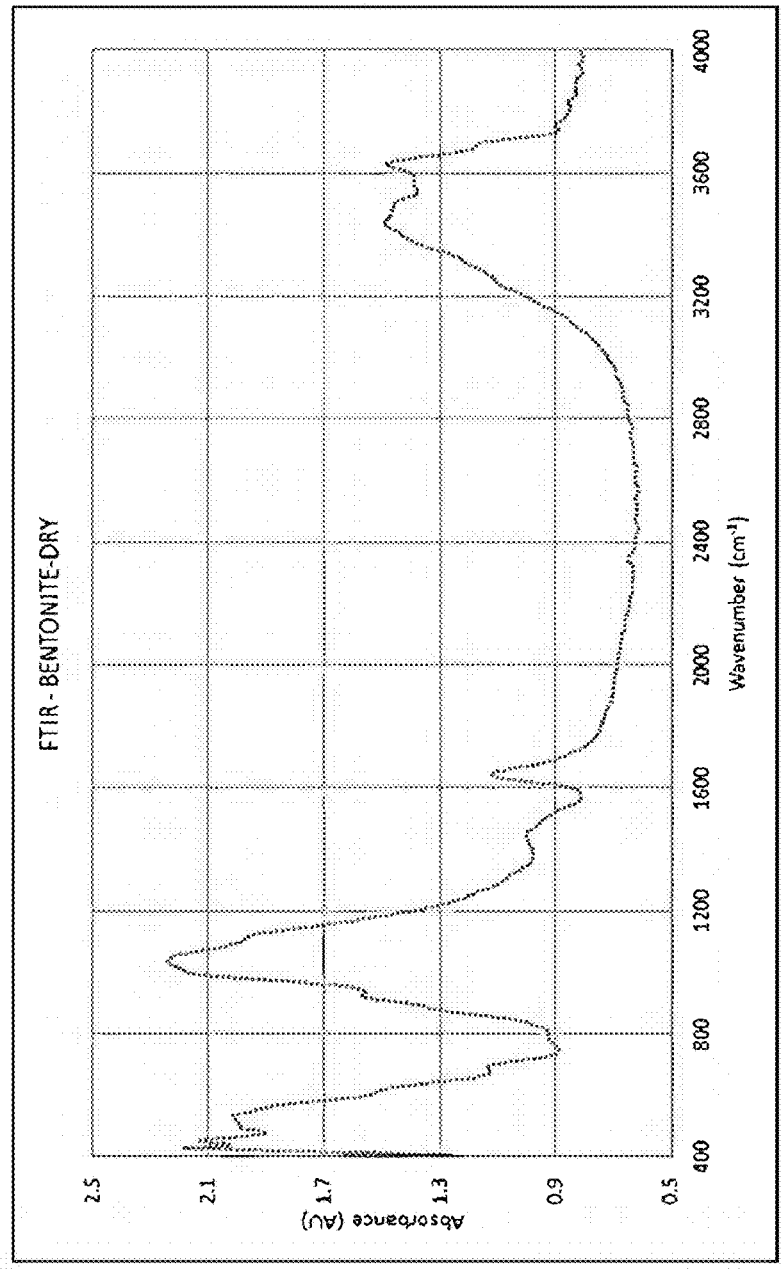

FIG. 141 is a graphical presentation of FTIR results of dry Bentonite sample.

Figure 142:
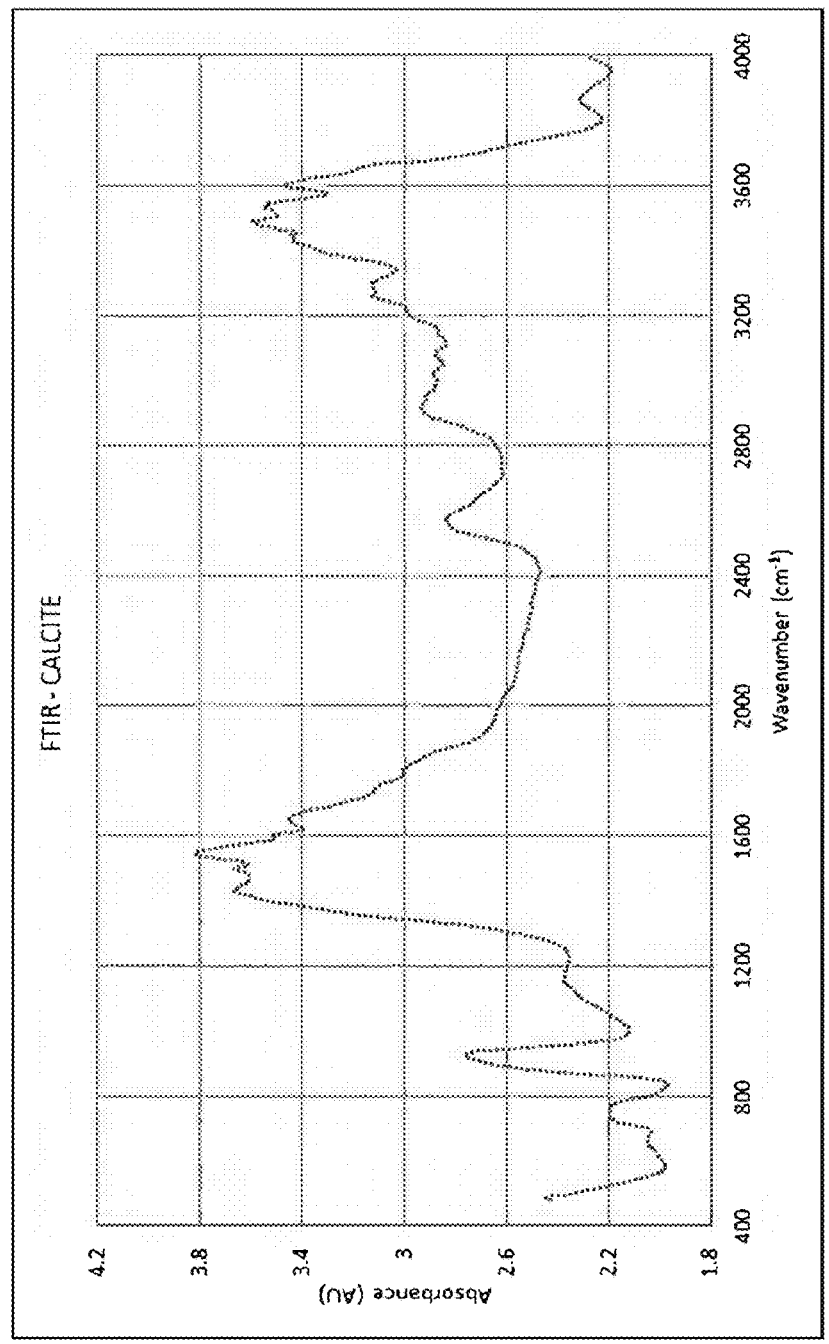

FIG. 142 is a graphical presentation of FTIR results of Calcium Carbonate sample.

Figure 143:
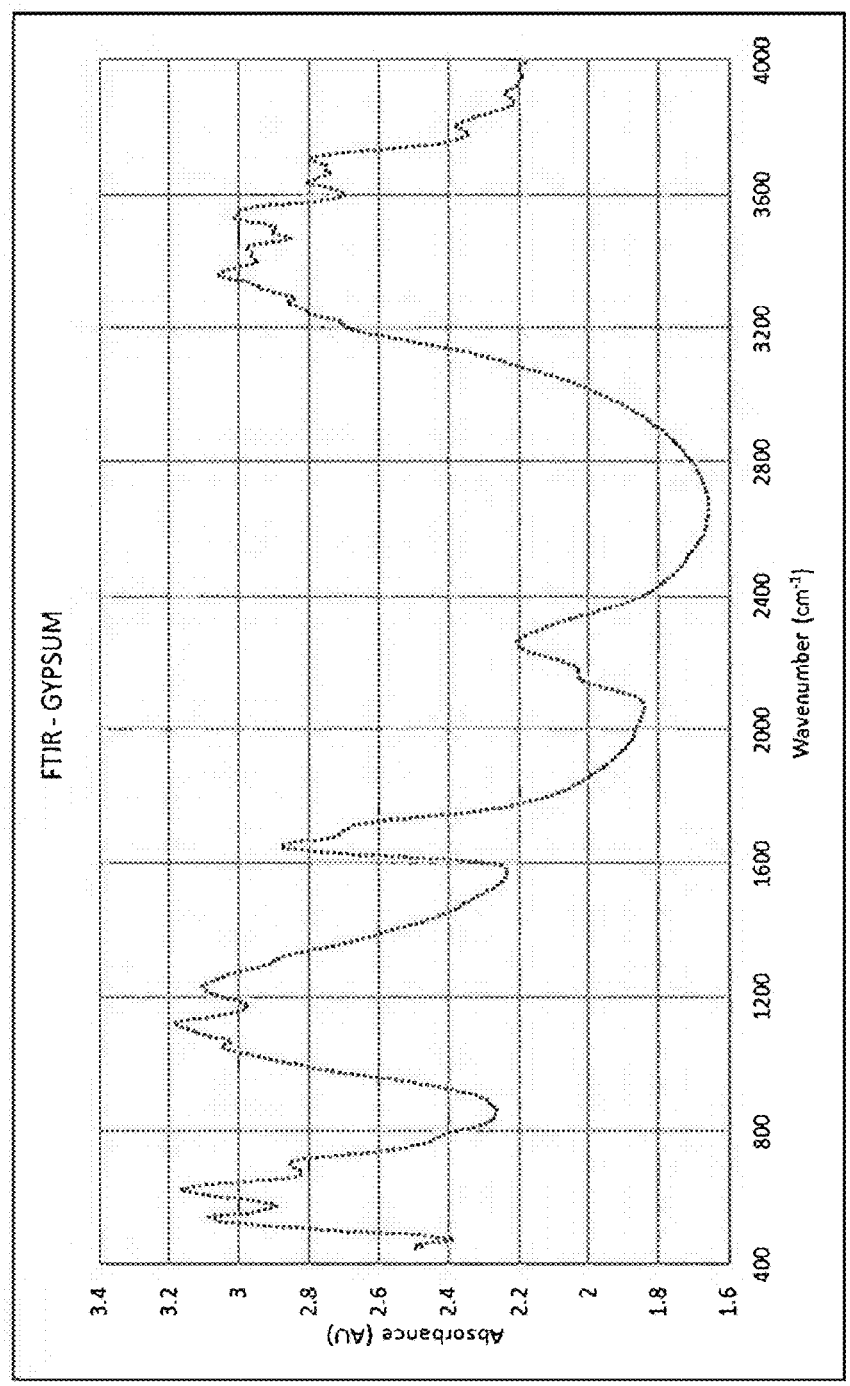

FIG. 143 is a graphical presentation of FTIR results of Gypsum sample.

Figure 144:
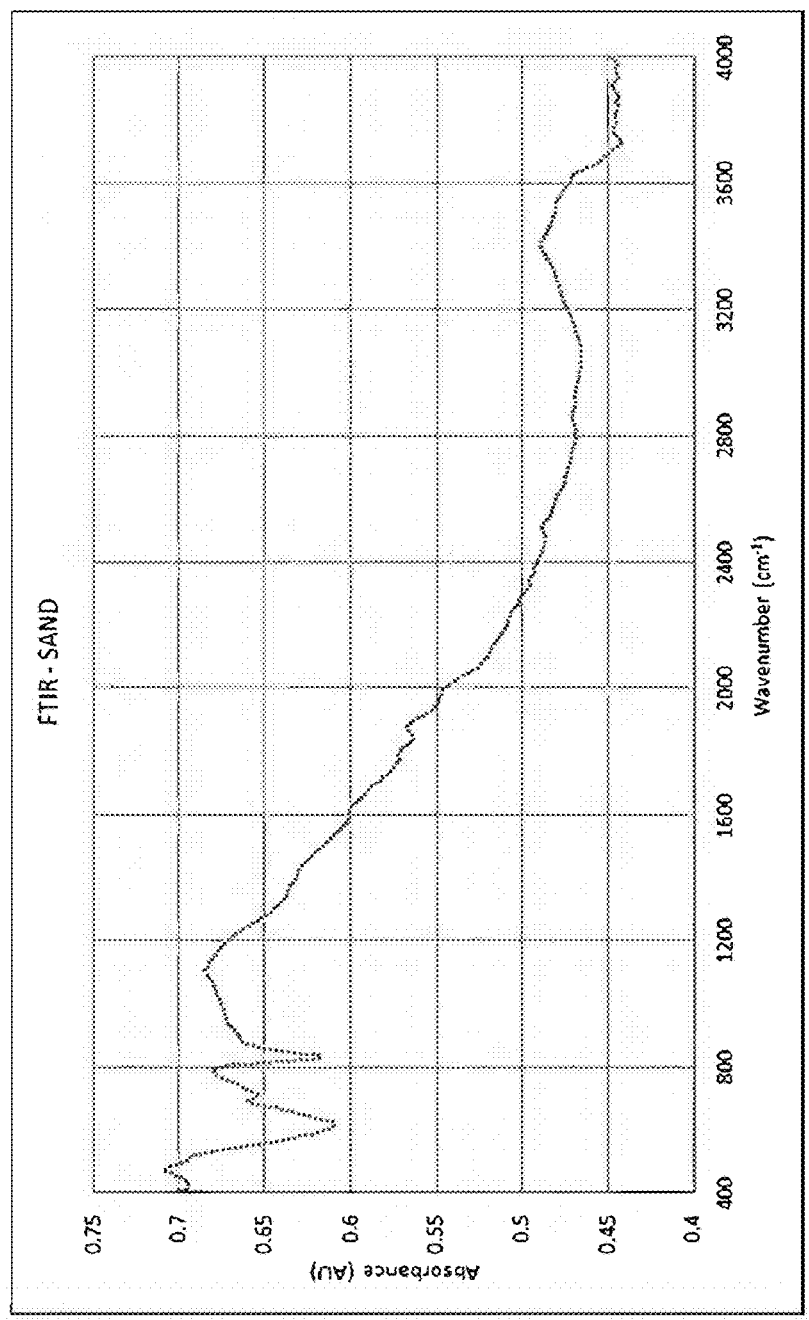

FIG. 144 is a graphical presentation of FTIR results of Sand sample.

Figure 145:
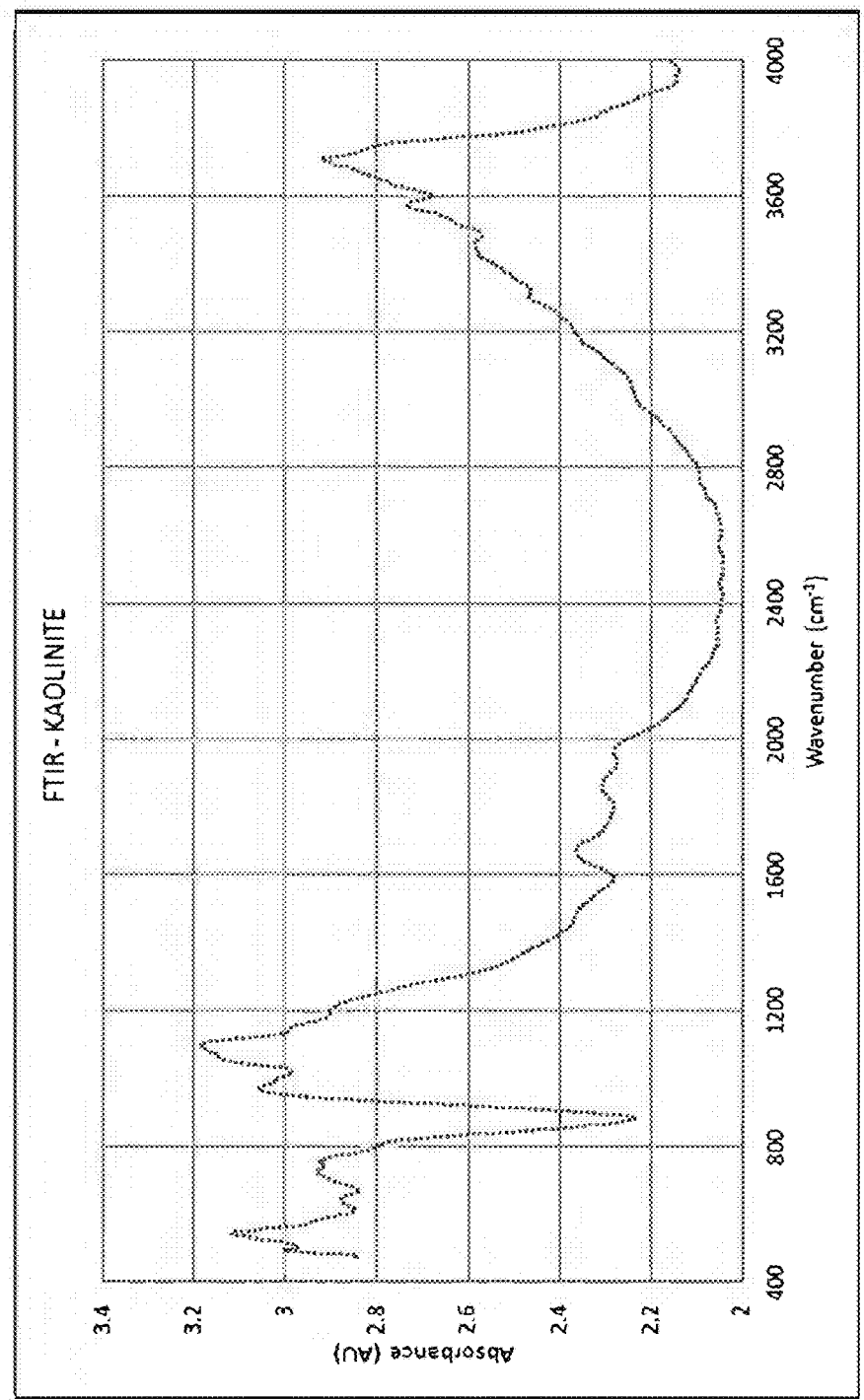

FIG. 145 is a graphical presentation of FTIR results of Kaolinite sample.

Figure 146:
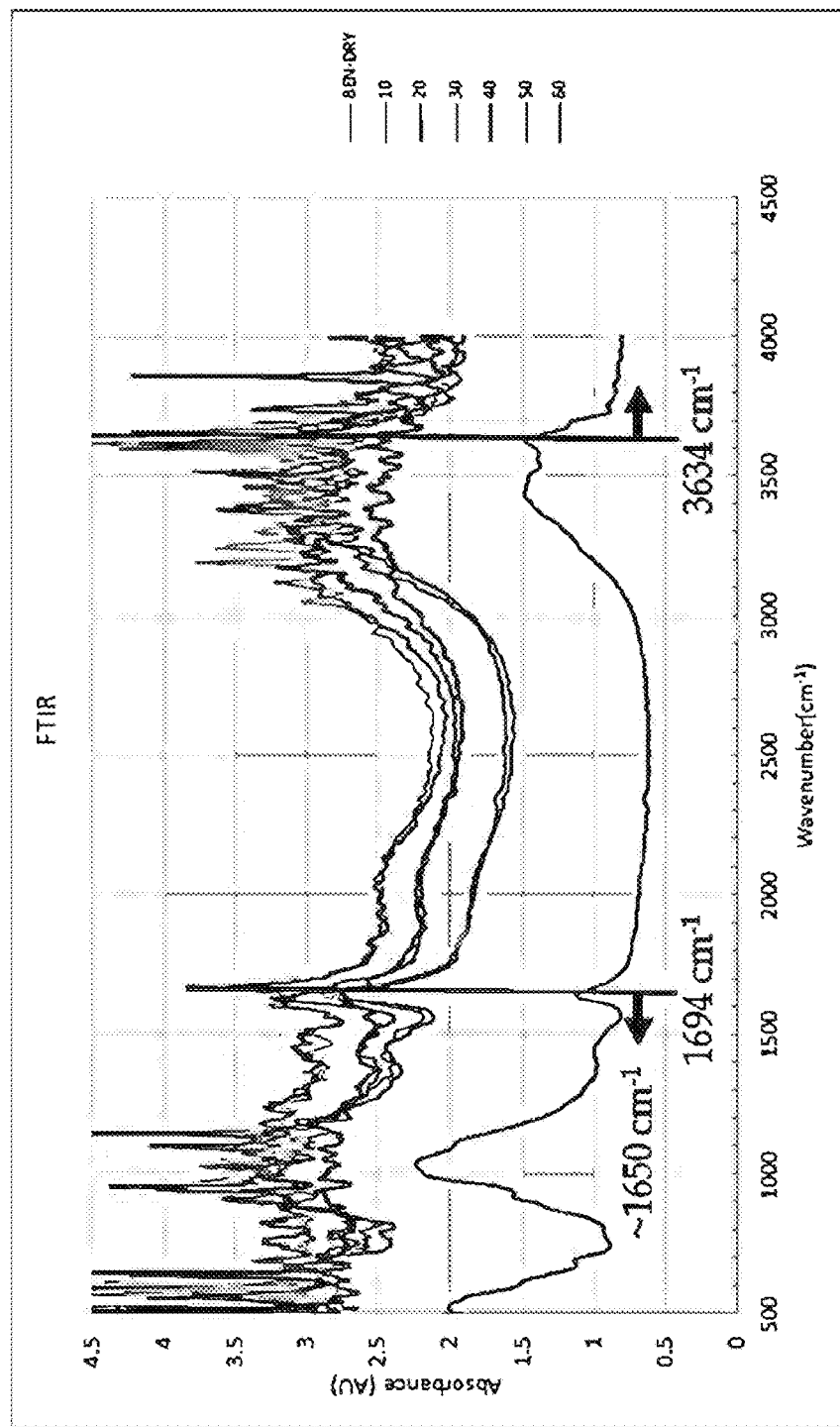

FIG. 146 is a graphical presentation of comparison of FTIR results of dry Bentonite and at various moisture contents from 10% to 60%.

Figure 147:
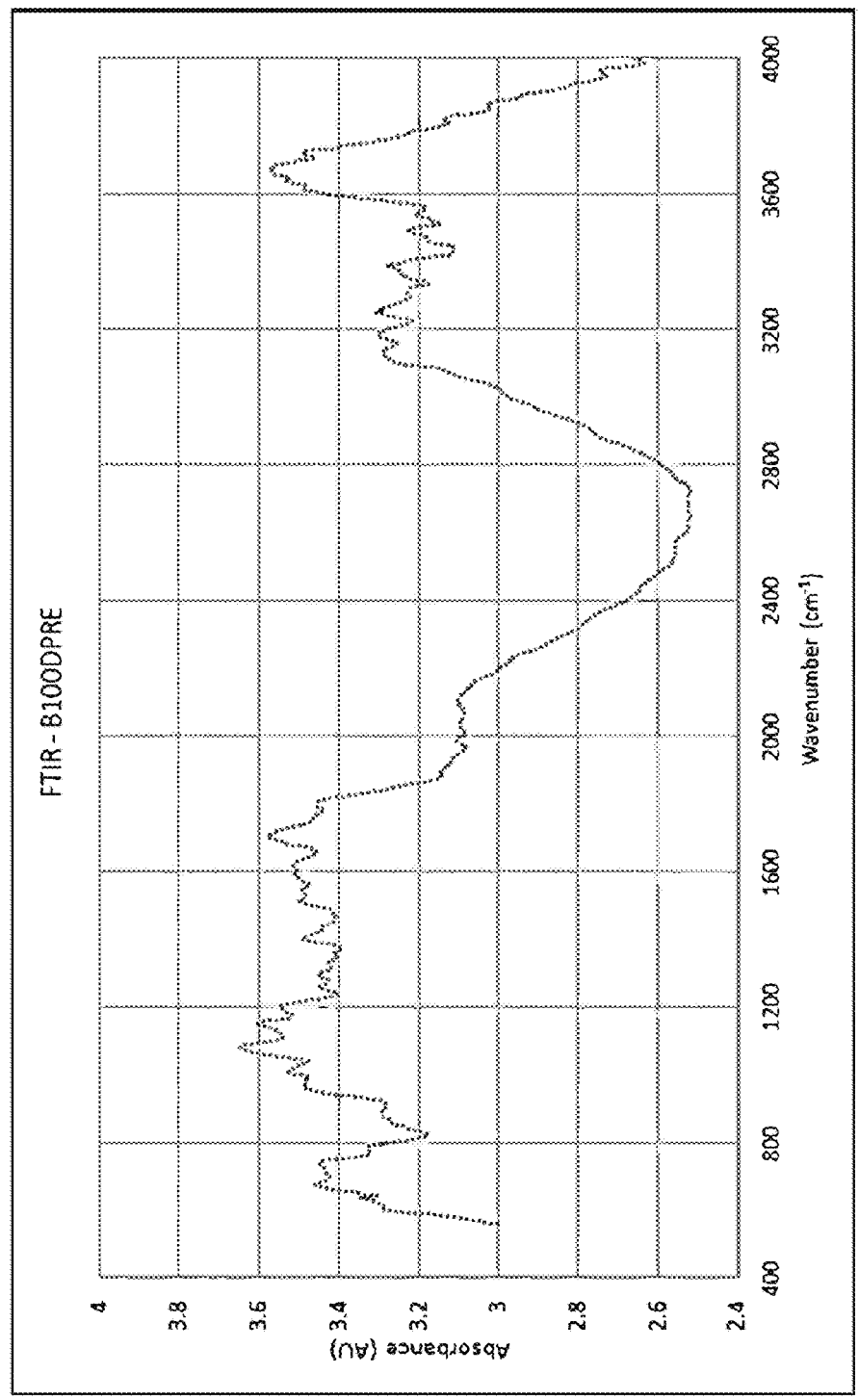

FIG. 147 is a graphical presentation of FTIR results of 100% Bentonite compacted on dry of OMC—pre swell conditions.

Figure 148:
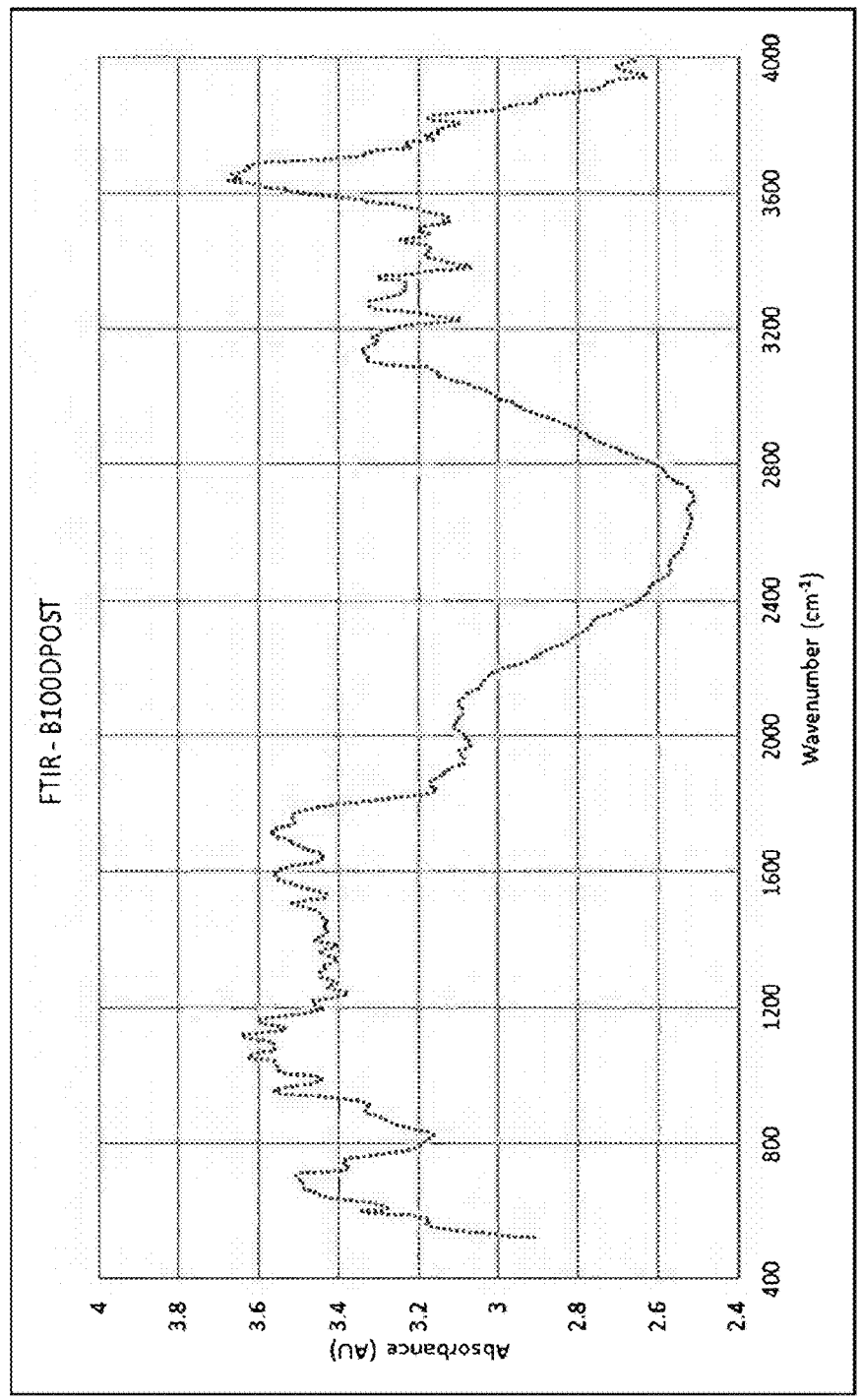

FIG. 148 is a graphical presentation of FTIR results of 100% Bentonite compacted on dry of OMC—post swell conditions.

Figure 149:
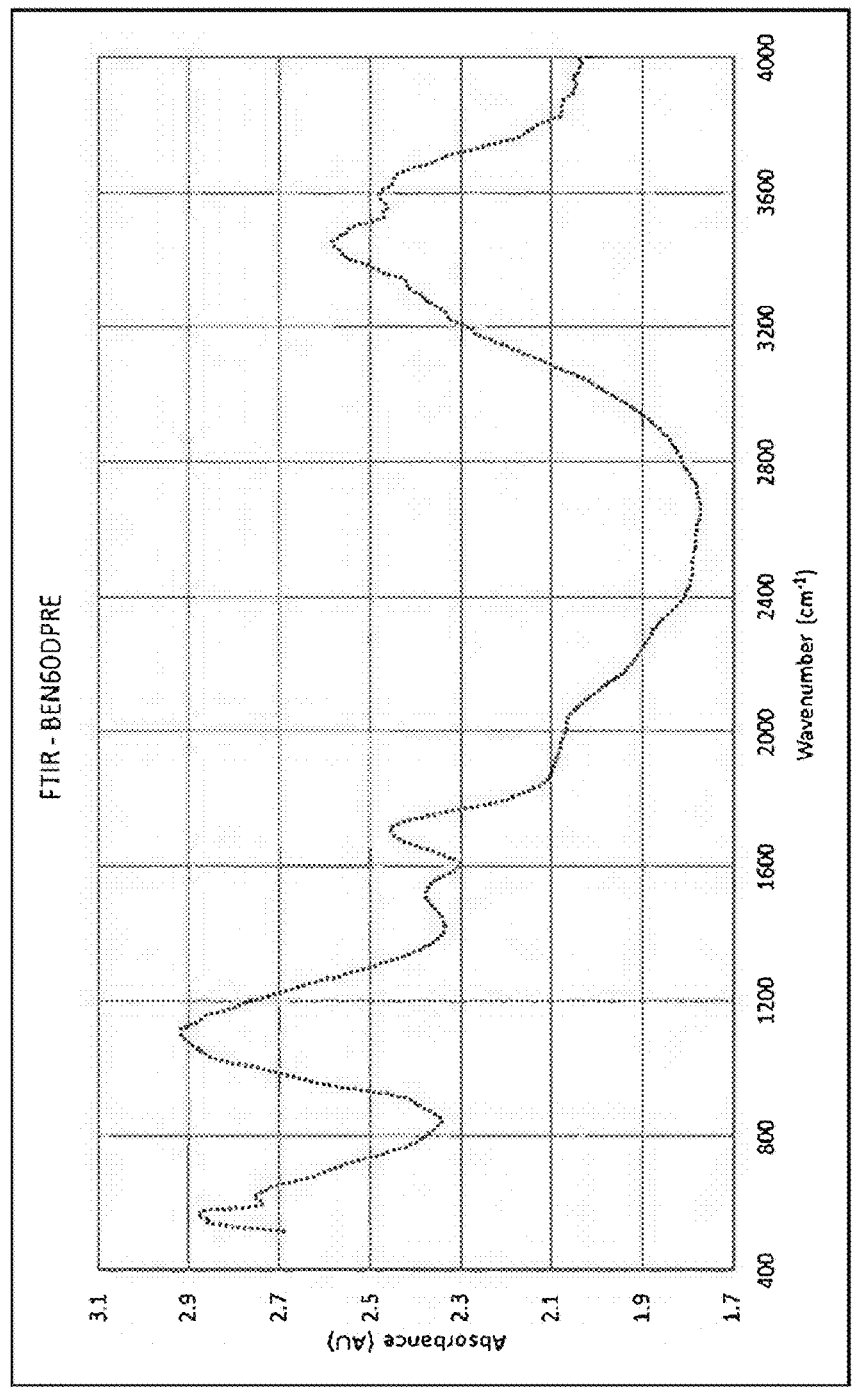

FIG. 149 is a graphical presentation of FTIR results of 60% Bentonite and 40% Sand compacted on dry of OMC—pre swell conditions.

Figure 150:
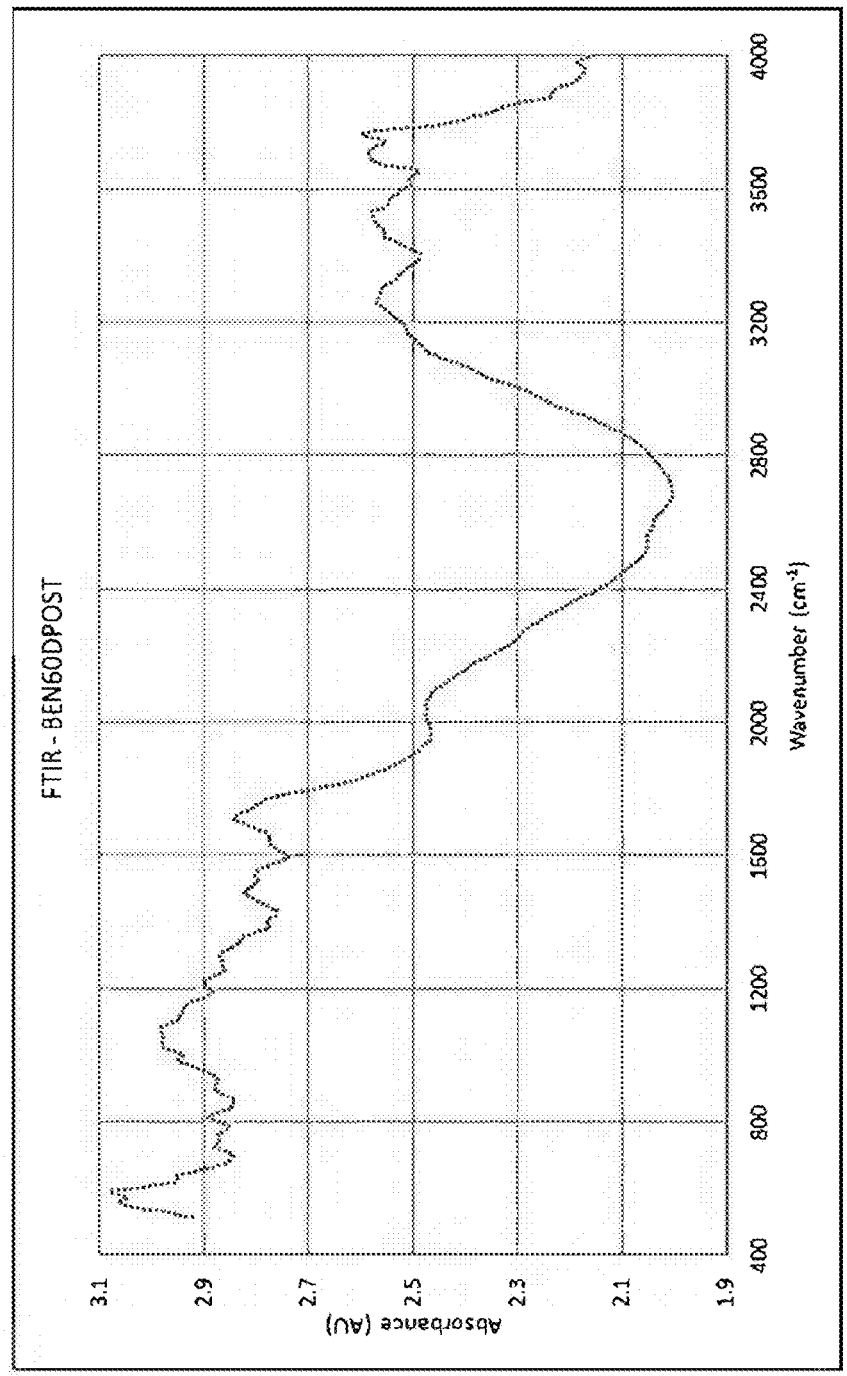

FIG. 150 is a graphical presentation of FTIR results of 60% Bentonite and 40% Sand compacted on dry of OMC—post swell conditions.

Figure 151:
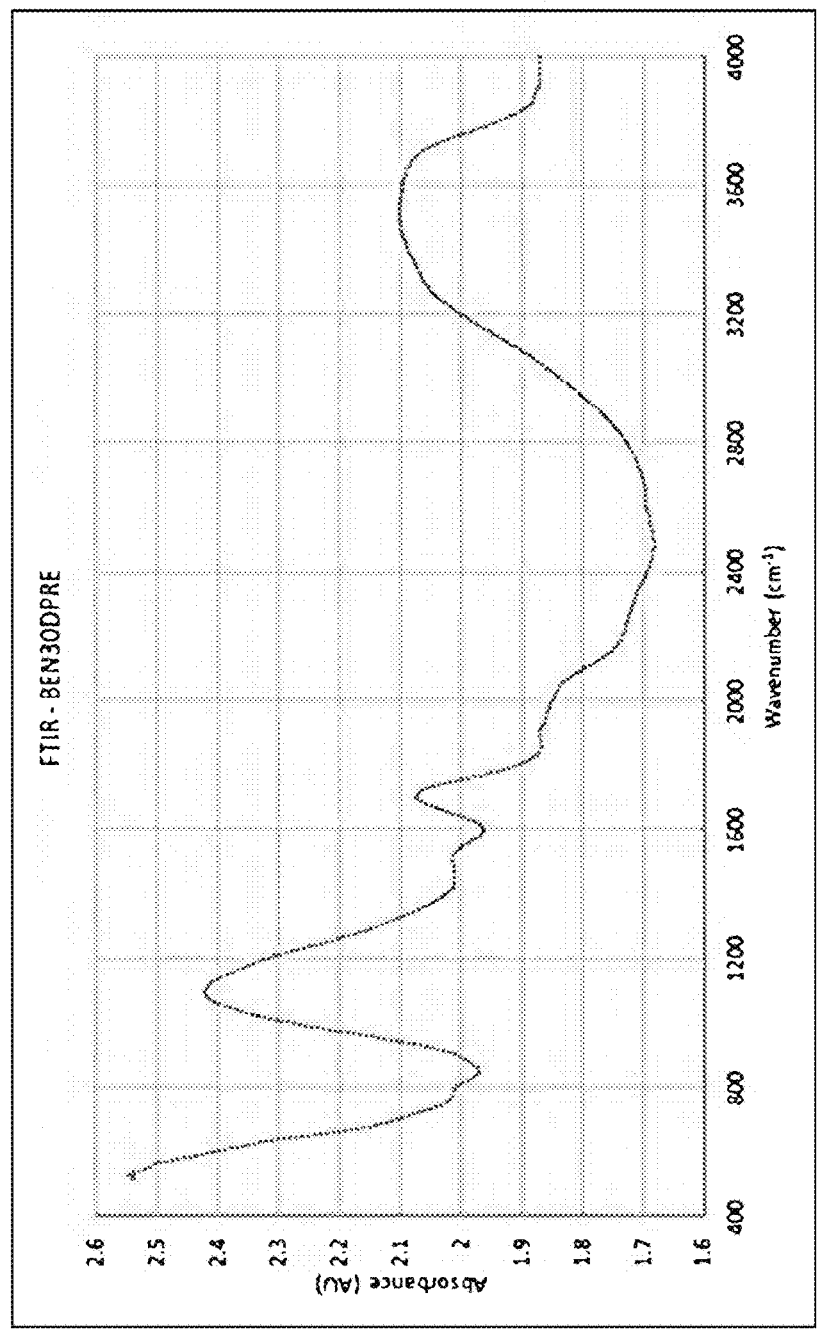

FIG. 151 is a graphical presentation of FTIR results of 30% Bentonite and 70% Sand compacted on dry of OMC—pre swell conditions.

Figure 152:
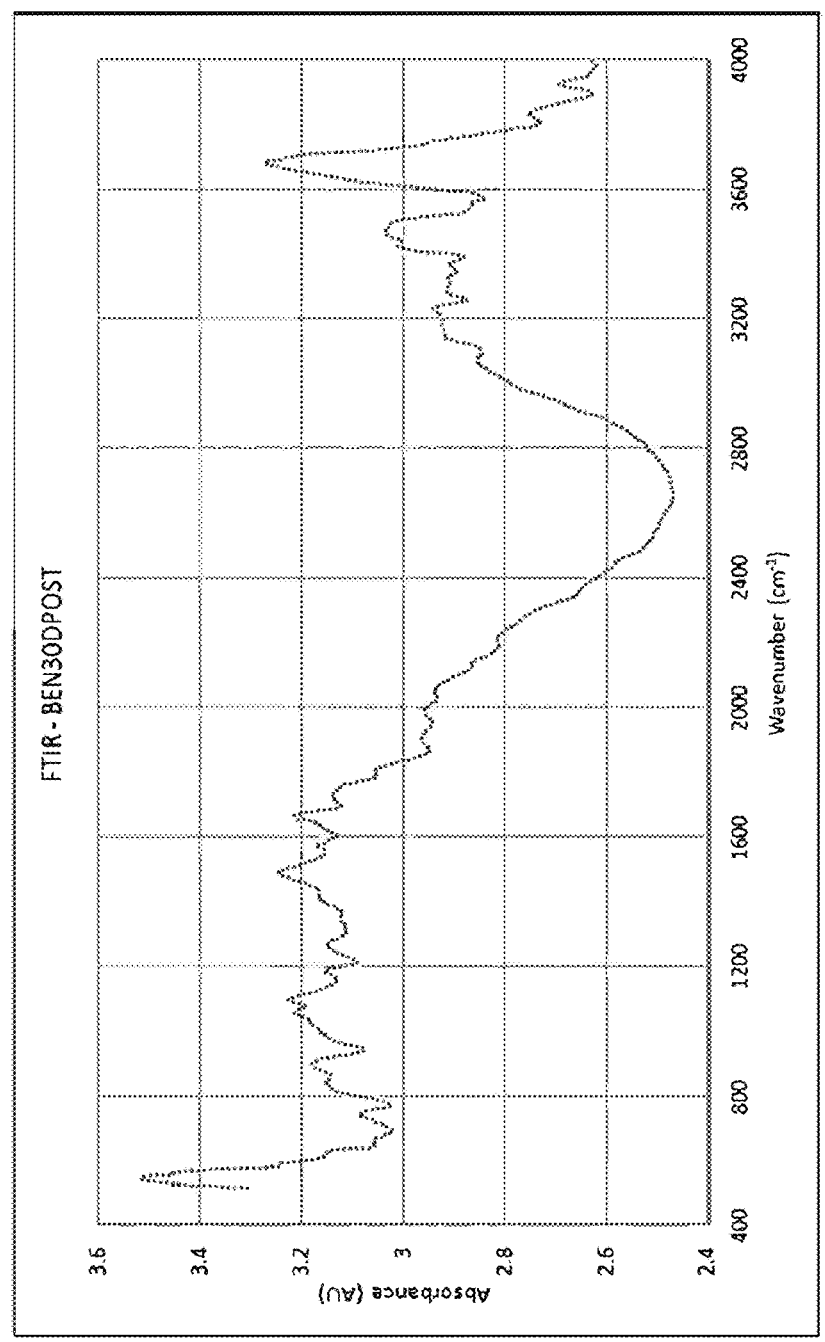

FIG. 152 is a graphical presentation of FTIR results of 30% Bentonite and 70% Sand compacted on dry of OMC—post swell conditions.

Figure 153:
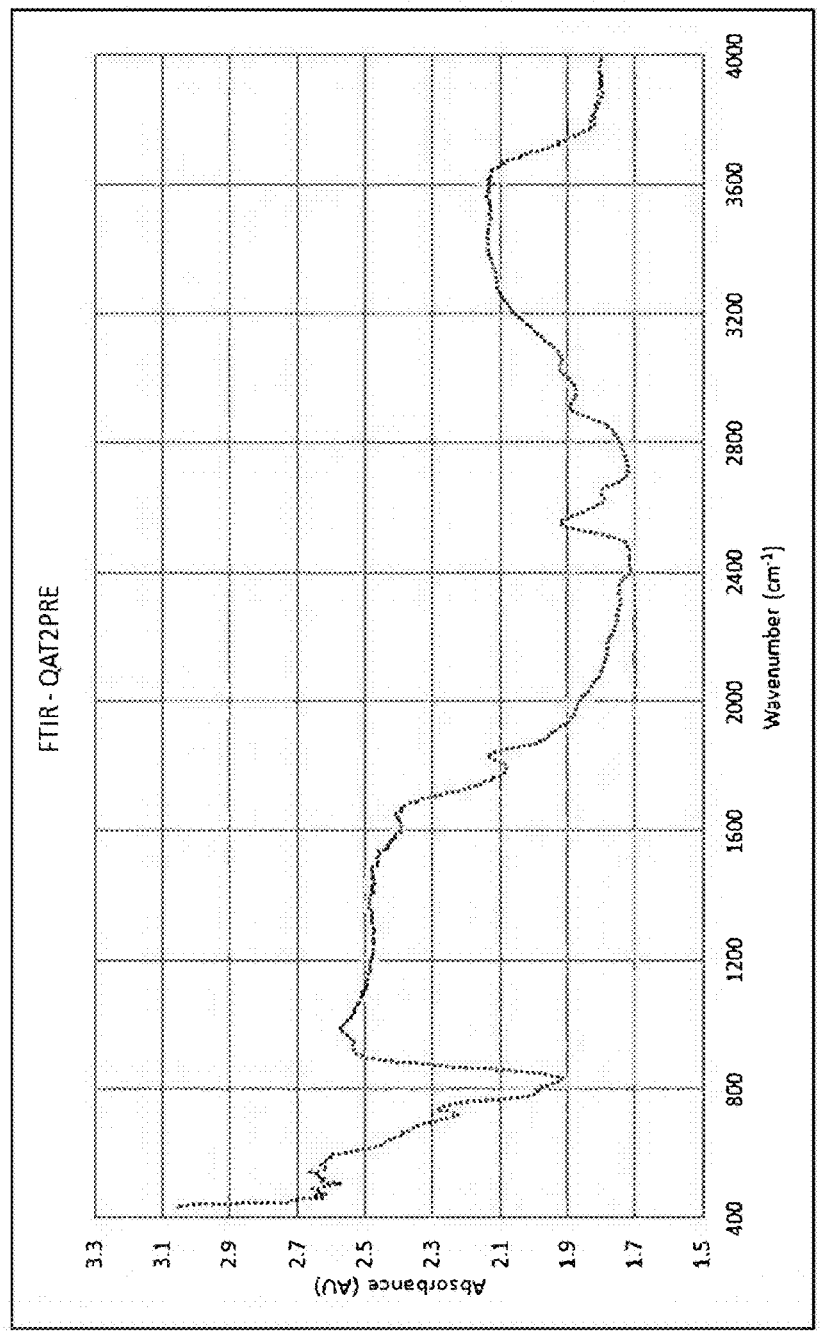

FIG. 153 is a graphical presentation of FTIR results of Qatif-2 sample at NMC—pre swell conditions.

Figure 154:
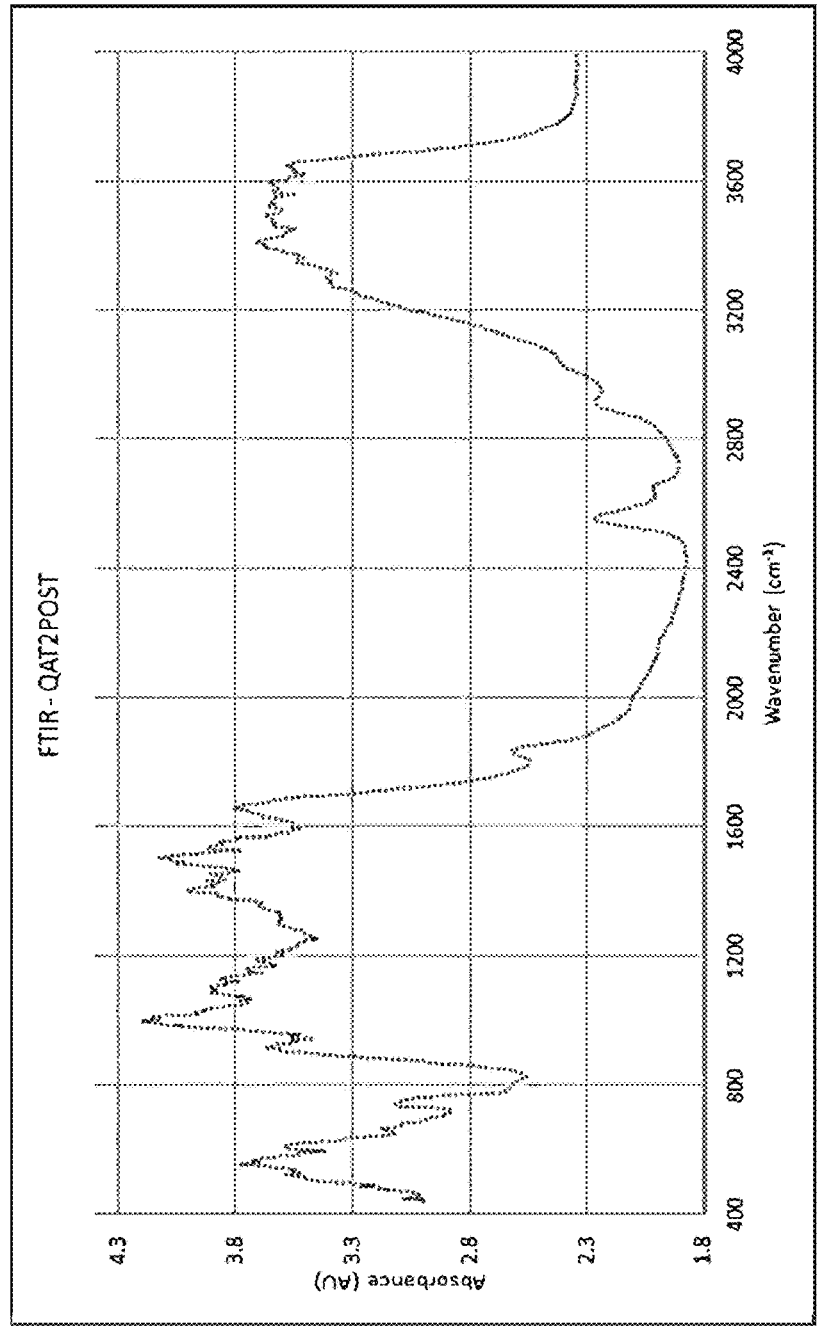

FIG. 154 is a graphical presentation of FTIR results of Qatif-2 sample at NMC—post swell conditions.

Figure 155:
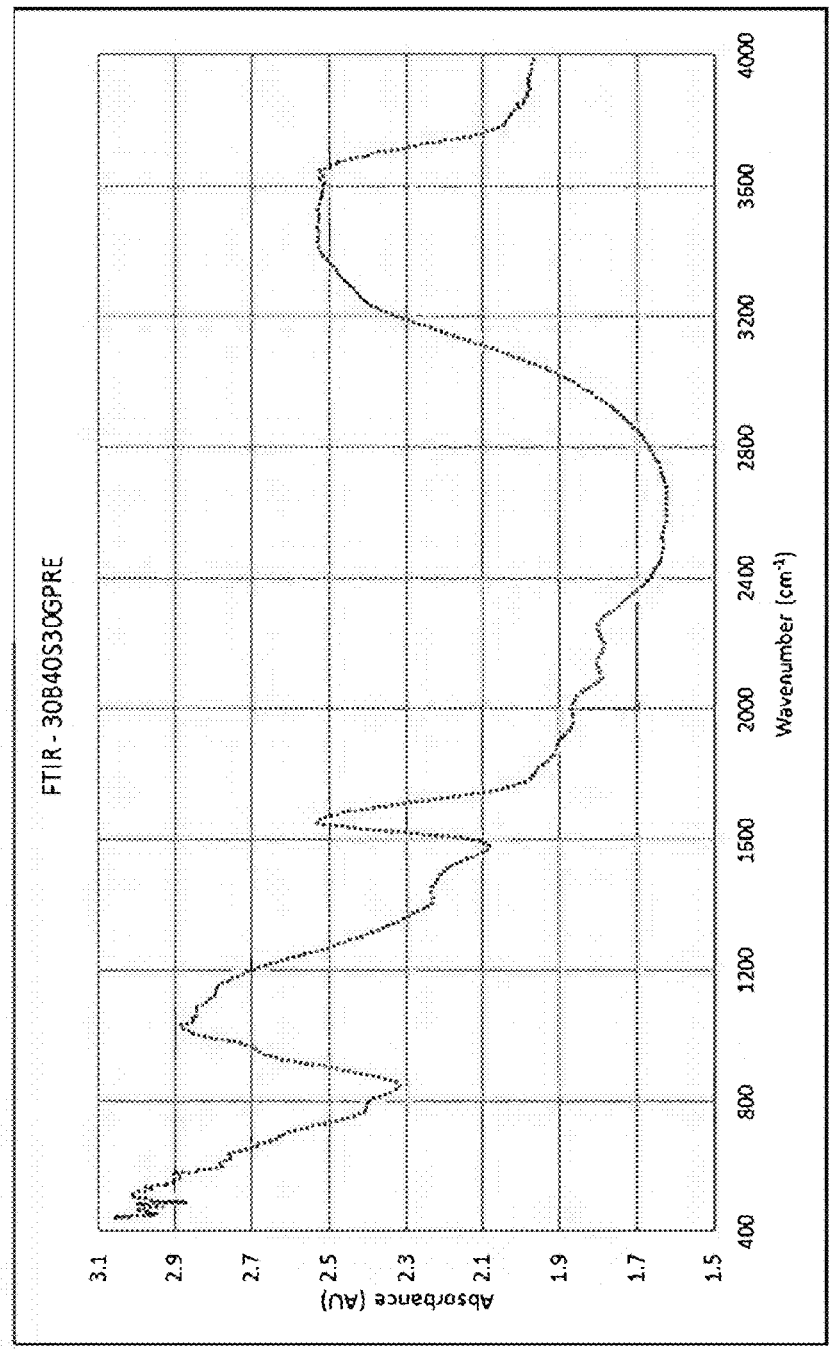

FIG. 155 is a graphical presentation of FTIR results of 30% Bentonite, 30% Gypsum, and 40% Sand compacted on dry of OMC—pre swell conditions.

Figure 156:
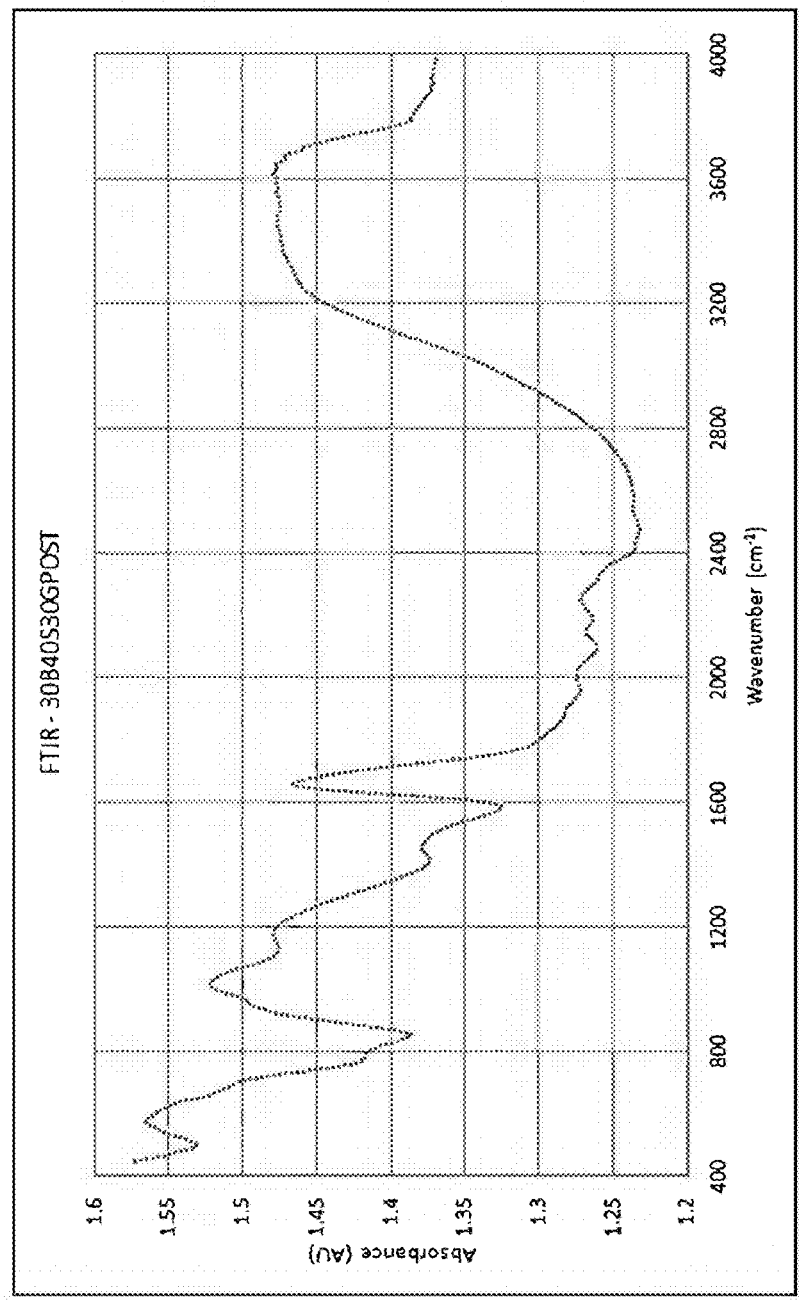

FIG. 156 is a graphical presentation of FTIR results of 30% Bentonite, 30% Gypsum, and 40% Sand compacted on dry of OMC—post swell conditions.

Figure 157:
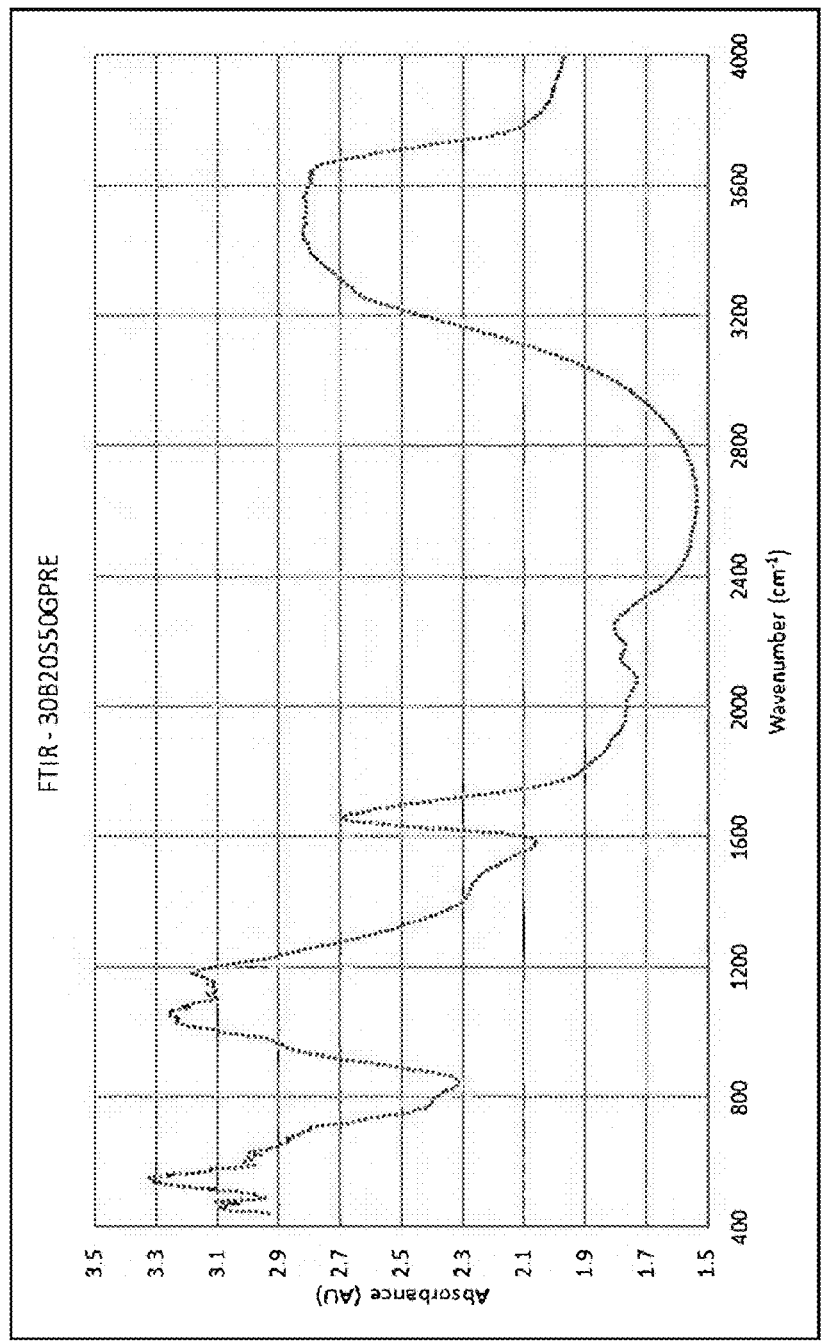

FIG. 157 is a graphical presentation of FTIR results of 30% Bentonite, 50% Gypsum, and 20% Sand compacted on dry of OMC—pre swell conditions.

Figure 158:
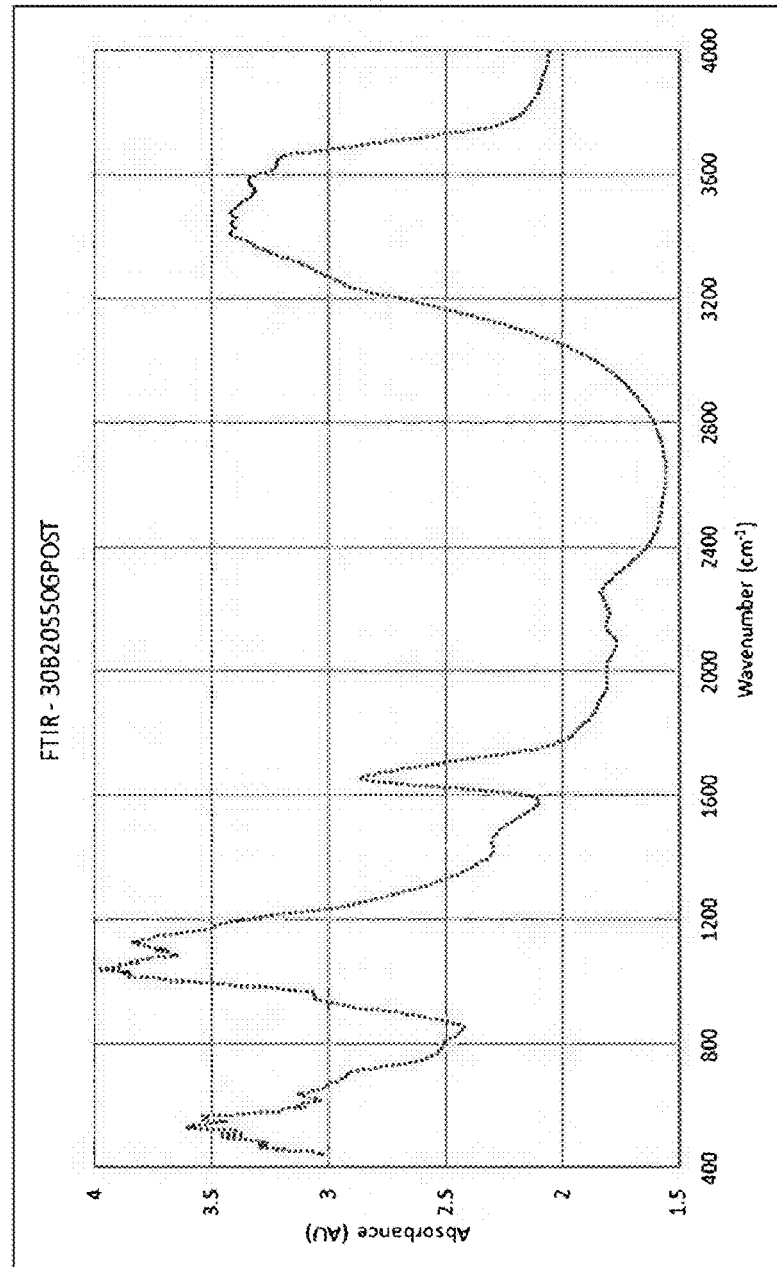

FIG. 158 is a graphical presentation of FTIR results of 30% Bentonite, 50% Gypsum, and 20% Sand compacted on dry of OMC—post swell conditions.

Figure 159:
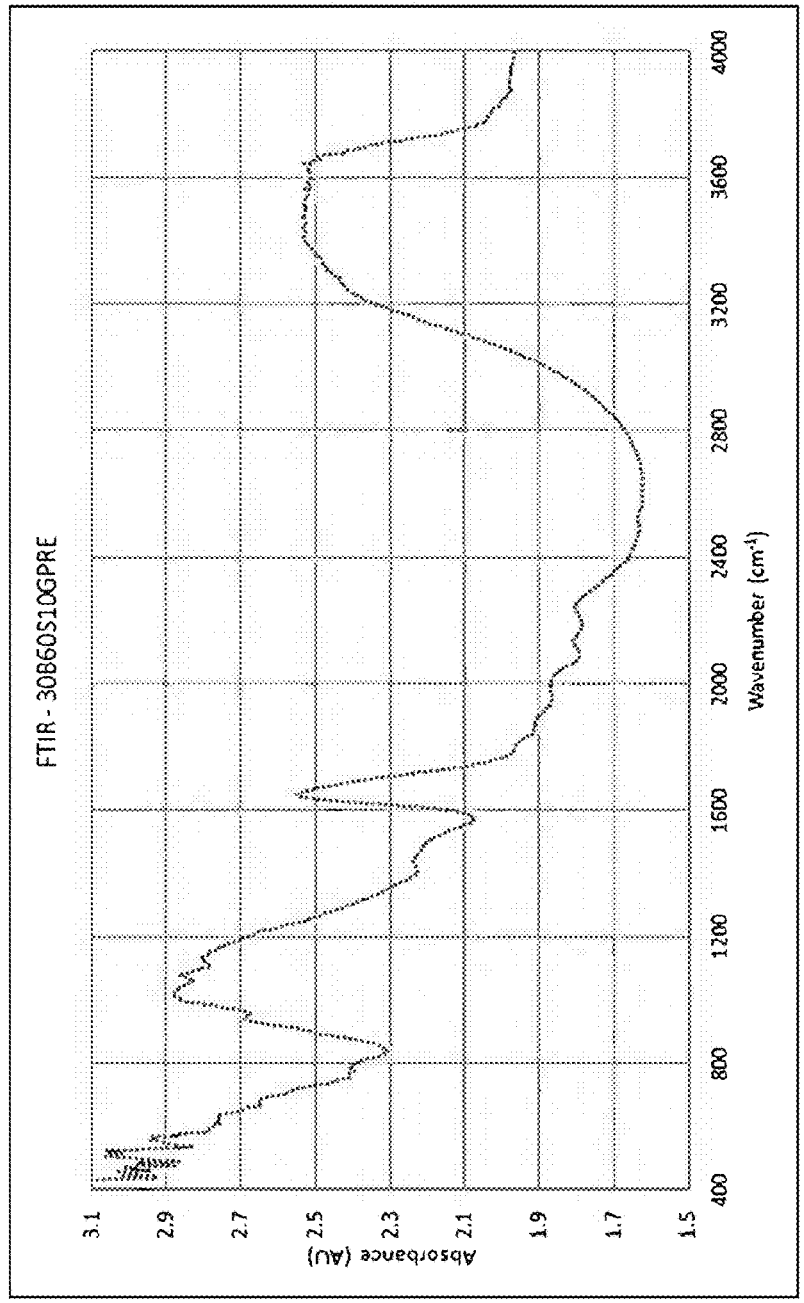

FIG. 159 is a graphical presentation of FTIR results of 30% Bentonite, 10% Gypsum, and 60% Sand compacted on dry of OMC—pre swell conditions.

Figure 160:
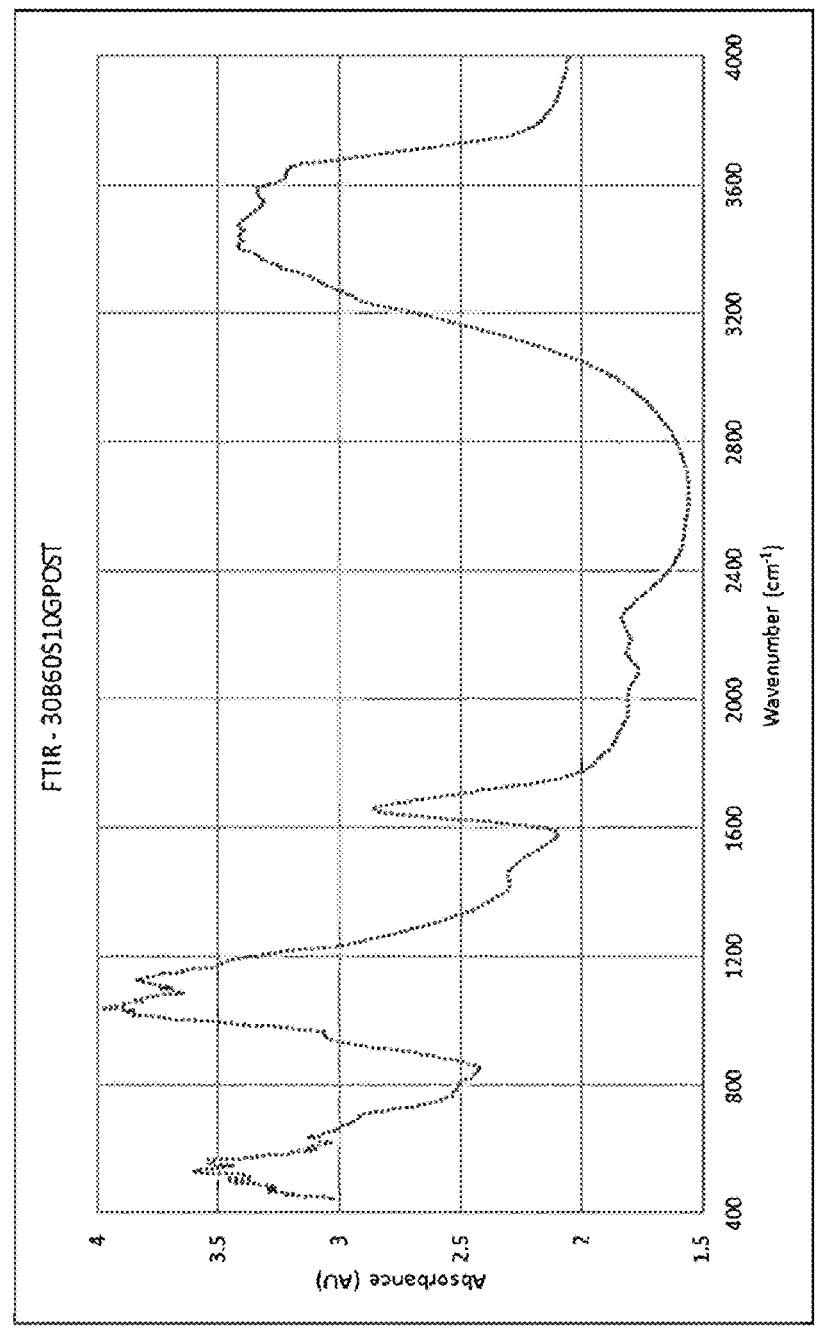

FIG. 160 is a graphical presentation of FTIR results of 30% Bentonite, 10% Gypsum, and 60% Sand compacted on dry of OMC—post swell conditions.

Figure 161:
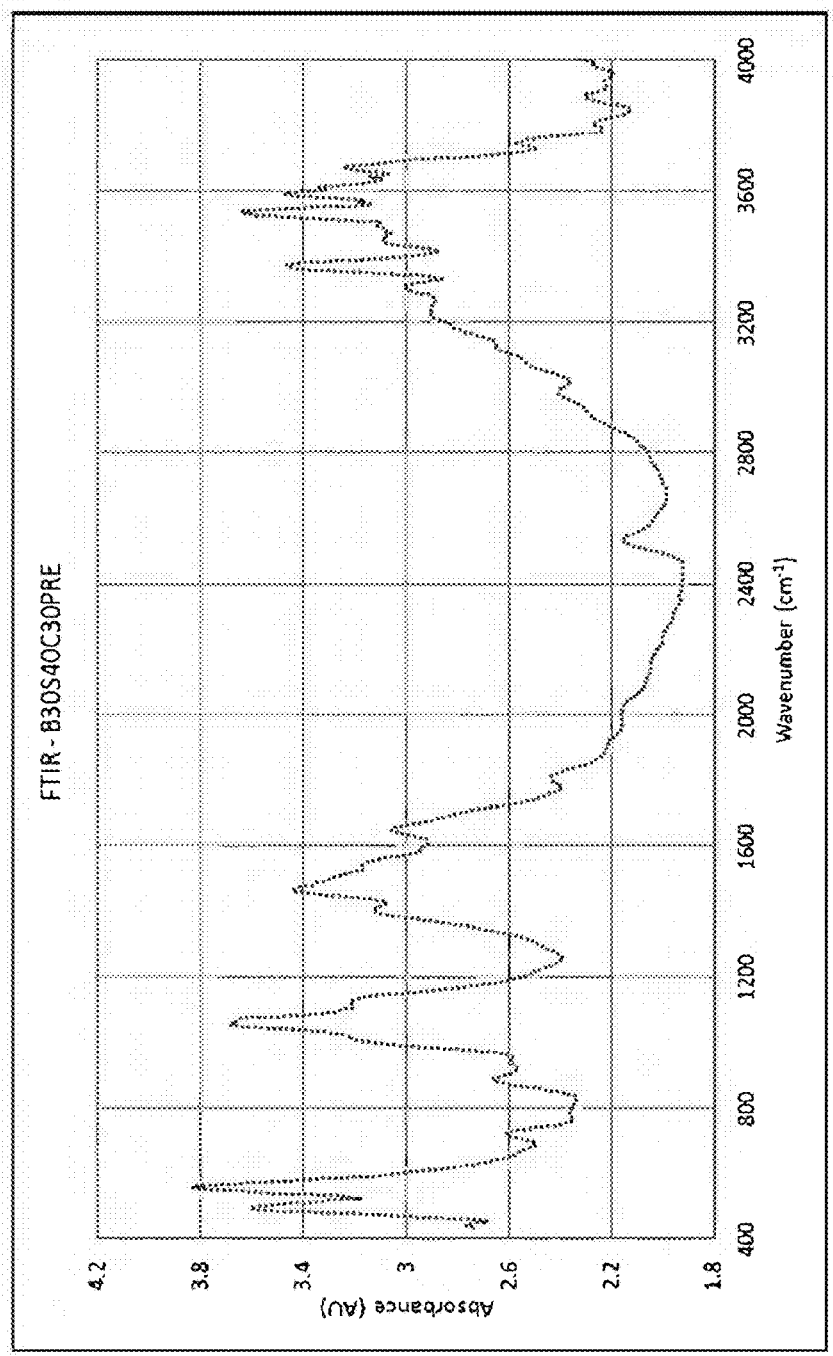

FIG. 161 is a graphical presentation of FTIR results of 30% Bentonite, 30% Calcite, and 40% Sand compacted on dry of OMC—pre swell conditions.

Figure 162:
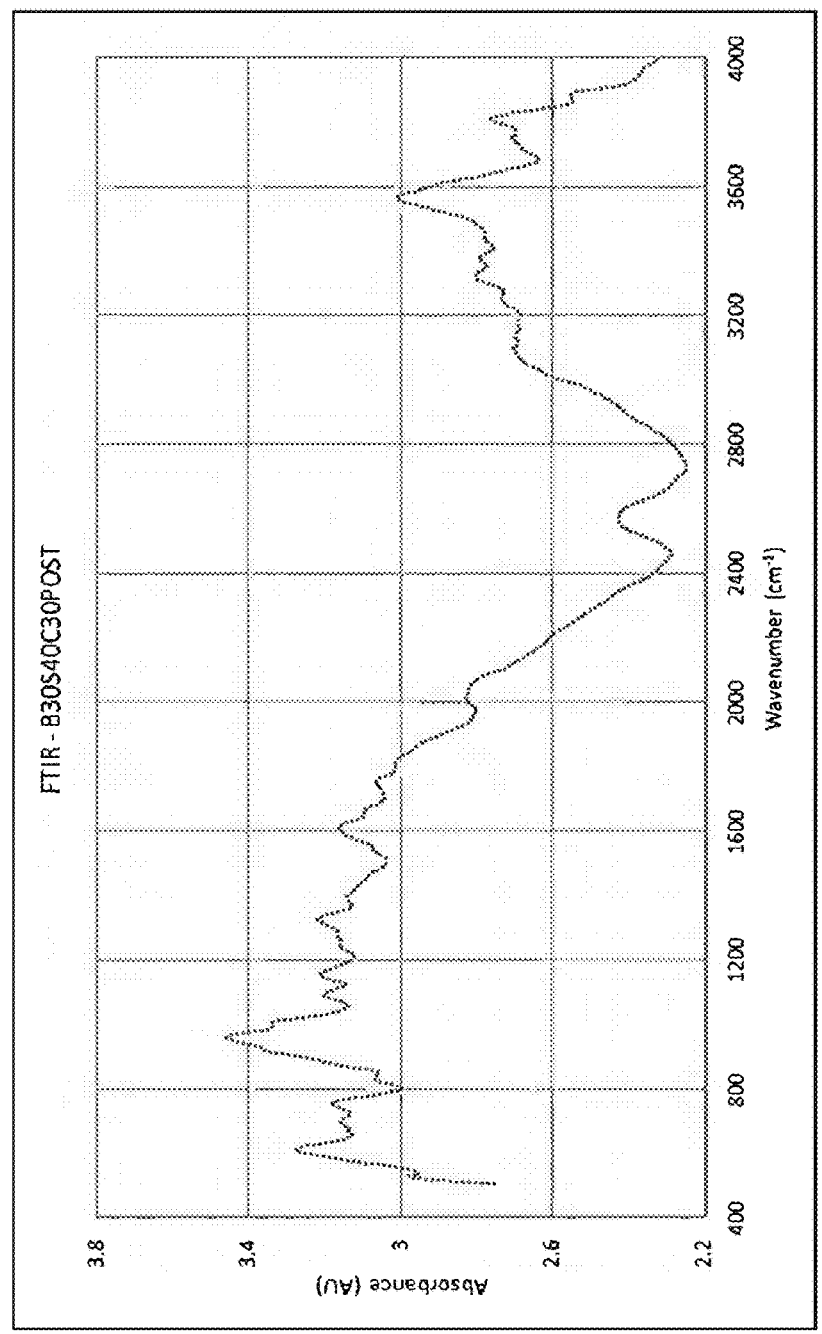

FIG. 162 is a graphical presentation of FTIR results of 30% Bentonite, 30% Calcite, and 40% Sand compacted on dry of OMC—post swell conditions.

Figure 163:
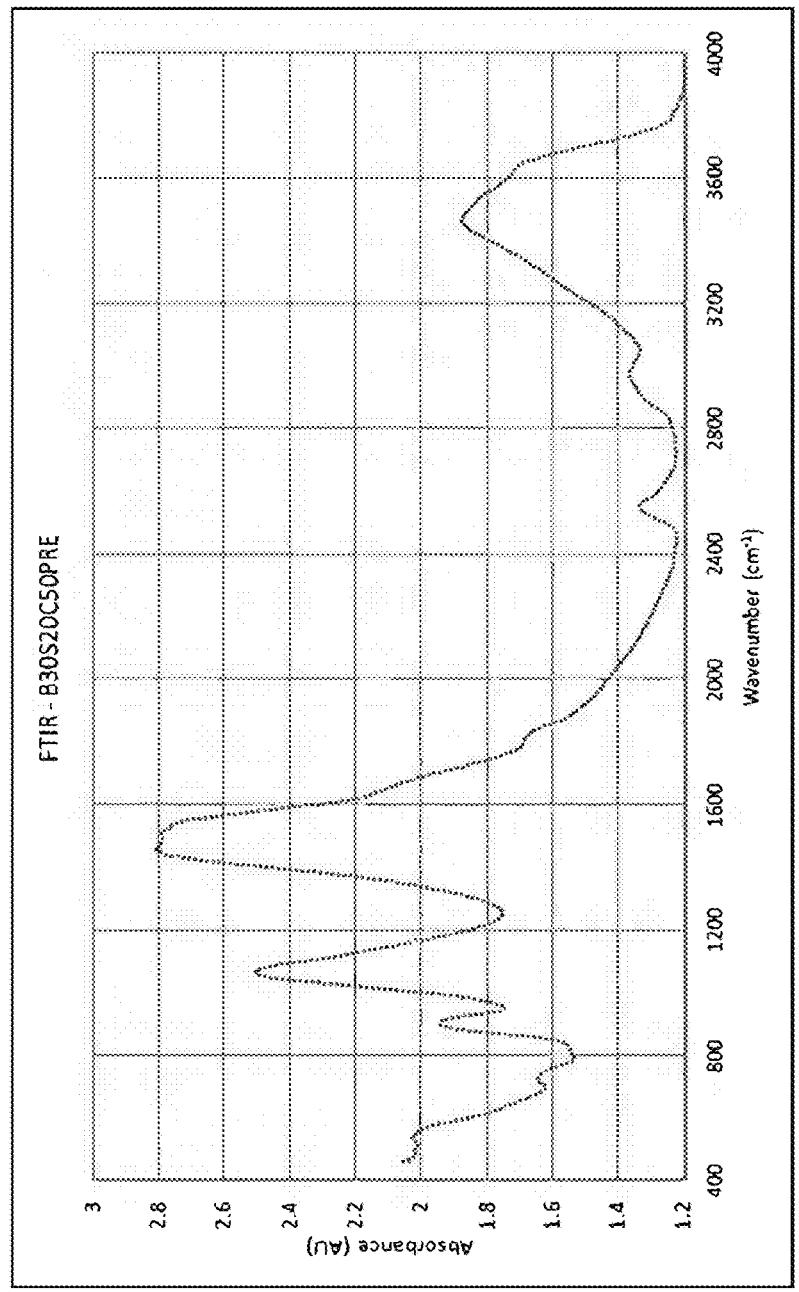

FIG. 163 is a graphical presentation of FTIR results of 30% Bentonite, 50% Calcite, and 20% Sand compacted on dry of OMC—pre swell conditions.

Figure 164:
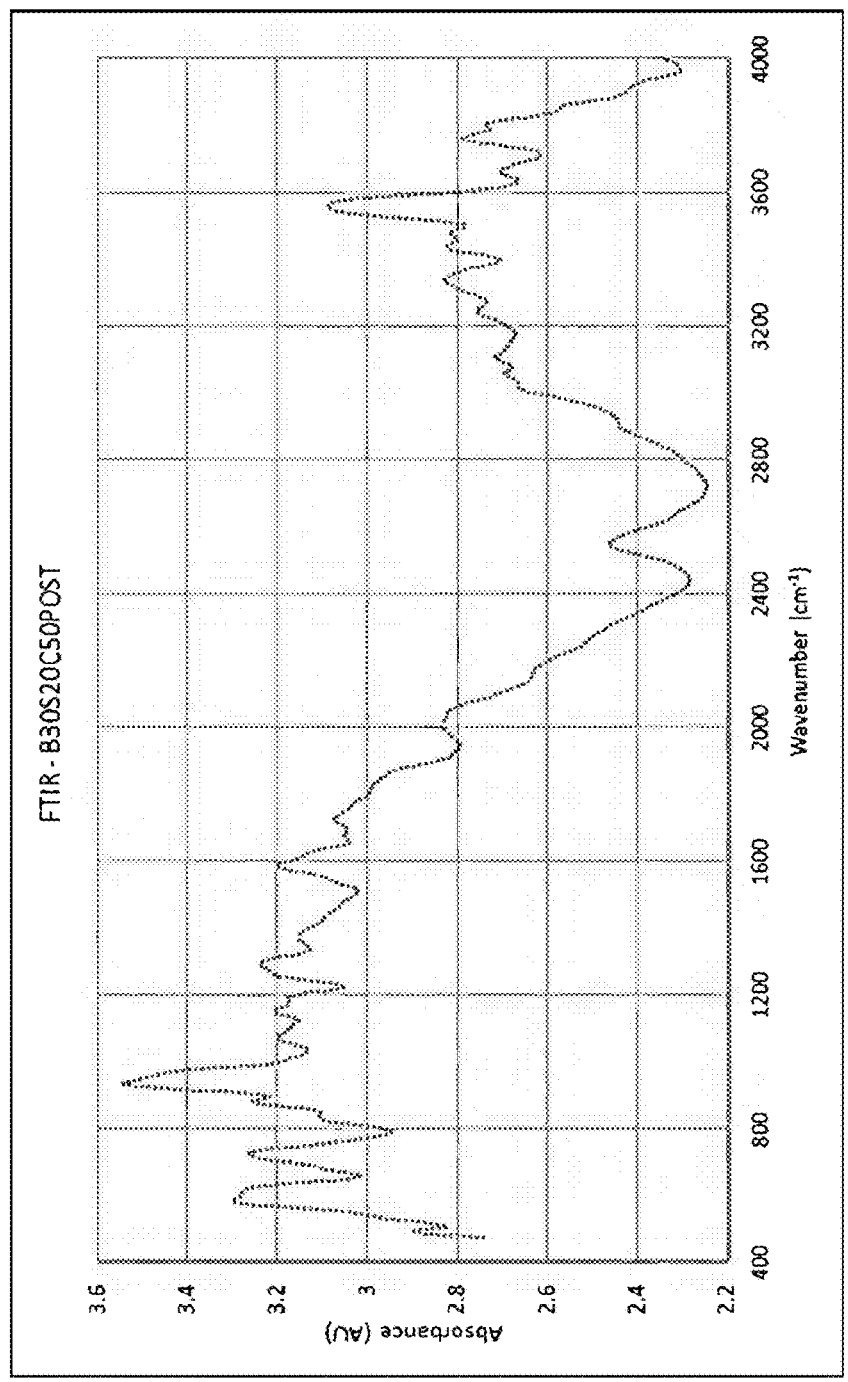

FIG. 164 is a graphical presentation of FTIR results of 30% Bentonite, 50% Calcite, and 20% Sand compacted on dry of OMC—post swell conditions.

Figure 165:
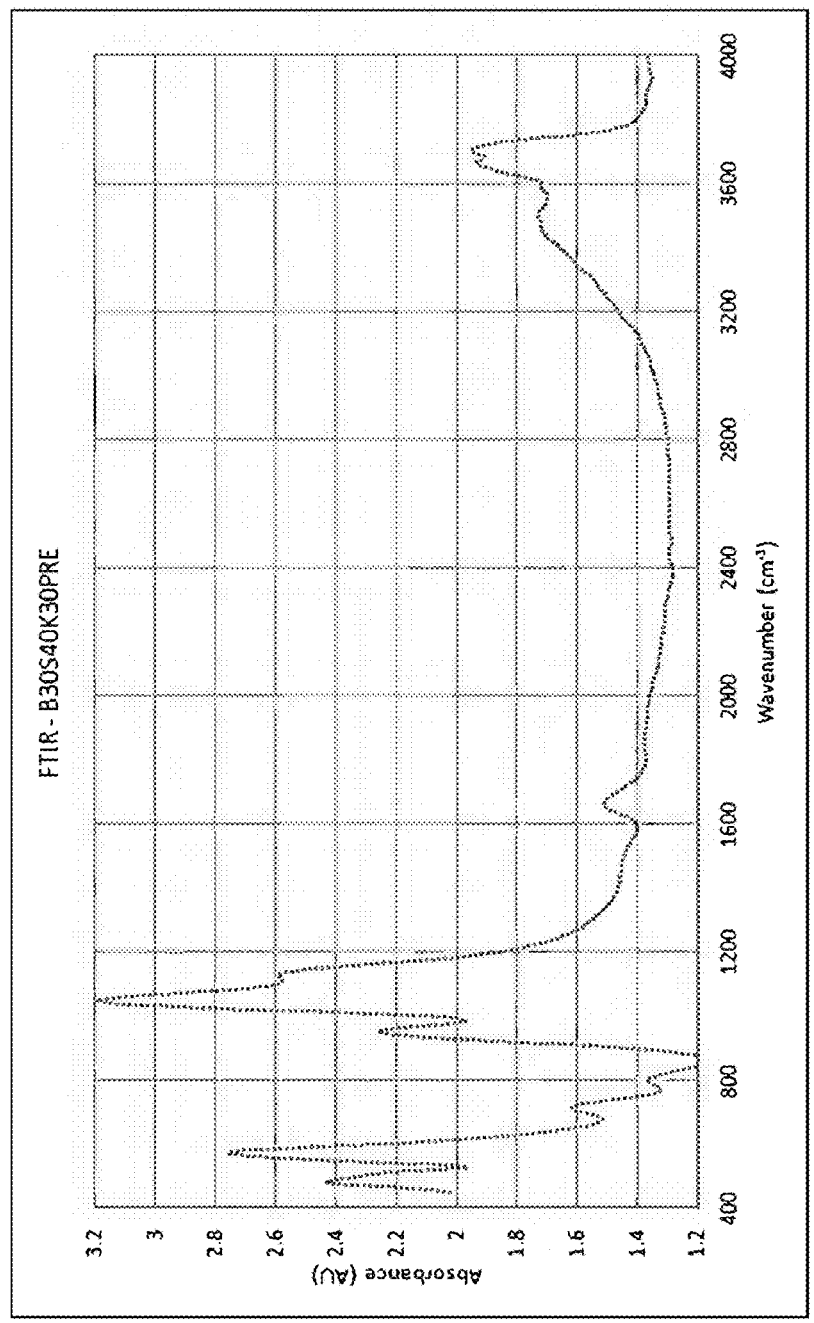

FIG. 165 is a graphical presentation of FTIR results of 30% Bentonite, 30% Kaolinite, and 40% Sand compacted on dry of OMC—pre swell conditions.

Figure 166:
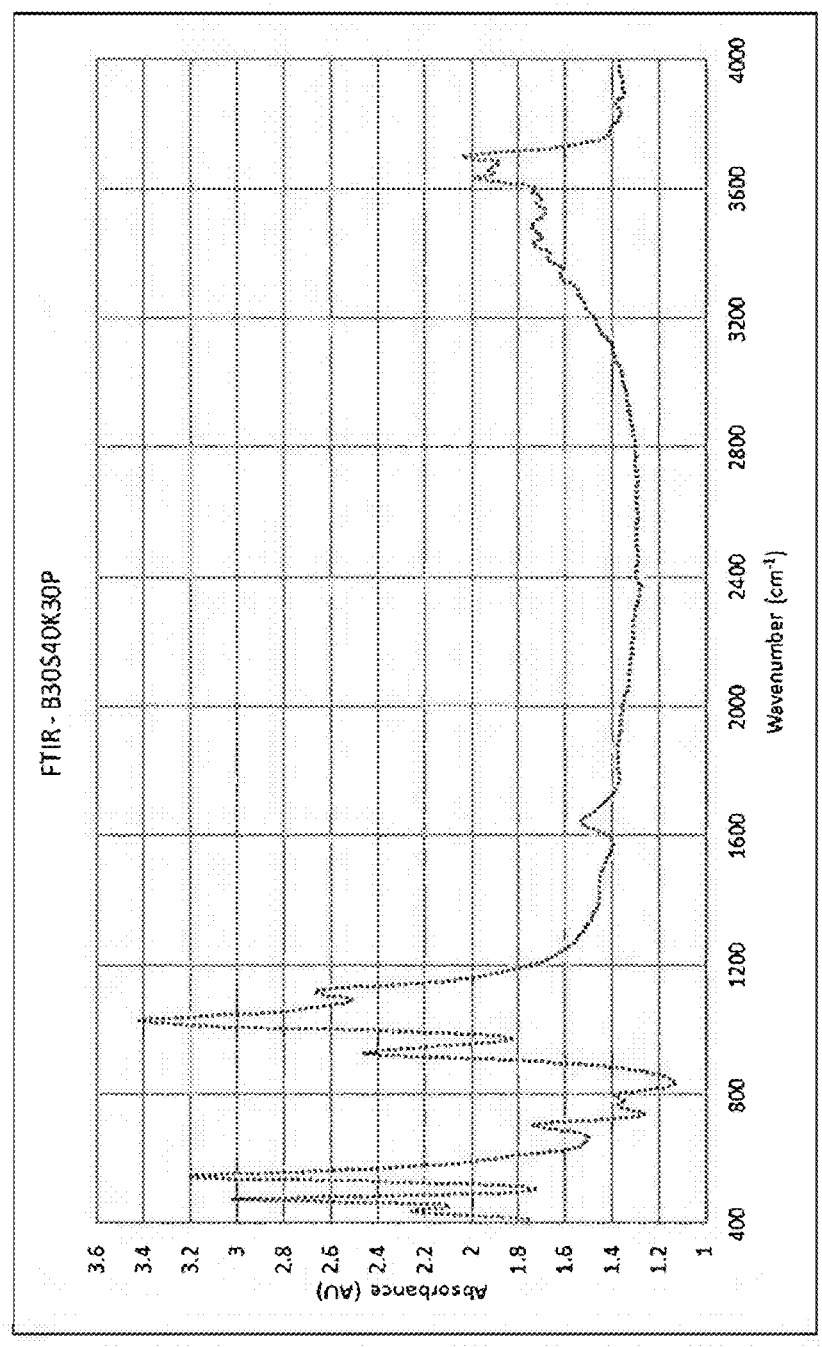

FIG. 166 is a graphical presentation of FTIR results of 30% Bentonite, 30% Kaolinite, and 40% Sand compacted on dry of OMC—post swell conditions.

Figure 167:
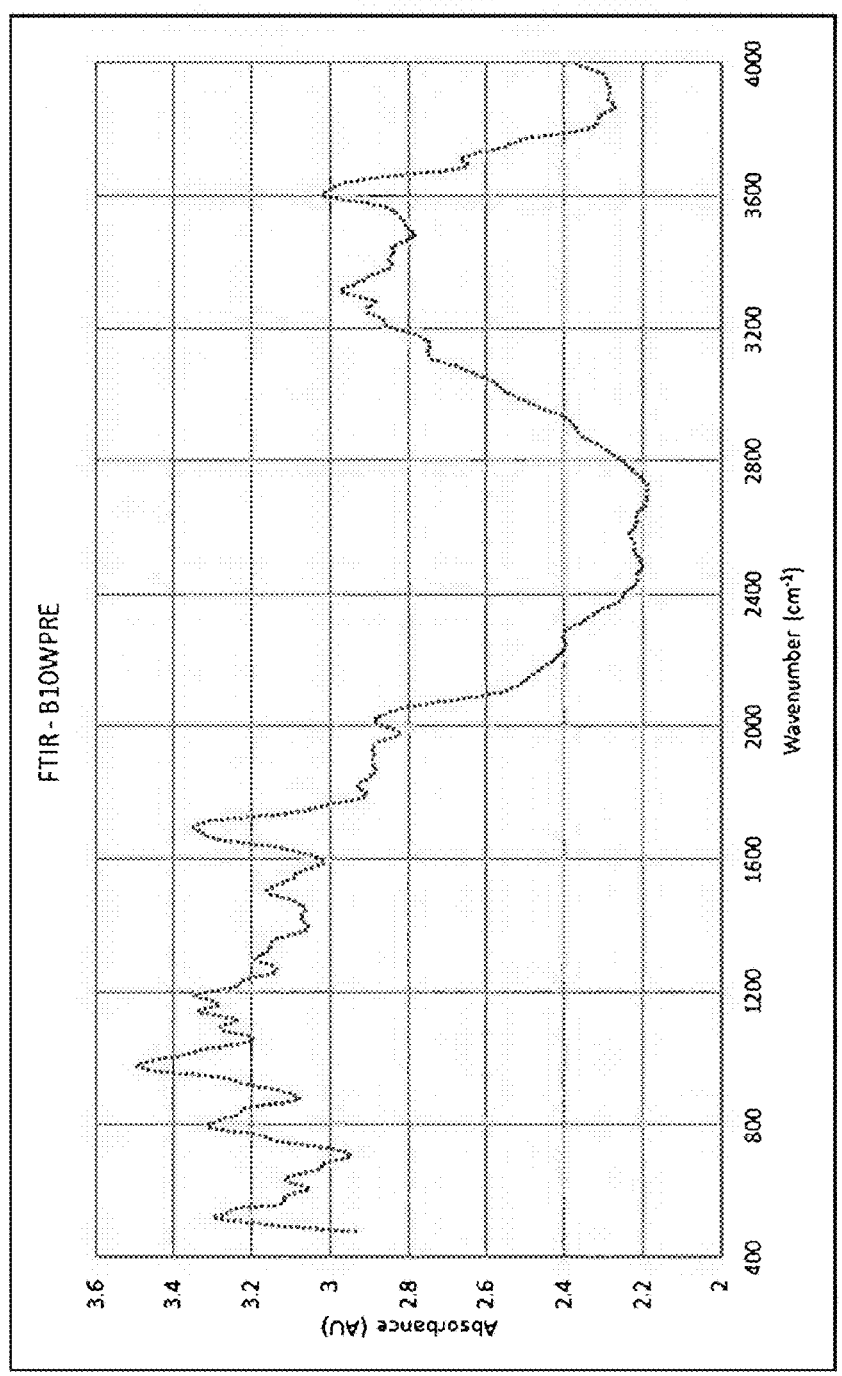

FIG. 167 is a graphical presentation of FTIR results of 10% Bentonite and 90% Sand compacted on wet of OMC—pre swell conditions.

Figure 168:
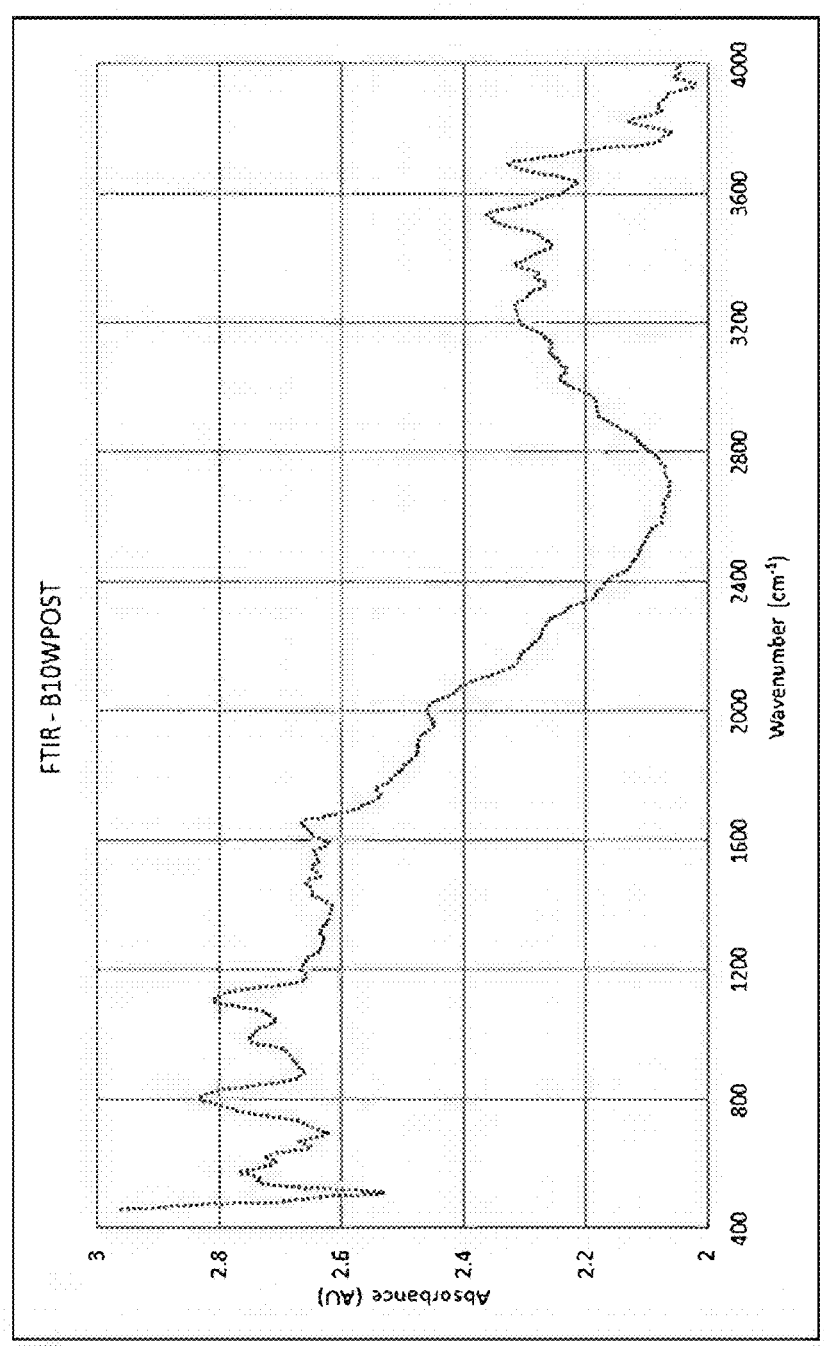

FIG. 168 is a graphical presentation of FTIR results of 10% Bentonite and 90% Sand compacted on wet of OMC—post swell conditions.

Figure 169:
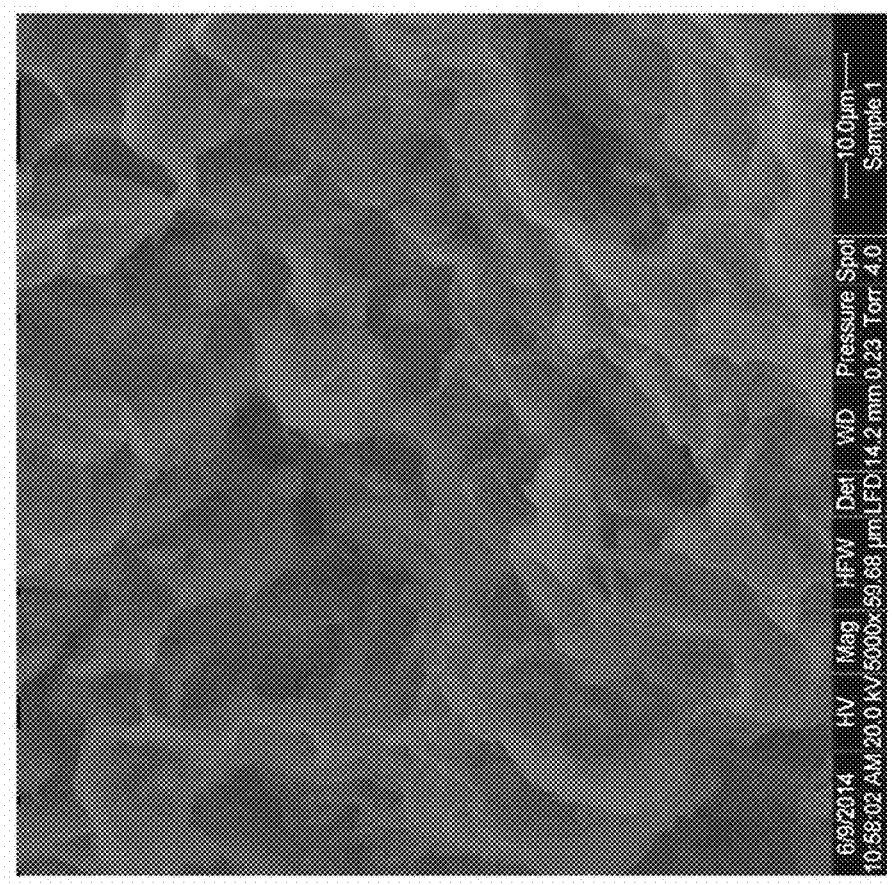

FIG. 169 is an ESEM image of 100% Bentonite compacted on dry of OMC—pre swell.

Figure 170:
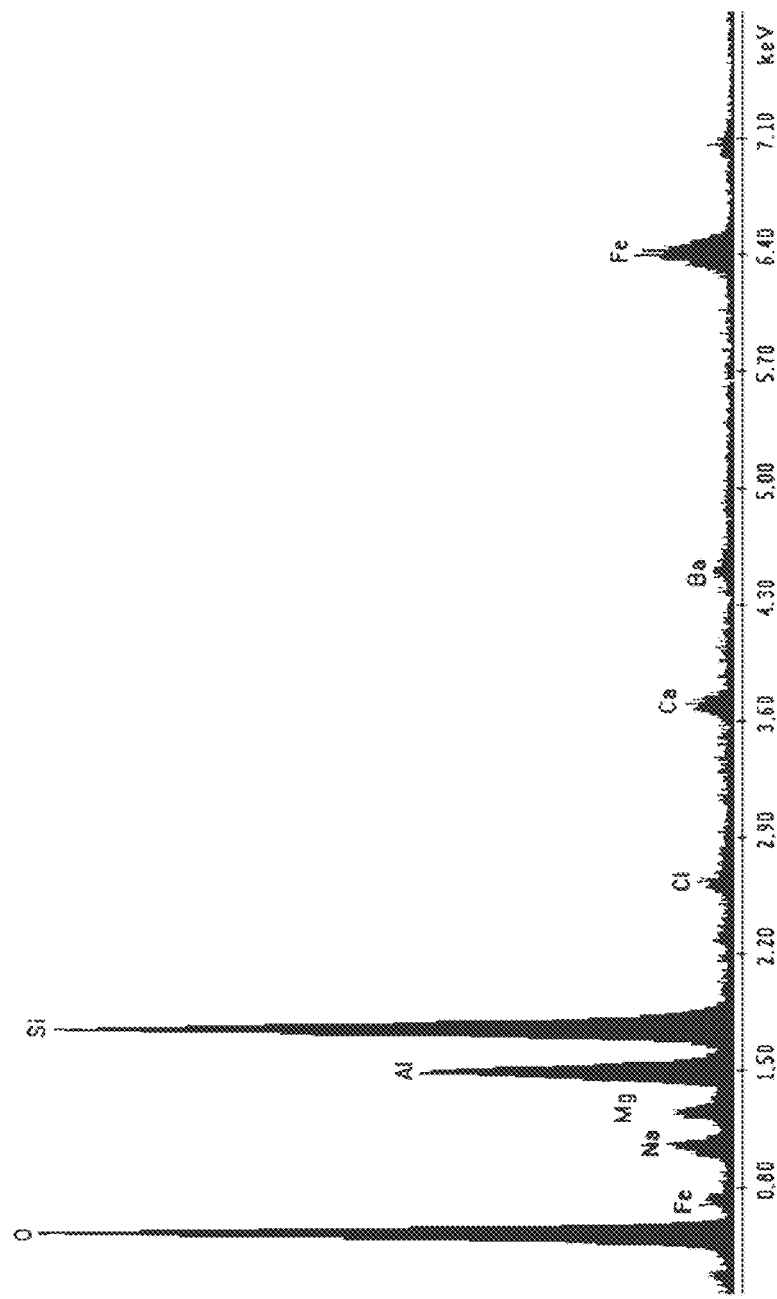

FIG. 170 is a graphical presentation of EDS of general area of ESEM in FIG. 169.

Figure 171:
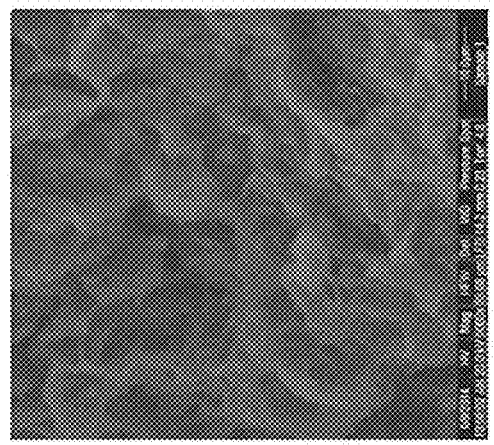

FIG. 171 is an ESEM image of 100% Bentonite compacted on dry of OMC—pre swell.

Figure 172:
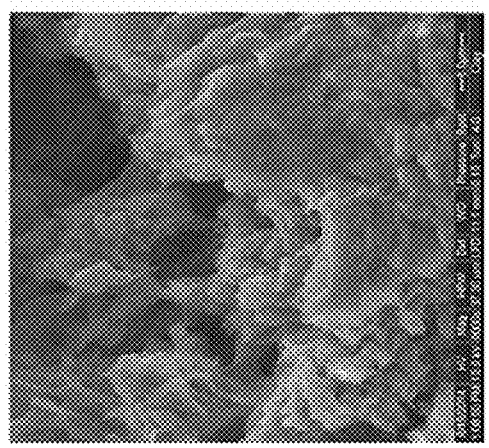

FIG. 172 is an ESEM image of 100% Bentonite compacted on dry of OMC—post swell.

Figure 173:
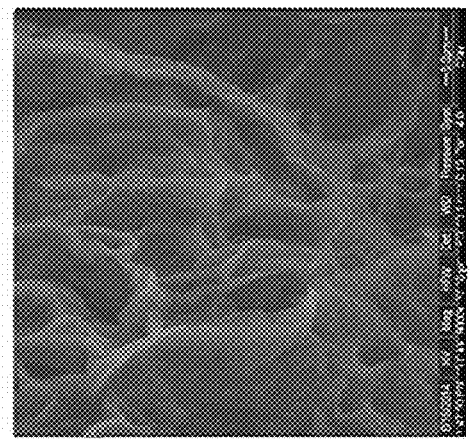

FIG. 173 is an ESEM image of 100% Bentonite compacted on wet of OMC—pre swell.

Figure 174:
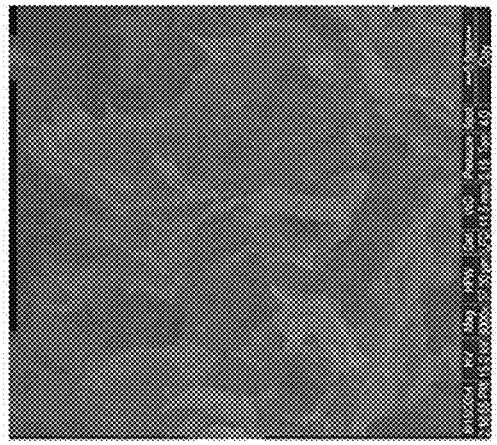

FIG. 174 is an ESEM image of 100% Bentonite compacted on wet of OMC—post swell.

Figure 175:
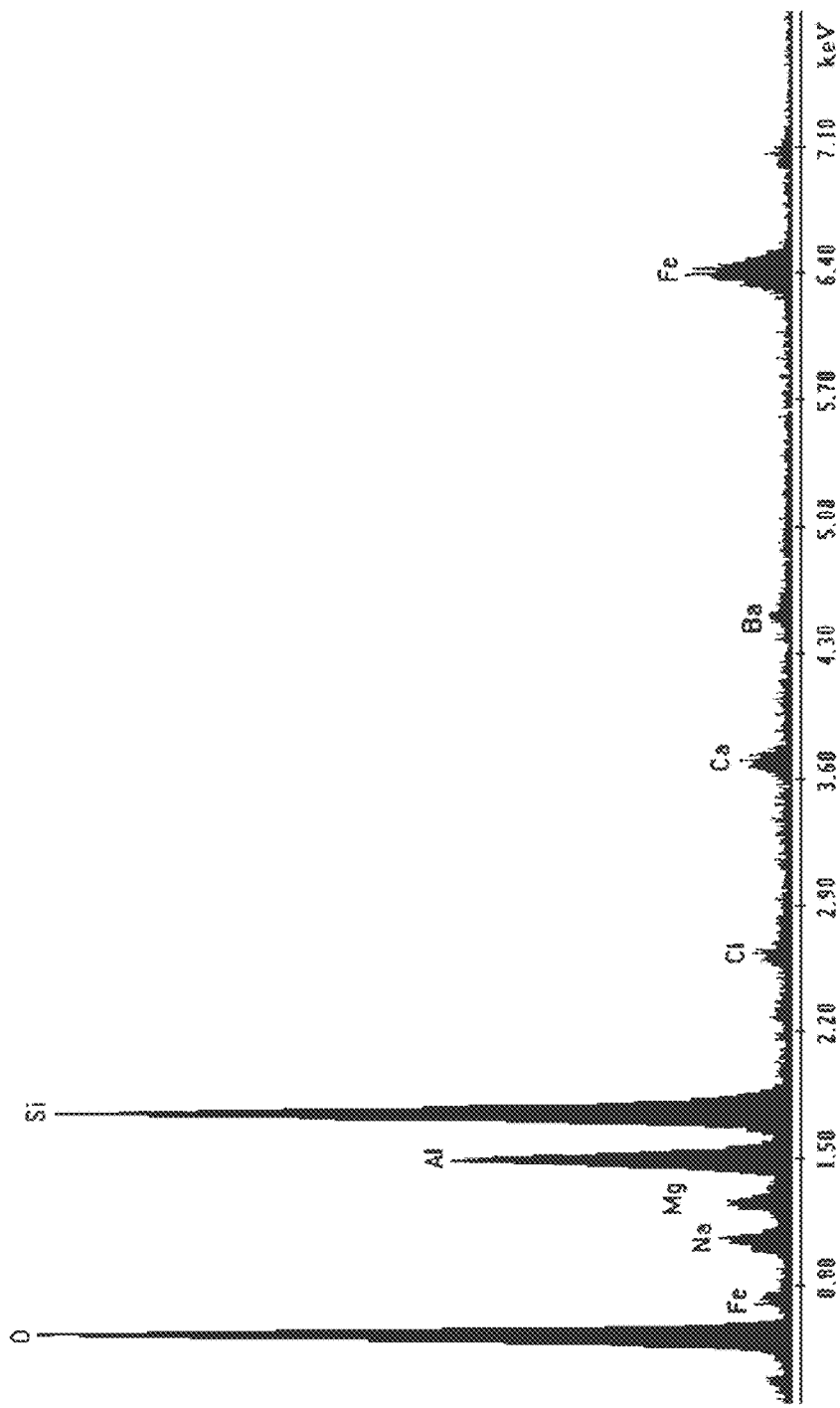

FIG. 175 is a graphical presentation of EDS of 100% Bentonite compacted on dry of OMC—pre swell.

Figure 176:
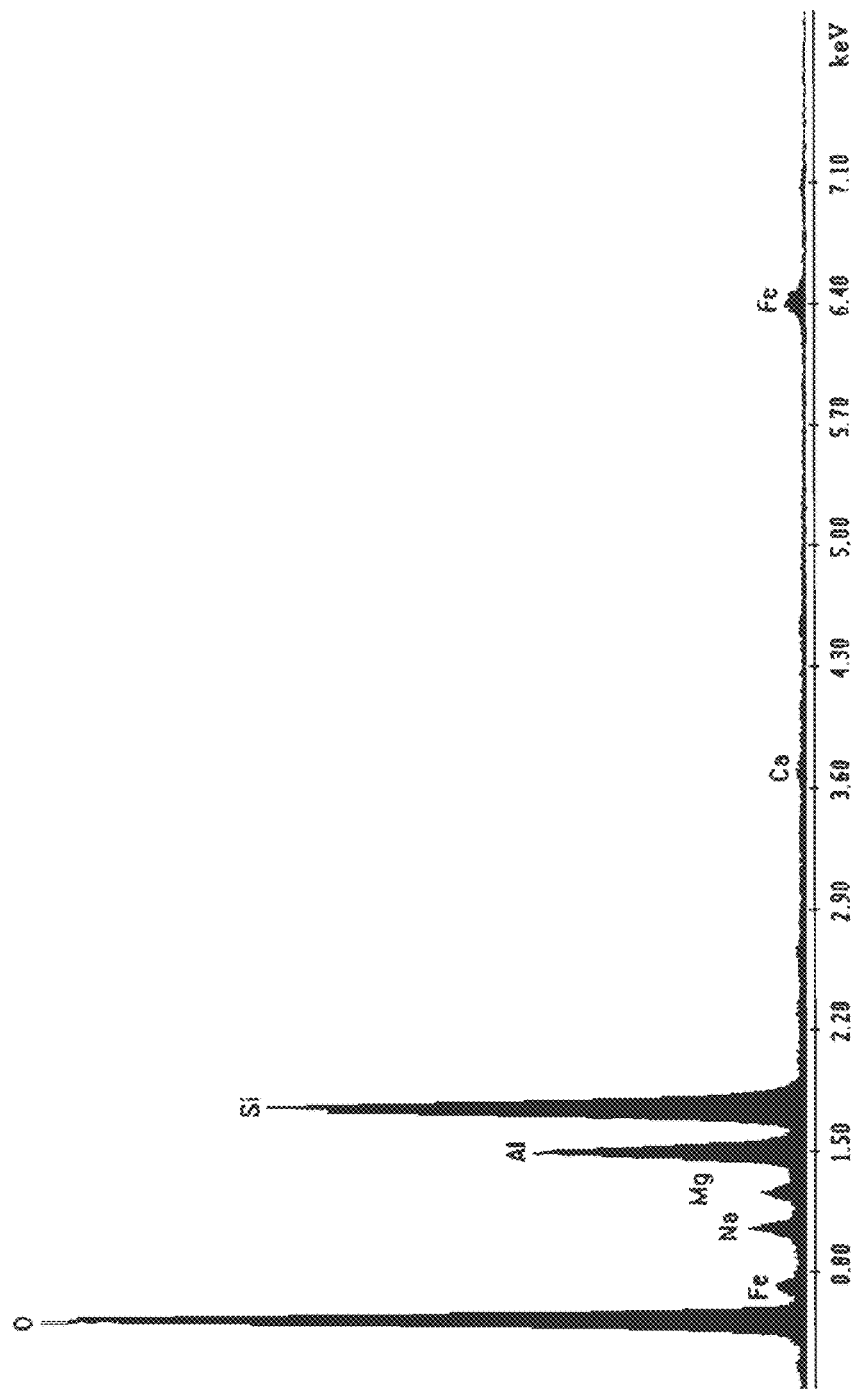

FIG. 176 is a graphical presentation of EDS of 100% Bentonite compacted on dry of OMC—post swell.

Figure 177:
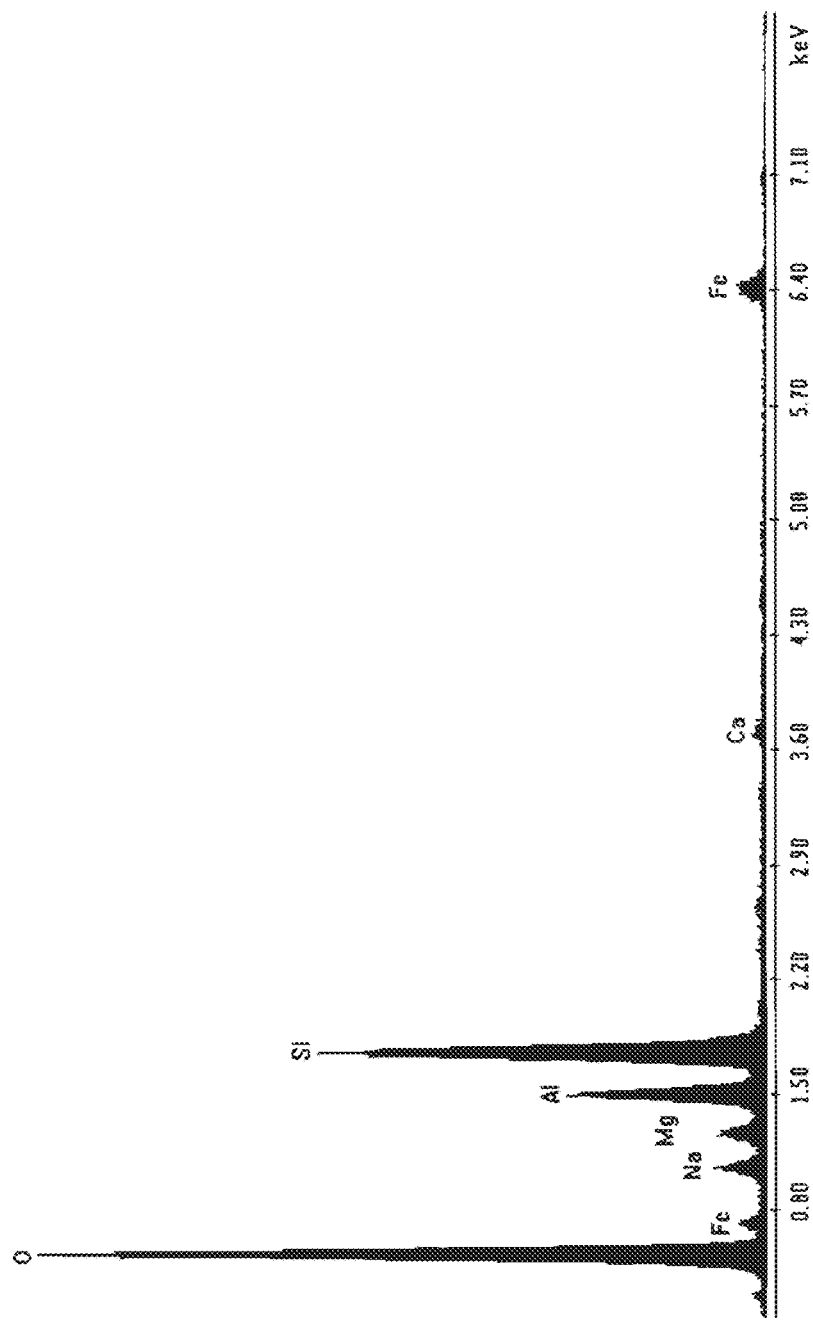

FIG. 177 is a graphical presentation of EDS of 100% Bentonite compacted on wet of OMC—pre swell.

Figure 178:
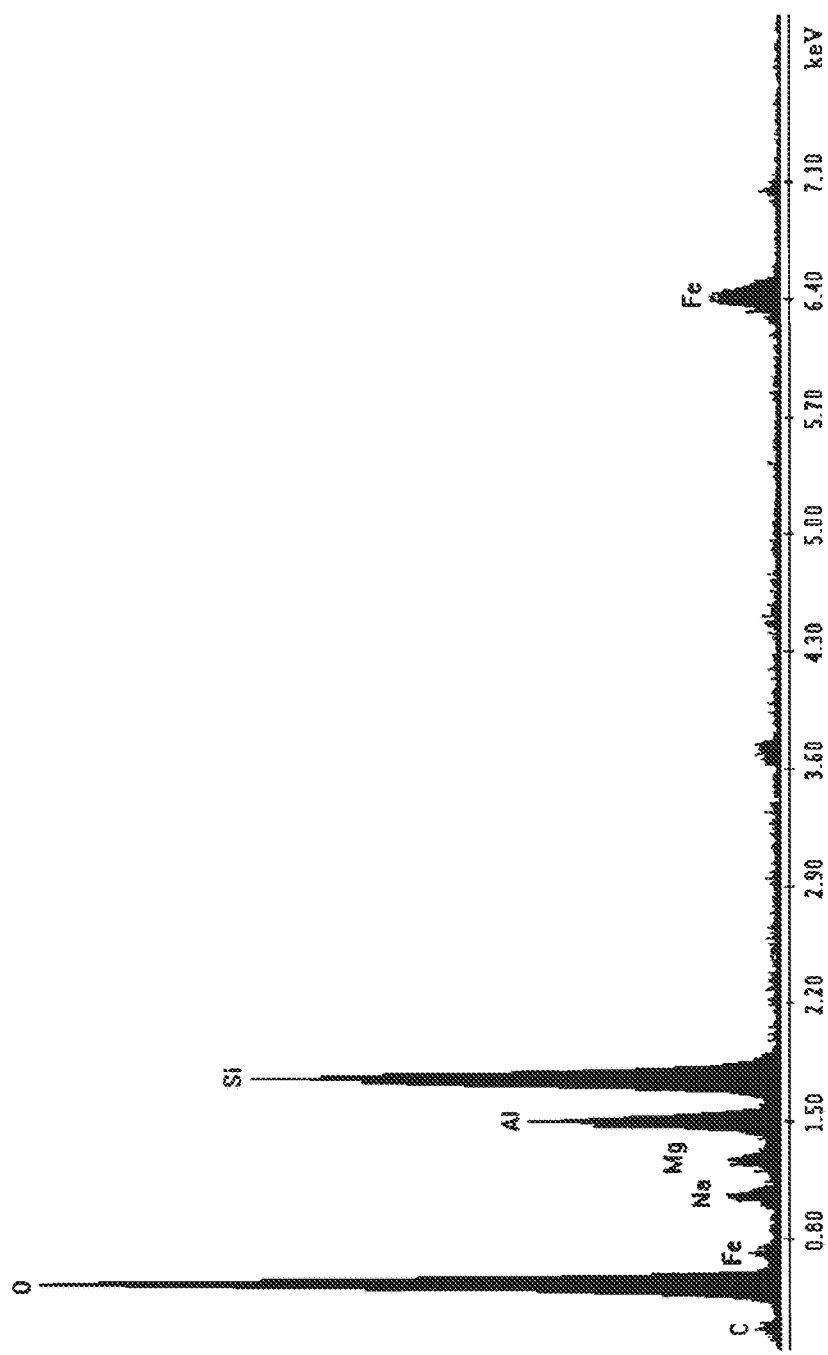

FIG. 178 is a graphical presentation of EDS of 100% Bentonite compacted on dry of OMC—post swell.

Figure 179:
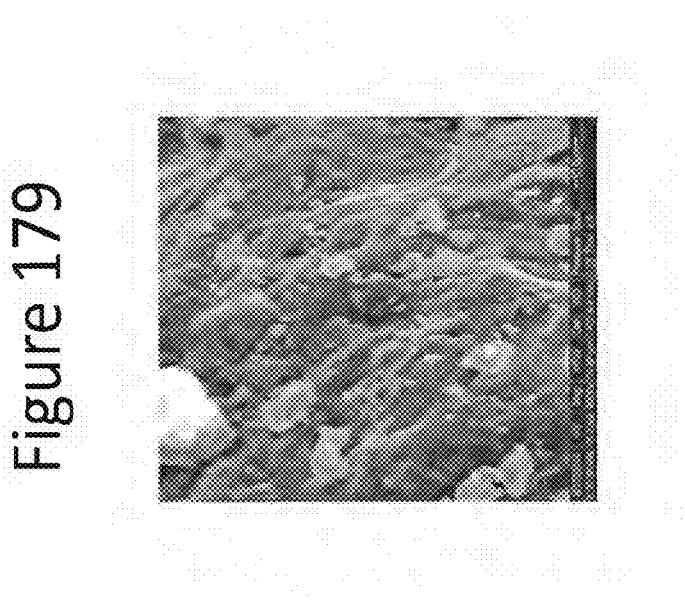

FIG. 179 is an ESEM image of dry Bentonite sample.

Figure 180:
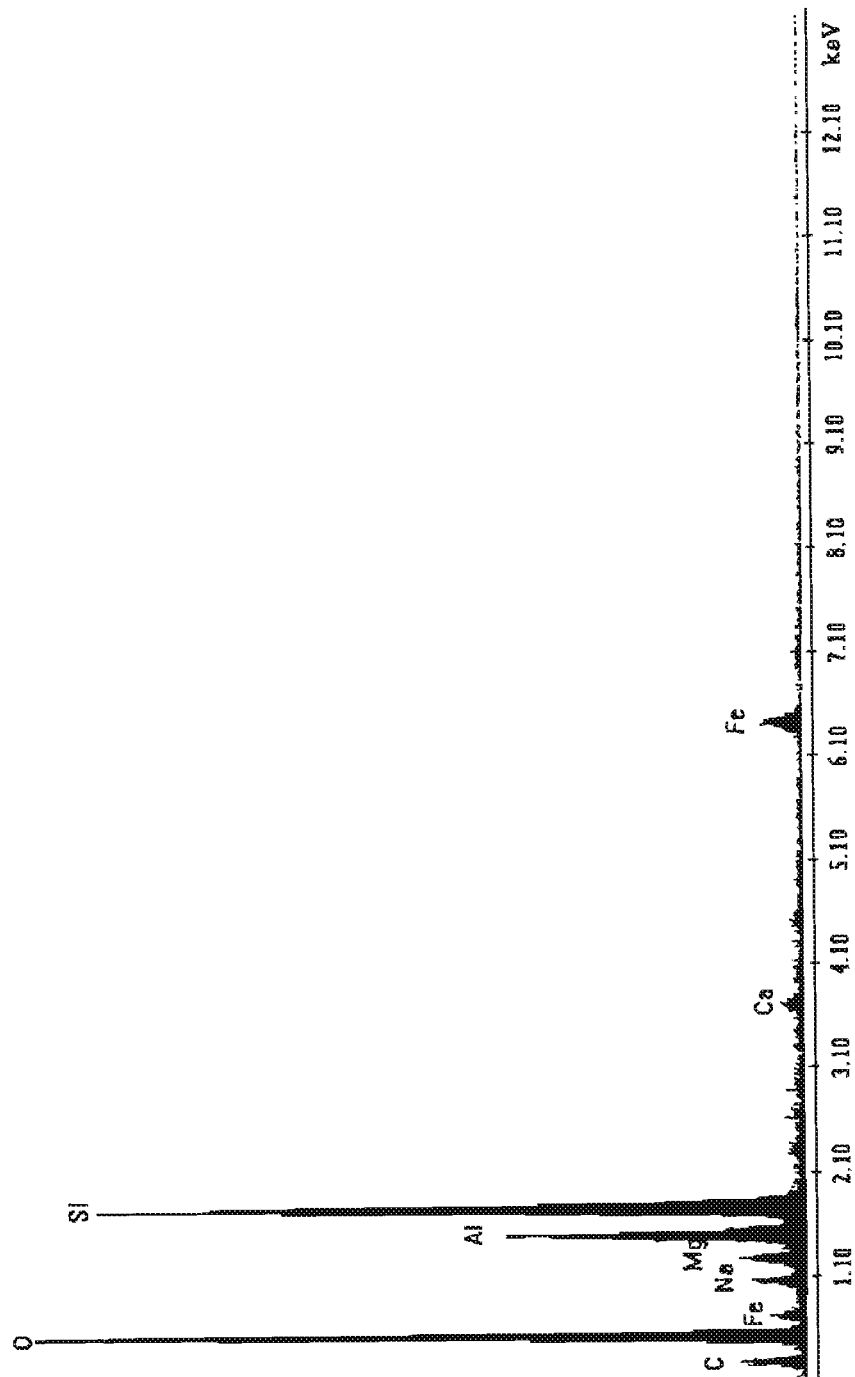

FIG. 180 is a graphical presentation of EDS of dry Bentonite sample.

Figure 181:
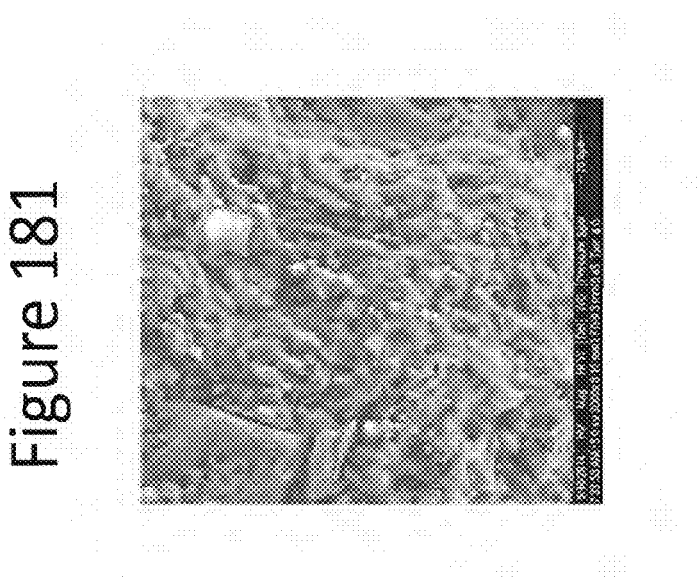

FIG. 181 is an ESEM image of Qatif-2 sample—pre swell.

Figure 182:
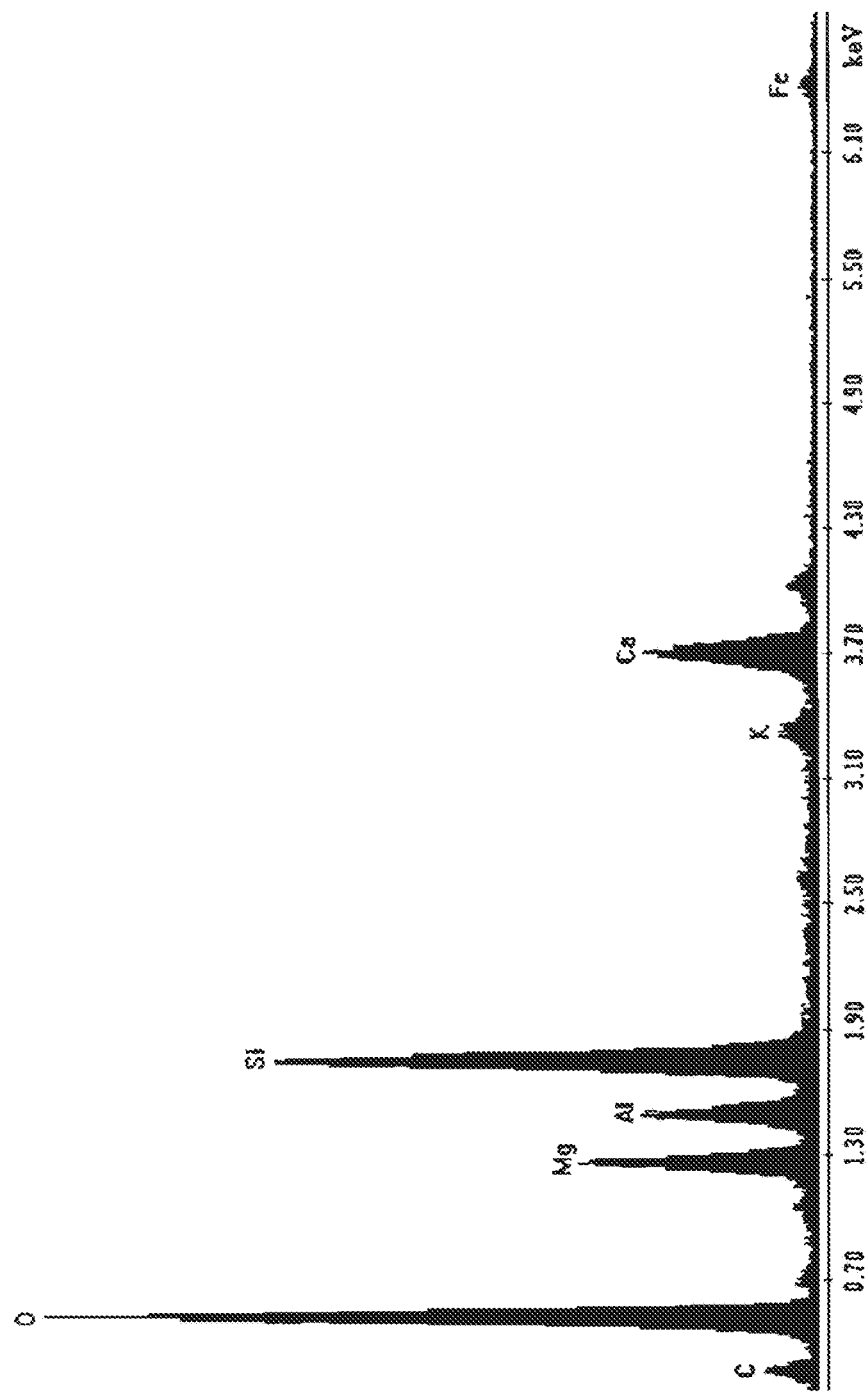

FIG. 182 is a graphical presentation of EDS of Qatif-2 sample—pre swell.

Figure 183:
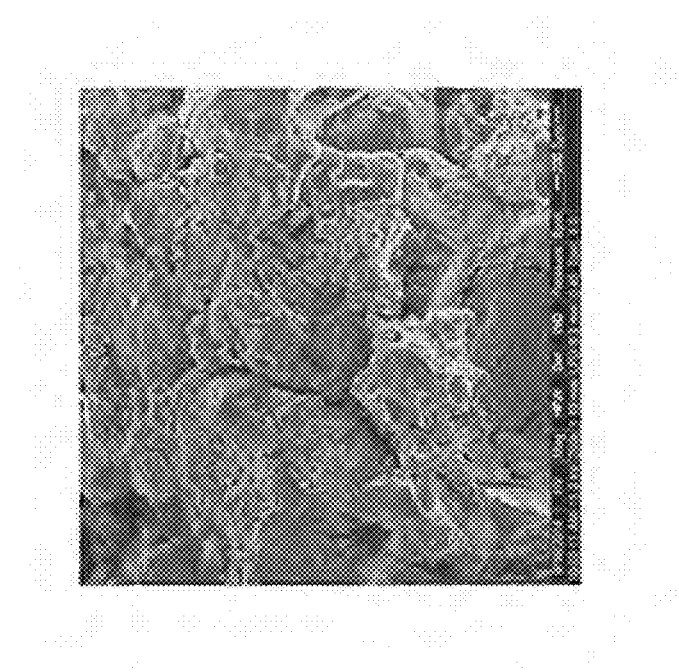

FIG. 183 is an ESEM image of 30% Bentonite and 70% Sand—Dry of OMC—Pre swell.

Figure 184:
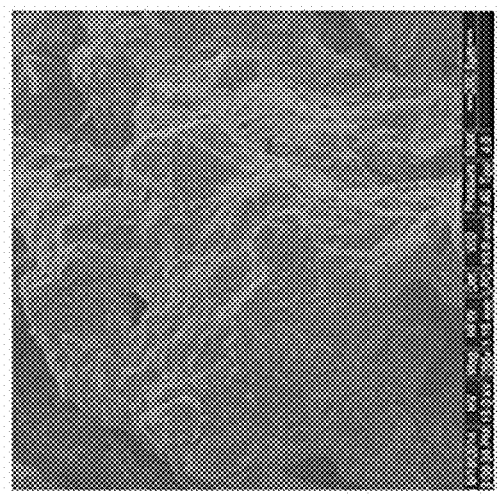

FIG. 184 is an ESEM image of 30% Bentonite and 70% Sand—Dry of OMC—Post swell.

Figure 185:
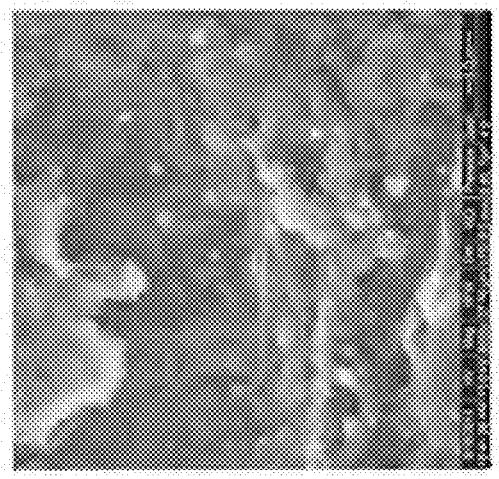

FIG. 185 is an ESEM image of 30% Bentonite and 70% Sand—Dry of OMC—Pre swell.

Figure 186:
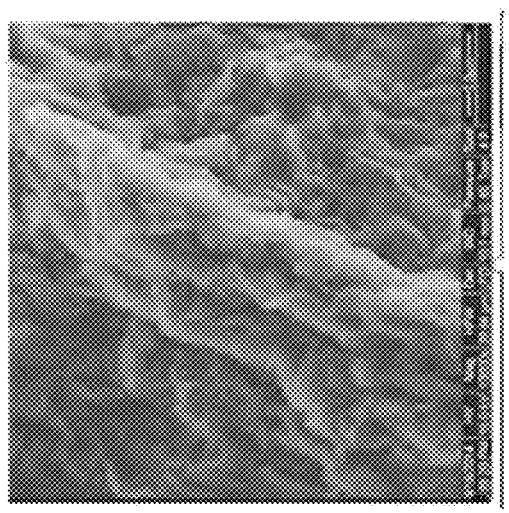

FIG. 186 is an ESEM image of 30% Bentonite and 70% Sand—Dry of OMC Post swell.

Figure 187:
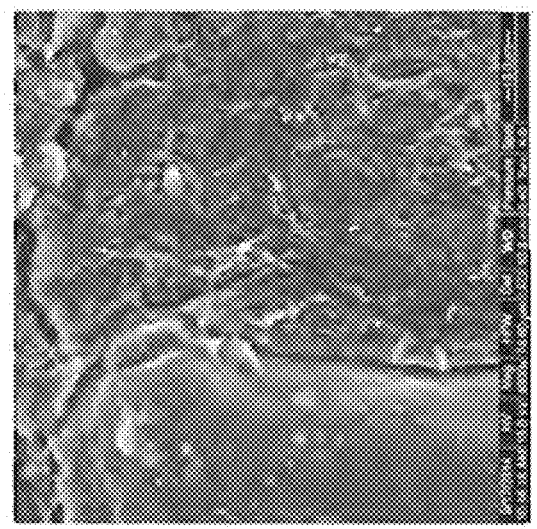

FIG. 187 is an ESEM image of 30% Bentonite, 70% Sand-Static—Dry of OMC—Pre swell.

Figure 188:
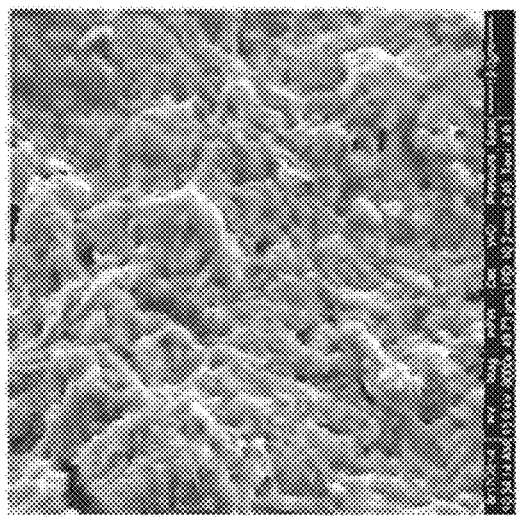

FIG. 188 is an ESEM image of 30% Bentonite, 70% Sand-Static—Dry of OMC—Post swell.

Figure 189:
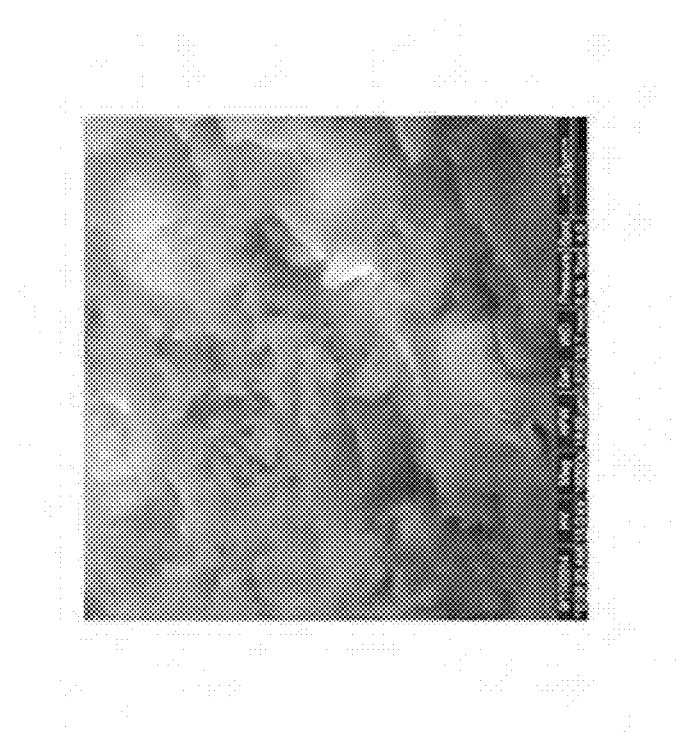

FIG. 189 is an ESEM image of 30% Bentonite, 70% Sand-Static—Dry of OMC—Pre swell.

Figure 190:
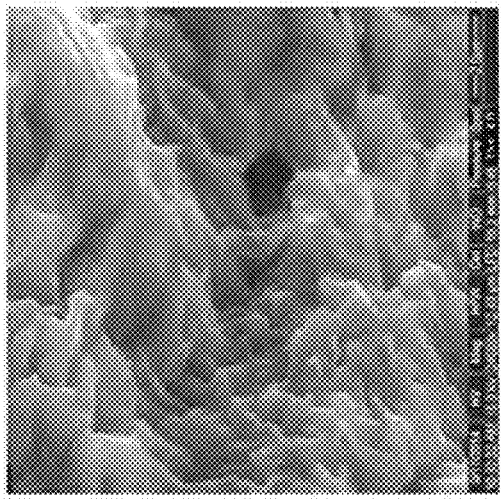

FIG. 190 is an ESEM image of 30% Bentonite, 70% Sand-Static—Dry of OMC—Post swell.

Figure 191:
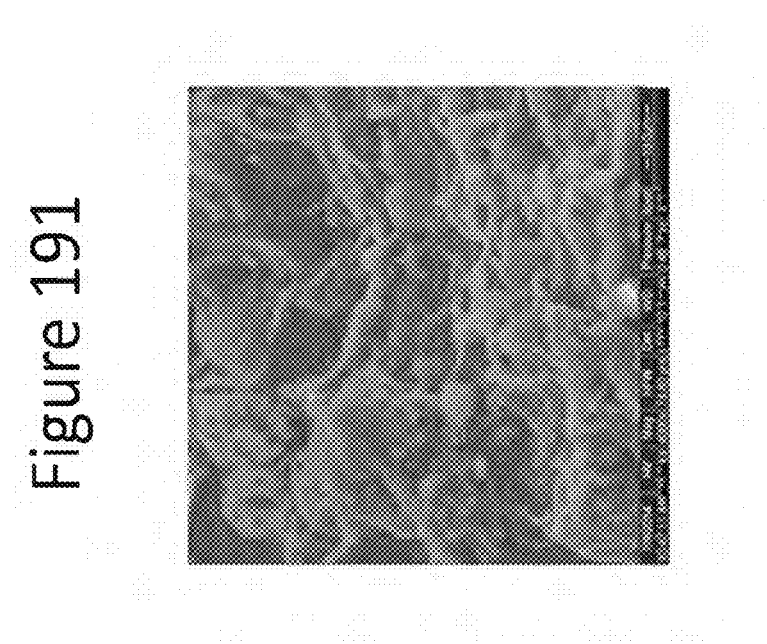

FIG. 191 is an ESEM image of 30% Bentonite, 10% Gypsum, 60% Sand-Dry of OMC—Pre swell.

Figure 192:
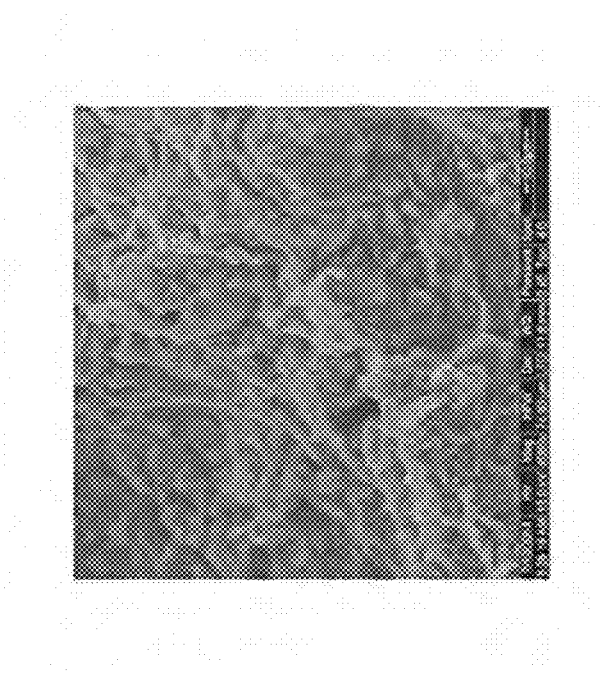

FIG. 192 is an ESEM image of 30% Bentonite, 10% Gypsum, 60% Sand-Dry of OMC—Post swell.

Figure 193:
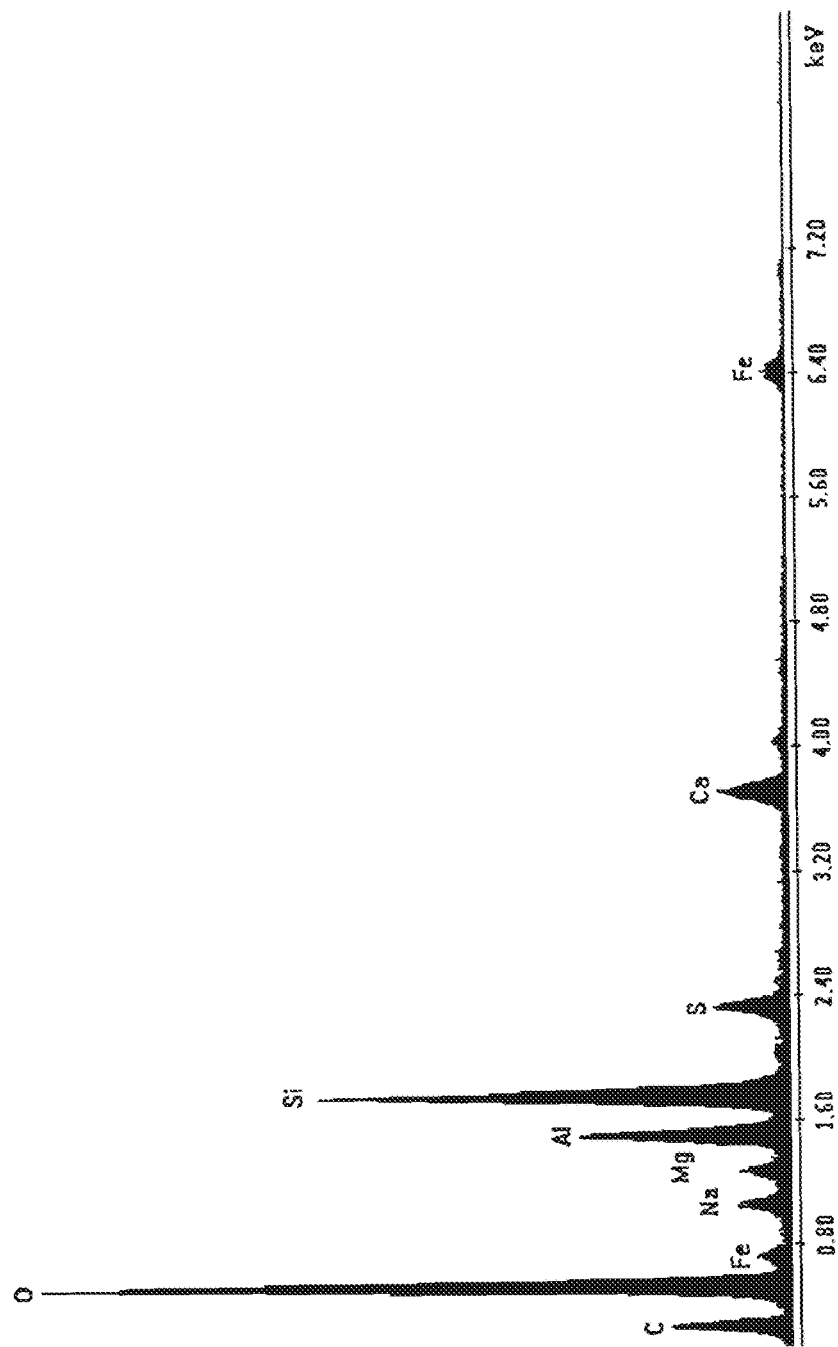

FIG. 193 is a graphical presentation of EDS of 30% Bentonite, 10% Gypsum, 60% Sand-Dry of OMC—Pre swell.

Figure 194:
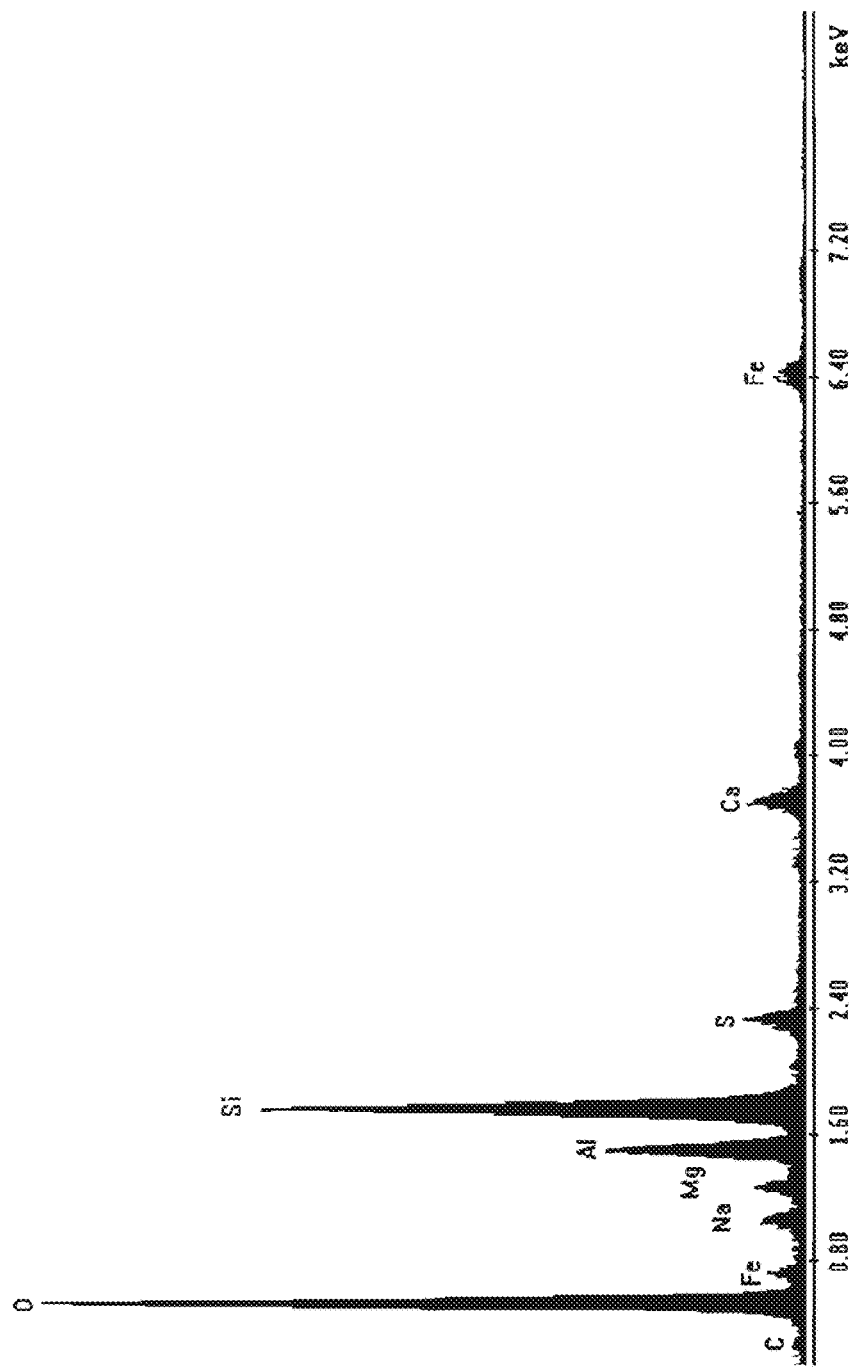

FIG. 194 is a graphical presentation of EDS of 30% Bentonite, 10% Gypsum, 60% Sand-Dry of OMC—Post swell.

Figure 195:
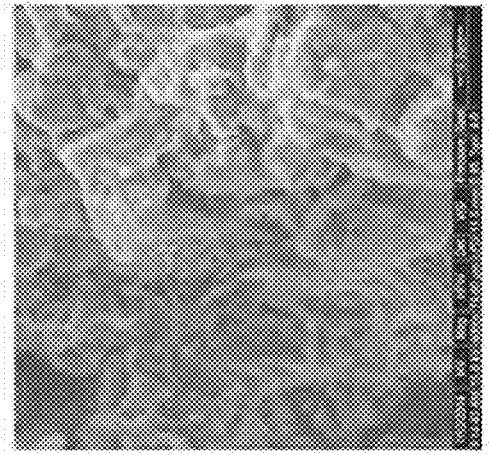

FIG. 195 is an ESEM image of 30% Bentonite, 30% Gypsum, 40% Sand-Dry of OMC—Pre swell.

Figure 196:
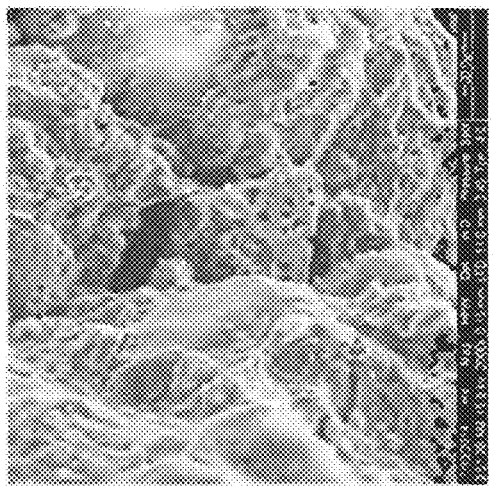

FIG. 196 is an ESEM image of 30% Bentonite, 30% Gypsum, 40% Sand-Dry of OMC—Post swell.

Figure 197:
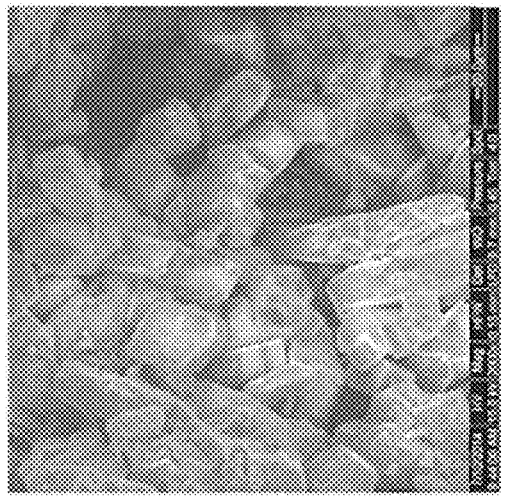

FIG. 197 is an ESEM image of 30% Bentonite, 30% Gypsum, 40% Sand-Dry of OMC—Post swell.

Figure 198:
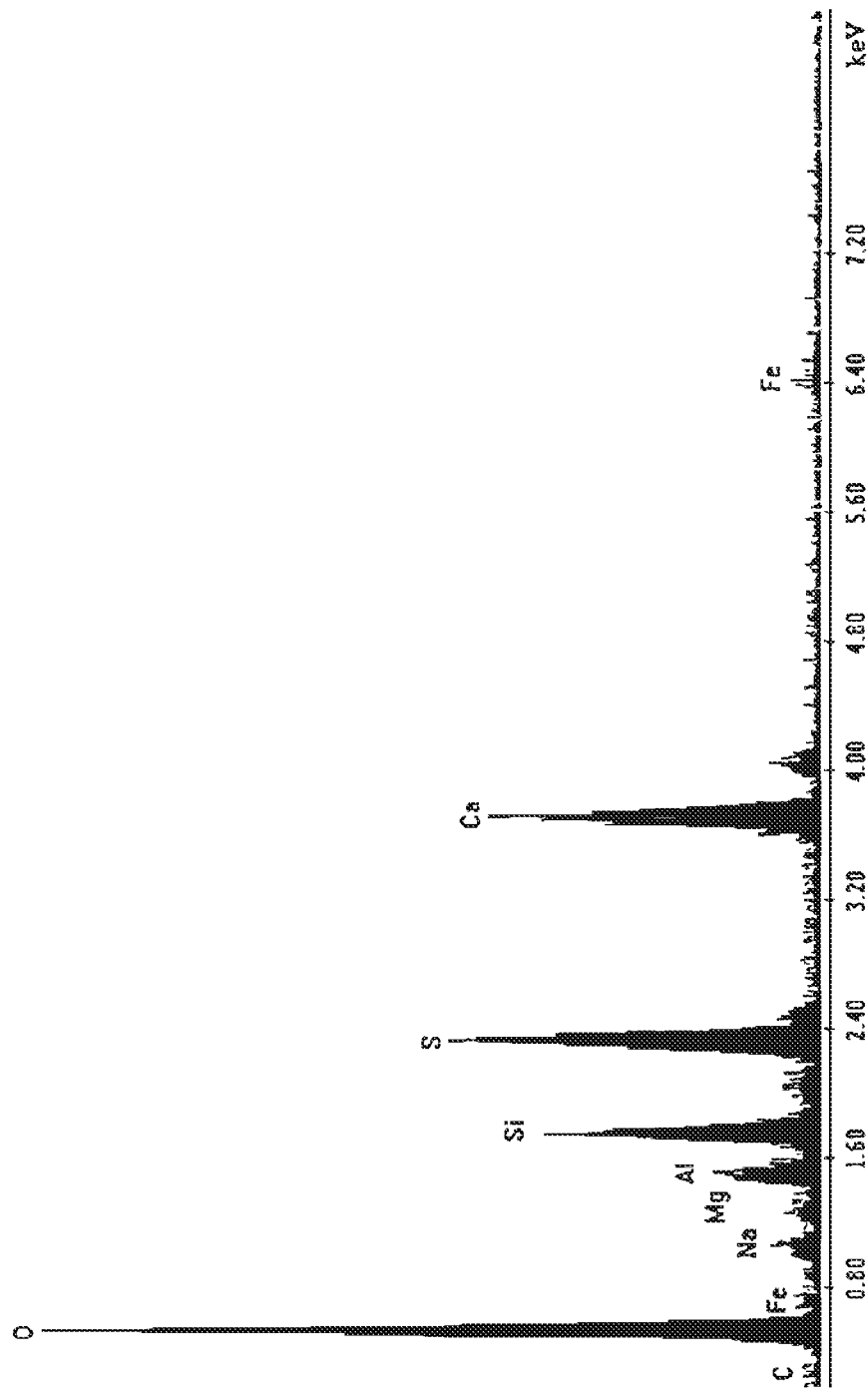

FIG. 198 is a graphical presentation of EDS of 30% Bentonite, 30% Gypsum, 40% Sand-Dry of OMC—Post swell.

Figure 199:
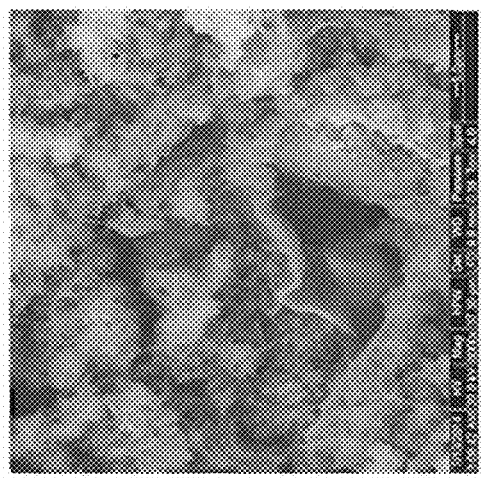

FIG. 199 is an ESEM image of 30% Bentonite, 30% Calcite, 40% Sand-Dry of OMC—Pre swell.

Figure 200:
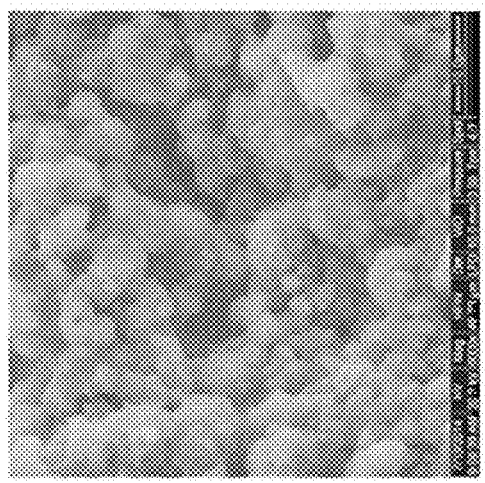

FIG. 200 is an ESEM image of 30% Bentonite, 30% Calcite, 40% Sand-Dry of OMC—Post swell.

Figure 201:
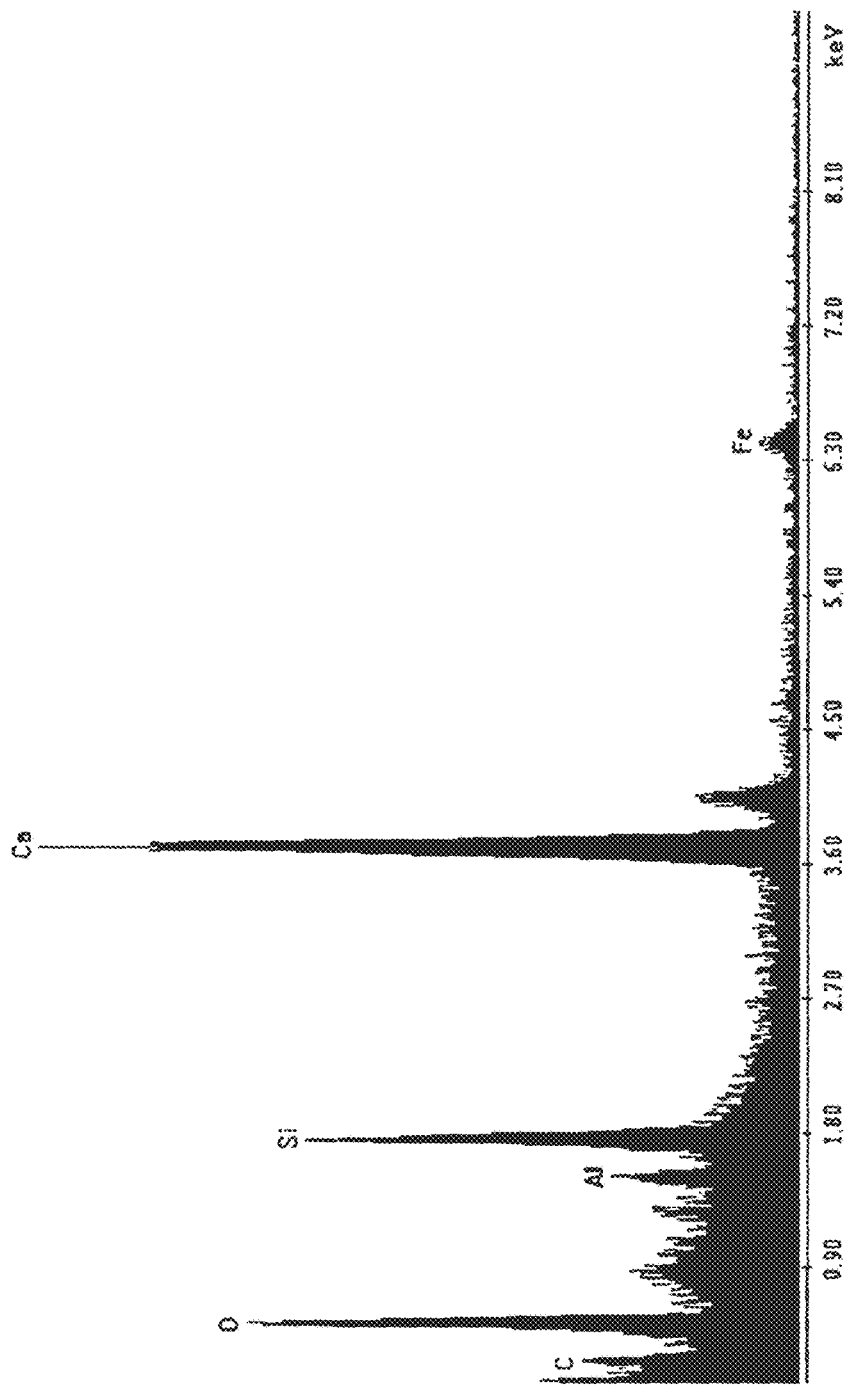

FIG. 201 is a graphical presentation of EDS of 30% Bentonite, 30% Calcite, 40% Sand-Dry of OMC—Pre swell.

Figure 202:
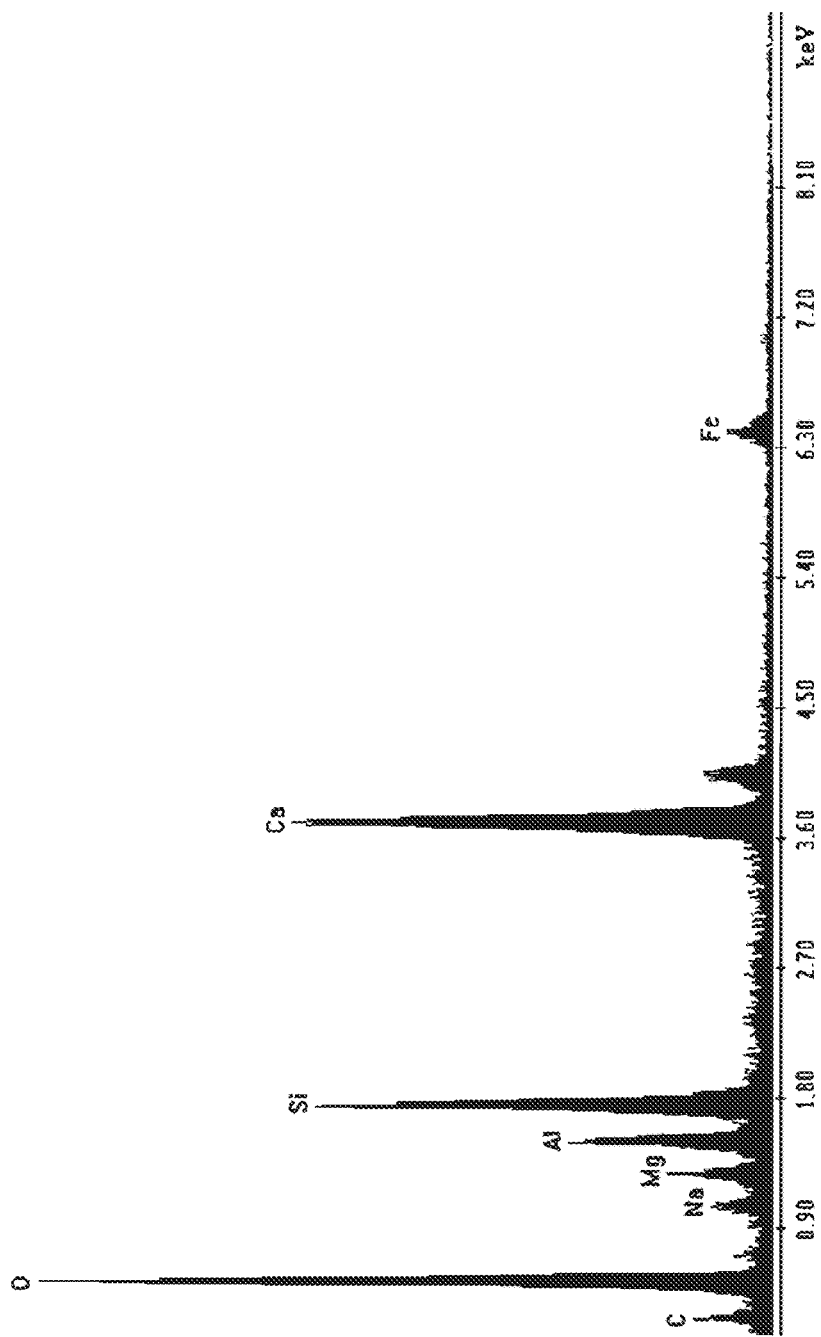

FIG. 202 is a graphical presentation of EDS of 30% Bentonite, 30% Calcite, 40% Sand-Dry of OMC—Post swell.

FIGS. 203A, 203B, and 203C are Micro CT Scans of Kaolinite-Sand Compacted Specimens (Pre Swelling).

FIGS. 204A, 204B, and 204C are Micro CT Scans of Kaolinite-Sand Compacted Specimens (Post Swelling).

FIGS. 205A, 205B, and 205C are Micro CT Scans of Na-Montmorillonite-Sand Compacted Specimens (Pre Swelling).

Figure 206A:
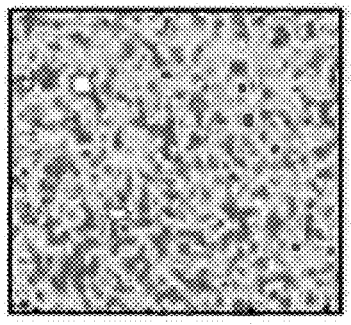
Figure 206C:
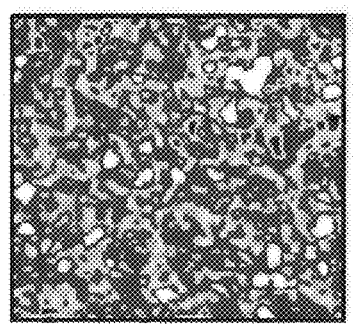
Figure 206B:
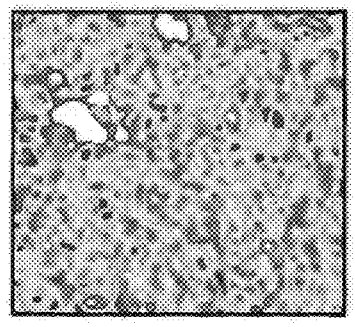

FIGS. 206A, 206B, and 206C are Micro CT Scans of Na-montmorillonite-Sand Compacted Specimens (Post Swelling).

Figure 207A:
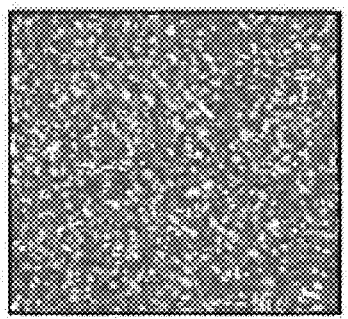
Figure 207C:
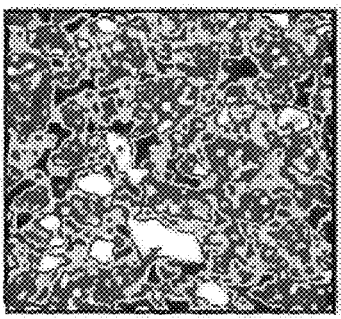
Figure 207B:
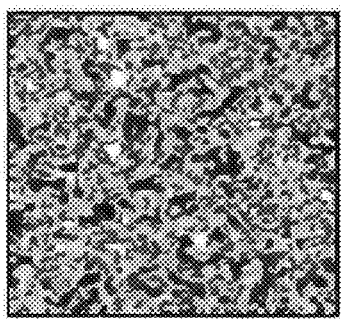

FIGS. 207A, 207B, and 207C are Micro CT Scans of Ca-montmorillonite-Sand Compacted Specimens (Pre Swelling).

Figure 208A:
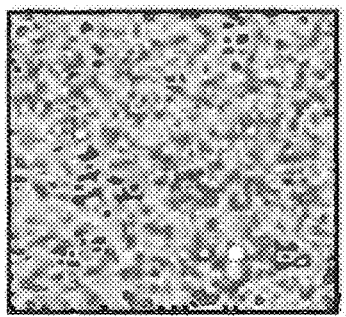
Figure 208C:
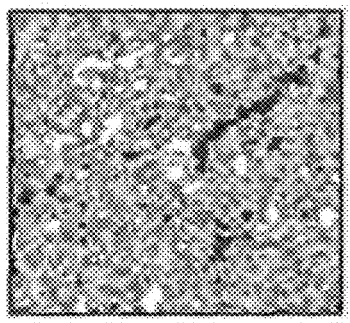
Figure 208B:
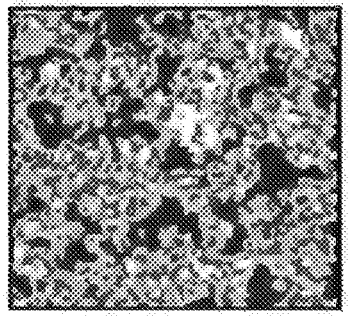

FIGS. 208A, 208B, and 208C are Micro CT Scans of Ca-montmorillonite-Sand Compacted Specimens (Post Swelling).

FIGS. 209A and 209B are Micro CT Scans of Qatif-1 Specimens (Pre and Post Swelling).

Figure 210:
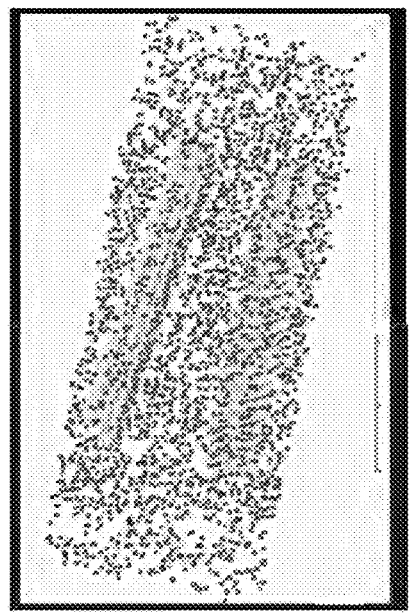

FIG. 210 is a graphical presentation of molecular simulation result showing Water sorbed single crystallite of Na-montmorillonite MCEC at initial water content=40%.

Figure 211:
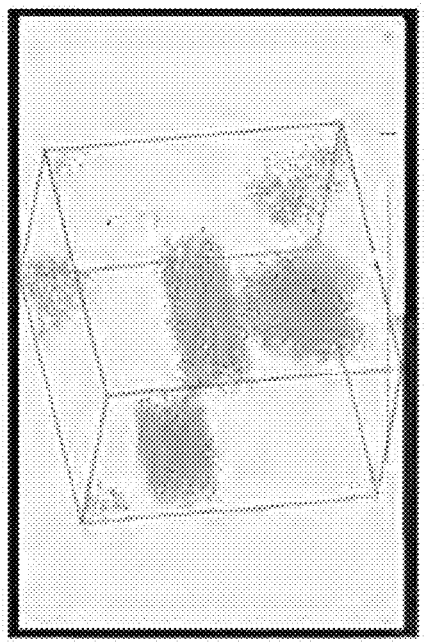

FIG. 211 is a graphical presentation of molecular simulation result showing Loose mix simulation of Na-montmorillonite MCEC at initial water content=40%.

Figure 212:
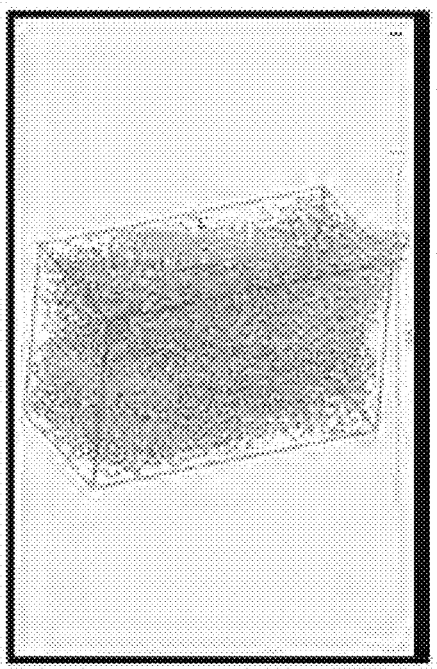

FIG. 212 is a graphical presentation of molecular simulation result showing compacted unit cell of Na-montmorillonite MCEC at initial water content=40%.

Figure 213:
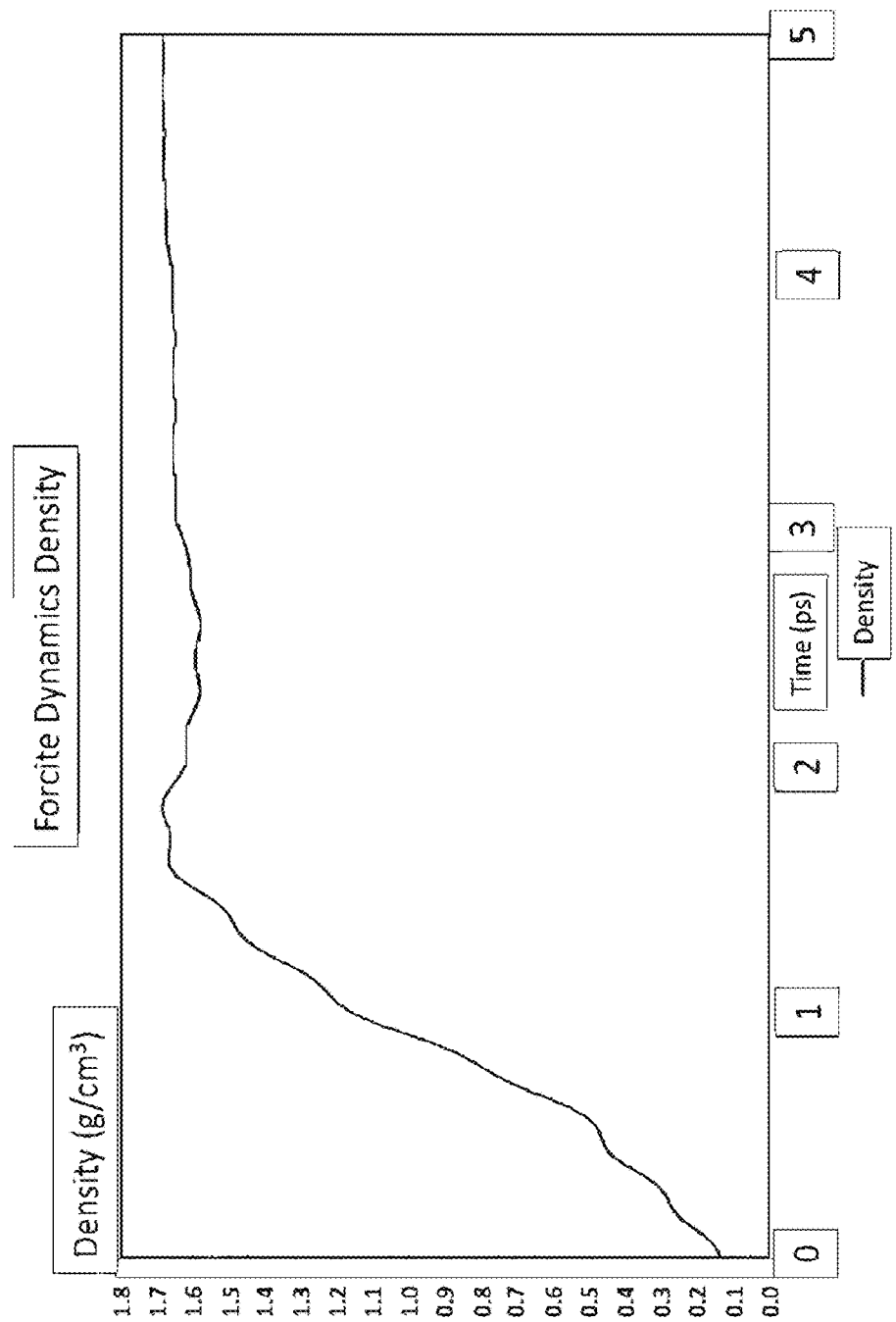

FIG. 213 is a graphical presentation of compaction plot of unit cell of Na-montmorillonite MCEC at initial water content=40%.

Figure 214:
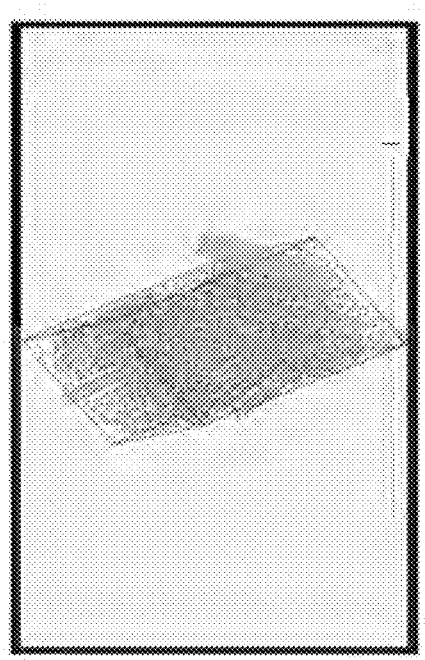

FIG. 214 is a graphical presentation of molecular simulation result showing stress relaxation of the unit cell of Na-montmorillonite MCEC at initial water content=40%.

Figure 215:
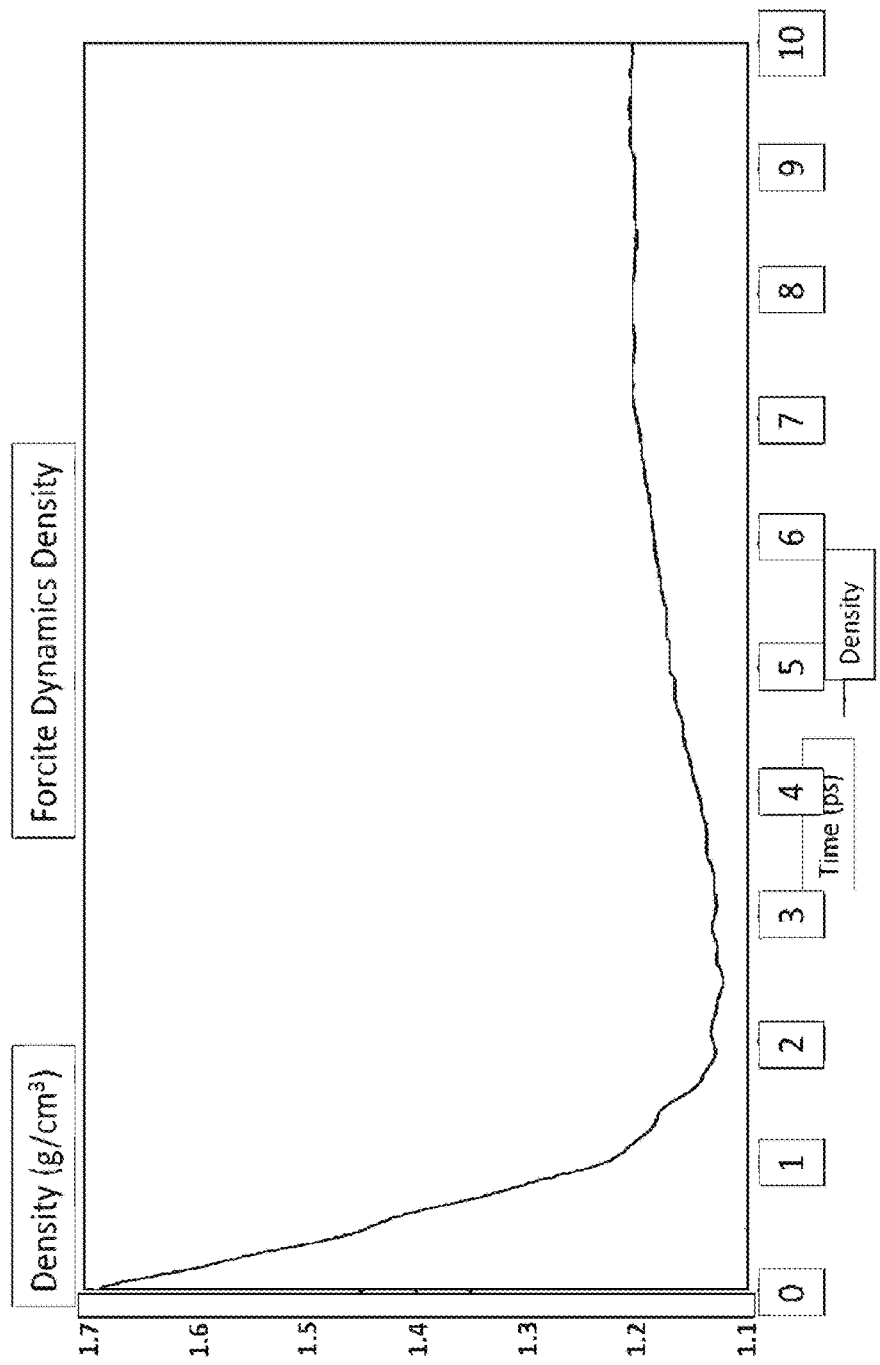

FIG. 215 is a graphical presentation of stress relaxation plot of the unit cell of Na-montmorillonite MCEC at 40% water content.

Figure 216:
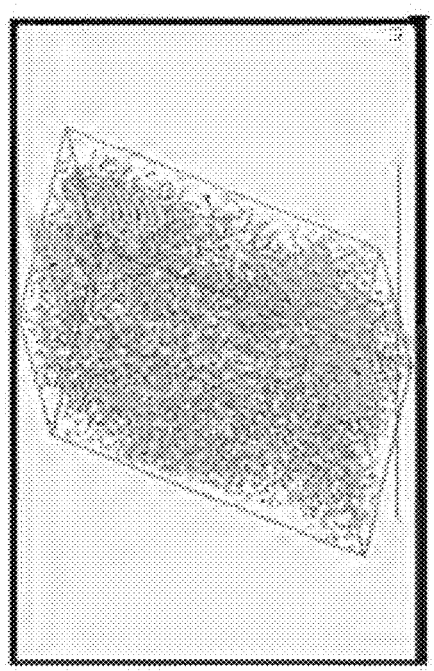

FIG. 216 is a graphical presentation of molecular simulation result showing 10% water sorption in Na-montmorillonite MCEC crystallites unit cell (initial water content=40%).

Figure 217:
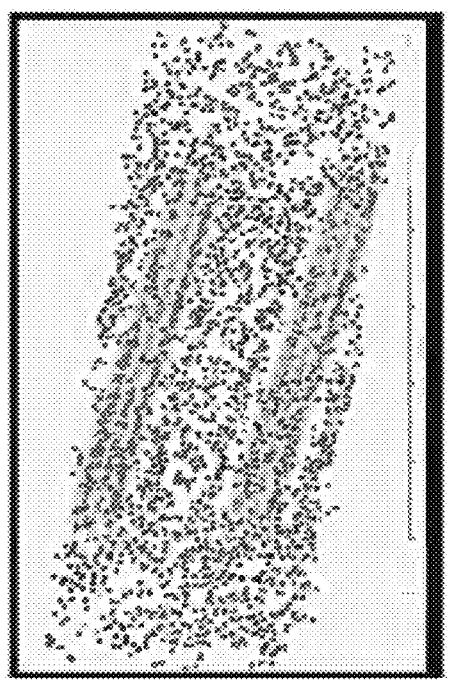

FIG. 217 is a graphical presentation of molecular simulation result showing single crystallite of Na-montmorillonite HCEC at initial water content=30%.

Figure 218:
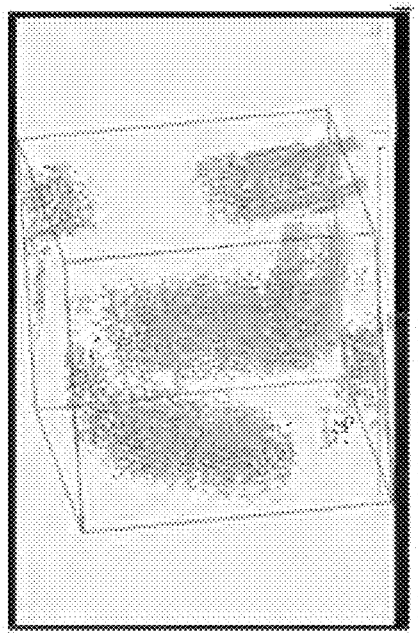

FIG. 218 is a graphical presentation of molecular simulation result showing loose arrangement of crystallites of Na-montmorillonite HCEC at initial moisture content=30%.

Figure 219:
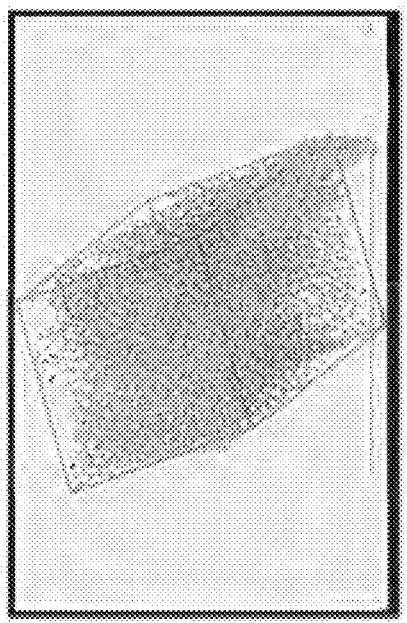

FIG. 219 is a graphical presentation of molecular simulation result showing compacted unit cell of Na-montmorillonite HCEC at initial water content=30%.

Figure 220:
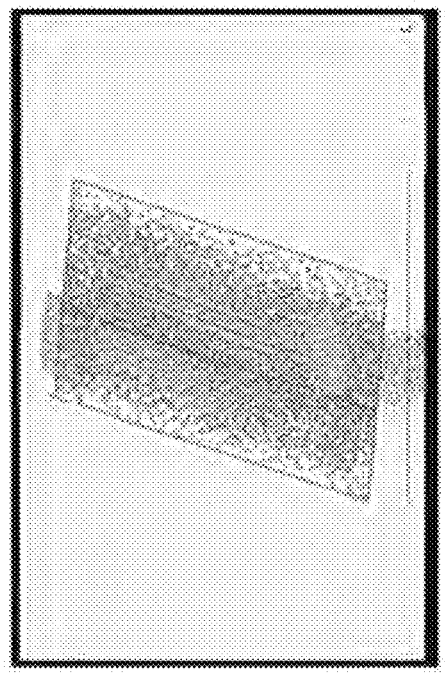

FIG. 220 is a graphical presentation of molecular simulation result showing stress relaxed unit cell of Na-montmorillonite HCEC at initial water content=30%.

Figure 221:
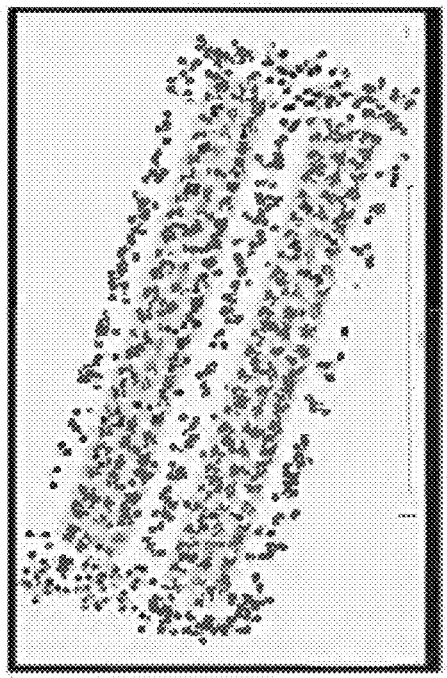

FIG. 221 is a graphical presentation of molecular simulation result showing single crystallite of montmorillonite (60% Ca+40% Na) at initial water content=10%.

Figure 222:
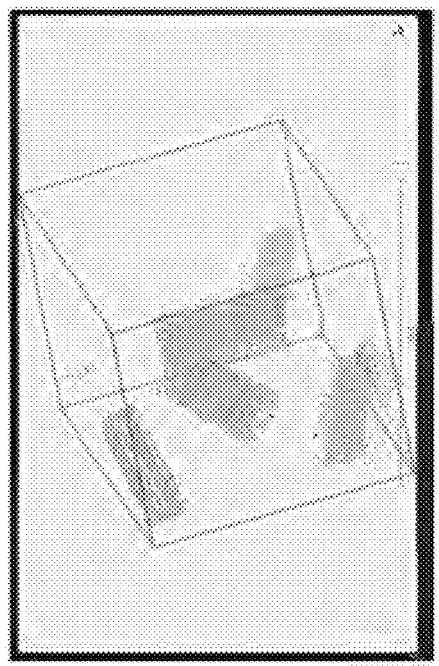

FIG. 222 is a graphical presentation of molecular simulation result showing loose mix of four montmorillonite crystallites (60% Ca+40% Na) at initial moisture content=10%.

Figure 223:
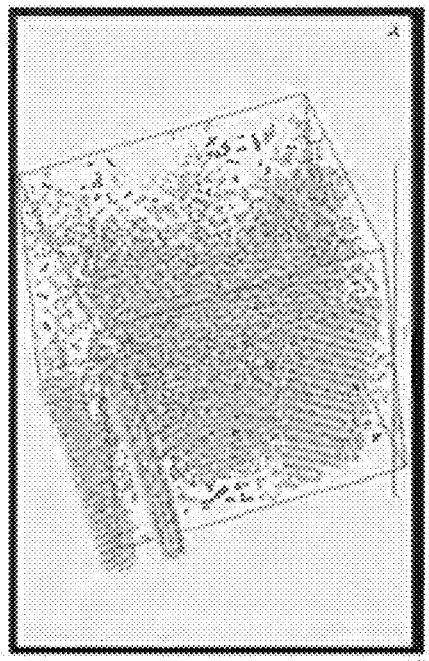

FIG. 223 is a graphical presentation of molecular simulation result showing compacted four montmorillonite crystallites (60% Ca+40% Na) at initial moisture content=10%.

Figure 224:
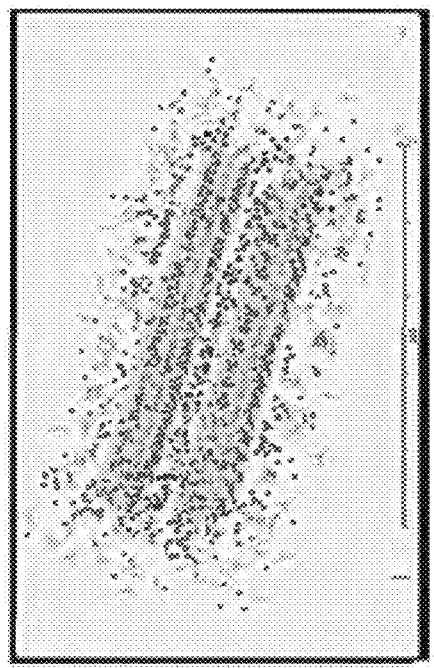

FIG. 224 is a graphical presentation of molecular simulation result showing single Na-montmorillonite crystallite MCEC at initial moisture content=10%.

Figure 225:
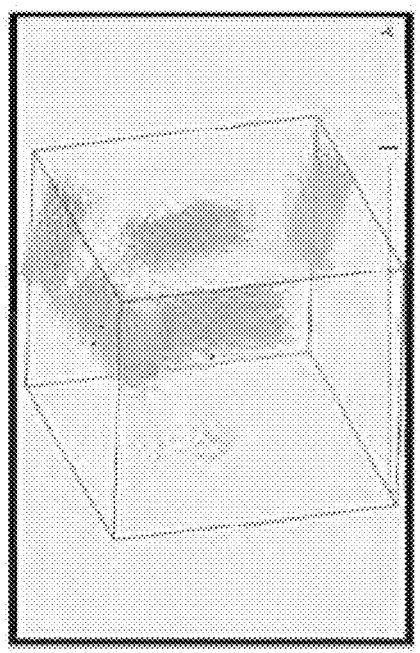

FIG. 225 is a graphical presentation of molecular simulation result showing four Na-montmorillonite crystallites MCEC at initial moisture content=10%.

Figure 226:
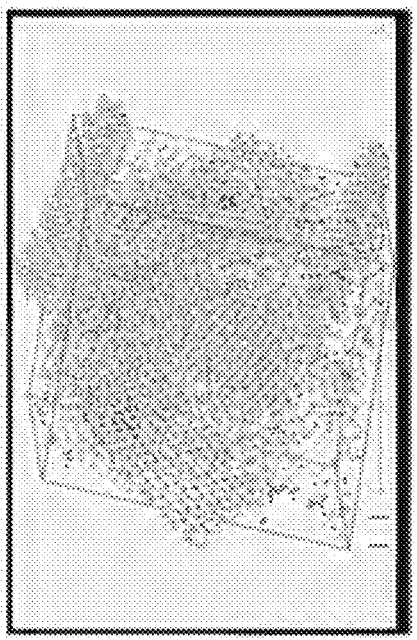

FIG. 226 is a graphical presentation of molecular simulation result showing four compacted Na-montmorillonite crystallites MCEC at initial moisture content=10%.

DETAILED DESCRIPTION OF THE EMBODIMENTS

According to a first aspect, the present disclosure relates to a method of reducing the swell potential of an expansive clayey soil comprising at least one expansive clay mineral. The proportion of the weight of the at least one expansive clay mineral relative to the total weight of the expansive clayey soil is $P_{ECM}$. The expansive clayey soil has a water content and a cation exchange capacity (CEC) expressed in meq/100 g dry expansive clayey soil. The method includes (a) calculating a first amount of a swelling reduction agent to be incorporated into the expansive clayey soil to form a first swelling reduction agent incorporated expansive clayey soil with a reduced swell potential $S_{1i(soil)}$ that is no greater than a pre-set level T with a nano-level constitutive modeling based on the water content as an initial water content (IWC) and the cation exchange capacity (CEC) of the expansive clayey soil, wherein the first swelling reduction agent incorporated expansive clayey soil comprises a first swelling reduction agent incorporated at least one expansive clay mineral having a swell potential represented by $S_{1i(ECM)}$, wherein the swelling reduction agent is at least one selected from the group consisting of calcite, gypsum, potassium chloride, a composition comprising exchangeable $K^+$, a composition comprising exchangeable $Ca^{2+}$, and a composition comprising exchangeable $Mg^{2+}$, wherein the incorporation of the first amount of the swelling reduction agent produces a modified total cohesive energy density (TCEDm) of the first swelling reduction agent incorporated at least one expansive clay mineral calculated according to Equation (6):

$$TCEDm=0.0625(IWC)^3-3.575(IWC)^2+10.5(IWC)+ \\ 2830+7100(C/0.1)+5050(G/0.2)+3010(KCl/0.1)+ \\ Ca(500)+Mg(300)+K(100) \qquad (6)$$

where TCEDm=modified TOED, C=Proportion of calcite weight relative to the total weight of the first swelling reduction agent incorporated expansive clayey soil×$P_{ECM}$, G=Proportion of gypsum weight relative to the total weight of the first swelling reduction agent incorporated expansive clayey soil×$P_{ECM}$, KCl=Proportion of potassium chloride weight relative to the total weight of the first swelling reduction agent incorporated expansive clayey soil×$P_{ECM}$, Ca=Proportion of the number of calcium exchangeable cation relative to the total number of exchangeable cations in the first swelling reduction agent incorporated expansive clayey soil, Mg=Proportion of the number of magnesium exchangeable cation relative to the total number of exchangeable cations in the first swelling reduction agent incorporated expansive clayey soil, K=Proportion of the number of potassium exchangeable cation relative to the total number of exchangeable cations in the first swelling reduction agent incorporated expansive clayey soil, IWC=initial water content, wherein the TCEDm of the first swelling reduction agent incorporated at least one expansive clay mineral results in $S_{1i(ECM)}$ calculated according to Equations (2), (3), and (5):

$$IDD=\{-2E-15(TCEDm)^4+5E-11(TCEDm)^3-5E-07 \\ (TCEDm)^2+0.0023(TCEDm)-1.5378\}*1.85* \\ (ABS(CEC-90)/90) \qquad (2)$$

where IDD is initial dry density of the first swelling reduction agent incorporated at least one expansive clay mineral, $$FDD=-2E-22(TCEDm)^6+5E-18(TCEDm)^5-6E-14 \\ (TCEDm)^4+3E-10(TCEDm)^3-7E-07(TCEDm)^2+ \\ 0.0005(TCEDm)+0.3747 \qquad (3)$$

where FDD is final dry density of the first swelling reduction agent incorporated at least one expansive clay mineral when the first swelling reduction agent incorporated at least one expansive clay mineral reaches the swell potential $S_{1i(ECM)}$, $$S_{1i(ECM)}(\%)=(FDD-IDD)/FDD*100 \qquad (5);$$

and wherein the reduced swell potential of the first swelling reduction agent incorporated expansive clayey soil $S_{1i(soil)}$ equals $S_{1i(ECM)} \times P_{ECM}$, and (b) incorporating the first amount of the swelling reduction agent into the expansive clayey soil to form the first swelling reduction agent incorporated expansive clayey soil.

Expansive clay mineral is a type of clay mineral that is known as a lightweight aggregate with a rounded structure, with a porous inner, and a resistant and hard outer layer. An expansive clay mineral or an expansive clayey soil comprising one or more expansive clay minerals is prone to large volume changes (swelling and shrinking) that are directly related to changes in water content. An expansive clayey soil comprising smectite, montmorillonite, and bentonite clay minerals has the most dramatic shrink-swell capacity. An expansive clayey soil can swell in a wet season and shrink and form cracks in a dry season. A laboratory test to measure the swell potential of an expansive clayey soil is ASTM D 4829, or more preferably ASTM D 5890. For example, a compacted or a natural undisturbed expansive clayey soil sample may be subjected to free swell testing in the presence of water in an oedometer test equipment. Increase in height of the sample is recorded at regular time intervals until no further noticeable change in height of the sample is recorded. Maximum change in the height of the sample divided by the original height is recorded and expressed in percent swell for the tested sample.

Soils are composed of a variety of materials, most of which do not expand in the presence of moisture. However, a number of clay minerals are expansive. In some embodiments, the expansive clayey soil comprises at least one expansive clay mineral selected from the group consisting of smectite, bentonite, montmorillonite, beidellite, vermiculite, attapulgite, nontronite, illite, and chlorite. The swell potential of the expansive clayey soil is determined by the type and weight percentage of the expansive clay minerals, the type and weight percentage of non-swell cementitious minerals (e.g. calcite and gypsum), and the type and weight percentage of non-expansive clay minerals (e.g. kaolinite). The compositions of an expansive clayey soil, including the types and weight percentages of expansive clay minerals and non-expansive clay minerals, the types and weight percentages of non-clay, non-swell cementitious minerals (e.g. calcite and gypsum), and the weight percentage of quartz (sand) in an expansive clayey soil, can be determined by a mineralogical analysis using, for example, powder X-ray diffraction (XRD) as shown in Table 6 in the "Examples" of the present disclosure, scanning electron microscopy (SEM) with associated energy dispersive micro analysis (EDA), optical microscopy and petrographic analysis. In some embodiments, the proportion of the weight of the expansive clay minerals relative to the total weight of the expansive clayey soil $P_{ECM}$, or the weight percentage of the expansive clay minerals (e.g. smectite and illite) in the expansive clayey soil is 5-80%, 10-70%, 20-60%, or 30-50%. In some embodiments, the weight percentage of non-swell cementitious minerals in the expansive clayey soil is 1-50%, 10-40%, or 20-30%. In some embodiments, the swell potential of the expansive clayey soil is 1-40%, 5-30%, or 10-20%. In one embodiment, the expansive clayey soil is a laboratory compacted expansive clayey soil. In another embodiment, the expansive clayey soil is a natural undisturbed expansive clayey soil. When the nano-level constitutive modeling is applied to a natural undisturbed expansive clayey soil where macro features dominate in controlling the water in flow and volume change, coupling of the nano-level constitutive modeling with micro and macro level models may be preferred to correlate the amount of the swelling reduction agent incorporated into the expansive clayey soil with the resulting swell potential of the swelling reduction agent incorporated expansive clayey soil.

An expansive clayey soil comprising one or more expansive clay minerals swells or shrinks when there is a change in water content. In the disclosed method, the water content of the expansive clayey soil, if not known, may be determined according to ASTM D 2216-Standard Test Method for Laboratory Determination of Water (Moisture) Content of Soil, Rock, and Soil-Aggregate Mixtures. The water content is the ratio, expressed as a percentage, of the mass of "pore" or "free" water in a given mass of soil to the mass of the dry soil solids. The following are the procedures of an exemplary soil water content test: (1) determining and recording the mass of an empty, clean, and dry moisture can with its lid represented by $M_c$ using a balance; (2) placing the moist soil in the moisture can, securing the lid of the moisture can, and determining and recording the mass of the moisture can containing the moist soil with the lid represented by $M_{cms}$; (3) placing and leaving the moisture can containing the moist soil with the lid removed in a drying oven that is set at 100-110° C. overnight; (4) removing the moisture can from the oven, and allowing the moisture can to cool to room temperature after carefully and securely replacing the lid of the moisture can on the moisture can, preferably using gloves; and (5) determining and recording the mass of the moisture can containing the dry soil and the lid represented by $M_{cds}$ using a balance. The water content of the soil is calculated according to the following equation:

$$W = \frac{Mw}{Ms} \times 100$$

where Ms is the mass of soil solids and Ms=Mcds−Mc; and Mw is the mass of pore water and Mw=Mcms−Mcds.

The cation exchange capacity (CEC) of the expansive clayey soil is the number of exchangeable cations per dry weight that the expansive clayey soil is capable of holding, at a given pH value, and available for exchange with the soil water solution. It is expressed as milliequivalent of hydrogen per 100 g of dry soil (meq+/100 g), or the SI unit centi-mol per kg (cmol+/kg). The expansive and non-expansive clay minerals and humus in the expansive clayey soil have electrostatic surface charges that attract and hold ions. The holding capacity of a clay mineral varies with the type of the clay mineral. Humus has a CEC that is two to three times that of the best clay mineral. For many expansive clayey soils, the CEC is dependent upon the pH of the expansive clayey soil. As soil acidity increases (pH decreases), more $H^+$ ions are attached to the soil colloids, pushing the other cations from the soil colloids and into the soil water solution. Inversely, when an expansive clayey soil becomes more basic (pH increases), the available cations in the soil water solution decreases because there are fewer H ions to push cations into the soil water solution from the soil colloids (CEC increases). In the disclosed method, the CEC of the expansive clayey soil may be determined by two standardized International Soil Reference and Information Centre methods: extraction with ammonium acetate; and the silver-thiourea method (one-step centrifugal extraction). The CEC of the expansive clayey soil, if not known, may be preferably determined according to the method disclosed by Rayment and Higginson, Electrical Conductivity, In "Australian Laboratory Handbook of Soil and Water Chemical Methods," Inkata Press: Melbourne, 1992, incorporated herein by reference in its entirety. In some embodiments, the CEC of the expansive clayey soil is in the range of 30-250 meq/100 g, 40-150 meq/100 g, 60-120 meq/100 g, or 80-100 meq/100 g. In some embodiments, the water content of the expansive soil is in the range of 5-100%, 10-90%, 20-80%, 30-70%, or 40-60%.

The swelling reduction agent used by the disclosed method preferably includes, without limitation, calcite, gypsum, potassium chloride, a composition comprising exchangeable $K^+$, a composition comprising exchangeable $Ca^{2+}$, a composition comprising exchangeable $Mg^{2+}$, and a combination thereof.

Calcite is a carbonate mineral and the most stable polymorph of calcium carbonate ($CaCO_3$). All forms of calcite, such as fibrous, granular, lamellar, and/or compact calcite, and either highly pure or calcite with impurities may be used. Calcite can be either dissolved by groundwater or precipitated by groundwater, depending on several factors including the water temperature, pH, and dissolved ion concentrations. Calcite is fairly insoluble in cold water, and exhibits an unusual characteristic called retrograde solubility in which it becomes less soluble in water as the temperature increases. To increase the incorporation of calcite into the expansive clayey soil through, for example, absorption and/or adsorption, the pH of the expansive clayey soil is preferably acidic, e.g. a pH of 1-6, preferably a pH of 1-4, or preferably a pH of 2-3, and the temperature of the expansive clayey soil is preferably at a low ambient temperature of 4-30° C., preferably 10-25° C., or more preferably 15-20° C. In some embodiments, calcite is incorporated into the expansive clayey soil by mixing calcite particles with the expansive clayey soil and/or by depositing a layer of calcite particles on the surface of the expansive clayey soil to let the expansive clayey soil absorb and/or adsorb calcite from the soil water solution. In other embodiments, calcite is incorporated into the expansive clayey soil by microbiologically induced calcium carbonate precipitation, whereby photosynthetic microorganisms such as cyanobacteria and microalgae; sulfate-reducing bacteria; and some species of microorganisms involved in nitrogen cycle produce calcium carbonate through autotrophic and heterotrophic pathways and induce calcium carbonate precipitation within the soil matrix. Calcite reduces the swell potential of the expansive clayey soil probably by providing binding or cementation effects to the individual or group of the expansive clay mineral particles.

Gypsum is a soft sulfate mineral composed of calcium sulfate dihydrate, with the chemical formula $CaSO_4 \cdot 2H_2O$. Gypsum is moderately water-soluble (~2.0-2.5 g/L at 25° C.) and, in contrast to most other salts, exhibits retrograde solubility, becoming less soluble at higher temperatures. Thus, to increase the incorporation of gypsum into the expansive clayey soil through, for example, absorption and/or adsorption, the expansive clayey soil is preferably at a low ambient temperature of 4-30° C., preferably 10-25° C., or more preferably 15-20° C. to facilitate dissolution of gypsum in the soil water solution. In one embodiment, the gypsum used is pure gypsum that has a white color, i.e. white gypsum. In another embodiment, the gypsum used is gypsum with impurities that has a wide range of colors, including red gypsum. Red gypsum or secondary gypsum is typically comprised predominantly of calcium sulfate in varying states of hydration, along with oxides of iron in an amount varying from about 3-35%, and various trace elements. Red gypsum may be produced as an industrial by-product, for example, in the manufacture of titanium dioxide pigment via the well-known sulfate process, in which it is precipitated from acidic solution filtrates. Incorporation of red gypsum into the expansive clayey soil may also increase the plastic limit and reduce frost susceptibility of the expansive clayey soil. In still another embodiment, the gypsum used is a mixture of white gypsum, red gypsum, and/or one or more other types of impure gypsum. Gypsum may be incorporated into the expansive clayey soil by spraying a gypsum water solution onto the expansive clayey soil, soaking the expansive clayey soil in a gypsum water solution, injecting a gypsum water solution into the expansive clayey soil, mixing gypsum particles with the expansive clayey soil, depositing a layer of gypsum particles on the surface of the expansive clayey soil to let the expansive clayey soil absorb and/or adsorb gypsum from the soil water solution. Since gypsum has a higher solubility in water than calcite, in practice using gypsum as a swelling reduction agent advantageously results in a greater reduction in the swell potential of the expansive clayey soil than using an equivalent amount of calcite. The concentration of the gypsum water solution may be 0.5-2.5 g/L, 1-2 g/L, or 1.5 g/L. Like calcite, gypsum reduces the swell potential of the expansive clayey soil probably by providing binding or cementation effects to the individual or group of the expansive clay mineral particles.

Since potassium chloride dissolves readily in water, incorporation of potassium chloride into the expansive clayey soil can be accomplished by spraying a KCl water solution onto the expansive clayey soil, soaking the expansive clayey soil in a KCl water solution, injecting a KCl water solution into the expansive clayey soil, mixing solid KCl particles with the expansive clayey soil, depositing a layer of solid KCl particles on the surface of the expansive clayey soil to let the expansive clayey soil absorb and/or adsorb KCl from the soil water solution. The concentration of the KCl water solution may be 10-400 g/L, 50-300 g/L, or 100-200 g/L. Similar to calcite and gypsum, KCl reduces the swell potential of the expansive clayey soil probably due to a binding or cementation effect it provides to the expansive clay mineral particles.

A composition comprising exchangeable $K^+$, $C^{2+}$, and/or $Mg^{2+}$ may be an aqueous solution comprising $K^+$, $Ca^{2+}$, and/or $Mg^{2+}$, or may be a K $Ca^{2+}$, and/or $Mg^{2+}$ loaded exchange resin to replace certain cations in the expansive clayey soil, e.g. $Na^+$ and $Li^+$, with $K^+$, $Ca^{2+}$, and/or $Mg^{2+}$. Since the CEC of the expansive clayey soil is generally dependent on the pH of the expansive clayey soil, with the expansive clayey soil having a higher CEC at a more basic pH, in some embodiments, the pH of the expansive clayey soil is adjusted to 8-14, 9-13, or 10-12 by, for example, NaOH, KOH, and/or lime prior to incorporating the swelling reduction agent comprising one or more compositions comprising exchangeable $K^+$, $Ca^{2+}$, and/or $Mg^{2+}$ into the expansive clayey soil. When the composition is an aqueous solution, the exchangeable $K^+$, $Ca^{2+}$, and/or $Mg^{2+}$ may be incorporated into the expansive clayey soil by spraying the aqueous solution onto the expansive clayey soil, soaking the expansive clayey soil in the aqueous solution, and/or injecting the aqueous solution into the expansive clayey soil. When the composition is an ion exchange resin, the resin particles may be batch mixed with the expansive clayey soil. Alternatively, the resin particles may be first packed in resin bags made of, for example, a piece of porous nylon fabric and then the resin bags may be mixed with the expansive clayey soil. The resin bags may vary in size, for example, from small ones holding only a few grams of resin to others several centimeters in diameter, depending on the volume of the expansive clayey soil to be treated and the desired efficiency of the contact of the resin particles with the expansive clayey soil. Or preferably, the ion exchange resin is modified and shaped as a membrane, and sheets of the resin membranes are placed at various depths and/or on the surface of the expansive clayey soil. The chemical structures from which the membrane is made is similar to those to make ion-exchange resin particles. During manufacture, membranes may be extruded into sheets and combined with reinforcing material to provide dimensional stability and mechanical strength. Use of membranes simplifies the separation of the resin from the expansive clayey soil when the desired cation exchange process, e.g. replacing $Na^+$ adsorbed on the surface of the expansive clay minerals with $K^+$, $Ca^{2+}$, and/or $Mg^{2+}$, is complete and when such separation of the resin from the expansive clayey soil is desirable.

According to the present disclosure, cohesive energy density (CED) is an excellent indicator of the interaction of the soil structure with the water sorption and the consequent volume change. Cohesive energy density is the amount of energy needed to completely remove unit volume of molecules from their neighbors to infinite separation (an ideal gas). CED is highly sensitive to various volume change variables such as water content, density, CEC, type and percentage of exchangeable and non-exchangeable cations, and anions. Total CED of any combination of molecules is contributed from two components, i.e., electrostatic and van der Waals forces. Contribution from van der Waals forces could either be repulsion or attraction in nature, while it is always attraction in nature from electrostatic forces. A general trend is that low CEC expansive clay mineral crystallites produce lesser CED, while a higher CEC and the expansive clay mineral crystallites sorbed with other compounds show higher values of CED. Total CED has been found to be increasing with an increase in CEC, density, cementation, and bivalent cations and decreasing with water content, while van der Waals CED reduces and becomes repulsion in nature with the same variation of the above parameters. For the same CEC, lesser water content results in higher cohesive energy, but for same density/moisture, higher CEC crystallites achieve much higher cohesive energy. As cohesion in clay particles is a result of the hydrogen bonding between their surfaces and the water, more number of charge deficiency centers in higher CEC clay result in more number of hydrogen bonds and consequently raising the electrostatic attraction CED. However, at the same time, van der Waals repulsions increase due to the high vicinity of the crystallites. Therefore, higher total cohesive energy mixes have corresponding higher repulsion van der Waals. These additional repulsion forces play an important role in the expansion/swell behavior of the clay particles in addition to the hydration by water molecules. Similarly, interaction with gypsum and calcite also causes an increase in cohesive energy density due to the extra bonding created by the cations and anions. Although there is an increase in repulsion due to van der Waals forces, increase in attraction forces due to electrostatic component has much higher value and far outweighs the repulsion forces in these cases.

The swell potential of the expansive clayey soil $S_{soil}$ can be calculated based on the proportion of the weight of the expansive clay mineral(s) relative to the total weight of the expansive clayey soil ($P_{ECM}$) and the swell potential of the expansive clay mineral(s) ($S_{ECM}$) calculated according to the nano-level constitutive modeling for water-induced swelling of the expansive clay mineral(s). The modeling can be expressed by the following equations:

$$TCED = 0.0625(IWC)^3 - 3.575(IWC)^2 + 10.5(IWC) + 2830 \quad (1)$$

where TCED is total cohesive energy density in J/cm³ of the expansive clay mineral(s) and IWC is the initial water content of the expansive clayey soil (and the expansive clay mineral(s) the expansive clayey soil comprises).

When the expansive clayey soil further comprises and/or is incorporated with the swelling reduction agent, such as calcite, gypsum, potassium chloride, a composition comprising exchangeable $K^-$, a composition comprising exchangeable $Ca^{2+}$, a composition comprising exchangeable $Mg^{2+}$, and a combination thereof, a modified TCED (TCEDm) of the expansive clayey mineral(s) in the expansive clayey soil can be calculated according to Equation (6):

$$TCEDm = 0.0625(IWC)^3 - 3.575(IWC)^2 + 10.5(IWC) + 2830 + 7100(C/0.1) + 5050(G/0.2) + 3010(KCl/0.1) + Ca(500) + Mg(300) + K(100) \quad (6)$$

where TCEDm=modified TCED, C=Proportion of calcite weight relative to the total weight of the (swelling reduction agent incorporated) expansive clayey soil×$P_{ECM}$, G=Proportion of gypsum weight relative to the total weight of the (swelling reduction agent incorporated) expansive clayey soil×$P_{ECM}$, KCl=Proportion of potassium chloride weight relative to the total weight of the (swelling reduction agent incorporated) expansive clayey soil×$P_{ECM}$, Ca=Proportion of the number of calcium exchangeable cation relative to the total number of exchangeable cations in the (swelling reduction agent incorporated) expansive clayey soil, Mg=Proportion of the number of magnesium exchangeable cation relative to the total number of exchangeable cations in the (swelling reduction agent incorporated) expansive clayey soil, K=Proportion of the number of potassium exchangeable cation relative to the total number of exchangeable cations in the (swelling reduction agent incorporated) expansive clayey soil, IWC=initial water content. For example, if calcite is present in an expansive clayey soil at 30% of the total weight of the expansive clayey soil, and the proportion $P_{ECM}$ or weight percent of the expansive clay minerals is 20% of the total weight of the expansive clayey soil, then C in Equation (6) will be 0.3×0.2=0.06. As another example, if calcium exchangeable cation constitutes 50% of the total number of exchangeable cations and potassium exchangeable cation constitutes 30% of the total number of exchangeable cations in addition to $Na^+$ exchangeable cation, then Ca and K in Equation (6) will be 0.5 and 0.3, respectively. Since Equation (6) incorporates Equation (1) entirely, i.e. Equation (6) is the same as Equation (1) when the expansive clayey soil or the expansive clay mineral(s) do not comprise any of the swelling reduction agents listed above, Equation (6) and the corresponding TCEDm supersede Equation (1) and TCED, respectively, hereafter in the "Detailed Description of the Embodiments" when calculations of total cohesive energy density of expansive clay mineral(s) are described and discussed.

The corresponding relationships for Initial Dry Density (IDD) in g/cm³ of the expansive clay minerals, Final Dry Density (FDD) in g/cm³ of the expansive clay minerals when the expansive clay minerals reach the swell potential $S_{ECM}$, Final Water Content (FWC) of the expansive clay minerals when the expansive clay minerals reach the swell potential $S_{ECM}$, and swell potential of the expansive clay minerals $S_{ECM}$ are provided by the following equations:

$$IDD = \{-2E\text{-}15(TCEDm)^4 + 5E\text{-}11(TCEDm)^3 - 5E\text{-}07(TCEDm)^2 + 0.0023(TCEDm) - 1.5378\} \ast 1.85 \ast (ABS(CEC-90)/90) \quad (2)$$

$$FDD = -2E\text{-}22(TCEDm)^6 + 5E\text{-}18(TCEDm)^5 - 6E\text{-}14(TCEDm)^4 + 3E\text{-}10(TCEDm)^3 - 7E\text{-}07(TCEDm)^2 + 0.0005(TCEDm) + 0.3747 \quad (3)$$

$$FWC = \{1E\text{-}13(TCEDm)^4 - 4E\text{-}09(TCEDm)^3 + 4E\text{-}05(TCEDm)^2 - 0.2037TCEDm + 369.54\} \ast ABS(CEC^2 - 90)/CEC^2 \ast 0.82 \quad (4)$$

$$S_{(ECM)}(\%) = (FDD - IDD)/FDD \ast 100 \quad (5);$$

In the above Equations (2) and (4), CEC is the cation exchange capacity of the expansive clayey soil expressed in meq/100 g dry expansive clayey soil. Thus, the swell potential of the expansive clay mineral(s) can be calculated according to Equation (5), following the calculation of TCEDm according to Equation (6) based on the initial water content (IWC) of the expansive clayey soil, the calculation of IDD according to Equation (2) based on the CEC of the expansive clayey soil and TCEDm obtained from Equation (6), and the calculation of FDD according to Equation (3) based on the TCEDm obtained from Equation (6). Additionally, the final water content (FWC) of the expansive clay mineral(s) when $S_{ECM}$ is reached can be calculated according to Equation (4) based on the CEC of the expansive clayey soil and the TCEDm obtained from Equation (6).

Assuming that the components of the expansive clayey soil other than the expansive clay mineral(s) and the swelling reduction agent(s) listed above, such as non-expansive clay minerals and other non-clay minerals do not contribute to or affect the swelling process but produce a dilution effect proportional to their weight percentages, the swell potential of the expansive clayey soil $S_{soil}$ equals $S_{ECM} \times P_{ECM}$. For example, if the expansive clay mineral content of the expansive clayey soil, or $P_{ECM}$ is 30%, then $S_{soil}$ equals $S_{ECM} \times 0.3$.

The swell potential of the swelling reduction agent-incorporated expansive clayey soil can be likewise calculated according to Equations (6), (2), (3), and (5) if the type(s) and the amount(s) of the swelling reduction agent(s) and $P_{ECM}$ are known. Conversely, if a target swell potential of the swelling reduction agent-incorporated expansive clayey soil is set based on the pre-set level T, the type(s) and the amount(s) of the swelling reduction agent(s) that need to be incorporated into the expansive clayey soil to obtain the target swell potential can be solved using the same set of equations based on the water content (as the initial water content, IWC) and the CEC of the expansive clayey soil and $P_{ECM}$.

In some embodiments, there may be various potential ways of using either a single swelling reduction agent or combinations of the swelling reduction agents to obtain a swell potential of the first swelling reduction agent incorporated expansive clayey soil ($S_{1i(soil)}$) that is no greater than the pre-set level T according to the nano-level constitutive modeling, specifically according to Equations (6), (2), (3), and (5). In those cases, the preferred choices for the single swelling reduction agent or the combinations of the swelling reduction agents to be incorporated into the expansive clayey soil are those where the first amount of calcite needed as calculated according to the nano-level constitutive modeling is in the range of 10-70%, 20-60%, or 30-50% of the total weight of the first swelling reduction agent incorporated expansive clayey soil, the first amount of gypsum needed as calculated according to the nano-level constitutive modeling is in the range of 5-75%, 10-60%, 15-50%, or 20-40% of the total weight of the first swelling reduction agent incorporated expansive clayey soil, the first amount of KCl needed as calculated according to the nano-level constitutive modeling is in the range of 2-30%, 5-25%, or 10-20% of the total weight of the first swelling reduction agent incorporated expansive clayey soil, and/or the first amount of the composition comprising exchangeable $K^-$, $Ca^{2+}$, and/or $Mg^{2+}$ needed as calculated according to the nano-level constitutive modeling replaces 5-100%, 10-90%, 20-80%, 30-70%, or 40-60% of the non-$K^-$, $Ca^{2+}$, or $Mg^{2+}$ exchangeable cation(s), such as $Na^+$ and $Li^+$, previously adsorbed on the surface of the expansive clay minerals in the expansive clayey soil.

The pre-set level T, in one embodiment, may be set based on an acceptable level of swell potential of the expansive clayey soil, for example, a level at which the expansive clayey soil may not exert enough force on a building or other structure built on or within the expansive clayey soil to cause damage, such as 5-10%, 6-9%, or 7-8%.

To confirm that the swelling reduction agent needs to be incorporated into the expansive clayey soil to reduce the swell potential of the expansive clayey soil, in one embodiment, the method may further comprise measuring the actual swell potential of the expansive clayey soil represented by $S^*_{soil}$. In another embodiment, the method may further comprise calculating the swell potential of the expansive clayey soil represented by $S_{soil}$ with the nano-level constitutive modeling based on the water content as an initial water content (IWC) and the cation exchange capacity (CEC) of the expansive clayey soil expressed in meq/100 g dry expansive clayey soil, wherein the at least one expansive clay mineral has a swell potential represented by $S_{ECM}$, wherein the water content of the expansive clayey soil as the initial water content (IWC) produces a modified total cohesive energy density (TCEDm) of the at least one expansive clay mineral calculated according to Equation (6) whether or not the expansive clayey soil further comprises at least one selected from the group consisting of calcite, gypsum, potassium chloride, calcium exchangeable cation, magnesium exchangeable cation, and potassium exchangeable cation before the incorporating the first amount of the swelling reduction agent:

$$TCEDm = 0.0625(IWC)^3 - 3.575(IWC)^2 + 10.5(IWC) + 2830 + 7100(C/0.1) + 5050(G/0.2) + 3010(KCl/0.1) + Ca(500) + Mg(300) + K(100) \quad (6)$$

where TCEDm=modified TOED, C=Proportion of calcite weight relative to the total weight of the expansive clayey soil$\times P_{ECM}$, G=Proportion of gypsum weight relative to the total weight of the expansive clayey soil$\times P_{ECM}$, KCl=Proportion of potassium chloride weight relative to the total weight of the expansive clayey soil$\times P_{ECM}$, Ca=Proportion of the number of calcium exchangeable cation relative to the total number of exchangeable cations in the expansive clayey soil, Mg=Proportion of the number of magnesium exchangeable cation relative to the total number of exchangeable cations in the expansive clayey soil, K=Proportion of the number of potassium exchangeable cation relative to the total number of exchangeable cations in the expansive clayey soil, IWC=initial water content, wherein the TCEDm of the at least one expansive clay mineral results in $S_{ECM}$ calculated according to Equations (2), (3), and (5):

$$IDD = \{-2E-15(TCEDm)^4 + 5E-11(TCEDm)^3 - 5E-07(TCEDm)^2 + 0.0023(TCEDm) - 1.5378\} * 1.85 * (ABS(CEC-90)/90) \quad (2)$$

where IDD is initial dry density of the at least one expansive clay mineral, $$FDD = -2E-22(TCEDm)^6 + 5E-18(TCEDm)^5 - 6E-14(TCEDm)^4 + 3E-10(TCEDm)^3 - 7E-07(TCEDm)^2 + 0.0005(TCEDm) + 0.3747 \quad (3)$$

where FDD is final dry density of the at least one expansive clay mineral when the at least one expansive clay mineral reaches the swell potential $S_{ECM}$, $$S_{(ECM)}(\%) = (FDD - IDD)/FDD * 100 \quad (5);$$

and wherein the swell potential of the expansive clayey soil $S_{soil}$ equals $S_{ECM} \times P_{ECM}$.

When an expansive clayey soil also comprises sand, particularly a large percentage of sand (e.g. at least 50 wt %, at least 60 wt %, or at least 70 wt % of the total weight of the expansive clayey soil), the expansive clayey soil may have a relatively open fabric containing relatively large sized pores as compared to an expansive clayey soil containing, for example, 100 wt % of expansive clay minerals, indicating a better water permeability favoring a complete swelling of all the expansive clay minerals present in the soil fabric. Thus, when the expansive clayey soil also comprises sand, all or a portion of the sand is preferably removed from the expansive clayey soil prior to incorporating the swelling reduction agent, particularly calcite, gypsum, and/or KCl that provide binding or cementation effects to the individual or group of the expansive clay mineral particles, into the expansive clayey soil to reduce the swell potential of the expansive clayey soil. This is especially advantageous when the volume and/or weight percentage of the sand in the expansive clayey soil is big. Removing all or a portion of the sand facilitates the contact of the swelling reduction agent with the expansive clay minerals and may require a smaller amount of the swelling reduction agent to make the swell potential of the swelling reduction agent incorporated expansive clayey soil no greater than the pre-set level T. In one embodiment, the sand may be separated and removed from the expansive clayey soil with one or more soil screen sieves. For example, the expansive clayey soil that preferably has been dried and broken up into loose particles may be passed through a soil screen sieve, or more preferably a set of soil screen sieves with the mesh sizes of, for example, #5, #10, #60, and #230 (mesh size is an indication of number of openings per linear inch) and arranged with the soil screen sieve of the largest screen size (e.g. the #5 mesh size screen) on top followed by the soil screen sieves of proportionately decreasing screen sizes to a closed bottom container, preferably with shaking. As a result, the expansive clayey soil particles that remain on the first sieve of the #5 mesh size are gravels. The expansive clayey soil particles that remain on the second sieve of the #10 mesh size are fine gravels. The expansive clayey soil particles that remain on the third sieve of the #60 mesh size are coarse sand. The expansive clayey soil particles that remain on the fourth sieve of the #230 mesh size are fine sand. The expansive clayey soil particles that are collected in the closed bottom container are silt and clay. The total mass of the expansive clayey soil processed by the soil screen sieves and the mass of the sand particles are preferably measured by a scale or a balance so that the weight percent of the sand present in or removed from the expansive clayey soil can be determined. In some embodiments, replacing the sand at an amount of 10-50 wt % of the total weight of the expansive clayey soil with the same mass of gypsum may reduce the swell potential of the expansive clayey soil 60-95%, or 70-90%, or 80% based on the actual swell potential tests performed in the present disclosure and shown in the Examples. In other embodiments, replacing the sand at an amount of 30-50% of the total weight of the expansive clayey soil with the same mass of calcite may reduce the swell potential of the expansive clayey soil 20-60%, 30-50%, or 40% based on the actual swell potential tests performed in the present disclosure and shown in the Examples.

In another preferred embodiment, all or a portion of the sand removed from the expansive clayey soil may be replaced by at least one non-expansive clay mineral, such as kaolinite, mica, hydroxy interlayered vermiculite (HIV), and hydroxy interlayered smectite (HIS), prior to incorporating the swelling reduction agent into the expansive clayey soil, probably because a non-expansive clay mineral like kaolinite has a fine grained texture with a low water permeability as compared to sand. In some embodiments, replacing the sand at an amount of 20-40%, 25-35%, or 30% of the total weight of the expansive clayey soil with the same mass of kaolinite may reduce the swell potential of the expansive clayey soil 10-30%, 15-25%, or 20% based on the actual swell potential tests performed in the present disclosure and shown in the Examples.

To confirm that the swell potential of the first swelling reduction agent-incorporated expansive clayey soil is indeed no greater than the pre-set level T, in a preferred embodiment, the method further comprises measuring the actual swell potential of the first swelling reduction agent incorporated expansive clayey soil represented by $S_{1i}^*{}_{(soil)}$, and comparing $S_{1i}^*{}_{(soil)}$ with the pre-set level T. In some embodiments, the difference between the actual swell potential of the first swelling reduction agent-incorporated expansive clayey soil $S_{1i}^*{}_{(soil)}$ and the calculated swell potential of the first swelling reduction agent-incorporated expansive clayey soil $S_{1i(soil)}$ with the nano-level constitutive modeling, particularly when gypsum is used as the swelling reduction agent, is less than 10%, less than 5%, less than 3%, or less than 1% of $S_{1i}^*{}_{(soil)}$.

Occasionally, $S_{1i}^*{}_{(soil)}$ may significantly deviate from $S_{1i(soil)}$ and/or may be larger than the pre-set level T, particularly when calcite is used as the swelling reduction agent. Calcite has a lower solubility in water compared to gypsum, resulting in a low percentage of the total input calcite actually interacting with the expansive clay mineral particles and an overestimation of the swelling reduction effect of calcite by the nano-level constitutive modeling. In this case, the disclosed method may be performed a second time, i.e. the method may further comprise (a) determining a water content and a cation exchange capacity (CEC) of the first swelling reduction agent incorporated expansive clayey soil, the CEC expressed in meq/100 g dry first swelling reduction agent incorporated expansive clayey soil, (b) calculating a second amount of a swelling reduction agent to be incorporated into the first swelling reduction agent incorporated expansive clayey soil to form a second swelling reduction agent incorporated expansive clayey soil with a further reduced swell potential $S_{2i(soil)}$ that is no greater than the pre-set level T with the nano-level constitutive modeling based on the water content as an initial water content (IWC) and the cation exchange capacity (CEC) of the first swelling reduction agent incorporated expansive clayey soil, wherein the second swelling reduction agent incorporated expansive clayey soil comprises a second swelling reduction agent incorporated at least one expansive clay mineral having a swell potential represented by $S_{2i(ECM)}$, wherein the swelling reduction agent is at least one selected from the group consisting of calcite, gypsum, potassium chloride, a composition comprising exchangeable $K^+$, a composition comprising exchangeable $Ca^{2+}$, and a composition comprising exchangeable $Mg^{2+}$, wherein the incorporation of the second amount of the swelling reduction agent produces a modified total cohesive energy density (TCEDm) of the second swelling reduction agent incorporated at least one expansive clay mineral calculated according to Equation (6):

$$TCEDm = 0.0625(IWC)^3 - 3.575(IWC)^2 + 10.5(IWC) + 2830 + 7100(C/0.1) + 5050(G/0.2) + 3010(KCl/0.1) + Ca(500) + Mg(300) + K(100) \quad (6)$$

where TCEDm=modified TCED, C=Proportion of calcite weight relative to the total weight of the second swelling reduction agent incorporated expansive clayey soil× G=Proportion of gypsum weight relative to the total weight of the second swelling reduction agent incorporated expansive clayey soil×$P_{ECM}$, KCl=Proportion of potassium chloride weight relative to the total weight of the second swelling reduction agent incorporated expansive clayey soil×$P_{ECM}$, Ca=Proportion of the number of calcium exchangeable cation relative to the total number of exchangeable cations in the second swelling reduction agent incorporated expansive clayey soil, Mg=Proportion of the number of magnesium exchangeable cation relative to the total number of exchangeable cations in the second swelling reduction agent incorporated expansive clayey soil, K=Proportion of the number of potassium exchangeable cation relative to the total number of exchangeable cations in the second swelling reduction agent incorporated expansive clayey soil, IWC=initial water content, wherein the TCEDm of the second swelling reduction agent incorporated at least one expansive clay mineral results in $S_{2i(ECM)}$ calculated according to Equations (2), (3), and (5):

$$IDD = \{-2E\text{-}15(TCEDm)^4 + 5E\text{-}11(TCEDm)^3 - 5E\text{-}07(TCEDm)^2 + 0.0023(TCEDm) - 1.5378\} * 1.85 * (ABS(CEC-90)/90) \quad (2)$$

where IDD is initial dry density of the second swelling reduction agent incorporated at least one expansive clay mineral, $$FDD=-2E-22(TCEDm)^6+5E-18(TCEDm)^5-6E-14(TCEDm)^4+3E-10(TCEDm)^3-7E-07(TCEDm)^2+0.0005(TCEDm)+0.3747 \quad (3)$$

where FDD is final dry density of the second swelling reduction agent incorporated at least one expansive clay mineral when the second swelling reduction agent incorporated at least one expansive clay mineral reaches the swell potential $S_{2i(ECM)}$, $$S_{2i(ECM)}(\%)=(FDD-IDD)/FDD*100 \quad (5);$$

and wherein the further reduced swell potential of the second swelling reduction agent incorporated expansive clayey soil $S_{2i(soil)}$ equals $S_{2i(ECM)} \times P_{ECM}$, and (c) incorporating the second amount of the swelling reduction agent into the first swelling reduction agent incorporated expansive clayey soil to form the second swelling reduction agent incorporated expansive clayey soil.

In some embodiments, the method may further comprise measuring the actual swell potential of the second swelling reduction agent incorporated expansive clayey soil and comparing it with the pre-set level T. In other embodiments, an additional one or more rounds of incorporation of the swelling reduction agent(s) into the previously swelling reduction agent incorporated expansive clayey soil with the aid of the nano-level constitutive modeling may be performed based on the result from the comparing.

According to a second aspect, the present disclosure relates to another method of reducing the swell potential of an expansive clayey soil comprising at least one expansive clay mineral. The proportion of the weight of the at least one expansive clay mineral relative to the total weight of the expansive clayey soil is $P_{ECM}$. The expansive clayey soil has a first water content and a cation exchange capacity (CEC) expressed in meq/100 g dry expansive clayey soil. The method includes (a) determining a second water content of a wetted expansive clayey soil to be formed by wetting the expansive clayey soil with water, the wetted expansive clayey soil having a reduced swell potential $S_{w(soil)}$ that is no greater than a pre-set level T in accordance with a nano-level constitutive modeling based on the cation exchange capacity (CEC) of the expansive clayey soil and the second water content of the wetted expansive clayey soil as an initial water content (IWC), wherein the wetted expansive clayey soil comprises wetted at least one expansive clay mineral having the second water content and a swell potential $S_{w(ECM)}$, wherein the second water content as the initial water content (IWC) is greater than the first water content but no greater than a final water content (FWC) of the at least one expansive clay mineral when the at least one expansive clay mineral reaches the swell potential, and produces a modified total cohesive energy density (TCEDm) of the wetted at least one expansive clay mineral calculated according to Equation (6) whether or not the expansive clayey soil further comprises at least one selected from the group consisting of calcite, gypsum, potassium chloride, calcium exchangeable cation, magnesium exchangeable cation, and potassium exchangeable cation:

$$TCEDm=0.0625(IWC)^3-3.575(IWC)^2+10.5(IWC)+2830+7100(C/0.1)+5050(G/0.2)+3010(KCl/0.1)+Ca(500)+Mg(300)+K(100) \quad (6)$$

where TCEDm=modified ICED, C=Proportion of calcite weight relative to the total weight of the expansive clayey soil×$P_{ECM}$, G=Proportion of gypsum weight relative to the total weight of the expansive clayey soil×$P_{ECM}$, KCl=Proportion of potassium chloride weight relative to the total weight of the expansive clayey soil×$P_{ECM}$, Ca=Proportion of the number of calcium exchangeable cation relative to the total number of exchangeable cations in the expansive clayey soil, Mg=Proportion of the number of magnesium exchangeable cation relative to the total number of exchangeable cations in the expansive clayey soil, K=Proportion of the number of potassium exchangeable cation relative to the total number of exchangeable cations in the expansive clayey soil, IWC=initial water content, wherein the TCEDm of the wetted at least one expansive clay mineral results in $S_{w(ECM)}$ calculated according to Equations (2), (3), and (5):

$$IDD=\{-2E-15(TCEDm)^4+5E-11(TCEDm)^3-5E-07(TCEDm)^2+0.0023(TCEDm)-1.5378\}*1.85*(ABS(CEC-90)/90) \quad (2)$$

where IDD is initial dry density of the wetted at least one expansive clay mineral, $$FDD=-2E-22(TCEDm)^6+5E-18(TCEDm)^5-6E-14(TCEDm)^4+3E-10(TCEDm)^3-7E-07(TCEDm)^2+0.0005(TCEDm)+0.3747 \quad (3)$$

where FDD is final dry density of the wetted at least one expansive clay mineral when the wetted at least one expansive clay mineral reaches the swell potential $S_{w(ECM)}$, $$S_{w(ECM)}(\%)=(FDD-IDD)/FDD*100 \quad (5);$$

and wherein the reduced swell potential of the wetted expansive clayey soil $S_{w(soil)}$ equals $S_{w(ECM)} \times P_{ECM}$, and (b) wetting the expansive clayey soil with water to form the wetted expansive clayey soil having the second water content.

In one embodiment, the method further comprises determining the final water content (FWC) of the expansive clayey soil (and also the expansive clay mineral(s) the expansive clayey soil comprises) when the expansive clayey soil reaches the swell potential experimentally, for example, following a swell potential test. In another embodiment, the method further comprises calculating the final water content (FWC) of the at least one expansive clay mineral when the at least one expansive clay mineral reaches the swell potential with the nano-level constitutive modeling based on the first water content as an initial water content (IWC) and the cation exchange capacity (CEC) of the expansive clayey soil, wherein the at least one expansive clay mineral has a modified total cohesive energy density (TCEDm) calculated according Equation (6) whether or not the expansive clayey soil further comprises at least one selected from the group consisting of calcite, gypsum, potassium chloride, calcium exchangeable cation, magnesium exchangeable cation, and potassium exchangeable cation:

$$TCEDm=0.0625(IWC)^3-3.575(IWC)^2+10.5(IWC)+2830+7100(C/0.1)+5050(G/0.2)+3010(KCl/0.1)+Ca(500)+Mg(300)+K(100) \quad (6)$$

where TCEDm=modified TCED, C=Proportion of calcite weight relative to the total weight of the expansive clayey soil×$P_{ECM}$, G=Proportion of gypsum weight relative to the total weight of the expansive clayey soil×$P_{ECM}$, KCl=Proportion of potassium chloride weight relative to the total weight of the expansive clayey soil×$P_{ECM}$, Ca=Proportion of the number of calcium exchangeable cation relative to the total number of exchangeable cations in the expansive clayey soil, Mg=Proportion of the number of magnesium exchangeable cation relative to the total number of exchangeable cations in the expansive clayey soil, K=Proportion of the number of potassium exchangeable cation relative to the total number of exchangeable cations in the expansive clayey soil, IWC=initial water content, and wherein the TCEDm of the at least one expansive clay mineral results in the final water content (FWC) of the at least one expansive clay mineral when the at least one expansive clay mineral reaches the swell potential according to Equation (4):

FWC={1E-13(TCEDm)$^4$−4E-09(TCEDm)$^3$+4E-05(TCEDm)$^2$−0.2037TCEDm+369.54}*ABS(CEC$^2$−90)/CEC$^2$*0.82     (4)

In a preferred embodiment, the wetting of the expansive clayey soil is performed in a controlled manner, for example, by pre-estimating the amount of water needed and/or by applying (e.g. spraying or injecting) the water to the expansive clayey soil while monitoring the water content of the wetted expansive clayey soil, so that the wetted expansive clayey soil reaches the second water content that is higher than the first water content.

In some embodiments, an increase of 2-30 percentage points, 4-25 percentage points, 6-20 percentage points, 8-15 percentage points, or 10-12 percentage points in the water content of the expansive clayey soil may result in a 5-95%, 10-90%, 15-85%, 20-80%, 30-70%, 40-60%, or 50% reduction in the swell potential of the expansive clayey soil, depending on the initial water content of the expansive clayey soil, the weight percent of the expansive clay minerals in the expansive clayey soil or $P_{ECM}$, and the weight percent of sand in the expansive clayey soil.

To confirm that the swell potential of the expansive clayey soil prior to the wetting is greater than the pre-set level T and that a reduction in the swell potential by wetting is necessary, in one embodiment, the method may further comprise calculating the swell potential of the (unwetted) expansive clayey soil according to the nano-level constitutive modeling, based on the first water content (as the initial water content, IWC) and the CEC of the expansive clayey soil and $P_{ECM}$. Specifically, the first water content of the expansive clayey soil is used as the initial water content (IWC) to calculate the modified total cohesive energy density (TCEDm) of the expansive clay mineral(s) in the expansive clayey soil according to Equation (6) whether or not the expansive clayey soil further comprises at least one selected from the group consisting of calcite, gypsum, potassium chloride, calcium exchangeable cation, magnesium exchangeable cation, and potassium exchangeable cation. Based on the calculated TCEDm of the expansive clay mineral(s) in the expansive clayey soil and the CEC of the expansive clayey soil, the swell potential of the (unwetted) expansive clay mineral(s) in expansive clayey soil ($S_{(unwetted)ECM}$) can be calculated according to Equations (2), (3), and (5) and the swell potential of the (unwetted) expansive clayey soil equals $S_{(unwetted)ECM} \times P_{ECM}$. In another embodiment, the method may further comprise measuring the actual swell potential of the (unwetted) expansive clayey soil by performing a swell potential test.

After the expansive clayey soil is wetted to reach the higher second water content and have the reduced swell potential $S_{w(soil)}$ no greater than the pre-set level T, in a preferred embodiment, the method further comprises maintaining or controlling the water content of the wetted expansive clayey soil, to keep the wetted expansive clayey soil at a relatively constant level of water content. One way to keep the wetted expansive clayey soil at a relatively constant level of water content may be by injecting water into the wetted expansive clayey soil at a plurality of injection points, with the amount of water determined based on the season and humidity. Preferably, periodic measurement of the water content of the wetted expansive clayey soil is performed so that the amount of water injected can be adjusted accordingly.

In case wetting the expansive clayey soil alone to reduce its swell potential to a level no greater than the pre-set level T is not feasible, e.g. the second water content needed to reduce the swell potential of the expansive clayey soil to no greater than the pre-set level T based on the calculation with the nano-level constitutive modeling is greater than the final water content, or the second water content is considered too high to be maintained practically, incorporating the swelling reduction agent(s) into the expansive clayey soil described in the first aspect of the present disclosure may be combined with the wetting. In one embodiment, the expansive clayey soil may be pre-wetted to reach a second water content that is higher than the first water content and is considered reasonable or practical prior to incorporating the swelling reduction agent(s) into the wetted expansive clayey soil, with the amount(s) of the swelling reduction agent(s) incorporated into the wetted expansive clayey soil calculated to result in a swell potential of the wetted swelling reduction agent incorporated expansive clayey soil that is no greater than the pre-set level T according to the nano-level constitutive modeling, specifically according to equations (6), (2), (3) and (5) based on the second water content (as the initial water content, IWC) of the wetted expansive clayey soil, the CEC of the expansive clayey soil, and $P_{ECM}$. In another embodiment, the swelling reduction agent(s) may be incorporated into the expansive clayey soil to form a swelling reduction agent incorporated expansive clayey soil with a first water content, and then the swelling reduction agent incorporated expansive clayey soil may be wetted to reach a second water content that is higher than the first water content, is no greater than a final water content of the swelling reduction agent incorporated expansive clay mineral(s) when the swelling reduction agent incorporated expansive clay mineral(s) reach the swell potential, and is considered reasonable or practical. The amount of the swelling reduction agent(s) incorporated into the expansive clayey soil is calculated to result in a swell potential of the swelling reduction agent incorporated wetted expansive clayey soil that is no greater than the pre-set level T according to the nano-level constitutive modeling, specifically according to equations (6), (2), (3) and (5) based on the second water content (as the initial water content, IWC) of the swelling reduction agent incorporated wetted expansive clayey soil, the CEC of the expansive clayey soil, and $P_{ECM}$. The final water content of the swelling reduction agent incorporated expansive clay mineral(s) when the swelling reduction agent incorporated expansive clay mineral(s) reach the swell potential may be obtained experimentally, for example, following a swell potential test with the swelling reduction agent incorporated expansive clayey soil, or calculated according to the nano-level constitutive modeling, specifically according to equations (6) and (4) based on the first water content of the swelling reduction agent incorporated expansive clayey soil as the initial water content (IWC) and the CEC of the expansive clayey soil.

According to a third aspect, the present disclosure relates to a method of preparing a site having an expansive clayey soil having a swell potential $S_{soil}$ between T2 and T1, where T2<T1, under a two-limit criteria or at or above a pre-set limit T* under a single limit criteria, a first water content, and a cation exchange capacity (CEC) expressed in meq/100 g dry expansive clayey soil, and comprising at least one expansive clay mineral to build a structure. The proportion of the weight of the at least one expansive clay mineral relative to the total weight of the expansive clayey soil is $P_{ECM}$. The method includes (a) calculating a first amount of a swelling reduction agent to be incorporated into the expansive clayey soil to form a first swelling reduction agent incorporated expansive clayey soil with a reduced swell potential $S_{1i(soil)}$ that is no greater than T2 or the pre-set limit T* with a nano-level constitutive modeling based on the first water content as an initial water content (IWC) and the cation exchange capacity (CEC) of the expansive clayey soil, wherein the first swelling reduction agent incorporated expansive clayey soil comprises a first swelling reduction agent incorporated at least one expansive clay mineral having a swell potential represented by $S_{1i(ECM)}$, wherein the swelling reduction agent is at least one selected from the group consisting of calcite, gypsum, potassium chloride, a composition comprising exchangeable $K^+$, a composition comprising exchangeable $Ca^{2+}$, and a composition comprising exchangeable $Mg^{2+}$, wherein the incorporation of the first amount of the swelling reduction agent produces a modified total cohesive energy density (TCEDm) of the first swelling reduction agent incorporated at least one expansive clay mineral calculated according to Equation (6):

$$TCEDm=0.0625(IWC)^3-3.575(IWC)^2+10.5(IWC)+ 2830+7100(C/0.1)+5050(G/0.2)+3010(KCl/0.1)+ Ca(500)+Mg(300)+K(100) \quad (6)$$

where TCEDm=modified ICED, C=Proportion of calcite weight relative to the total weight of the first swelling reduction agent incorporated expansive clayey soil×$P_{ECM}$, G=Proportion of gypsum weight relative to the total weight of the first swelling reduction agent incorporated expansive clayey soil×$P_{ECM}$, KCl=Proportion of potassium chloride weight relative to the total weight of the first swelling reduction agent incorporated expansive clayey soil×$P_{ECM}$, Ca=Proportion of the number of calcium exchangeable cation relative to the total number of exchangeable cations in the first swelling reduction agent incorporated expansive clayey soil, Mg=Proportion of the number of magnesium exchangeable cation relative to the total number of exchangeable cations in the first swelling reduction agent incorporated expansive clayey soil, K=Proportion of the number of potassium exchangeable cation relative to the total number of exchangeable cations in the first swelling reduction agent incorporated expansive clayey soil, IWC=initial water content, wherein the TCEDm of the first swelling reduction agent incorporated at least one expansive clay mineral results in $S_{1i(ECM)}$ calculated according to Equations (2), (3), and (5)

$$IDD=\{-2E-15(TCEDm)^4+5E-11(TCEDm)^3-5E-07 (TCEDm)^2+0.0023(TCEDm)-1.5378\}*1.85* (ABS(CEC-90)/90) \quad (2)$$

where IDD is initial dry density of the first swelling reduction agent incorporated at least one expansive clay mineral, $$FDD=-2E-22(TCEDm)^6+5E-18(TCEDm)^5-6E-14 (TCEDm)^4+3E-10(TCEDm)^3-7E-07(TCEDm)^2+ 0.0005(TCEDm)+0.3747 \quad (3)$$

where FDD is final dry density of the first swelling reduction agent incorporated at least one expansive clay mineral when the first swelling reduction agent incorporated at least one expansive clay mineral reaches the swell potential $S_{1i(ECM)}$, $$S_{1i(ECM)}(\%)=(FDD-IDD)/FDD*100 \quad (5);$$

and wherein the reduced swell potential of the first swelling reduction agent incorporated expansive clayey soil $S_{1i(soil)}$ equals $S_{1i(soil)} \times P_{ECM}$, and (b) incorporating the first amount of the swelling reduction agent into the expansive clayey soil at the site to form the first swelling reduction agent incorporated expansive clayey soil.

When a structure is planned to be built on or within an expansive clayey soil comprising at least one expansive clay mineral, especially in a region where there are fluctuations in the amount of moisture contained in the expansive clayey soil, the swell potential of the expansive clayey soil needs to be evaluated and be reduced if necessary, since the expansive clayey soil will exert pressure on the structure, such as the vertical face of a foundation, basement or retaining wall, resulting in lateral movement. Additionally, the expansive clayey soil that has expanded or swelled due to a high ground moisture experiences a loss of soil strength or "capacity" and the resulting instability can result in various forms of problems and/or failures of the structures built on or within the expansive clayey soil.

In some embodiments, the determination of the (first) water content and cation exchange capacity of the expansive clayey soil, the determination of $P_{ECM}$, the incorporation of the swelling reduction agent(s) into the expansive clayey soil, and the types, characteristics, and preferred amount ranges of the swelling reduction agents of the method of this aspect are the same as those of the method of the first aspect of the disclosure.

In one embodiment, the method may further comprise determining the swell potential $S_{soil}$ of the expansive clayey soil (if not known). In one embodiment, the swell potential $S_{soil}$ of the expansive clayey soil is a calculated swell potential of the expansive clayey soil with the nano-level constitutive modeling based on $P_{ECM}$ and the first water content and the cation exchange capacity of the expansive clayey soil, specifically based on $P_{ECM}$ and the swell potential of the expansive clay mineral(s) $S_{ECM}$ calculated according to Equations (6) (whether or not the expansive clayey soil further comprises at least one selected from the group consisting of calcite, gypsum, potassium chloride, calcium exchangeable cation, magnesium exchangeable cation, and potassium exchangeable cation before the incorporating the first amount of the swelling reduction agent), (2), (3), and (5) using the first water content (as the initial water content, IWC) and the CEC of the expansive clayey soil, with $S_{soil}$ equaling $S_{ECM} \times P_{ECM}$. In another embodiment, the swell potential $S_{soil}$ of the expansive clayey soil is an actual swell potential of the expansive clayey soil obtained from a swell potential test of the expansive clayey soil.

In some embodiments, the expansive clayey soil comprises at least one expansive clay mineral selected from the group consisting of smectite, bentonite, montmorillonite, beidellite, vermiculite, attapulgite, nontronite, illite, and chlorite.

In some embodiments, the structure to be built at the site includes, without limitation, a building foundation, a railway line foundation, a pipe, a footing, a landfill liner, a nuclear waste storage containment liner, a swimming pool, a wall, a driveway, a road, a pavement, a basement floor, and a wellbore. If these structures are built on or within the expansive clayey soil with an unacceptably high swell potential, particularly in regions with very defined wet and dry periods, the swelling of the expansive clayey soil when the expansive clayey soil is wet can cause the structures to heave or lift, and the shrinking of the expansive clayey soil when the expansive clayey soil becomes dry can cause uneven settling of sediment underneath the structures, resulting in damages to or even failures of the structures, such as large cracks in walls, foundations and swimming pool shells, buckling of driveway and roads, jamming of doors and windows, breakage of water or sewage pipes, and destabilization and even collapsing of a wellbore.

In one embodiment, the method employs a two-limit (T1 and T2, T2<T1) criteria to evaluate swell potential $S_{soil}$ of the expansive clayey soil for determining whether the expansive clayey soil at the site is suitable, not suitable, or may be suitable after a treatment with one or more of the swelling reduction agents for building a structure. Specifically, if $S_{soil}$ is at or above a pre-determined limit T1, the expansive clayey soil will be considered unsuitable and the site will be rejected to build the structure. If $S_{soil}$ is no greater than a pre-determined limit T2, where T2 is less than T1, the expansive clayey soil will be considered suitable and the site will be accepted to build the structure. If $S_{soil}$ is between T2 and T1 (T2<S<T1), a(n) (first) amount of the swelling reduction agent will be incorporated into the expansive clayey soil at the site to form a (first) swelling reduction agent incorporated expansive clayey soil with a reduced swell potential $S_{1i(soil)}$ that is no greater than the pre-determined limit T2. The (first) amount of the swelling reduction agent is calculated with the nano-level constitutive modeling based on the first water content as an initial water content (IWC) and the cation exchange capacity (CEC) of the expansive clayey soil and $P_{ECM}$. Depending on the structure to be built at the site of the expansive clayey soil and the depth of the expansive clayey soil where the structure is built, the T1 and T2 values may vary. A uniform mass of an expansive clayey soil which becomes saturated with moisture will exert pressure in all directions as each individual expanding clay mineral seeks to occupy more space. The direction and magnitude of the expansive clayey soil movement will depend upon the magnitude of the confining pressure at any particular point of resistance. The expansive clayey soil movement will be minimized where confining pressures are the largest, while the movement will be greatest where the magnitude of the confining pressure is the smallest. As depth increases, the weight of the overburden soil creates increasing confining pressure. Therefore, for any particular uniform mass of an expanding expansive clayey soil, the expansion resistance is generally greater at depth than it is near the surface. On level ground, the magnitude of an expanding expansive clayey soil movement will be greatest near the surface and in the upward direction. On sloping ground, the greatest magnitude of movement will again be nearest the surface but the primary direction of movement will also have a horizontal or "lateral" component. Buildings and other structures which have been constructed on top of a mass of an expansive clayey soil create confining pressure which tends to mitigate soil movement. The magnitude of the confining pressure from a building or structure is determined by the load distribution together with other expansion-resisting design elements. When the confining pressure of a building or other structure does not exceed the pressure exerted by the expanding expansive clayey soil, foundation movement will occur on the form of "heave" or upward movement.

In some embodiments, T1 may be in the range of 10-30%, 15-25%, or 18-20%, and T2 may be in the range of 1-7%, 2-6%, or 3-5%. Thus, the expansive clayey soil with a swell potential of 7-30%, 10-25%, or 15-20% may be suitable for building a structure after it is treated with one or more of the swelling reduction agents.

In another embodiment, the method may employ a simpler single pre-set limit T* criteria to evaluate the swell potential $S_{soil}$ of the expansive clayey soil for determining whether the expansive clayey soil at the site is suitable, not suitable, or may be suitable after a treatment with one or more of the swelling reduction agents for building a structure. For example, T* may be in the range of 5-10%, 6-9%, or 7-8%. If $S_{soil}$ is at or above T*, the expansive clayey soil at the site is to be treated with one or more of the swelling reduction agents to reduce the swell potential. On the other hand, if $S_{soil}$ is less than T*, the site is accepted for building the structure without treating the expansive clayey soil with the swelling reduction agents.

As in the method of the first aspect, in the method of this aspect, the swelling reduction agent includes, without limitation, calcite, gypsum, potassium chloride, a composition comprising exchangeable $K^+$, a composition comprising exchangeable $Ca^{2+}$, a composition comprising exchangeable $Mg^{2+}$, and a combination thereof, and the first amount of the swelling reduction agent incorporated into the expansive clayey soil is calculated to result in a swell potential of the first swelling reduction agent incorporated expansive clayey soil represented by $S_{1i(soil)}$ that is no greater than T2 or the pre-set limit T* according to the nano-level constitutive modeling based on $P_{ECM}$ and the first water content and the cation exchange capacity of the expansive clayey soil, specifically based on $P_{ECM}$ and $S_{1i(ECM)}$ calculated according to equations (6), (2), (3) and (5) using the first water content (as the initial water content, IWC) and the CEC of the expansive clayey soil, with $S_{1i(soil)}$ equaling $S_{1i(ECM)} \times P_{ECM}$.

Like the method of the first aspect, the method of this aspect may use white gypsum, red gypsum, one or more other types of impure gypsum, or a mixture of white gypsum, red gypsum, and/or one or more other types of impure gypsum as the swelling reduction agent.

When the expansive clayey soil comprising the expansive clay minerals takes in water and swells, the water sorbed on the expansive clay mineral particles will cause a reduction in the capacity or strength of the expansive clayey soil. In some embodiments, the swelling reduction agent of calcite, gypsum, potassium chloride, a composition comprising exchangeable $K^+$, a composition comprising exchangeable $Ca^{2+}$, and/or a composition comprising exchangeable $Mg^{2+}$, and a soil stabilizing composition comprising at least one material selected from the group consisting of ground granulated blastfurnace slag (GGBS), cement, resins, fly ash, lime, pozzolana, and a mixture of lime and pozzolana are incorporated into the expansive clayey soil either together or sequentially to reduce the swell potential as well as increase the stability and strength of the expansive clayey soil to make the swelling reduction agent incorporated expansive clayey soil more stable and suitable for building a structure.

In some embodiments, a mixture of ground granulated blastfurnace slag (GGBS) and gypsum, preferably red gypsum, may be incorporated into the expansive clayey soil, with the weight ratio of the gypsum:the GGBS in the mixture in the range of 1:5 to 5:1, 1:4 to 4:1, preferably 1:3 to 3:1, more preferably 1:3 to 3:2, or more preferably 1:4 to 2:3, with the pH of the mixture preferably adjusted by lime to be greater than 10.5, or preferably greater than 12, to increase the strength of the expansive clayey soil as well as decrease the swell potential of the expansive clayey soil. In a preferred embodiment, the first amount of the gypsum calculated to be incorporated into the expansive clayey soil according to the nano-level constitutive modeling is 20-50%, or 20-40% of the total weight of the first swelling reduction agent incorporated expansive clayey soil, with the co-incorporated GGBS at an amount of 15-60%, 20-50%, or 30-40% of the total weight of the first swelling reduction agent incorporated expansive clayey soil, and the co-incorporated lime at an amount of 0.1-5%, or 0.5-3% of the total weight of the first swelling reduction agent incorporated expansive clayey soil.

Also like the method of the first aspect, when the expansive clayey soil further comprises sand, particularly when the sand is present at greater than 30%, greater than 40%, greater than 50%, greater than 60%, or greater than 70% of the total weight of the expansive clayey soil, the method of this aspect preferably further comprises removing all or a portion of the sand from the expansive clayey soil, for example, with one or more soil screen sieves as described in the first aspect, prior to the incorporating the first amount of the swelling reduction agent into the expansive clayey soil to form the first swelling reduction agent incorporated expansive clayey soil. In another preferred embodiment, all or a portion of the sand is removed from the expansive clayey soil and replaced by one or more non-expansive clay minerals such as kaolinite, mica, hydroxy interlayered vermiculite (HIV), and hydroxy interlayered smectite (HIS), preferably at a fraction of the weight of the sand removed or at an equal weight of the sand removed prior to the incorporating the first amount of the swelling reduction agent into the expansive clayey soil to form the first swelling reduction agent incorporated expansive clayey soil.

Similar to the method of the first aspect, to confirm that the swell potential of the first swelling reduction agent incorporated expansive clayey soil is indeed reduced, preferably to a desirable level lower than T2 or T* as predicted by the nano-level constitutive modeling, the method of this aspect may further comprise measuring the actual swell potential of the first swelling reduction agent incorporated expansive clayey soil represented by $S_{1i}^*{}_{(soil)}$ and comparing $S_{1i}^*{}_{(soil)}$ with T2 or T*. In one embodiment, $S_{1i}^*{}_{(soil)}$ is no greater than T2 or T*, and the expansive clayey soil at the site is deemed suitable for building a structure. In another embodiment, $S_{1i}^*{}_{(soil)}$ is greater than T2 or T*. In this case, a second round of incorporating the swelling reduction agent into the first swelling reduction agent incorporated expansive clayey soil may be necessary to further reduce the swell potential of the first swelling reduction agent incorporated expansive clayey soil, similar to the method of the first aspect of the present disclosure. Specifically, the method may further comprise (a) determining a water content and a cation exchange capacity (CEC) of the first swelling reduction agent incorporated expansive clayey soil expressed in meq/100 g dry first swelling reduction agent incorporated expansive clayey soil, (b) calculating a second amount of a swelling reduction agent to be incorporated into the first swelling reduction agent incorporated expansive clayey soil to form a second swelling reduction agent incorporated expansive clayey soil with a further reduced swell potential $S_{2i(soil)}$ that is no greater than T2 or T* with the nano-level constitutive modeling based on the water content as an initial water content (IWC) and the cation exchange capacity (CEC) of the first swelling reduction agent incorporated expansive clayey soil, wherein the second swelling reduction agent incorporated expansive clayey soil comprises a second swelling reduction agent incorporated at least one expansive clay mineral having a swell potential represented by $S_{2i(ECM)}$, wherein the swelling reduction agent is at least one selected from the group consisting of calcite, gypsum, potassium chloride, a composition comprising exchangeable $K^+$, a composition comprising exchangeable $Ca^{2+}$, and a composition comprising exchangeable $Mg^{2+}$, wherein the incorporation of the second amount of the swelling reduction agent produces a modified total cohesive energy density (TCEDm) of the second swelling reduction agent incorporated at least one expansive clay mineral calculated according to Equation (6):

$$TCEDm = 0.0625(IWC)^3 - 3.575(IWC)^2 + 10.5(IWC) + 2830 + 7100(C/0.1) + 5050(G/0.2) + 3010(KCl/0.1) + Ca(500) + Mg(300) + K(100) \quad (6)$$

where TCEDm=modified TCED, C=Proportion of calcite weight relative to the total weight of the second swelling reduction agent incorporated expansive clayey soil×$P_{ECM}$, G=Proportion of gypsum weight relative to the total weight of the second swelling reduction agent incorporated expansive clayey soil×$P_{ECM}$, KCl=Proportion of potassium chloride weight relative to the total weight of the second swelling reduction agent incorporated expansive clayey soil×$P_{ECM}$, Ca=Proportion of the number of calcium exchangeable cation relative to the total number of exchangeable cations in the second swelling reduction agent incorporated expansive clayey soil, Mg=Proportion of the number of magnesium exchangeable cation relative to the total number of exchangeable cations in the second swelling reduction agent incorporated expansive clayey soil, K=Proportion of the number of potassium exchangeable cation relative to the total number of exchangeable cations in the second swelling reduction agent incorporated expansive clayey soil, IWC=initial water content, wherein the TCEDm of the second swelling reduction agent incorporated at least one expansive clay mineral results in $S_{2i(ECM)}$ calculated according to Equations (2), (3), and (5):

$$IDD = \{-2E-15(TCEDm)^4 + 5E-11(TCEDm)^3 - 5E-07(TCEDm)^2 + 0.0023(TCEDm) - 1.5378\} * 1.85 * (ABS(CEC-90)/90) \quad (2)$$

where IDD is initial dry density of the second swelling reduction agent incorporated at least one expansive clay mineral, $$FDD = -2E-22(TCEDm)^6 + 5E-18(TCEDm)^5 - 6E-14(TCEDm)^4 + 3E-10(TCEDm)^3 - 7E-07(TCEDm)^2 + 0.0005(TCEDm) + 0.3747 \quad (3)$$

where FDD is final dry density of the second swelling reduction agent incorporated at least one expansive clay mineral when the second swelling reduction agent incorporated at least one expansive clay mineral reaches the swell potential $S_{2i(ECM)}$, $$S_{2i(ECM)}(\%) = (FDD - IDD)/FDD * 100 \quad (5);$$

and wherein the further reduced swell potential of the second swelling reduction agent incorporated expansive clayey soil $S_{2i(soil)}$ equals $S_{2i(ECM)} \times P_{ECM}$, and (c) incorporating the second amount of the swelling reduction agent into the first swelling reduction agent incorporated expansive clayey soil to form the second swelling reduction agent incorporated expansive clayey soil.

In some embodiments, the method may still further comprise measuring the actual swell potential of the second swelling reduction agent incorporated expansive clayey soil and comparing it to T2 or T*, and an additional one or more rounds of incorporation of the swelling reduction agent into the previously swelling reduction agent incorporated expansive clayey soil, with the amount of the swelling reduction agent calculated according to the nano-level constitutive modeling, may be performed based on the result from the comparing.

Since wetting an expansive clayey soil can reduce the swell potential of the expansive clayey soil as described in the second aspect of the disclosure, another preferred embodiment of the method involves a combination of wetting and incorporating the swelling reduction agent into the expansive clayey soil that comprises expansive clay mineral(s) at a weight proportion of $P_{ECM}$ and has a swell potential $S_{soil}$ between T2 and T1, where T2<T1, under a two-limit criteria, or at or above a pre-set limit T* under a single limit criteria, a first water content, and a cation exchange capacity (CEC). In one embodiment, the method includes (a) determining a second water content of a wetted expansive clayey soil to be formed by wetting the expansive clayey soil with water and a first amount of the swelling reduction agent to be incorporated into the wetted expansive clayey soil at the site to form a wetted first swelling reduction agent incorporated expansive clayey soil to result in a swell potential of the wetted first swelling reduction agent incorporated expansive clayey soil represented by $S_{w1i(soil)}$ that is no greater than T2 or T* according to the nano-level constitutive modeling based on $P_{ECM}$ and the second water content of the wetted expansive clayey soil and the cation exchange capacity (CEC) of the expansive clayey soil. Specifically, the TCEDm of the wetted first swelling reduction agent incorporated expansive clay mineral(s) in the expansive clayey soil is calculated using the second water content of the wetted expansive clayey soil as the initial water content (IWC) according to Equation (6). The calculated TCEDm together with the CEC of the expansive clayey soil results in $S_{w1i(ECM)}$. the swell potential of the wetted first swelling reduction agent incorporated expansive clay mineral(s), calculated according to Equations (2), (3), and (5) and $S_{w1i(soil)}$ equaling $S_{w1i(ECM)} \times P_{ECM}$. The second water content is greater than the first water content but no greater than a final water content of the expansive clay mineral(s) when the expansive clay mineral(s) reach the swell potential; (b) wetting the expansive clayey soil with water to form the wetted expansive clayey soil having the second water content; and (c) incorporating the first amount of the swelling reduction agent into the wetted expansive clayey soil at the site to form the wetted first swelling reduction agent incorporated expansive clayey soil. In this embodiment, because of the contribution of the (higher) second water content to reducing the swell potential of the expansive clayey soil, the amount of the swelling reduction agent needed to obtain the swell potential of the wetted first swelling reduction agent incorporated expansive clayey soil that is no greater than T2 or T* may be less than that without pre-wetting the expansive clayey soil. As in the method of the second aspect, the final water content of the expansive clay mineral(s) when the expansive clay mineral(s) reach the swell potential may be determined experimentally, for example, following a swell potential test of the expansive clayey soil, or calculated according to Equation (6) (whether or not the expansive clayey soil further comprises at least one selected from the group consisting of calcite, gypsum, potassium chloride, calcium exchangeable cation, magnesium exchangeable cation, and potassium exchangeable cation before the incorporating the first amount of the swelling reduction agent), and Equation (4) of the nano-level constitutive modeling based on the first water content (as the initial water content, IWC) and the CEC of the expansive clayey soil.

In another embodiment, wetting may be performed after incorporating the swelling reduction agent into the expansive clayey soil, e.g. wetting may be performed on the first or second swelling reduction agent incorporated expansive clayey soil, or more generally, the expansive clayey soil that has been incorporated with the swelling reduction agent for any number of times and may or may not have been previously wetted. In this embodiment, before the wetting, the swelling reduction agent incorporated expansive clayey soil has a first water content and a cation exchange capacity (CEC). After the wetting, the swelling reduction agent incorporated wetted expansive clayey soil has a second water content that is higher than the first water content. The swell potential of the swelling reduction agent incorporated wetted expansive clayey soil can be calculated using Equations (6), (2), (3) and (5) of the nano-level constitutive modeling based on the second water content (as the initial water content, IWC) of the swelling reduction agent incorporated wetted expansive clayey soil and the CEC of the swelling reduction agent incorporated expansive clayey soil as well as $P_{ECM}$. The second water content of the swelling reduction agent incorporated wetted expansive clayey soil may not exceed a final water content of the swelling reduction agent incorporated expansive clay mineral(s) in the expansive clayey soil when the swelling reduction agent incorporated expansive clay mineral(s) in the expansive clayey soil reach the swell potential. The final water content may be determined either experimentally, for example, following a swell potential test of the swelling reduction agent incorporated expansive clayey soil, or calculated according to Equations (6) and (4) based on the first water content (as the initial water content, IWC) and the CEC of the swelling reduction agent incorporated expansive clayey soil.

As described in the second aspect, the higher second water content achieved by the wetting of the expansive clayey soil or the swelling reduction agent incorporated expansive clayey soil preferably needs to be maintained or stabilized, for example, by subgrade irrigation when the wetted swelling reduction agent incorporated expansive soil is used as foundation soil. Subgrade irrigation involves the installation of pipes to conduct water into the foundation soil at various injection points. The amount of water required depends on the season and the humidity. Periodic measurement of the wetted swelling reduction agent incorporated expansive clayey soil moisture may be required so that the amount of water injected can be adjusted accordingly. The source of water may be a well or the domestic water supply. Since the wetting of the expansive clayey soil may result in a water content that can significantly weaken the expansive clayey soil strength, soil stabilization materials, such as ground granulated blastfurnace slag, cement, resins, fly ash, lime, pozzolana, and a mixture of lime and pozzolana, together with the swelling reduction agents are preferably incorporated into the wetted expansive clayey soil.

Having generally described this invention, a further understanding can be obtained by reference to certain specific examples which are provided herein for purposes of illustration only and are not intended to be limiting unless otherwise specified.

EXAMPLES

List of Abbreviations

CEC: Cation Exchange Capacity
CED: Cohesive Energy Density
CT: Computed Tomography
EDS: Energy Dispersive Spectroscopy
ESEM: Environmental Scanning Electron Microscope
FTIR: Fourier Transform Infrared Spectroscopy
LJ: Lennard Jones
LL: Liquid Limit
MC: Monte Carlo
MD: Molecular Dynamics
MM: Molecular Mechanics NPT: Constant Number of Particles, Pressure, and Temperature Ensemble
PI: Plasticity Index
PL: Plastic Limit
OMC: Optimum Moisture Content
XRD: X-Ray Diffraction The methodology of the examples covered three major levels of activities; macro level testing, micro level imaging and analysis, and molecular level simulation and modeling. The research methodology generally involved formulation of several types and nature of fabrics/structures of expansive clays through preparation and compaction of mixes of expansive clay minerals and non-expansive/non-clay minerals in various proportions at several moisture and density conditions, mapping and analysis of the fabric and structure of the laboratory compacted expansive clays specimens using nano/micro level imaging laboratory techniques at the pre and post swelling states. This was achieved through advanced imaging techniques such as X-ray diffraction (XRD), Environmental SEM (ESEM), Fourier Transform Infrared Spectroscopy (FTIR), and Computerized X-ray Tomography (Micro CT). Finally, to precisely model the behavior of natural and compacted fabric and structure of the expansive clays, molecular scale simulation of the swelling behavior of the above mentioned natural and compacted fabric and structure was carried out using the concepts of molecular mechanics (MM) I molecular dynamics (MD) and Monte Carlo (MC) simulation techniques.

One of the objectives of this disclosure is to compare the behavior of the natural expansive clay deposits and the laboratory reconstituted specimens using controlled proportions of the standard soil constituents with the simulation models. Therefore, to constitute the control samples besides obtaining undisturbed samples from natural expansive soil deposits, individual soil constituents were also acquired from standard/known sources.

Qatif and Hofuf areas in the eastern region of Saudi Arabia are well known for the presence of problematic shallow subsurface expansive soils deposits. Sampling plan was prepared to acquire representative undisturbed samples from some of the sites in Hofuf and Qatif known for their volume change behavior. For the purpose, test pits were excavated in the shallow subsurface to expose the expansive soil layers. Large lumps/pieces of expansive clayey soils were acquired from the excavated test pits and were immediately sealed to preserve the natural moisture content of these samples. Two samples each representative of two different expansive clay deposits were acquired from Qatif area, while one sample was obtained from Hofuf area. Samples from Qatif area were obtained from a site in the housing area next to Qatif Central Hospital, while sample from Hofuf area was acquired from a site in National Guard. The samples were characterized using various laboratory index tests and XRD and the results are summarized in Tables 4, 5, and 6.

TABLE 4

Summary of index tests on the acquired samples and materials

| Material | Designation | Source | Classification | Atterberg Limits LL | PL | PI | Specific Surface Area ($m^2/g$) | CEC (meq/100 g) |
|---|---|---|---|---|---|---|---|---|
| Na-Montmorillonite (SWy-1) | NaM | The Clay Mineral Society, US | CH | 612 | 36 | 576 | 31.82 | 76.4 |
| Ca-Montmorillonite (SAz-1) | CaM | The Clay Mineral Society, US | MH | 129 | 55 | 74 | 97.42 | 120.0 |
| Kaolinite (KGa-1) | K | The Clay Mineral Society, US | MH | 58 | 36 | 22 | 10.05 | 2.0 |
| Bentonite | B | Kanoo Est., KSA | CH | 480 | 44 | 436 | — | 54.8 |
| Qatif Clay - Source 1 | Q-1 | Qatif, KSA | CH | 155 | 53 | 102 | — | 51.0 |
| Qatif Clay - Source 2 | Q-2 | Qatif, KSA | CH | 69 | 29 | 40 | — | 20.7 |
| Hofuf Clay | H-1 | Hofuf, KSA | CH | 70 | 27 | 43 | — | 12.7 |
| Calcium Carbonate | Ca | Techno Pharmchem, India | — | — | — | — | — | — |
| Gypsum | G | Phosphate Plant, RJC, KSA | — | — | — | — | — | — |
| Sand | S | Juball, KSA | SP | NP | NP | NP | — | — |

CH: High Plastic CLAY
MH: Elastic SILT
SP: Poorly graded SAND
NP: Non Plastic
RIC: Ras al-Khair Industrial City
KSA: Kingdom of Saudi Arabia
Atterberg Limits methodology: ASTM D 4318
Specfic Surface Area methodology: Brunauer, Emmett and Teller (BET) Method
CEC methodology: Rayment and Higginson (1992)

TABLE 5

Exchangeable and total cations analysis of the Clay samples

| Soil | Designation | CEC (meq/100 g) | Exchangeable Cations Type | meq/100 g | mg/kg | % of CEC | Total Cations Type | mg/kg | % of Fixed Cations |
|---|---|---|---|---|---|---|---|---|---|
| Bentonite | B | 54.8 | Ca | 35.2 | 7054 | 64 | Ca | 16300 | 22 |
| | | | Mg | 2.4 | 292 | 4 | Mg | 869 | 1 |
| | | | K | 2.0 | 782 | 4 | K | 1200 | 1 |
| | | | Na | 15.2 | 3496 | 28 | Na | 24300 | 49 |

TABLE 5-continued

Exchangeable and total cations analysis of the Clay samples

| Soil | Designation | CEC (meq/100 g) | Exchangeable Cations | | | | Total Cations | | |
|---|---|---|---|---|---|---|---|---|---|
| | | | Type | meq/100 g | mg/kg | % of CEC | Type | mg/kg | % of Fixed Cations |
| Qatif Clay - Source 1 | Q-1 | 51.0 | Ca | 25.0 | 5004 | 49 | Ca | 101000 | 68 |
| | | | Mg | 17.0 | 2002 | 33 | Mg | 32400 | 22 |
| | | | K | 7.0 | 2963 | 14 | K | 6280 | 2 |
| | | | Na | 2.0 | 496 | 4 | Na | 840 | 0 |
| Qatif Clay - Source 2 | Q-2 | 20.7 | Ca | 10.0 | 2004 | 48 | Ca | 118000 | 54 |
| | | | Mg | 7.0 | 851 | 34 | Mg | 89600 | 41 |
| | | | K | 3.0 | 1173 | 14 | K | 6920 | 3 |
| | | | Na | 0.7 | 161 | 3 | Na | 1540 | 1 |
| Hofuf Clay | H-1 | 12.7 | Ca | 7.2 | 1443 | 57 | Ca | 28000 | 54 |
| | | | Mg | 4.1 | 510 | 32 | Mg | 8900 | 17 |
| | | | K | 1.2 | 469 | 9 | K | 6880 | 13 |
| | | | Na | 0.2 | 46 | 2 | Na | 5790 | 12 |

Total Cations methodology: APHA 21* ed., USEPA SW 846 - 6010 (ICPAES)

TABLE 6

Mineralogical analysis of Clay samples

| Soil | Designation | Smectite | Kaolinite | Illite | Palygorskite | Quartz | Calcite | Dolomite | Gypsum |
|---|---|---|---|---|---|---|---|---|---|
| Na-Montmorillonite (SWy-1) | NaM | 97 | — | — | — | 3 | — | — | — |
| Ca-Montmorillonite (SA2-1) | CaM | 95 | — | — | — | 5 | — | — | — |
| Bentonite | B | 95 | — | — | — | 5 | — | — | — |
| Qatif Clay - Source 1 | Q-1 | 32 | — | 521 | 7 | 9 | 22 | — | 9 |
| Qatif Clay - Source 2 | Q-2 | 15 | — | 25 | 9 | 15 | — | 24 | 12 |
| Hofuf Clay | H-1 | — | 5 | 35 | 5 | 15 | 40 | — | — |

In order to precisely isolate and study the relative contribution of various non-swelling clay particles/minerals to the behavior of swelling clay minerals, several standard materials were acquired from the known sources. These materials were further characterized to define the pertinent properties and complete compositional details. For the purpose, samples of standard clay minerals of different composition were obtained from Clay Mineral Society. See Clay Minerals Society (2013), "Source Clays Physical/Chemical Data", http://www.clays.org/SOURCE%20CLAYS/SCdata.html, incorporated herein by reference in its entirety. Na-montmorillonite (SWy-1), Ca-montmorillonite (SAz-1), and Kaolinite (KGa-1) are the three standard clay samples obtained from Clay Mineral Society.

As only small quantities of samples are available with Clay Mineral Society and large quantities were required to perform the required experimentation, commercially available bentonite samples were also obtained from Kanoo establishment, one of the bentonite (drilling mud) suppliers in KSA. As per information provided by the supplier, the source of this bentonite is from the shale deposits in Gujrat city of India. The bentonite is quarried from these deposits, crushed to fine powder (passing Sieve No. 200), homogenized, and marketed in 50 lbs bags. For this study, five bentonite bags were obtained from the supplier and were stored in controlled temperature and humidity rooms. Several samples were collected from different parts of the bags for the characterization and further verification of the homogeneity and uniformity of the bag samples. The test results indicate a uniformly distributed material throughout the bags.

In addition to the standard clay minerals from Clay Mineral Society and commercial bentonite, sand samples were acquired from the general sand dune deposits near Jubail area of KSA. Bulk sand samples were sampled and were washed through the sieves (No. 4 to No. 200). The relative amount of material retained on each sieve was collected and reconstituted to a standard gradation (Table 7).

TABLE 7

Standard gradation for the Sand sample

| ASTM Sieve No. | 10 | 20 | 40 | 60 | 100 | 200 |
|---|---|---|---|---|---|---|
| % passing | 100 | 92 | 58 | 35 | 19 | 2 |

In any typical natural expansive clayey soil deposit, in addition to swelling and non-swelling clay minerals, other common inclusions are quartz (sand), gypsum and calcite. In order to constitute control laboratory samples, these inclusions such as gypsum and calcium carbonate were also acquired from the known/standard sources. Each of these materials were further characterized using XRD and chemical testing techniques for verification of the composition. Gypsum samples were acquired in powdered form from Ma'aden's Phosphoric Acid Plant at Ras al-Khair on the east coast of KSA. Calcium carbonate was obtained from the local market manufactured by Techno Pharmchem, India. Characterization results for these materials are presented in Tables 4, 5, and 6.

The control laboratory specimens were prepared at various moisture contents using the distilled water and compacted at various densities using both static and dynamic compaction techniques. Detailed steps and procedures for the sample preparations in the laboratory are provided herein.

In order to formulate the various forms of fabric and structure, control specimens with known proportions of clay minerals and non-clay minerals/particles were prepared at various known densities and moisture contents. Types of clay and non-clay constituents and the corresponding proportions used for preparing the controlled specimens are listed in Table 8.

TABLE 8

List of control samples with the details of the respective compositions of various constituents.

| Sample No. | Moisture Content State | NaM | CaM | Bentonite | Sand | Gypsum | Calcite | Kaolinite |
|---|---|---|---|---|---|---|---|---|
| 1 | Dry of OMC | — | — | 100 | — | — | — | — |
| 2 | Wet of OMC | — | — | 100 | — | — | — | — |
| 3 | Dry of OMC | — | — | 60 | 40 | — | — | — |
| 4 | Wet of OMC | — | — | 60 | 40 | — | — | — |
| 5 | Dry of OMC | — | — | 30 | 70 | — | — | — |
| 6 | Wet of OMC | — | — | 30 | 70 | — | — | — |
| 7 | Dry of OMC | — | — | 10 | 90 | — | — | — |
| 8 | Wet of OMC | — | — | 10 | 90 | — | — | — |
| 9 | Dry of OMC* | — | — | 30 | 70 | — | — | — |
| 10 | Dry of OMC* | — | — | 30 | 60 | 10 | — | — |
| 11 | Dry of OMC* | — | — | 30 | 40 | 30 | — | — |
| 12 | Dry of OMC* | — | — | 30 | 20 | 50 | — | — |
| 13 | Dry of OMC* | — | — | 30 | 40 | — | 30 | — |
| 14 | Dry of OMC* | — | — | 30 | 20 | — | 50 | — |
| 15 | Dry of OMC* | — | — | 30 | 40 | — | — | 30 |
| 16 | Dry of OMC* | — | — | — | — | — | — | 100 |
| 17 | Dry of OMC* | — | — | — | 40 | — | — | 60 |
| 18 | Dry of OMC* | — | — | — | 70 | — | — | 30 |
| 19 | Dry of OMC* | 100 | — | — | — | — | — | — |
| 20 | Dry of OMC* | 60 | — | — | 40 | — | — | — |
| 21 | Dry of OMC* | 30 | — | — | 70 | — | — | — |
| 22 | Dry of OMC* | — | 100 | — | — | — | — | — |
| 23 | Dry of OMC* | — | 60 | — | 40 | — | — | — |
| 24 | Dry of OMC* | — | 30 | — | 70 | — | — | — |

Figure 31:
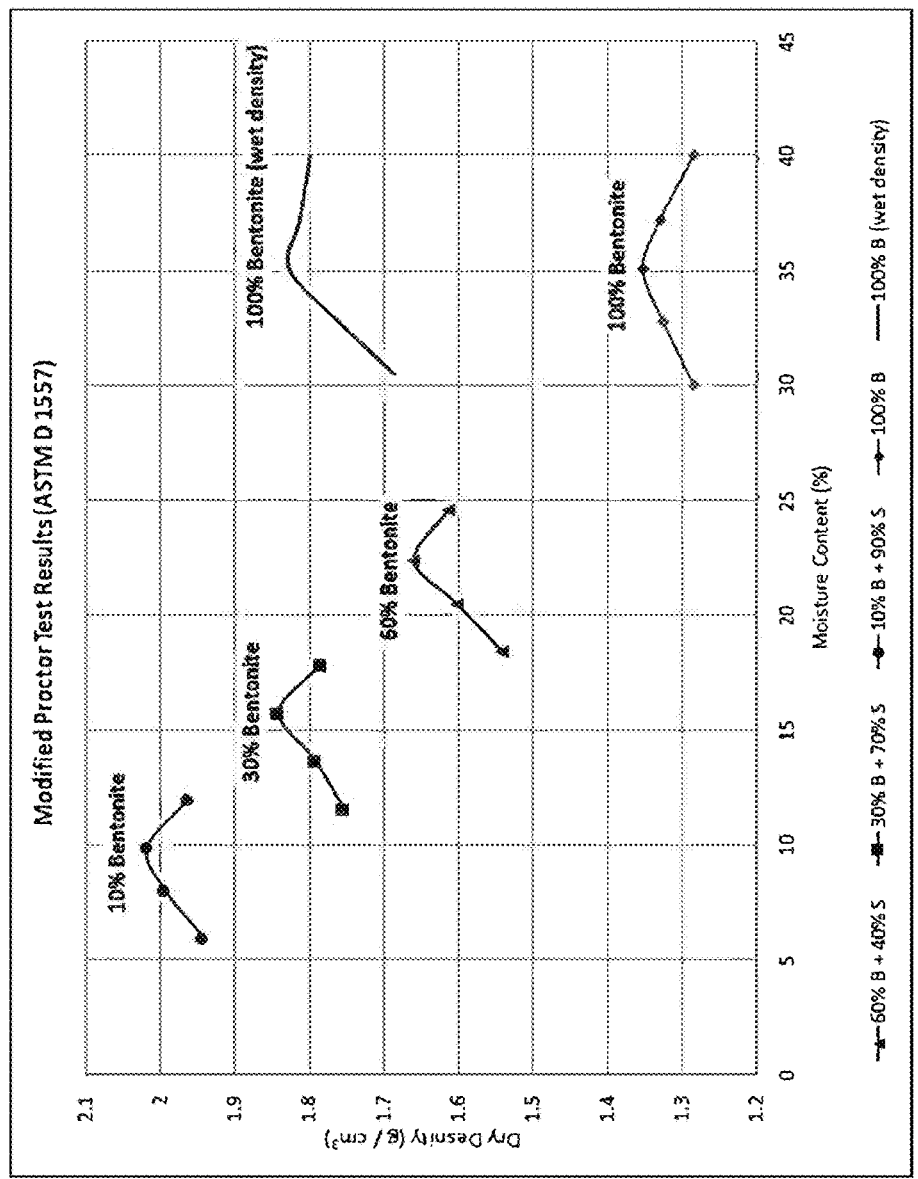
FIG. 31 is a graphical presentation of Proctor Moisture-Density relationships for various bentonite-sand proportioned mixes.

*Static Compaction in this study, baseline mixtures were prepared using bentonite and sand in various proportions (10, 30, 60, and 100% bentonite) and the moisture-density relationships were developed for each of the proportion using modified Proctor Test procedure (ASTM D 1557). Proctor test provides a relationship between moisture and density with its peak density at optimum moisture content (OMC) and further marking different zones such as dry and wet side of optimum moisture content. Results of Proctor compaction tests are provided in FIG. 31. To formulate specimens with different fabric conditions, specimens were prepared at 95% of maximum dry density both on dry and wet side of OMC. For the purpose, samples were prepared by mixing the required proportions of clay, sand, and water and were left over in sealed plastic bags for a minimum period of twenty four hours. This is to ensure the proper and uniform distribution and adsorption of the moisture throughout the clay and sand particles. These loose mixed samples were then compacted to 95% maximum dry density in the Proctor mold. Oedometer circular steel rings of 70 mm diameter and 19 mm height were then hydraulically pushed into the compacted samples to obtain the required specimens. The compacted specimens along with the rings were sealed against moisture loss for onward testing for the swelling tests. Among these specimens, one with 30% bentonite and compacted at 95% maximum dry density on the dry side of the OMC was selected as a reference specimen for the further variation in the clay and non-clay constituents.

As samples of standard materials other than bentonite could not be obtained in ample quantities for the dynamically compacted specimens, it was decided to use static compaction technique for the rest of the variation in constituents. For the comparison purpose, reference specimen (30% bentonite) was also compacted to the required density (95% of maximum dry density) on dry side of OMC using static compaction technique in the oedometer rings. The specimens were compacted in two layers through the piston of the compression machine having almost the same diameter as of the oedometer ring. Equivalent static pressure to achieve the same density in oedometer rings as in Proctor compaction was determined to be 1500 kPa. This equivalent pressure was used to compact the mixes in which sand was partially replaced with other constituents, several combinations used are listed in Table 8. In order to achieve the required density and moisture conditions, the samples were compacted to a pressure of 1500 kPa. In order to preserve the moisture conditions, the compacted specimens were immediately sealed with several wraps of plastic cling film and cased in polythene bags. In addition to the specimen compacted for swelling test, additional similar specimens were prepared for the micro investigation on the pre swell samples. These pre swell samples, taken from the compacted layer, were later on evaluated using molecular/nano level investigation and imaging techniques. All the laboratory prepared specimens were subjected to swell potential tests as detailed below.

Figure 2:
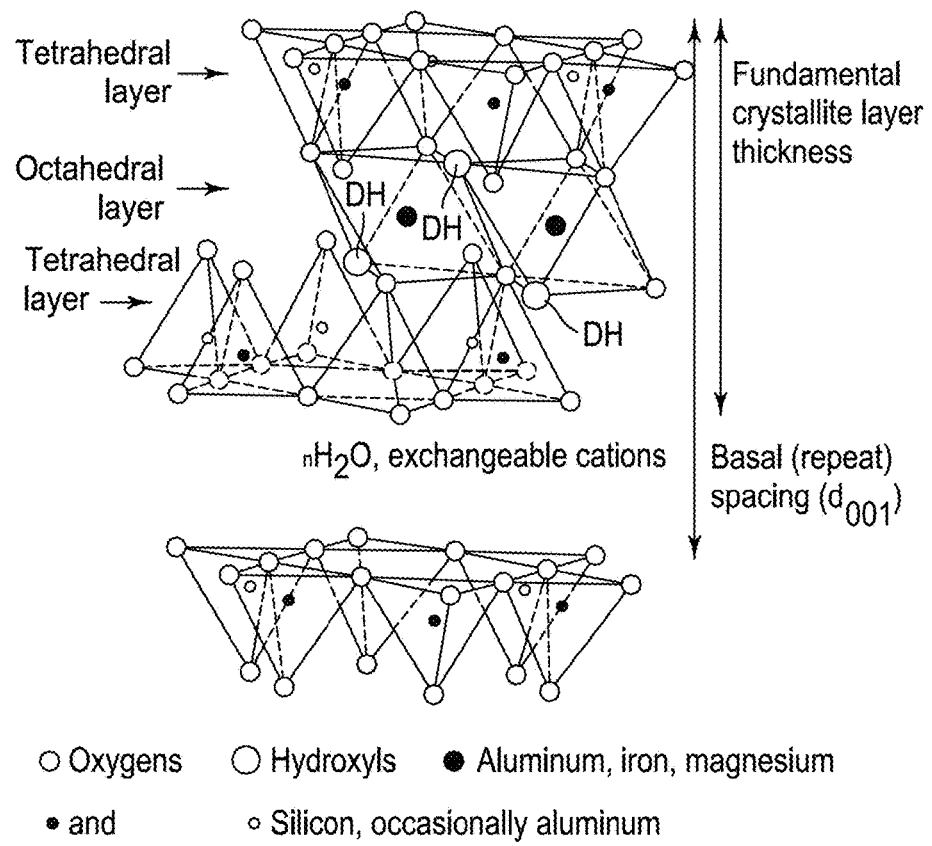
FIG. 2 is a schematic of smectite clay mineral group (Mitchell, 2005).
Figure 3B:
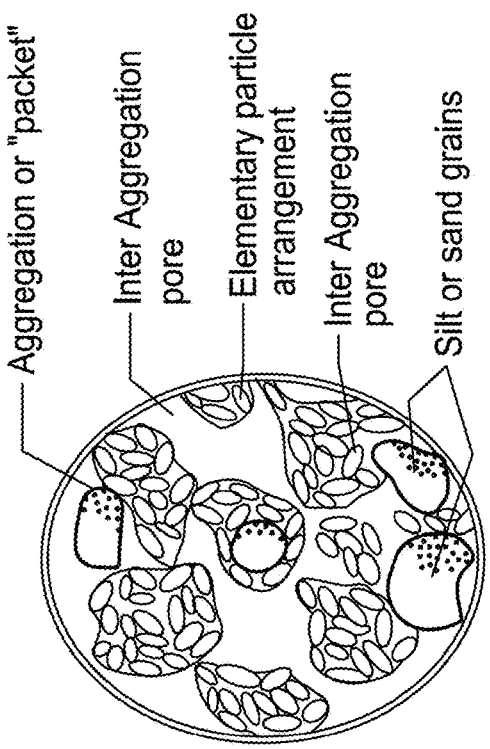
FIG. 3B is a graphical presentation of macro level clay fabric (Gens and Alonso, 1992)
Figure 3C:
FIG. 3C is a graphical presentation of platelet level clay fabric (Gens and Alonso, 1992).
Figure 3A:
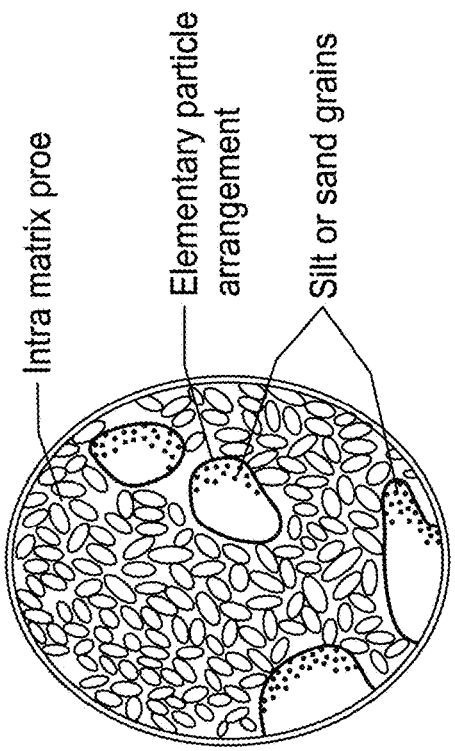
FIG. 3A is a graphical presentation of micro level clay fabric (Gens and Alonso, 1992).
Figure 4A:
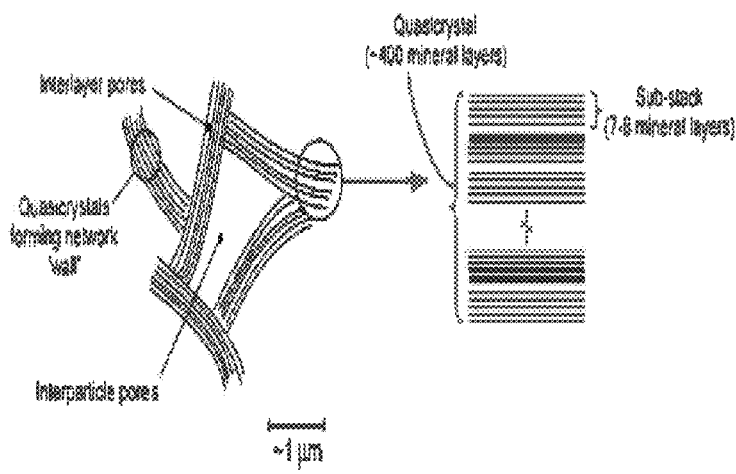
FIG. 4A is a graphical presentation of conceptual microstructures for $Ca^{2+}$-smectite.
Figure 4B:
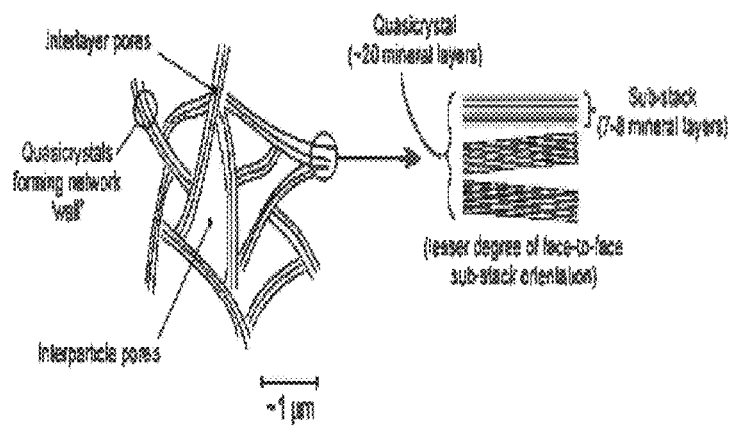
FIG. 4B is a graphical presentation of conceptual microstructures for $Na^+$-smectite.
Figure 4C:
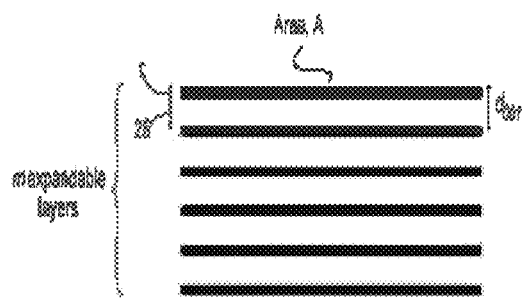
FIG. 4C is a graphical presentation of features of an individual quasicrystal for the quantitative microstructural model (Likos and Lu, 2006).
Figure 5A:
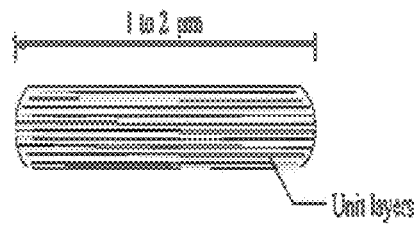
FIGS. 5A, 5B, and 5C are graphical presentations of conceptual fabric of clayey soils (Sharma, 1998).
Figure 5B:
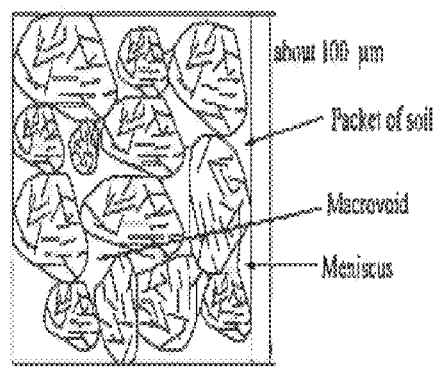
Figure 5C:
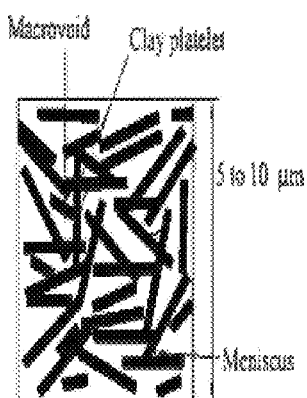
Figure 6:
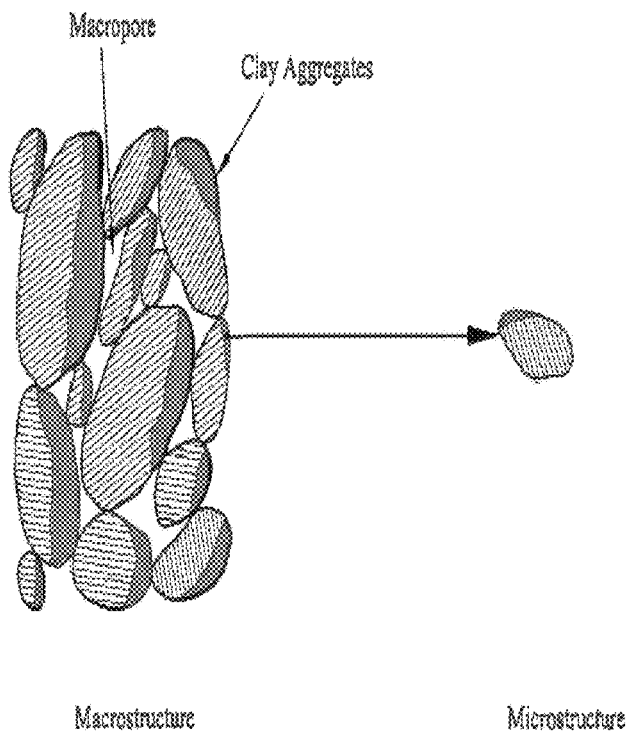
FIG. 6 is a graphical presentation of micro and macro level clay structure concept (Sanchez et al., 2005).
Figure 7:
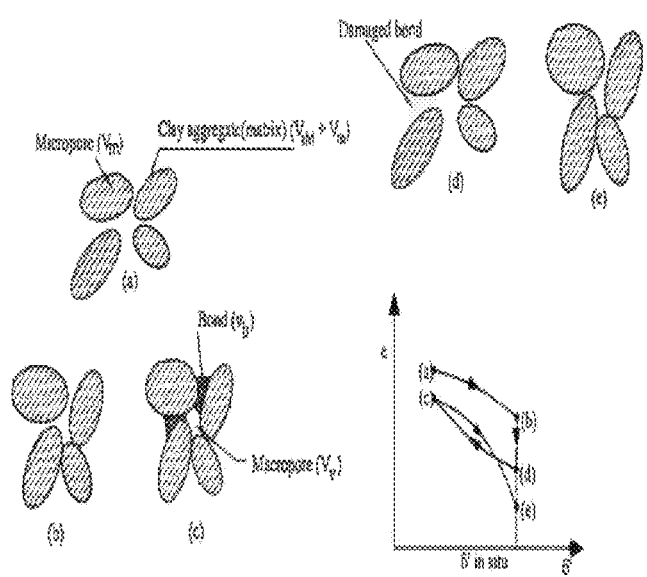
FIG. 7 is a graphical presentation of interpretation of diagenesis process and structural effects of loading (a, b. and d), unloading (d and c) and reloading (c and e) cycle on a clayey rock (Pinyol et al., 2007).
Figure 8:
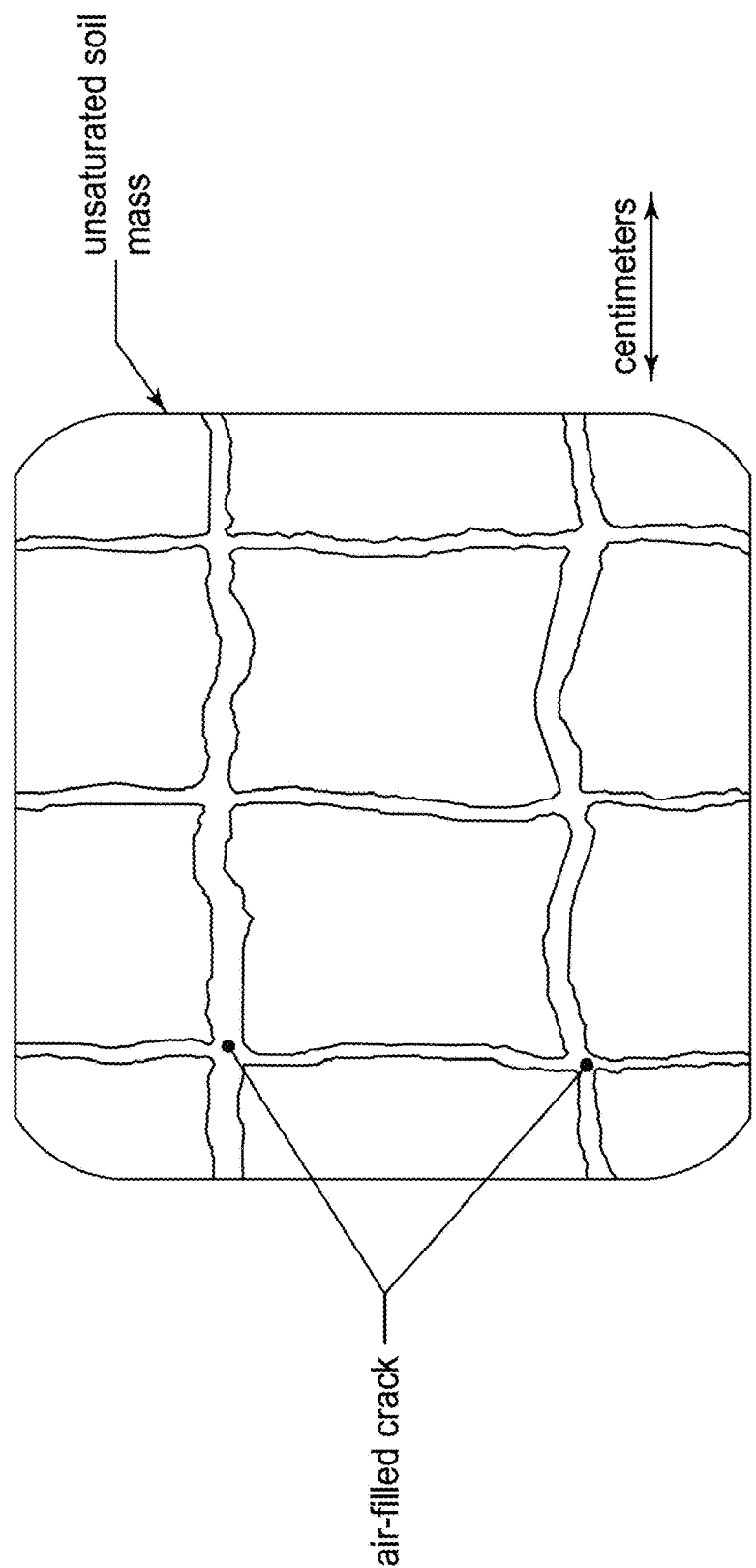
FIG. 8 is a schematic representation of a desiccated clay soil showing the differentiation between the unsaturated soil mass and the saturated soil elements (Fityus and Buzzy, 2009).
Figure 9A:
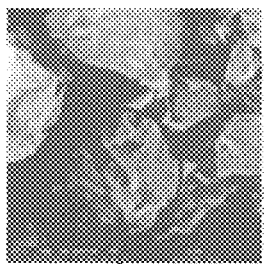
FIG. 9A is an SEM Image of compacted Wyoming bentonite showing bimodal porosity (image obtained parallel to compacted direction).
Figure 9B:
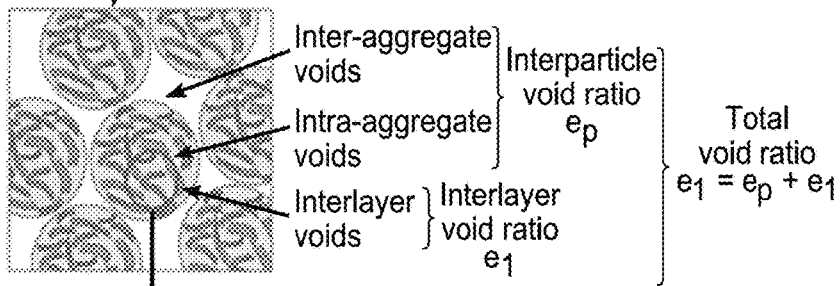
FIG. 9B is a conceptual diagram of pore spaces on the inter-aggregate scale (Likos and Wayllace, 2010).
Figure 9C:
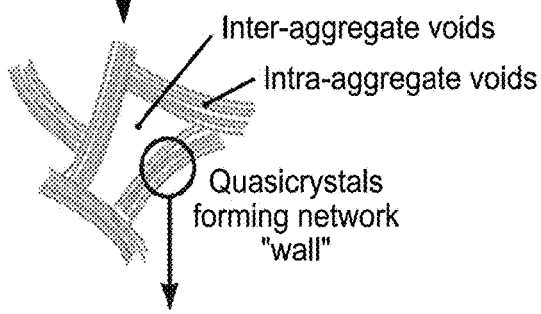
FIG. 9C is a conceptual diagram of pore spaces on the intra-aggregate scale (Likos and Wayllace, 2010).
Figure 9D:
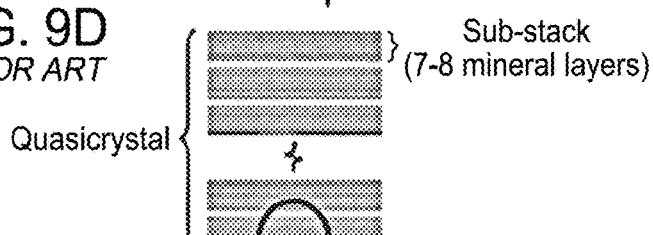
FIG. 9D is a conceptual diagram of pore spaces on the quasicrystal scale (Likos and Wayllace, 2010).
Figure 9E:
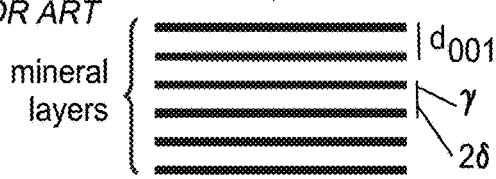
FIG. 9E is a conceptual diagram of pore spaces on the interlayer scale (Likos and Wayllace, 2010).
Figure 10:
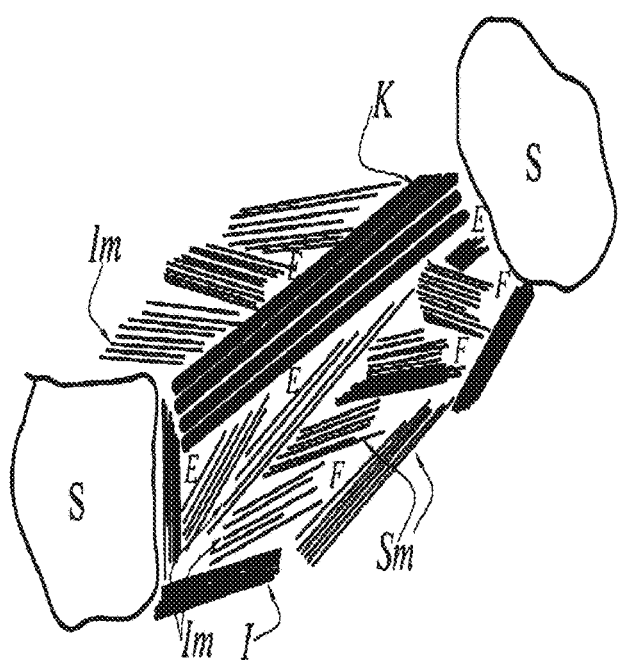
FIG. 10 is a graphical presentation of forms of water in high-density clay soil (F, Free or bulk water; E, external or inter-cluster water; Im, inter-lamellar or intra-cluster water; S, Silt; K, Kaolinite; T, illite; Sm, Smectite) (Hueckel, 1992).
Figure 11:
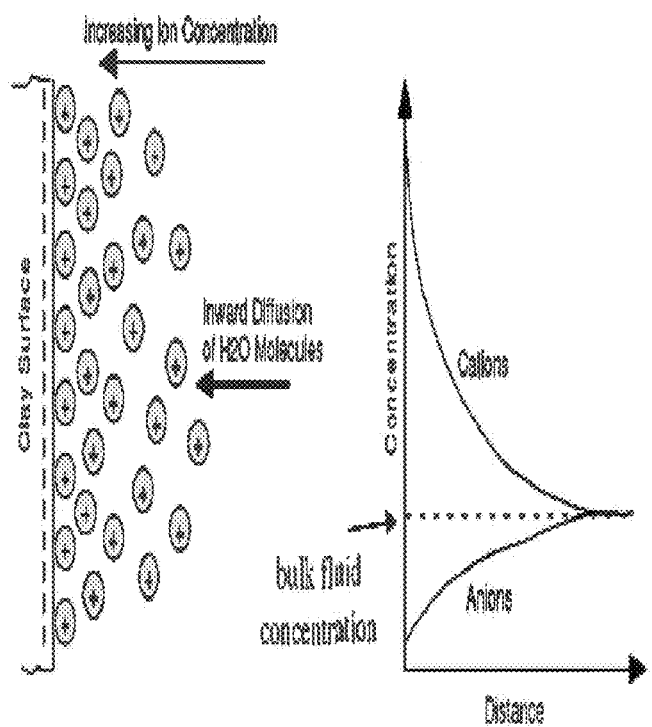
FIG. 11 is a graphical presentation of diffuse Double Layer (DDL) concept (Guoy, 1910 and Chapman, 1913).
Figure 12:
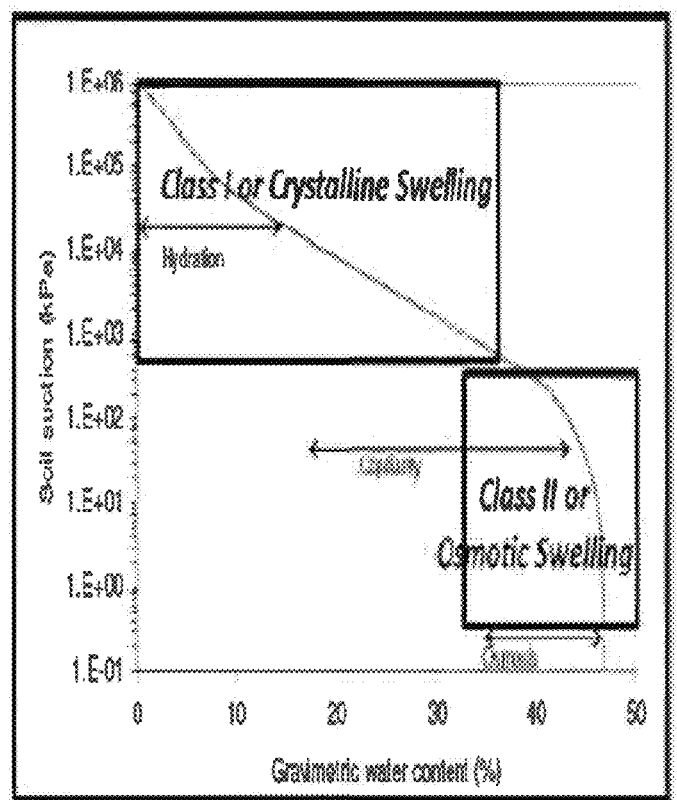
FIG. 12. is a graphical presentation of regimes of crystalline and osmotic swelling (Wayllace, 2008).
Figure 15A:
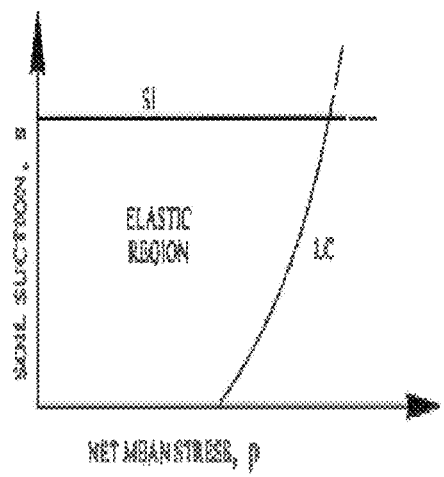
FIGS. 15A, 15B, 15C, and 15D are graphical presentations of elastic zone bounded by Load Collapse (LC) and Suction Increase (SI) curves (Alonso et al., 1990).
Figure 15B:
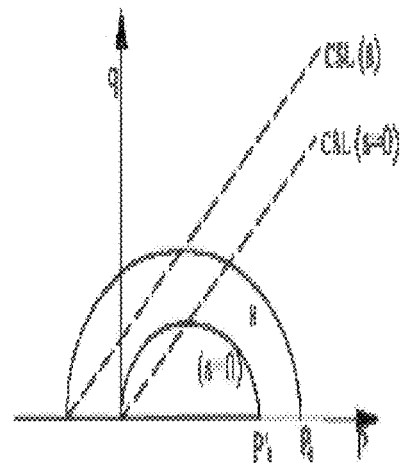
Figure 15C:
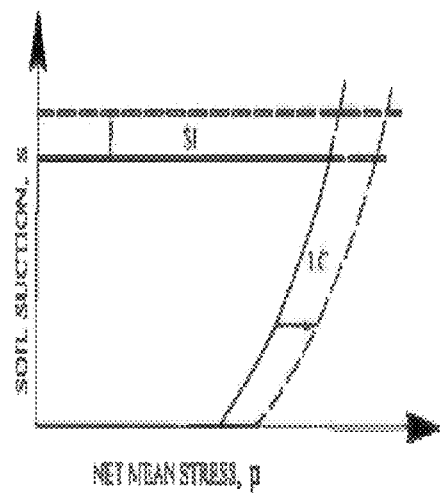
Figure 15D:
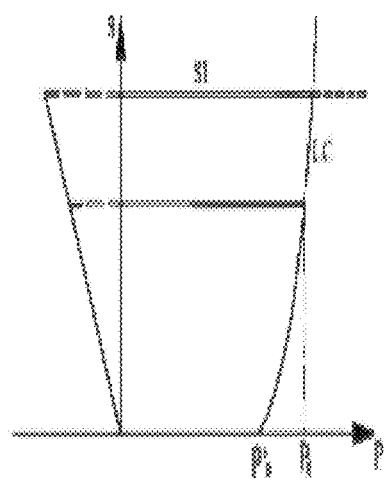
Figure 16:
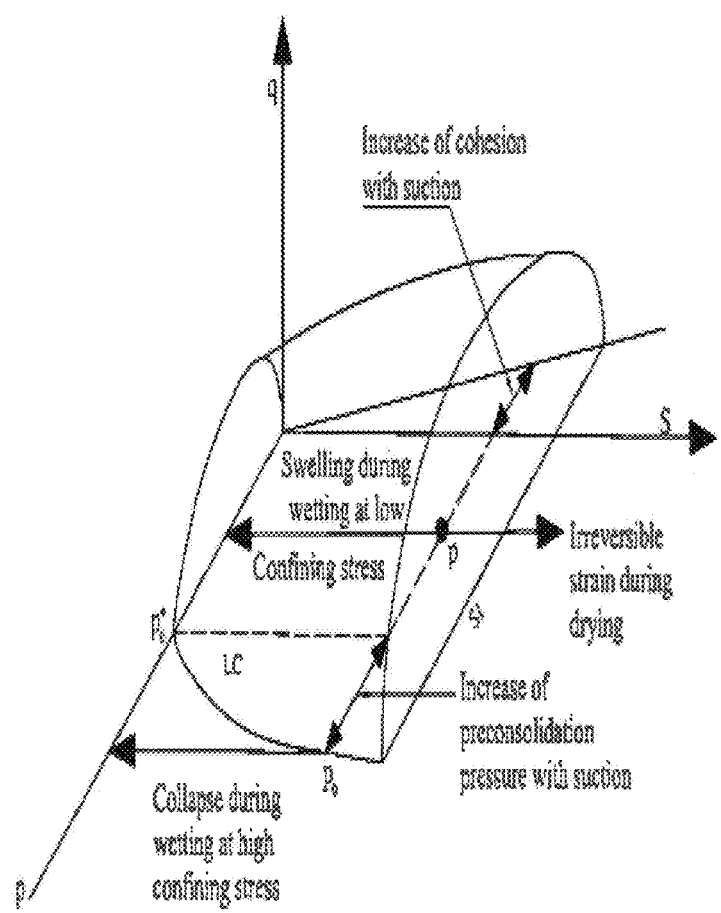
FIG. 16 is a graphical presentation of 3-D yield surfaces in p-q-s space (Alonso et al., 1990).
Figure 17:
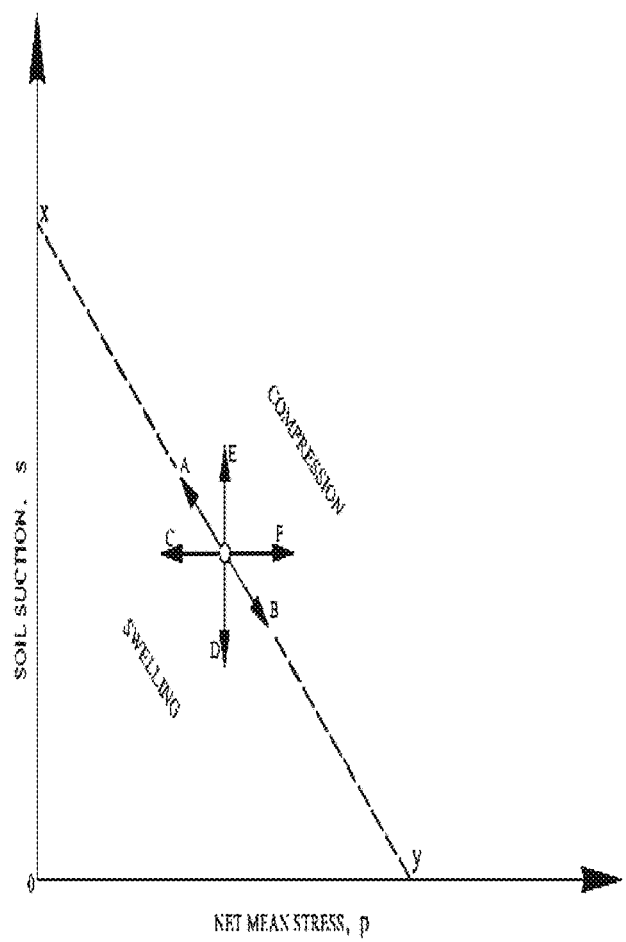
FIG. 17 is a graphical presentation of neutral line representing microstructure in the model (Gens and Alonso, 1992).
Figure 19:
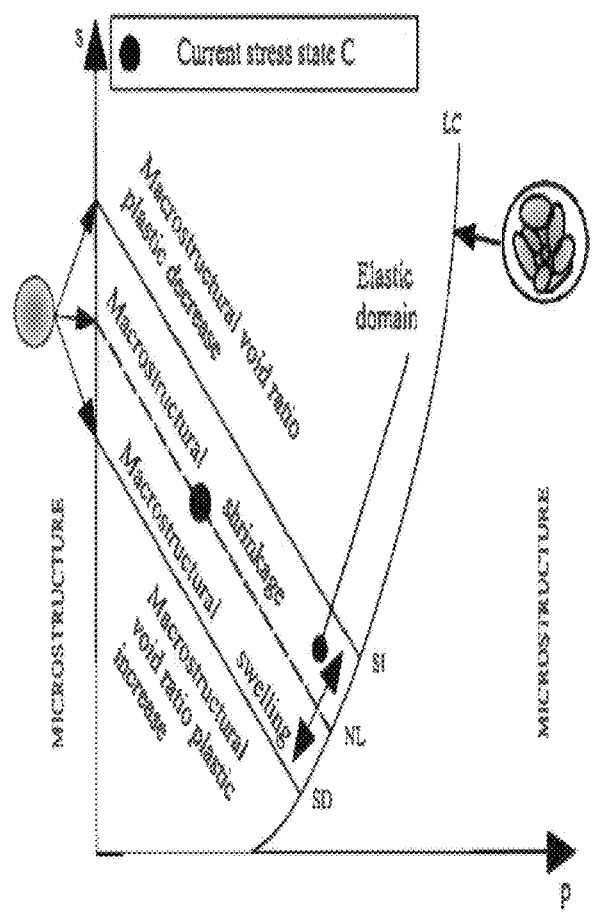
FIG. 19 is a graphical presentation of Barcelona Expansive Model (BExM) (Alonso et al., 1999).
Figure 20:
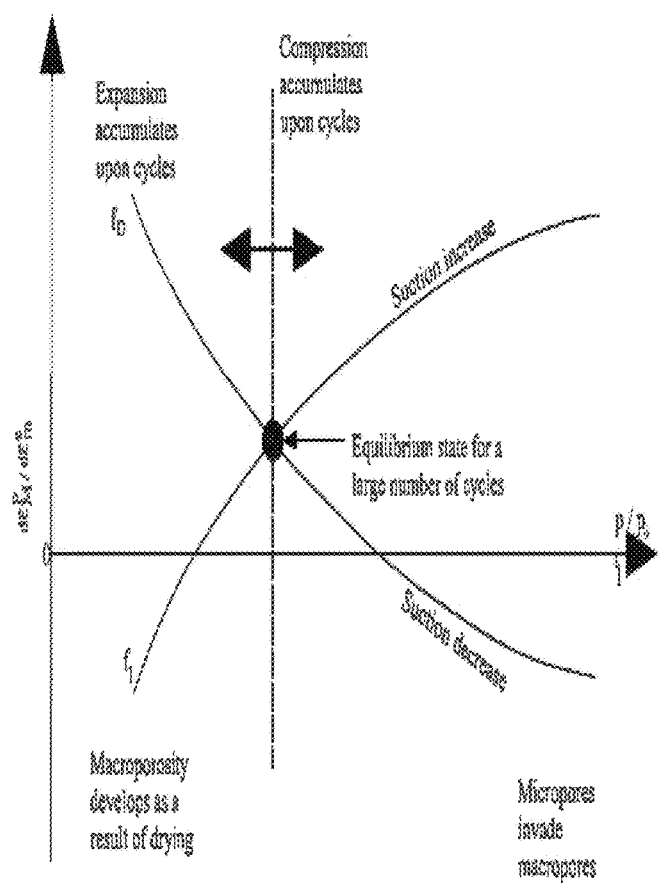
FIG. 20 is a graphical presentation of interaction and coupling functions in BExM (Alonso et al., 1999).
Figure 22:
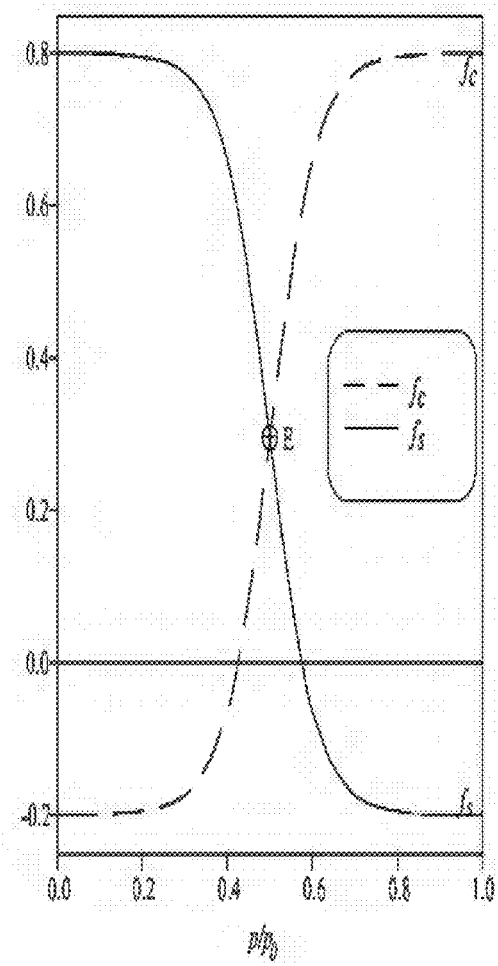
FIG. 22 is a graphical presentation of coupling functions between macro and micro structure in the model (Sanchez et al., 2005).
Figure 23:
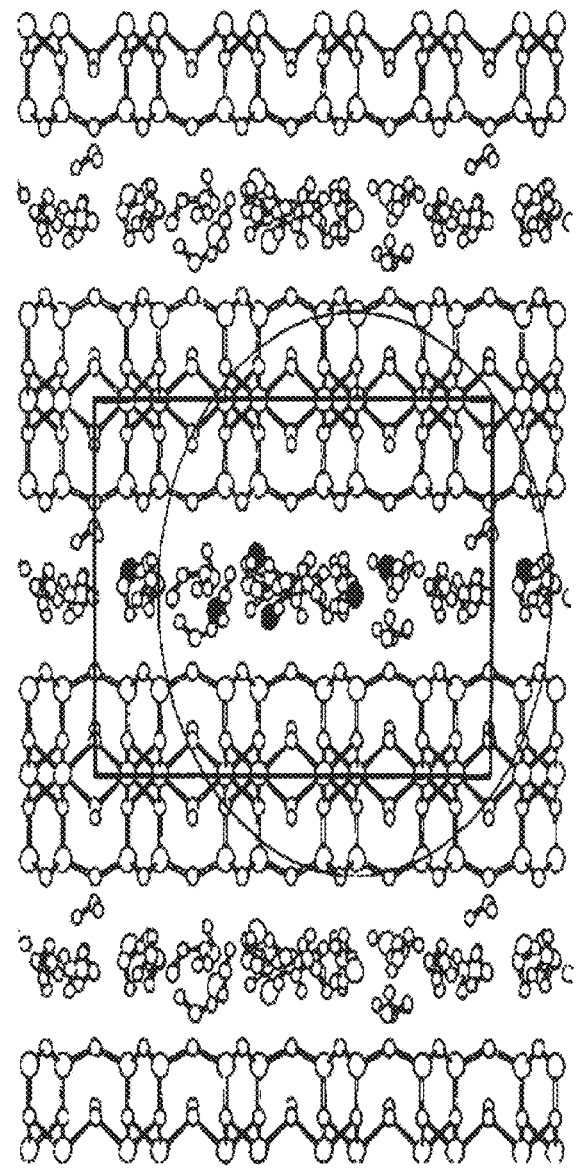
FIG. 23 is a graphical presentation of Molecular Simulation of the Hydration of Na Montmorillonite (Karaborni et al., 1996).
Figure 24:
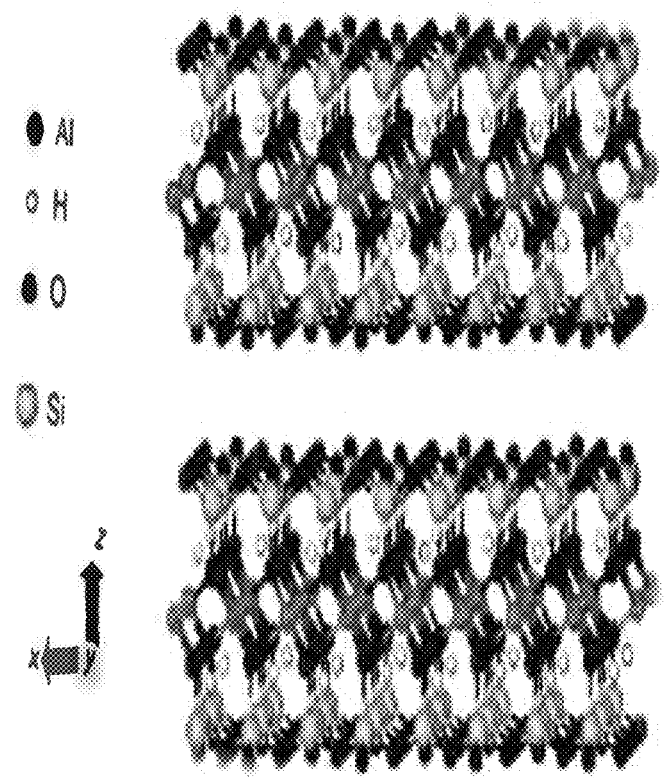
FIG. 24 is a perspective view of two pyrophyllite layers comprising 2×4 unit cells each (Katti et al., 2005).
Figure 25:
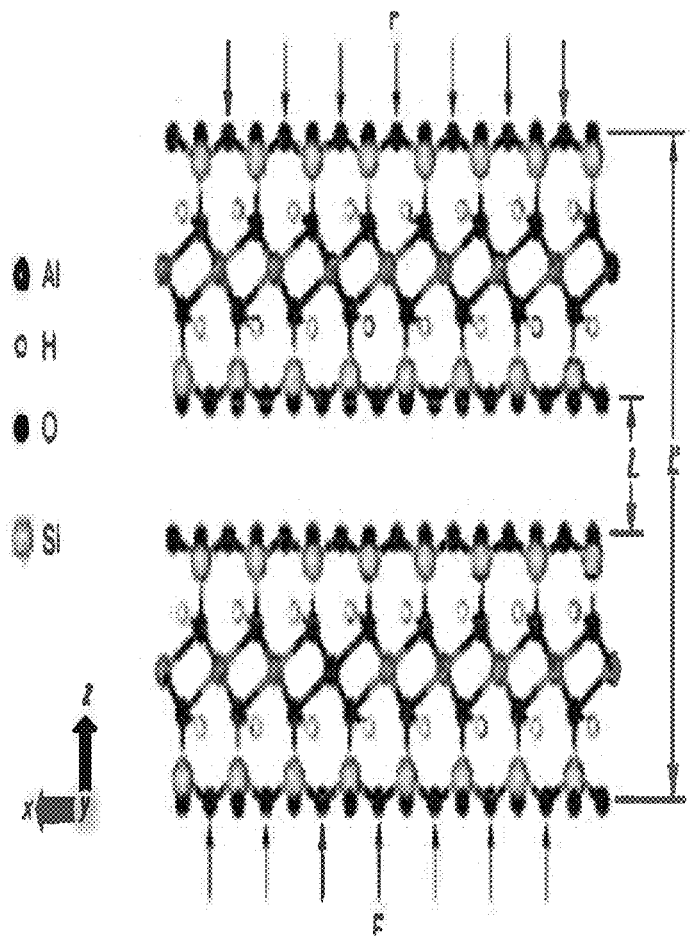
FIG. 25 is a graphical presentation of forces applied normal to the simulation cell (Katti et al., 2005).
Figure 26:
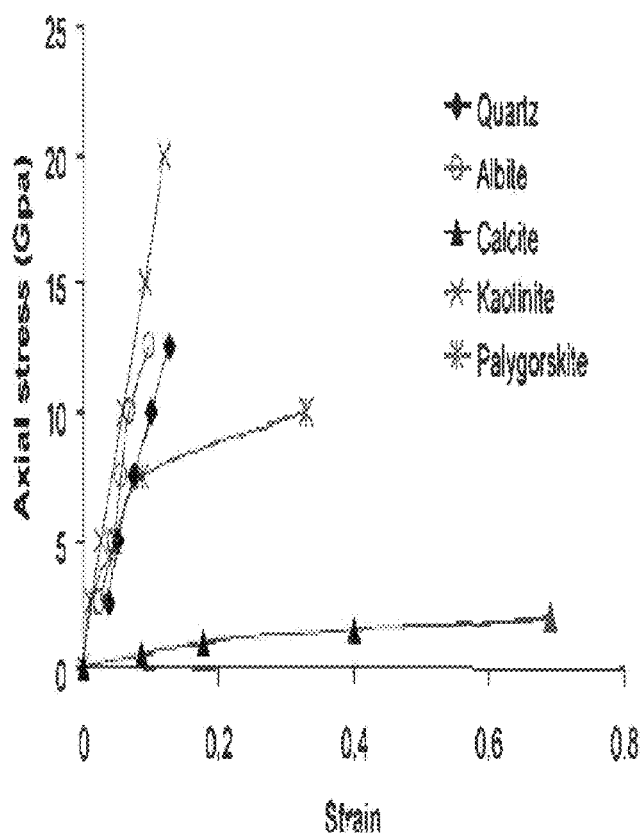
FIG. 26 is a graphical presentation of modulli values for various minerals obtained from the Nano-scale modelling (Wang et al., 2007).
Figure 27:
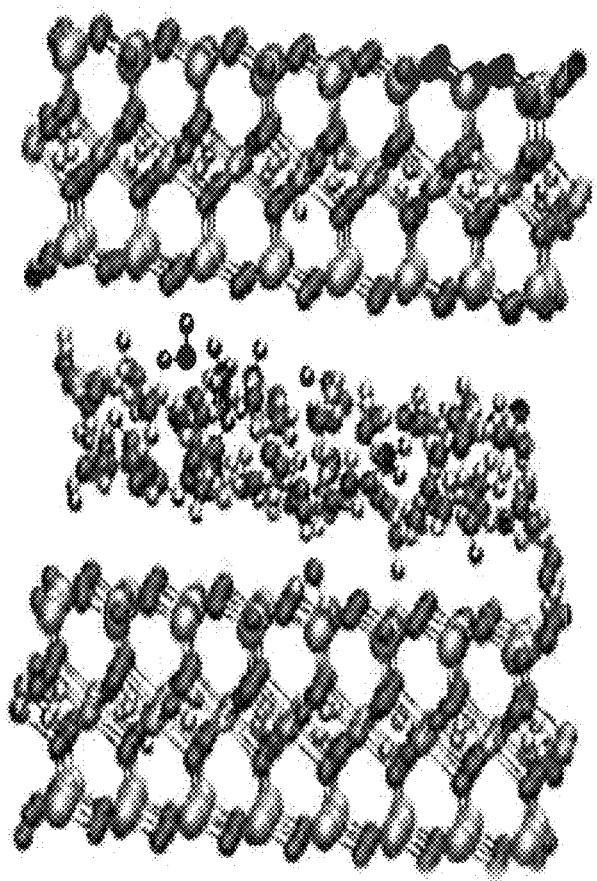
FIG. 27 is a snapshot of Na-montmorillonite with 3 water layers in the interlayer (Katti et al., 2009).
Figure 28:
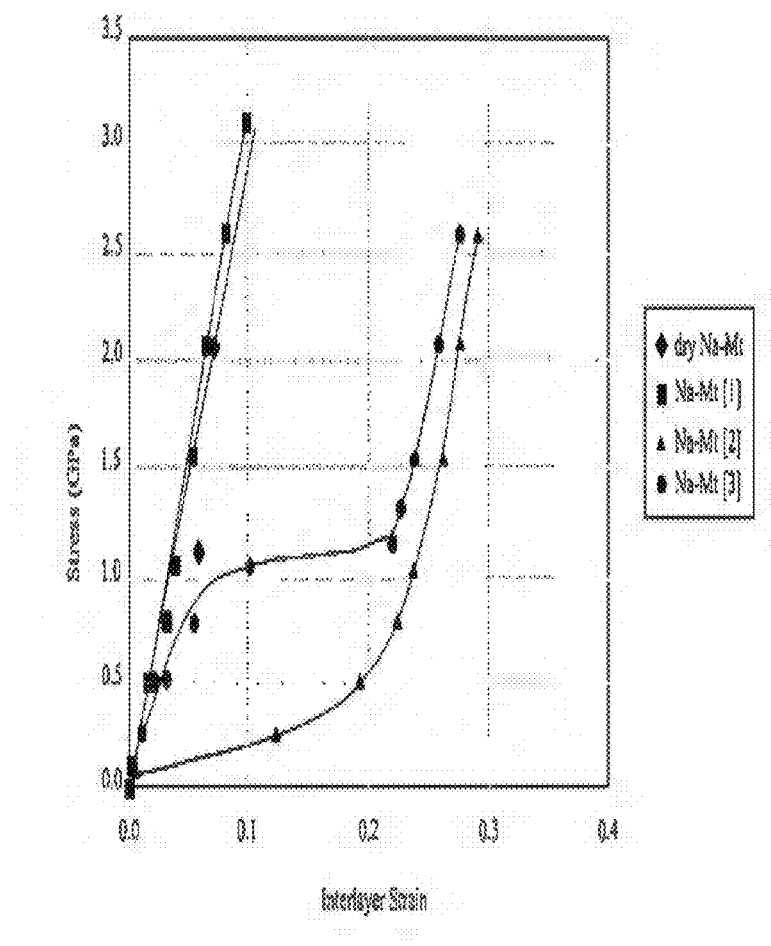
FIG. 28 is a graphical presentation of stress vs. interlayer strain plots for various level of hydration in the interlayer (Katti et al., 2009).
Figure 29:
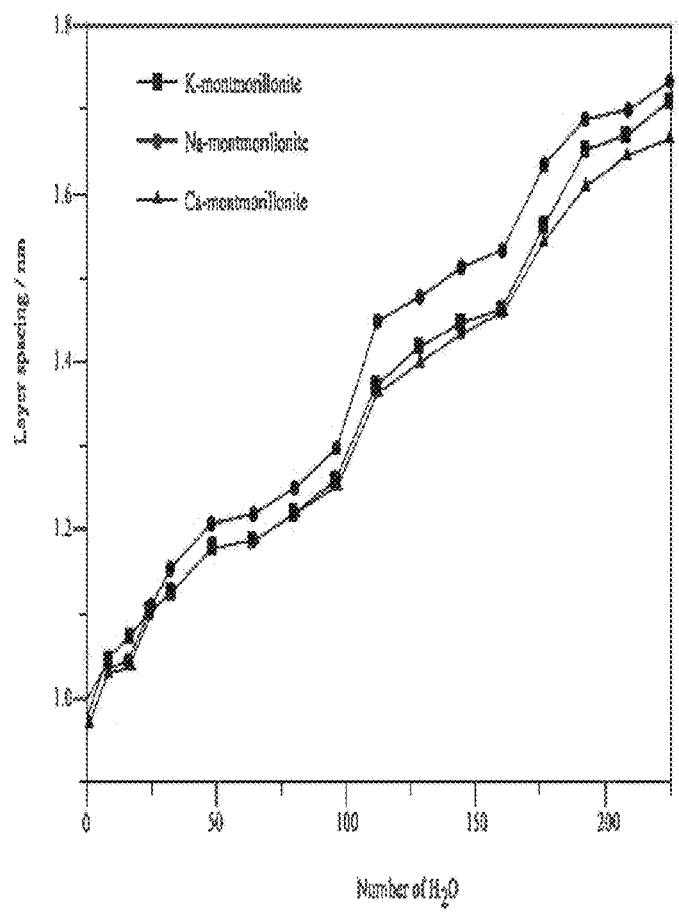
FIG. 29 is a graphical presentation of swelling curves of the potassium, sodium and calcium-montmorillonite clay showing the dependence of the layer spacing on the water molecules of the clay (Tao et al., 2010).
Figure 30:
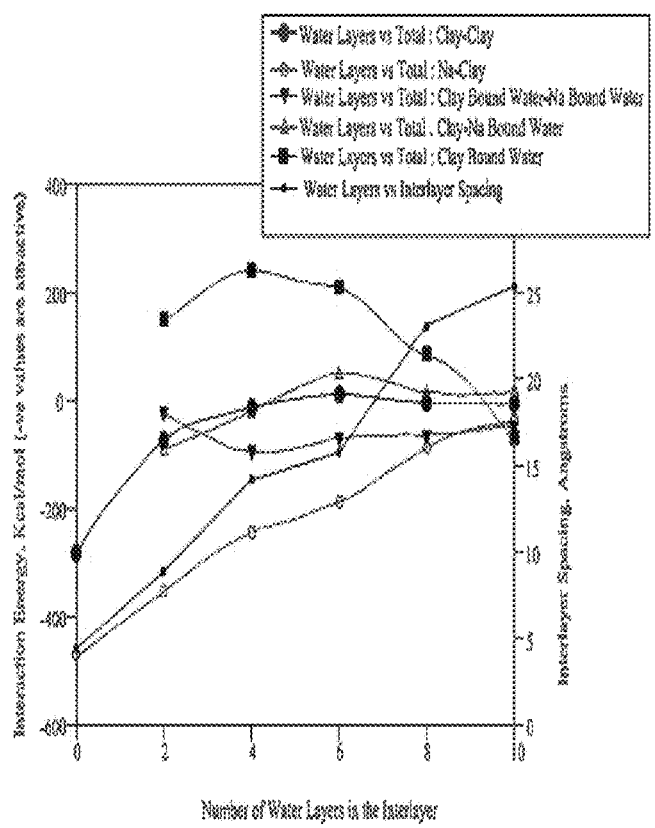
FIG. 30 is a plot of interaction energies versus number of water layers in the interlayer (Katti et al., 2011).

Specimens for the swell potential tests were prepared with various proportions of bentonite, sand, and/or gypsum, calcite, and kaolinite. Similarly, standard clays were also mixed with 40% and 70% sand and compacted to the maximum density corresponding to 1500 kPa static pressure. In order to ensure that specimens of standard clays be compacted on the dry side of OMC, it was assessed from the PL of these clay samples. Swell potential tests were carried out in general agreement with ASTM D 5890 and compacted specimens were subjected to free swell testing in the oedometer test equipment. In order to magnify the relative influence of each change in type and percentage of non-swell particles, the specimens were surcharged with a low surcharge pressure of 2 kPa and flooded with distilled water in the oedometer specimen holder. Increase in height of the specimen was recorded at regular time intervals until no further noticeable change in height of the specimen is recorded. Maximum change in the height of the specimen divided by the original height was recorded and expressed in percent swell for each tested specimen. After the swelling test, samples for moisture content were cut from the middle of the ring and rest was preserved for the post-swell micro level imaging and tests. The results of the swell tests carried out on bentonite, sand, and other inclusions are summarized in Table 9 and plotted in FIG. 22.

TABLE 9

Summary of swell potential tests results

| Sample No | Moisture Content State | NaM | CaM | Bentonite | Sand | Gypsum | Calcite | Kaolinite | Swell (%) | Initial Dry Density (g/cm$^2$) |
|---|---|---|---|---|---|---|---|---|---|---|
| 1 | Dry of OMC | — | — | 100 | — | — | — | — | 184 | 1.290 |
| 2 | Wet of OMC | — | — | 100 | — | — | — | — | 132 | 1.290 |
| 3 | Dry of OMC | — | — | 60 | 40 | — | — | — | 153 | 1.577 |
| 4 | Wet of OMC | — | — | 60 | 40 | — | — | — | 111 | 1.577 |
| 5 | Dry of OMC | — | — | 30 | 70 | — | — | — | 89 | 1.750 |
| 6 | Wet of OMC | — | — | 30 | 70 | — | — | — | 53 | 1.750 |
| 7 | Dry of OMC | — | — | 10 | 90 | — | — | — | 32 | 1.917 |
| 8 | Wet of OMC | — | — | 10 | 90 | — | — | — | 8 | 1.917 |
| 9 | Dry of OMC* | — | — | 30 | 70 | — | — | — | 123 | 1.750 |
| 10 | Dry of OMC* | — | — | 30 | 60 | 10 | — | — | 21 | 1.750 |
| 11 | Dry of OMC* | — | — | 30 | 40 | 30 | — | — | 11 | 1.750 |
| 12 | Dry of OMC* | — | — | 30 | 20 | 50 | — | — | 6 | 1.750 |
| 13 | Dry of OMC* | — | — | 30 | 40 | — | 30 | — | 74 | 1.750 |
| 14 | Dry of OMC* | — | — | 30 | 20 | — | 50 | — | 68 | 1.750 |
| 15 | Dry of OMC* | — | — | 30 | 40 | — | — | 30 | 95 | 1.750 |
| 16 | Dry of OMC* | — | — | — | — | — | — | 100 | 4 | 1.512 |
| 17 | Dry of OMC* | — | — | — | 40 | — | — | 60 | 3 | 1.828 |
| 18 | Dry of OMC* | — | — | — | 70 | — | — | 30 | 1 | 1.845 |
| 19 | Dry of OMC* | 100 | — | — | — | — | — | — | 96 | 1.436 |
| 20 | Dry of OMC* | 60 | — | — | 40 | — | — | — | 59 | 1.673 |
| 21 | Dry of OMC* | 30 | — | — | 70 | — | — | — | 25 | 1.889 |
| 22 | Dry of OMC* | — | 100 | — | — | — | — | — | 49 | 1.298 |
| 23 | Dry of OMC* | — | 60 | — | 40 | — | — | — | 18 | 1.567 |
| 24 | Dry of OMC* | — | 30 | — | 70 | — | — | — | 9 | 1.591 |
| 25 | NMC | | | | Qatif (Q-1) | | | | 29 | 1.367 |
| 26 | NMC | | | | Qatif (Q-2) | | | | 8 | 1.557 |
| 27 | NMC | | | | Hofuf (H-1) | | | | 5 | 1.507 |

| Sample No | IMC (%) | Initial Wet Density (g/cm$^2$) | FMC (%) | Final Dry Density (g/cm$^2$) | Final Wet Density (g/cm$^2$) |
|---|---|---|---|---|---|
| 1 | 29.5 | 1.67 | 136.0 | 0.45 | 1.07 |
| 2 | 39.0 | 1.79 | 174.0 | 0.56 | 1.52 |
| 3 | 19.5 | 1.88 | 93.0 | 0.62 | 1.20 |
| 4 | 26.0 | 1.99 | 103.0 | 0.75 | 1.52 |
| 5 | 11.5 | 1.95 | 72.0 | 0.93 | 1.59 |
| 6 | 18.8 | 2.08 | 82.0 | 1.14 | 2.08 |
| 7 | 5.2 | 2.02 | 18.0 | 1.45 | 1.71 |
| 8 | 13.4 | 2.17 | 22.0 | 1.83 | 2.23 |
| 9 | 12.0 | 1.96 | 108.0 | 0.79 | 1.65 |
| 10 | 12.0 | 1.96 | 56.0 | 1.45 | 2.26 |
| 11 | 12.0 | 1.96 | 27.0 | 1.58 | 2.00 |
| 12 | 12.0 | 1.96 | 19.0 | 1.65 | 1.96 |
| 13 | 12.0 | 1.96 | 80.0 | 1.01 | 1.81 |
| 14 | 12.0 | 1.96 | 66.0 | 1.03 | 1.73 |
| 15 | 12.0 | 1.96 | 115.0 | 0.90 | 1.93 |
| 16 | 23.1 | 1.86 | 27.0 | 1.45 | 1.84 |
| 17 | 13.3 | 2.07 | 16.0 | 1.77 | 2.06 |
| 18 | 8.1 | 1.99 | 11.0 | 1.83 | 2.03 |
| 19 | 3.8 | 1.49 | 87.0 | 0.73 | 1.37 |
| 20 | 10.0 | 1.84 | 50.0 | 1.05 | 1.58 |
| 21 | 8.0 | 2.04 | 25.0 | 1.51 | 1.89 |
| 22 | 1.5 | 1.32 | 90.0 | 0.87 | 1.66 |
| 23 | 16.3 | 1.82 | 42.0 | 1.33 | 1.89 |
| 24 | 11.5 | 1.77 | 33.7 | 1.46 | 1.95 |
| 25 | 7.2 | 1.47 | 55.6 | 1.06 | 1.65 |
| 26 | 5.2 | 1.68 | 40.0 | 1.44 | 2.02 |
| 27 | 3.9 | 1.57 | 29.3 | 1.44 | 1.86 |

*Static Compaction
NMC: Natural Moisture Content
IMC: Initial Moisture Content
FMC: Final Moisture Content Micro level fabric testing and visualization of the pre and post swell samples was carried out using X-ray Diffraction (XRD), Fourier Transform Infrared Spectroscopy (FTIR), Micro Computed Tomography Scan (CT), and Environmental Scanning Electron Microscopy (ESEM). XRD and CT were performed at Center of Excellence in Nanotechnology of KFUPM, while FTIR tests were conducted at the Center for Refining and Petrochemicals of the Research Institute (RI) of KFUPM. ESEM were conducted at R&D Center of Saudi Aramco at Dhahran, KSA. The main objectives achieved through this laboratory study were the soil fabric visualization, variation in interlayer spacing with change in moisture regime, assessment of crystallite size, and interaction among swelling and non-swelling soil particles in the fabric on the dry and wet side of optimum moisture content both in pre and post swell state. The molecular level information acquired from these tests was used as an input in the molecular level modeling schemes.

Pre and post swell specimens were tested for mineralogical analysis and change in interlayer/lattice space at various moisture regimes using Rigaku Miniflex II X-ray Diffraction (XRD) equipment. XRD equipment is equipped with a 40 keV X-ray tube, radiation safe enclosure, water chiller, and a monochromator.

For the testing purpose, few grams of representative specimen were taken from the corresponding samples and were pulverized/smeared to the fine powder or was used in paste form for high moisture content samples. The pulverized or paste sample was then placed in a sample holder creating a flat upper surface and assuring random distribution of lattice orientation. The specimen was subject to XRD testing from the diffraction angles $2\theta$ varying from 3° to 90°. During the test, intensity of diffracted X-rays was continuously recorded as the sample and detector rotate through their respective angles. A peak in intensity occurs when the mineral contains lattice planes with d-spacings appropriate to diffract X-rays at that value of $\theta$. The data was analyzed to determine the presence of various minerals and their approximate percentages. The XRD results are presented as peak positions at d spacings and X-ray counts (intensity) in the form of x-y plots in FIGS. 104 to 140. These plots were also used to determine the changes in lattice/d-spacing upon change in moisture content in the pre and post swell state.

Figure 33:
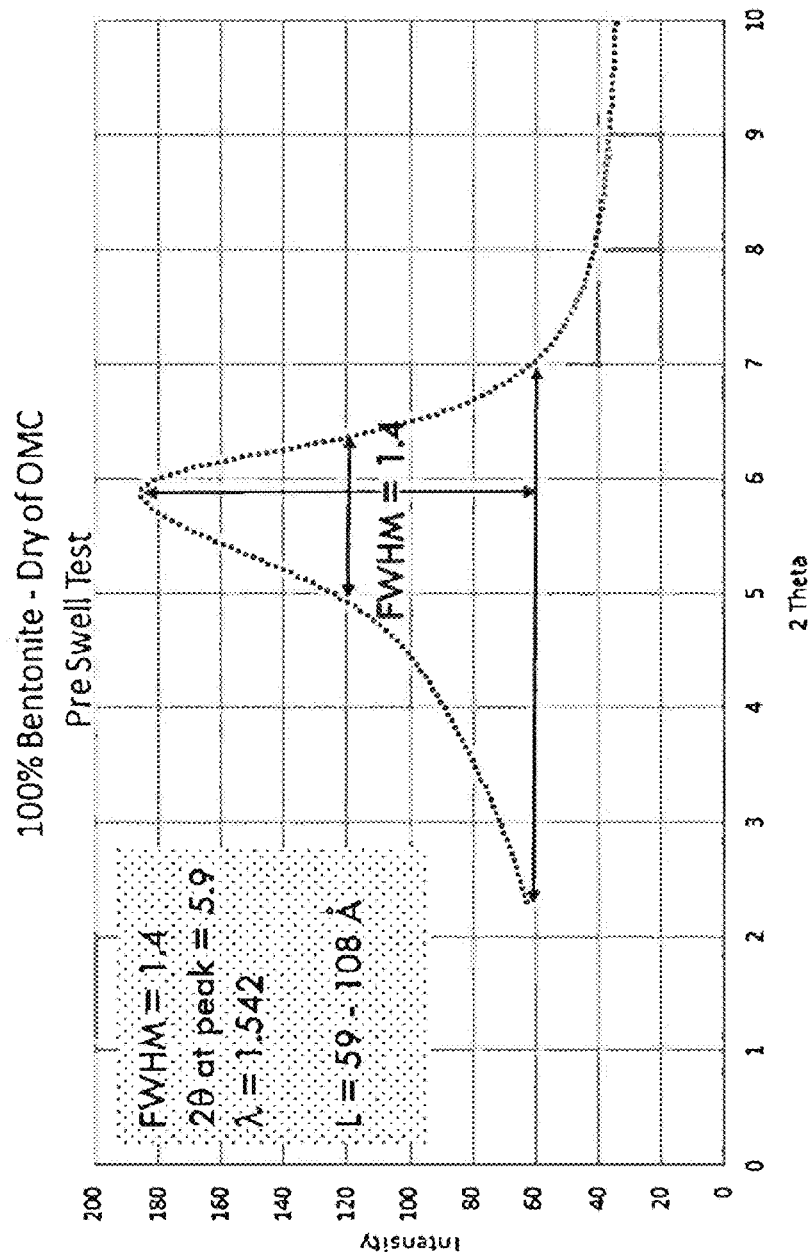
FIG. 33 is a graphical presentation of typical crystallite size determination using Scherrer (1918) method.

In addition to the knowledge of type and proportions of various minerals and the changes in the lattice spacing of clay minerals, crystallite size was also approximately assessed from XRD data. For the purpose, Scherrer method was used and procedure is shown in FIG. 33. See Scherrer, P. (1918), "Bestimmung der Grösse und der inneren Struktur von Kolloidteilchen mittels Röntgenstrahlen" Nachr. Ges. Wiss. Göttingen 26 (1918) pp. 98-100, incorporated herein by reference in its entirety. The line broadening caused by small crystal size, B, is calculated using the relation suggested by Warren (see Warren, B. E. (1941), "X-ray methods", Jour. Applied Physics 12, 375-83, incorporated herein by reference in its entirety), $$B2 = BM2 - BS2 \qquad 3\text{-}1$$

where
BM=measured montmorillonite peak breadth
BS=average measured aluminum peak breadth in radians
The Scherrer's formula relating peak breadth to crystal size is, $$D = 0.9\lambda/(B \cos \theta B) \qquad 3\text{-}2$$

where $\lambda=1.542$ Å and $\theta B$=diffraction angle at maximum intensity

Fourier Transform Infrared Spectroscopy (FTIR) was carried out using Nicolet 6700 FTIR spectrometer at Center for Refining and Petrochemicals at Research Institute (RI) of KFUPM. The equipment is equipped with OMNIC software and is capable of recording the wavelengths in the range of 400 cm-1 and 4000 nm.

For the analysis, few grams of representative sample was obtained from each of the pre and post swell samples. These samples were mixed with potassium bromide (KBr) and mixed thoroughly in a stone dish using the marble pestle. After achieving a uniform color, the mix was placed in a steel mold and the mold was compressed to form a thin slice/pellet. The pellet was carefully removed from the mold and placed in a vertical stand in the specimen chamber of the equipment. The sample holder was placed in such a way that the incident laser beam focuses on the specimen. OMNIC software is used to control the data acquisition. To exclude the other possible interferences in the sample chamber, background data is acquired using the software before placing the specimen. For each specimen, data was acquired for a wavelength range of 400 to 4000 cm$^{-1}$ The data acquired for the specimen is corrected by subtracting the background from the collected data. The data was acquired in absorbance units and the final results are presented as wavelength versus absorbance. The FTIR results are shown in FIGS. 141 to 168.

The pre and post swell samples obtained from the swell test specimens were viewed, examined, and studied using Environmental Scanning Electron Microscope (ESEM). FEI-Phillips ESEM-FEG Quanta 400 available at R&D center of Saudi Aramco was used for the purpose.

In ESEM, electron guns are used to produce a fine, controlled beam of electrons which are then focused at the specimen surface. ESEM mode in the instrument applies high pressure to ensure prevention of moisture during the test. In this study, a pressure up to 0.55 torr was used. The electron gun emits electrons from field-emission gun to produce an image representing the morphology of the sample. Moreover, it also facilitates in the spot and general elemental analysis at the selected points/surface of the specimen.

Representative sample particles/particle assemblage of the pre and post-swell specimens were placed on the copper strips pasted on the specimen holders. The specimens were scanned in the ESEM at 20 keV to acquire the high contrasting micrographs at different resolutions varying from 100× to 30,000×. Spot and general area level elemental analysis was also carried out using Energy Dispersive Spectroscopy (EDS) at the selected locations and/or areas of the specimens using 20 keV energy electron beams. EDS spectrums of several spots on the selected specimens were obtained to assess the elemental composition of the specimen. The ESEM and EDS results are presented FIGS. 169 to 202.

X-ray Computed Tomography (Micro CT) of the compacted and the natural clay samples was carried out using Micro CT SkyScan 1172 equipment. This equipment is capable of providing tomographic sections of the specimens in 2-D and 3-D with a resolution of 1 micron. The equipment is equipped with an X-ray source of 100 keV to focus on a spot size of less than 5 micron. The associated acquisition and analysis software aid in the acquisition of the data and further analyzing and presenting the data in 2-D and 3-D tomographic sections.

Cubical to cylindrical specimens of about 15 mm×25 mm in size were used for the CT scanning of the pre and post swell samples. The specimens were fixed on the sample holder placed in the sample chamber of the equipment. Through the acquisition software, the specimens were focused to scan the middle section of the specimen without any dried end effects. The specimens were scanned using X-ray energy of 72 keV and scans were obtained every 2° of the specimen. After the complete scan, data was loaded in the analysis software for display and development of tomographic sections. The raw data was reconstructed to formulate a series of tomographic sections of the entire height of the specimen. These series of sections were converted to a video form that shows the slides/slices of the variation in the X-ray attenuated sections along the height of the scanned specimen. Attenuation of the X-rays, while travelling through the specimen, is a result of several factors including density and the nature of the particles. During reconstruction of the specimen tomographic sections, each level of X-ray attenuation was designated with a different color. Colored CT sections of all the tested specimens, before and after the swell tests are shown in micro CT scan results of FIGS. 203A to 209B.

An objective of the present disclosure is to simulate and study the processes and interactions occurring at the molecular level in the natural and compacted fabrics of the expansive soils. A typical natural microstructure of expansive soils consists of clay and non-clay particles assemblages, pores varying from nano to micro level, and the water present in all these pore levels. A particle assemblage further consists of various sizes of the unit crystallites or quasi-crystals of each constituent. In the present disclosure, molecular mechanics (MM), molecular dynamics (MD), and Monte Carlo (MC) based simulation techniques were used to study the interactions between clay and non-clay particles in the presence of various combinations of interlayer and intra layer cations, anions, and water under various fabric and structure conditions. Materials Studio software (2013) have been used in this simulation study. Due to large volume of computations involved in the simulations, these calculations were carried out through the high performance computing facilities at KFUPM and King Abdullah University of Sciences and Technology (KAUST), KSA; HPC at KFUPM and NESER at KAUST were used for the purpose.

The general needs for any molecular simulation scheme are the choice of the representative crystallites, formulation of the representative unit cells with periodic boundary conditions, and running the appropriate ensemble using an applicable forcefield. The present disclosure also involved the modifications to the existing Universal force field in-built in the software to adapt it to the simulations involved in the present disclosure. The steps adopted for the formulation of unit cells and the subsequent simulations are described below.

Figure 34:
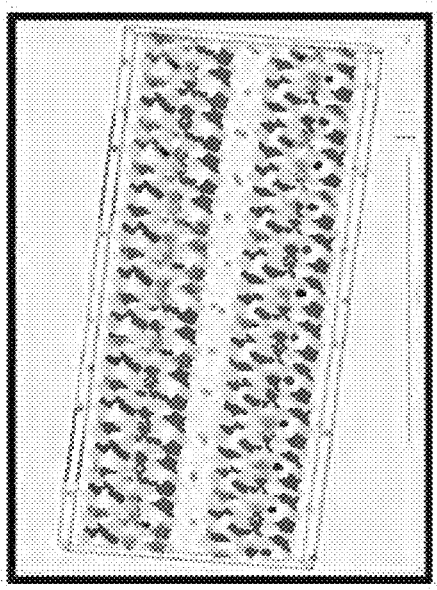
FIG. 34 is a graphical presentation of typical crystallite unit cell (26×54×20 Å) of Na-montmorillonite with CEC=90 meq/100 g.
Figure 35:
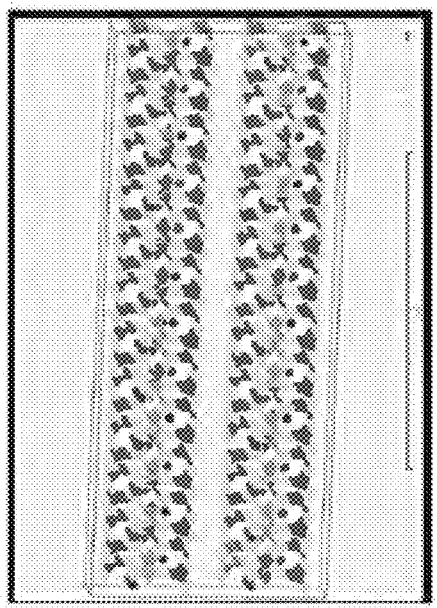
FIG. 35 is a graphical presentation of typical crystallite unit cell (26×54×20 Å) of Pyrophyllite with CEC=0.
Figure 36:
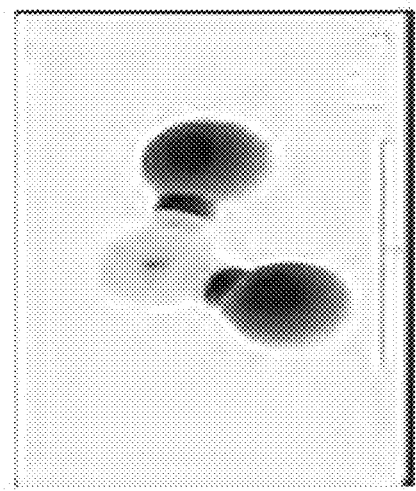
FIG. 36 is a typical view of water molecule.
Figure 37:
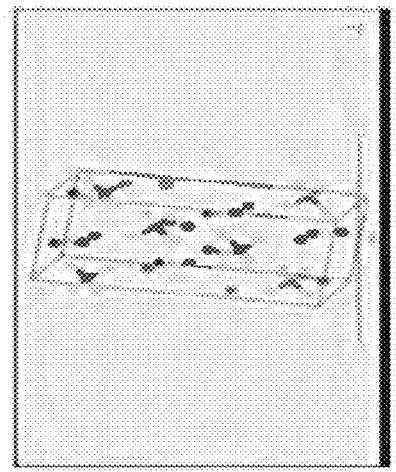
FIG. 37 is a typical view of gypsum unit cell.
Figure 38:
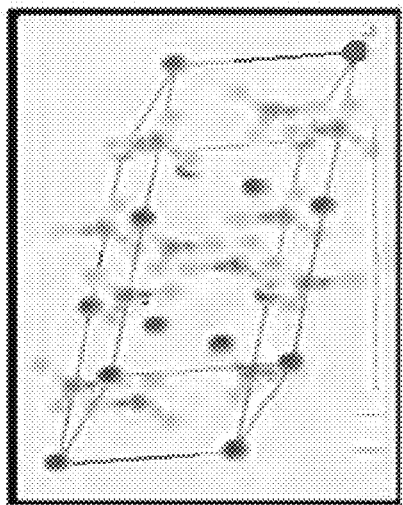
FIG. 38 is a typical view of calcite unit cell.

In order to formulate the basic unit cells of the soil fabric, individual clay and non-clay crystallites/molecules were acquired from several sources. Unit molecules used in the formulation are Na-montmorillonite of three different Cation Exchange Capacity (CEC), pyrophyllite, kaolinite, calcite (Calcium Carbonate), Calcium Sulfate (Gypsum), Potassium Chloride, and water. Most of these basic molecular units including two CEC Na-montmorillonite, kaolinite, Calcium Carbonate, and Calcium Sulfate were acquired from Nanoscale Simulation Lab at University of Akron, US (2013), while other molecules were prepared using the drafting tools of the software. See Nanoscale Simulation Lab at University of Akron, US (2013) (http://www2.uakron.edu/cpspe/dpe/web/nsl/interface-force-field-.php, incorporated herein by reference in its entirety). The molecules acquired from Nanoscale simulation lab are already in charged state and their charges were verified using charge equilibration method QEq of the Materials Studio software. Other molecules formulated in the software were charged using QEq module of the software. In order to study the relative effect of CEC on the simulation behavior, Na-montmorillonite molecules of three different CECs of 54, 90, and 144 meq/100 g were used. A typical Na-montmorillonite model with CEC of 90 meq/100 g and Na as interlayer cations is shown in FIGS. 34 and 35. In addition, pyrophyllite (CEC=0) known for its non-swell nature, was also used as a reference to verify the parameters in the simulation technique. A typical pyrophyllite crystallite is shown in FIGS. 34 and 35. In addition to the verification through pyrophyllite behavior, knowledge of several other well-known behaviors have been used to verify the parameters and other procedures adopted in the software. Calcite and gypsum unit cells and water molecule are also shown in FIGS. 36, 37, and 38.

The simulation study consisted of several steps starting from sorption of water molecules on the individual crystallite, assemblage of crystallites through natural randomness concepts, compaction to the maximum density, relaxation to simulate stress relief, and finally volume change upon sorption of water molecules in the pore spaces. The procedure is repeated for all the three CEC varied Na-montmorillonite and further variations in the exchangeable cations and the cementation due to the interactions with other soil constituents (Tables 10, 11, and 12). All the simulations as per combinations in Table 10 were carried out on Na-montmorillonite with Na as the sole exchangeable cation. MCEC Na-montmorillonite was then selected to simulate the cementation effects due to potassium chloride, gypsum, and calcite as per permutations in Table 11. LCEC montmorillonite was finally selected for the simulations by changing the type and amount of exchangeable cations as given in Table 12.

TABLE 10

Summary of various variations and combinations used in simulations for Na-montmorillonite (Na as 100% exchangeable cation).

| CEC (meq/ 100 g) | Designation | Density conditions* | Moisture conditions |
| --- | --- | --- | --- |
| 54 | LCEC | Stress relieved at 1000 kPa | 10, 20, 30, and 40% |
| 90 | MCEC | Stress relieved at 1000 kPa | 10, 20, 30, and 40% |
| 144 | HCEC | Stress relieved at 1000 kPa | 10, 20, 30, and 40% |

*compacted at 1, 0.1, and 0.01 GPa

TABLE 11

Simulation permutations of cementation agents for MCEC Na-montmorillonite.

| Cementation Agent | Percentage | Density conditions | Moisture conditions |
| --- | --- | --- | --- |
| Gypsum (CaSO$_4$•2H$_2$O) | Max 20 | Stress relieved at 1000 kPa | 10 and 30% |
| Calcite (CaCO$_3$) | Max 10 | Stress relieved at 1000 kPa | 10% |
| Potassium Chloride (KCl) | Max 10 | Stress relieved at 1000 kPa | 10% |

TABLE 12

Simulation permutations for various combinations of exchangeable cations for LCEC montmorillonite.

| Combinations | Exchangeable Cations | | | |
|---|---|---|---|---|
| | Na$^+$ | K$^2$ | Mg$^{+2}$ | Ca$^{-2}$ |
| 1 | 40 | 60 | — | — |
| 2 | 40 | — | 60 | — |
| 3 | 40 | — | — | 60 |
| 4 | 40 | 20 | 40 | — |
| 5 | 40 | 20 | — | 40 |
| 6 | 40 | 20 | 20 | 20 |

The detailed procedures involved in all these steps for a typical complete case for MCEC (90 meq/100 g) montmorillonite and one case of change in exchangeable cations in LCEC (54 meq/100 g) monlinorillonite are provided below, with the molecular simulation results shown by FIGS. 210 to 226.

The water sorption step simulates the sorption of water molecules on the individual Na-montmorillonite crystallites. It represents the processes of water mixing with the clay in the laboratory conditions or the interaction of clay particles with water during the geological depositional processes. Based on the knowledge from the literature and the findings of XRD results of the samples with similar densities on the moisture density plots in the present disclosure, a basic crystallite size of a×b×c: 26×54×20 Å was chosen as the fundamental particle/crystallite for Na-montmorillonite in the simulation.

Water molecules sorption on the individual montmorillonite crystallites were simulated using Sorption and Forcite modules of Materials Studio software. Sorption module is based on Monte Carlo simulation technique in which water molecules get sorbed on the clay particle on its surfaces, interlayer, and edges. In Sorption module, sorbate (single water molecules) is absorbed in the sorbent framework of clay molecule. Fixed loading was used to find the global minimum energy sites for the water molecules in a clay crystallite by running cycles of fixed loading simulation series where the temperature is steadily reduced over the series. Metropolis Monte Carlo method (Metropolis et al.) used in the Sorption module is a conventional Monte Carlo method in which trial configurations are generated without bias. See Metropolis, N.; Rosenbluth, A. W.; Rosenbluth, M. N.; Teller, A. H.; Teller, E. J. (1953), "cccc" Chem. Phys., 21, 1087, incorporated herein by reference in its entirety. This method was selected for the simulations as it treats the sorbate structure as rigid and only rigid body translations and reorientations are incorporated. In the sorption module, ratios for exchange, conformer, rotate, translate, and regrow have been selected as 0.39, 0.2, 0.2, 0.2, 0.2 respectively, while the corresponding probabilities are 0.39, 0.2, 0.2, 0.2, and 0.2. Amplitudes adopted for rotation and translation are 5° and 1 Å respectively. These selected parameters in Monte Carlo simulations have been verified through the findings and results of certain well known baseline facts. Facts such as formation of 3 Å thick water layers upon absorption of about 10% water and hydration radius of sodium cation have been used in the verification of the choice of the parameters.

The simulation is based on the concept of finding locations in the unit cell where water molecules would cause the maximum lowering in the energy. The water molecules get to the locations in the unit cell based on the lowering of the energy principle and the sorption is continued till an energy cut off is reached. After experimenting several energy cut off levels, 25000 steps cut off was adopted as the threshold limit for the realistic sorption. Simulation beyond 25000 steps resulted in the occupation of higher energy sites by water molecules and an unrealistically high volume change occurred. Moreover, pyrophyllite was also shown to be adsorbing water and showing high swell potential at steps more than 25000. After sorption of the water molecules in 25000 steps, equilibration was achieved in 15000 steps to a temperature of 298° K. Universal forcefield, one of the built in forcefield in the software was modified and used in the simulation and using the current charges associated with the molecules. Ewald summation method was adopted for the electrostatic forces, while atom based summation was used for van der Waals forces with cubic spline cut off at 12.5 Å. The final result of the Sorption simulation was a lowest energy frame with the water molecules sorbed at the most desired locations of the unit crystallite of montmorillonite; a typical sorption result is shown in FIGS. 39 and 40.

After performing each sorption cut off, the unit crystallite with water sorbed molecules was stabilized through molecular dynamics simulation. Forcite module of the Materials Studio software was used for the purpose. In Forcite, NPT (constant number of particles, pressure, and temperature) ensemble was used and simulations were performed using modified Universal forcefield for a period of 5 to 30 ps in 0.5 fs intervals or till a constant volume is achieved. Berendsen thermostat with a decay constant of 0.1 ps was used to control the temperature during the simulation. During the molecular dynamics simulation, temperature was kept constant at 298° K. Simulations were carried out at atmospheric pressure (100 kPa) and Berendsen barostat with decay constant of 0.1 ps was used to control the pressure of the system. Berendsen methodology was found as the most suitable for the single crystallites after several trials with other thermostats and barostats available in the software. A typical post molecular dynamics molecule is shown in FIGS. 39 and 40.

Figure 39:
FIG. 39 is a graphical presentation of typical initial water sorption in a dry MCEC Na-montmorillonite.
Figure 40:
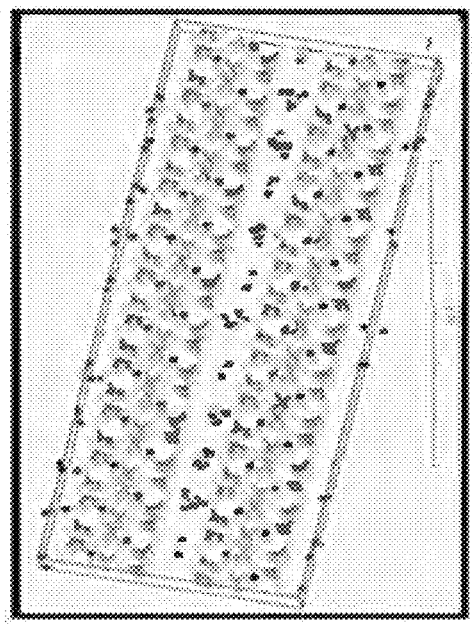
FIG. 40 is a graphical presentation of the final picture of the MCEC Na-montmorillonite after sorption of 30% water and the subsequent molecular dynamics.

As evident from FIGS. 39 and 40, water molecules are getting sorbed on the surface, edges, and the interlayer of the montmorillonite crystallite. The water sorbed in the interlayer causes the lattice expansion. The entire process of sorption and dynamics is repeated and the lattice expansion is noted with each increase in water content. A total of 277 water molecules sorption is equivalent to 10% water content of the unit crystallite of montmorillonite of 26×54×20 Å size. The simulation was continued to a maximum water content of 40%. Lattice expansion (d-spacing) for MCEC Na-montmorillonite is plotted against sorbed water content in FIG. 41. Change in lattice spacing with moisture content of the loose bentonite as determined through XRD is also plotted in FIG. 41. The verification of sorption parameters has been carried out using the pyrophyllite crystallite of the same size as Na-montmorillonite as described herein later. These water sorbed crystallites were then used to model the loose soil mix using natural randomness process through Monte Carlo simulation.

Pyrophyllite is the clay mineral in which no isomorphous substitution takes place and hence its CEC is zero. In order to verify the combination of parameters being used for the sorption of the water molecules in a montmorillonite crystallite, pyrophyllite crystallite of the same size (54×26×20 Å) was also used for the simulation. Adopting the same parameters in the sorption simulation, pyrophyllite did not show any adsorption of the water molecules.

So parameters selected for sorption module got further calibration and verification through this process.

Figure 42:
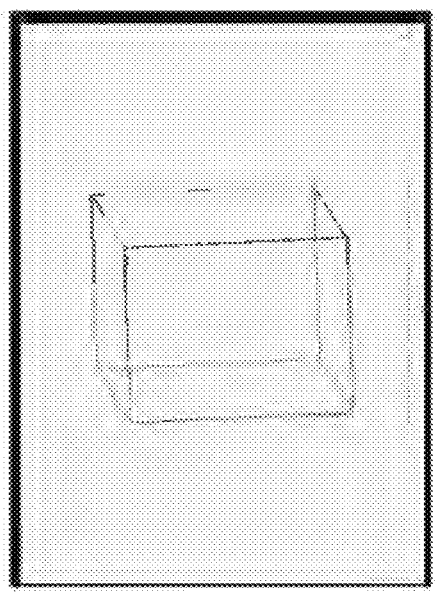
FIG. 42 is a graphical presentation of an empty unit cell (54×26×20 Å) by using Sorption module.
Figure 43:
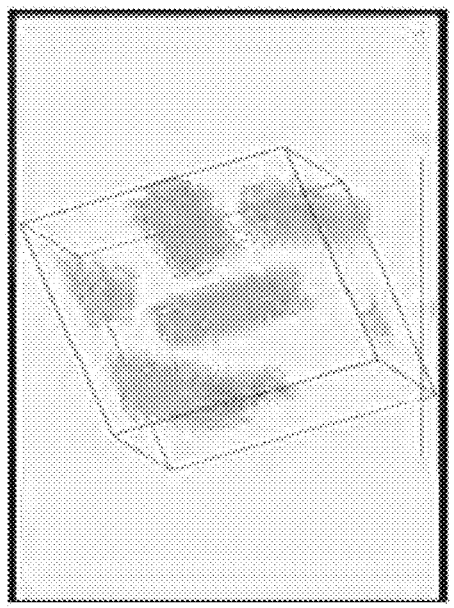
FIG. 43 is a graphical presentation of simulation of loose clay minerals mix showing four water sorbed MCEC Na-montmorillonite crystallites occupying random positions in the unit cell by using Sorption module.

Sorption module was used to simulate the assemblages of water sorbed crystallites when mixed together in the loose form before the compaction process. For the purpose, four crystallites were randomly sorbed in a 125×125×125 Å cubic unit cell (FIGS. 42 and 43). Several cubic unit cells sizes ranging from 100 Å to 200 Å were experimented and 125 Å was finally selected. Bigger unit cells resulted in distances larger than the crystallite themselves and smaller ones caused overlapping of the crystallites. Based on the randomness analogy and the parameters used in the Monte Carlo simulation in Sorption module for the single crystallite, these four crystallites occupy relative positions in the cubic space (FIGS. 42 and 43). The relative positions are taken up by the crystallites either parallel to faces, edge to edge, edge to the face, or an intermediate form depending on the charge distribution on each crystallite and the moisture content. These unit cells repeat infinitely in space with the superposition of the periodic boundary conditions. In this way, several possible fabrics during the loose mix state were created using Sorption module of the software. As a next step, simulation of the creation of the fabric and structure due to compaction was performed using molecular dynamics Forcite module as detailed below.

Figure 44:
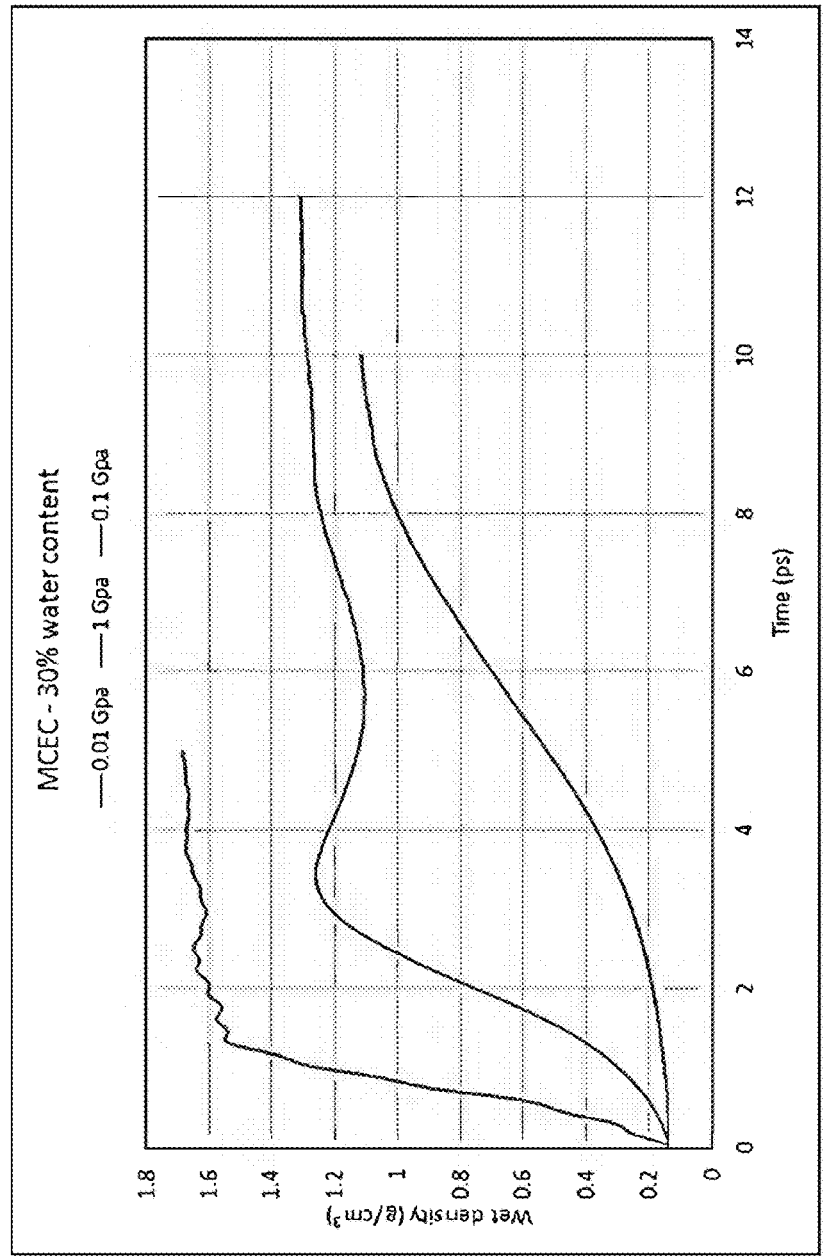
FIG. 44 is a graphical presentation of comparison of compaction to maximum density levels at different confining pressures.
Figure 45:
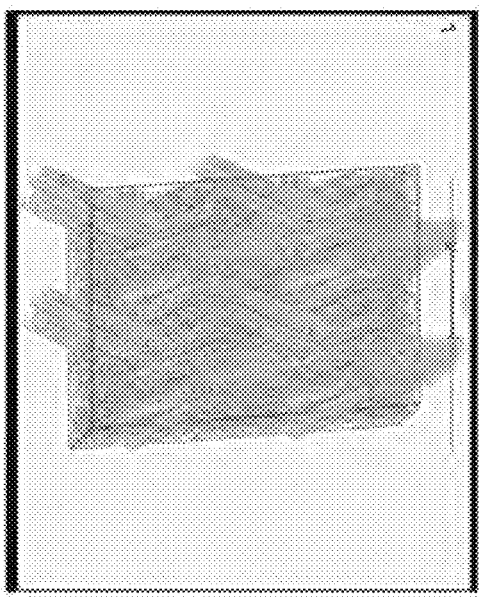
FIG. 45 is a 3-D view of multiple unit cells showing the continuity of fabric in the compacted MCEC Na-montmorillonite structure.
Figure 46:
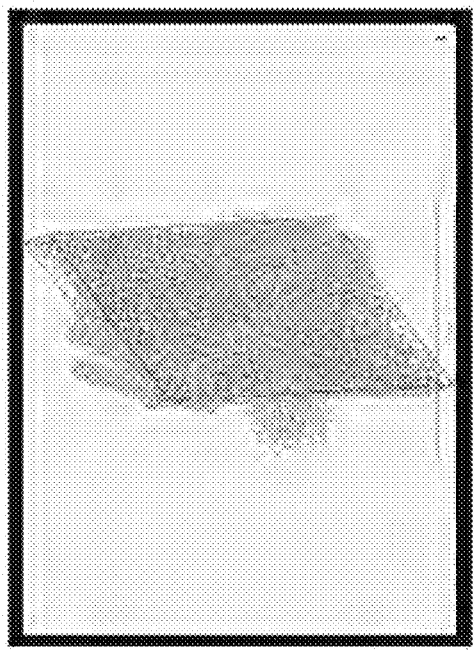
FIG. 46 is a graphical presentation of simulation of compaction process of loose crystallites showing compacted crystallites.
Figure 47:
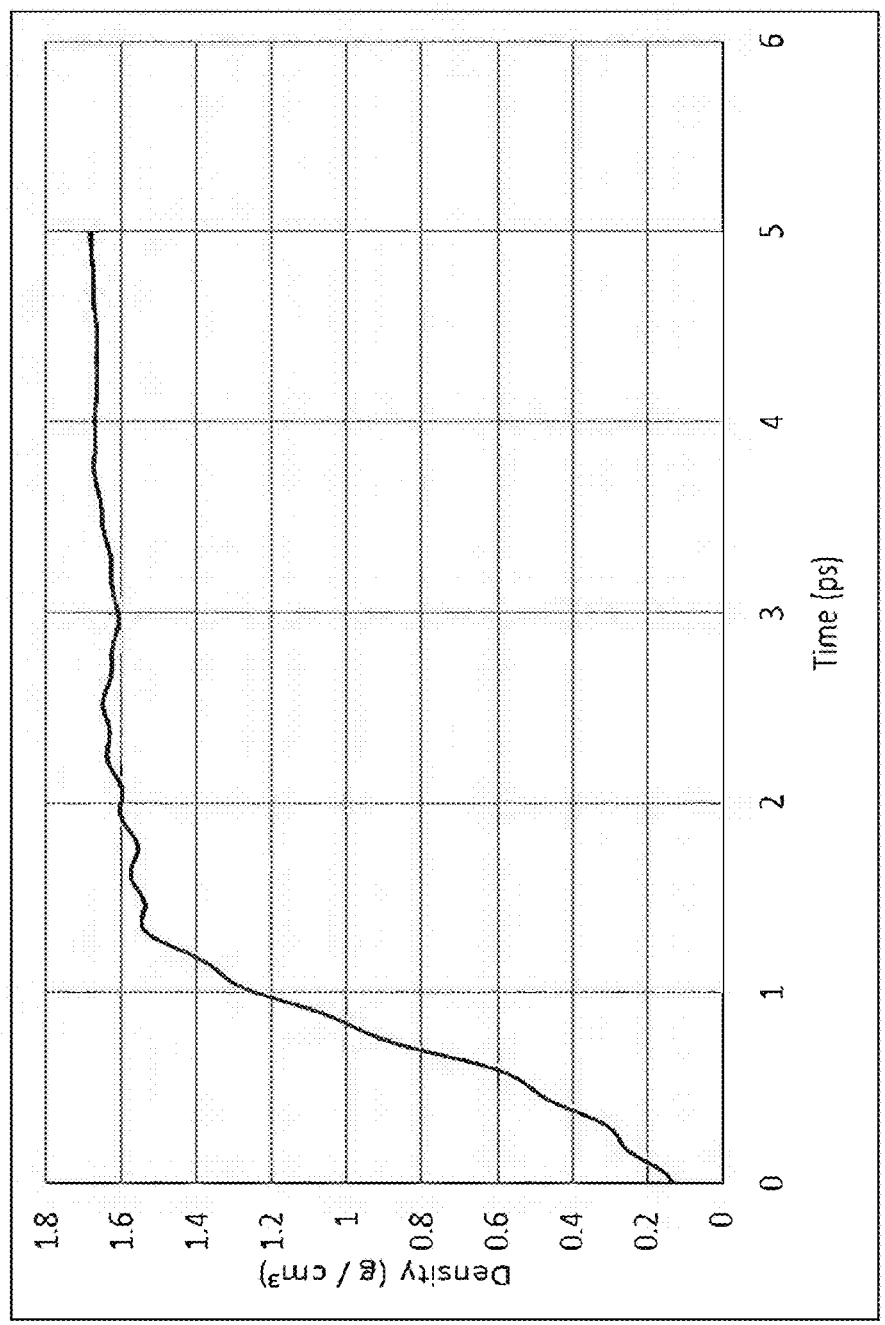
FIG. 47 is a graphical presentation of compaction curve showing density change with time.

To simulate the fabric and structure in the compacted specimens, unit cells consisting of the loose clay crystallites created in the previous step were compressed to the required density using Forcite molecular dynamics module. NPT ensemble was used to compress the unit cell to high density at different confining pressures of 0.01, 0.1, and 1 GPa. Different confining pressures were used to simulate the several levels of geological and laboratory compaction pressures. A comparison of the maximum density achievement at different pressures is shown in FIG. 44. The simulations were run to 30 ps or more at an interval of 0.5 fs to achieve the maximum density. In this simulation, Berendsen thermostat was used as in Sorption module, while Berendsen barostat was replaced by Parrinello barostat. As Berendsen barostat applies pressure in all the directions in such a way to keep the unit cell dimensions equal, the corresponding reduction of volume on all the faces of the periodic boundary cell remains uniform. Thus, Berendsen barostat does not simulate the real compaction process in which stresses vary along the faces under a uniform pressure compaction process. The dynamics compaction simulation was continued until a maximum density is achieved. A 3-D view of several combined unit cells in FIG. 45 provide a clear visualization of the created fabric. The compacted unit cell and the corresponding compaction curve is shown in FIGS. 46 and 47.

To simulate the overconsolidation process by the removal of geological overburden, next step in the simulation process was the relaxation of the compacted structure at low confining pressure and is detailed below.

Figure 48:
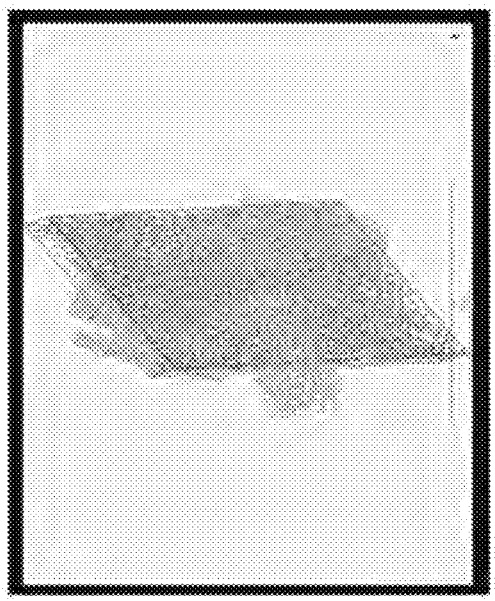
FIG. 48 is a graphical presentation of simulation of stress relief (overconsolidation) showing expanded MCEC Na-montmorillonite structure against a stress relief of 0.001 GPa.
Figure 49:
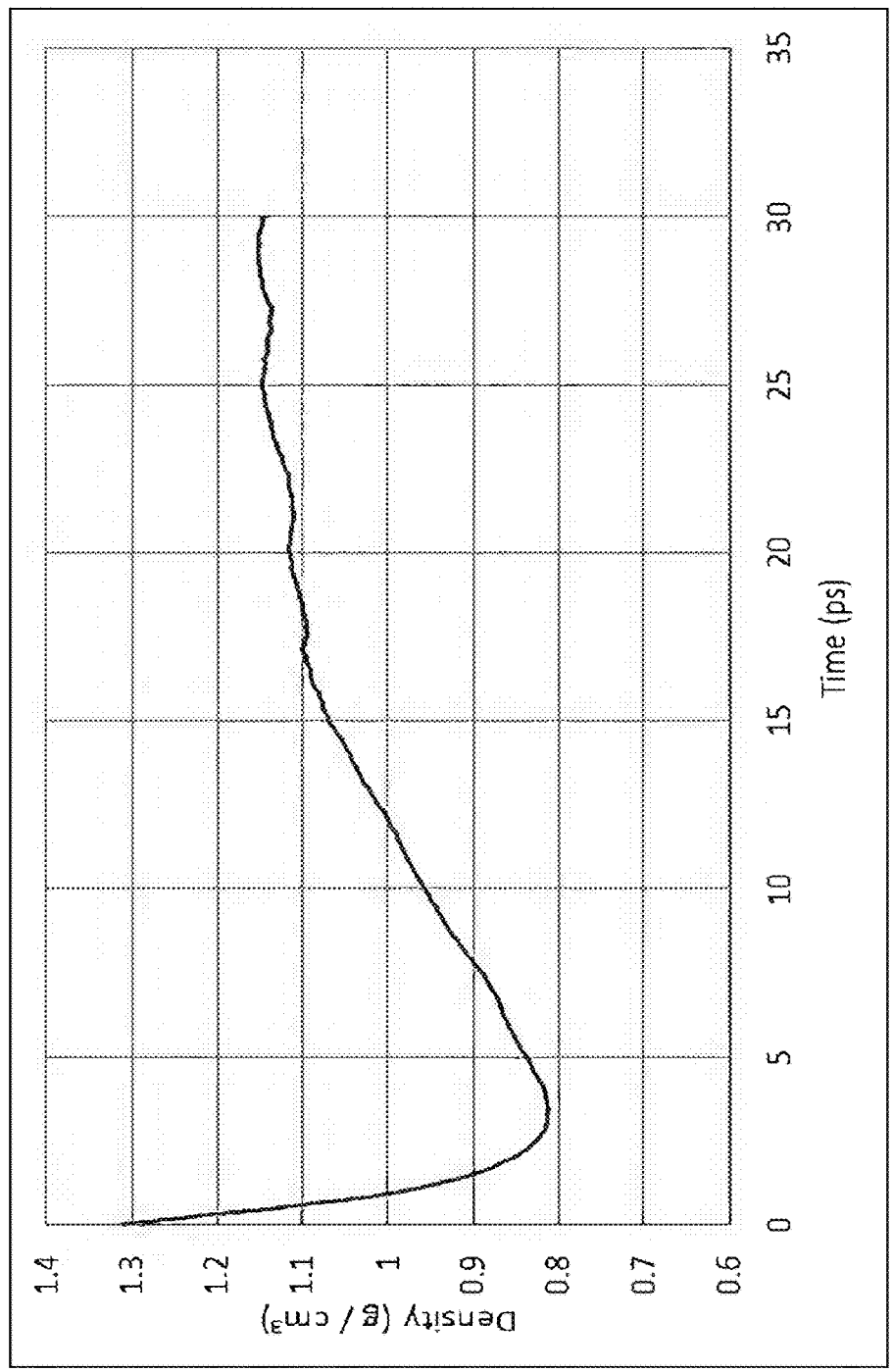
FIG. 49 is a graphical presentation of density change during the stress relief process.

Expansive clay deposits present at shallow subsurface level have suffered a stress relief due to removal of high geological pressures initially responsible for the creation of highly compacted soil structure. This process causes overconsolidation in the compacted expansive clay layers. To simulate the process of overconsolidation on the compacted unit cell, dynamics through Forcite module of the software was used at a confining pressure of 0.001 GPa. Due to a representative overconsolidation pressure in most of the expansive clay deposits in the area, a confining pressure of 0.001 GPa has been selected as the confining pressure for the relaxation simulation. The relaxed structure of the unit cell after the dynamics simulation and the corresponding relaxation curve is shown in FIGS. 48 and 49. The stress relaxed unit cell is now ready to be simulated for the water intake and the corresponding simulation of the swell/volume change behavior. The details of water sorption in the pores of the unit cell and the volume change behavior simulation is provided below.

Figure 50:
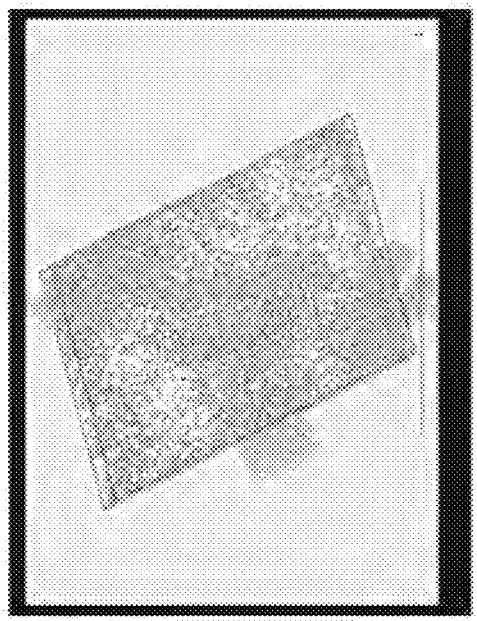
FIG. 50 is a graphical presentation of water sorption simulation in a stress relaxed MCEC Na-montmorillonite using Sorption module.

The stress relaxed unit cell was sorbed with water molecules in the intra and interlayer of the crystallites/particles using sorption module of the software. A maximum number of 25000 steps for the sorption of water molecules were used to apply the energy cutoff. FIG. 50 shows the sorbed water molecules in the stress relaxed cell.

Figure 51:
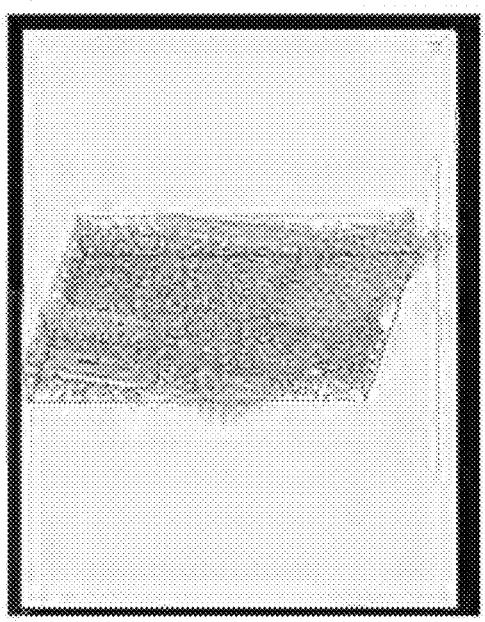
FIG. 51 is a graphical presentation of swelling simulation of water sorbed MCEC Na-montmorillonite showing the expanded structure.
Figure 52:
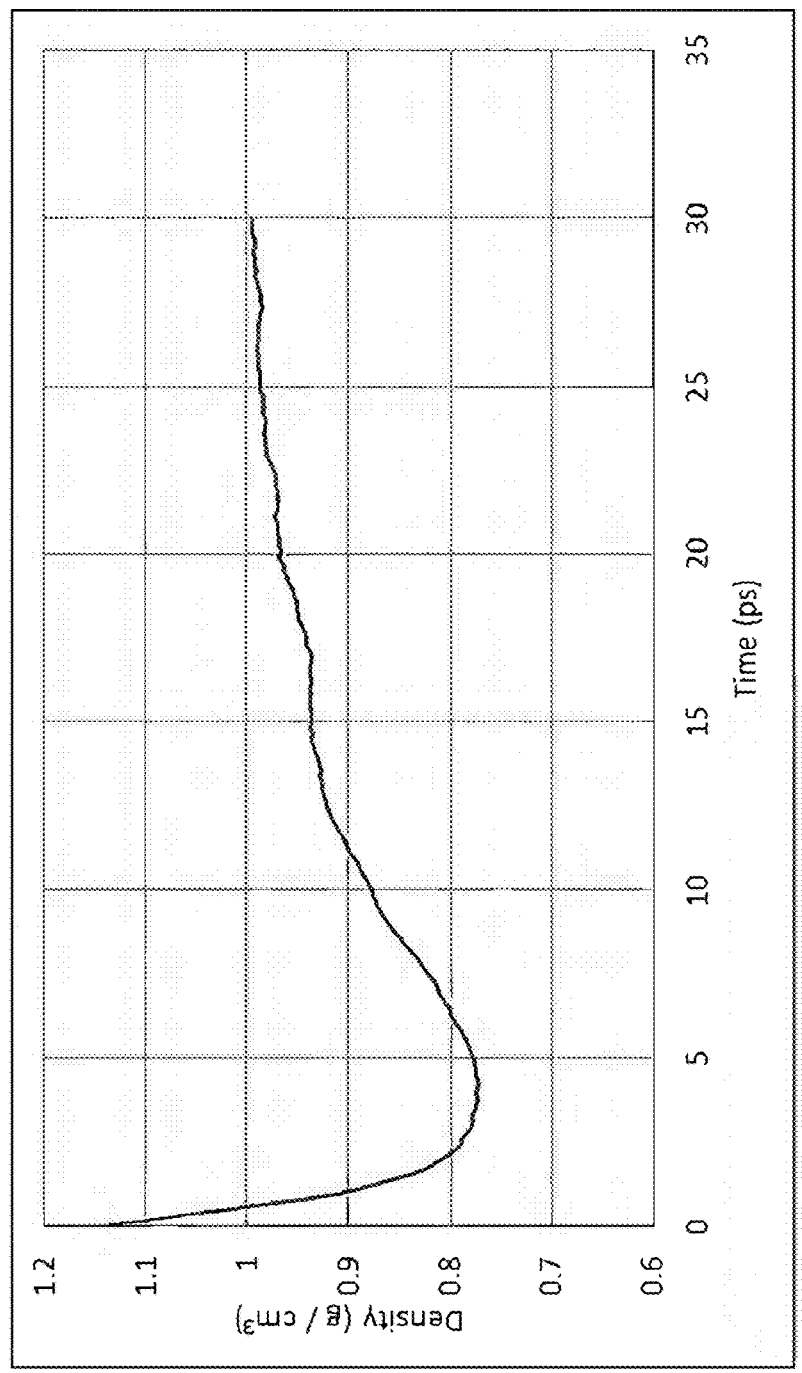
FIG. 52 is a graphical presentation of the swelling curve derived from the swelling simulation according to FIG. 51.

Upon the completion of sorption step, dynamics was performed on the water sorbed unit cell. The dynamics was continued until a stabilized volume/density is obtained. The unit cell after the volume change process simulated through dynamics and the corresponding volume change curve are shown in FIGS. 51 and 52.

Figure 53:
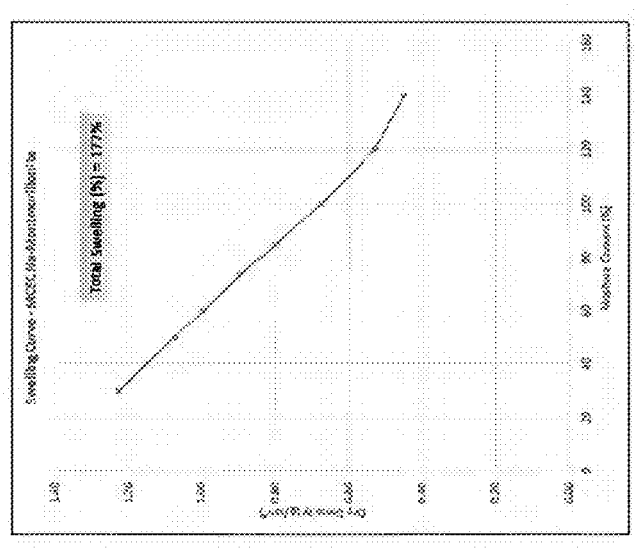
FIG. 53 is a graphical presentation of swelling versus moisture content plot for MCEC Na-montmorillonite compacted at an initial moisture content of 30%.

The process of water molecules sorption and the subsequent dynamics leading to a stabilized volume was repeated until a dry density of 0.5 g/cm$^3$ was obtained. A dry density of 0.5 g/cm$^3$ is considered a terminal point for the swelling process. Equivalently, this can also be determined once cohesive energy density of 6×10$^8$ J/m$^3$ is reached during the dynamics simulation process. In the present disclosure, cohesive energy density concept is applied to the behavior of expansive clays and has been used for the volume change model formulation. Volume change versus water content curve for MCEC Na-montmorillonite with initial moisture content of 30% is shown in FIG. 53.

In addition to the simulations with Na-montmorillonite, simulations were also carried out using other inclusions resulting in the cementation/cohesion effects. The simulations considering these variations are discussed below.

Figure 54:
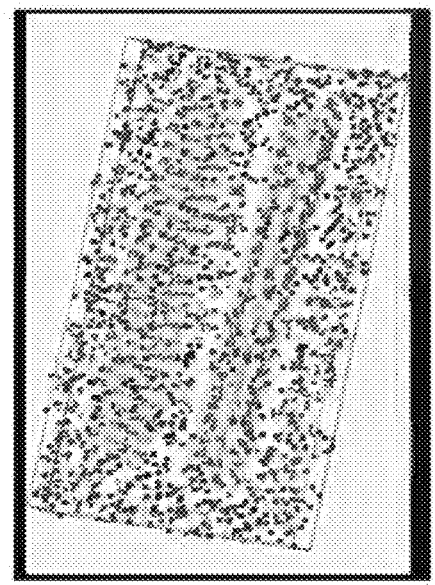
FIG. 54 is a graphical presentation of adsorption of $Ca^{2+}$ and $SO_4^{2-}$ on the individual clay crystallite.
Figure 55:
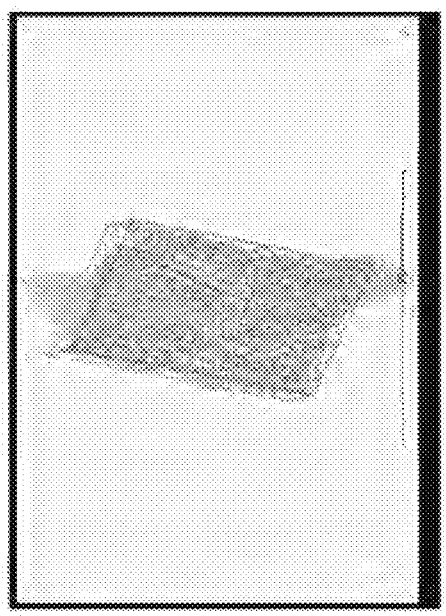
FIG. 55 is a graphical presentation of final fabric of the compacted four crystallites unit cell after swelling simulation according to FIG. 54.

In addition to the presence of non-clay inclusions in the expansive clay deposits as an inert materials, gypsum, calcite, and other salts are also responsible for the cementation/cohesion among the clay particles. In order to simulate this process, individual atoms/molecules such as $Ca^{2+}$, $SO_4^{2-}$, $K^+$, $Cl^-$, and $CO_3^{2-}$ were sorbed in the water bearing montmorillonite crystallites. For the purpose, 10% water was sorbed onto the montmorillonite crystallite with a CEC of 90 meq/100 g. Sorption of 10% water was performed in order to create a media in which other minerals can get dissolved. To simulate the dissolution of gypsum in the sorbed water layer, $Ca^{2+}$ and $SO_4^{2-}$ were sorbed in and around the crystallite using Sorption module of the software. About 20% Gypsum was added to the clay crystallite, creating an envelope of $Ca^{2+}$ and $SO_4^{2-}$ around the molecule (FIGS. 54 and 55).

Similarly to simulate the adsorption of potassium chloride and calcite in the sorbed water of clay crystallite, $K^+/Cl^-$ and $Ca^{2+}/CO_3^{2-}$ were respectively sorbed using the Sorption module of the software. These processes led to the formulation of the individual crystallites containing the respective molecules.

Rest of the procedure including the simulation of loose mix of crystallites, compaction, stress relief, water sorption, and the swelling is same as described above for the MCEC Na-montmorillonite. The final unit cell after swelling simulation for the Gypsum sorbed case is shown in FIGS. 54 and 55. A swell cutoff selected for these cases is the quantity of water adsorbed in any single step. Water sorption as low as 2.0 to 4.0% is indicative of extremely small size of pores and the corresponding extremely low permeability. Therefore, such low values of water adsorption are practically not possible in such highly densified/cemented mass of expansive clay structure. Rest of the simulation results using potassium chloride and calcite are shown in FIGS. 210 to 226.

All the above simulations were carried out using montmorillonite having sodium as the only exchangeable cation. To study the influence of varying types and proportions of the exchangeable cations, LCEC montmorillonite was subjected to changes in the types and numbers of exchangeable cations. For this purpose, $Na^+$ cations in LCEC montmorillonite were partially replaced with $K^+$, $Mg^{2+}$, and $Ca^{2+}$ cations as per the permutations in Table 12. Rest of the process followed for such cases was the same as adopted for MCEC Na-montmorillonite described earlier. The results for various exchangeable cations combinations by molecular simulation are shown by FIGS. 210 to 226.

The concepts of cohesive energy and cohesive energy density were first introduced into the theoretical treatment of mixtures by Hildebrand (1916, 1919, 1933, 1970) and Scatchard (1931). See Hildebrand, J. H. (1916), "Solubility", J. Am. Chem. Soc., 38, 1452; Hildebrand, J. H. (1919), "Solubility 111. Relative Values of Internal Pressures and their Practical Application", J. Am. Chem. Soc., 41, 1067; Hildebrand, J. H., Scott, R. L. (1933), "Solubility of Non-Electrolytes" 3rd Edition, Reinhold: New York; Hildebrand, J. H., Prausnitz, J. M., and Scott, R. L. (1970), "Regular and Related Solutions", van Nostrand: New York; Scatchard, G. (1931), "Equilibria in Non-Electrolyte Solutions in Relation to the Vapor Pressures and Densities of the Components", Chem. Rev., 8, 321, each incorporated herein by reference in their entirety. In their theories, the cohesive energy is used to estimate the energy change on mixing two species. When supplemented with the entropy of mixing it allows the prediction of the phase behavior of simple mixtures.

The cohesive energy density concept is used first time in the present disclosure in relating the swelling behavior of expansive clay minerals to the various variants such as moisture, density, CEC, type, and proportion of exchangeable and total cations etc. Cohesive energy is indicative of how strongly the molecules/crystallites are coherent with each other due to the inherent CEC or cementation effects. The higher the cohesive energy density of the expansive clay structure, the lesser the swelling potential of the clay minerals. A swell cutoff selected for these cases is the quantity of water adsorbed in any single step. Water sorption as low as 2.0 to 4.0% is indicative of extremely small size of pores and the corresponding extremely low permeability. Therefore, such low values of water adsorption are practically not possible in such highly densified/cemented mass of expansive clay structure. Moreover, swell cutoff for these cases also derives from the fact that swell will take place for the cohesive energy density corresponding to its original counterpart (without cementation and with Na cations only). Using these both concepts, swell potential was evaluated for these cases.

Figure 56:
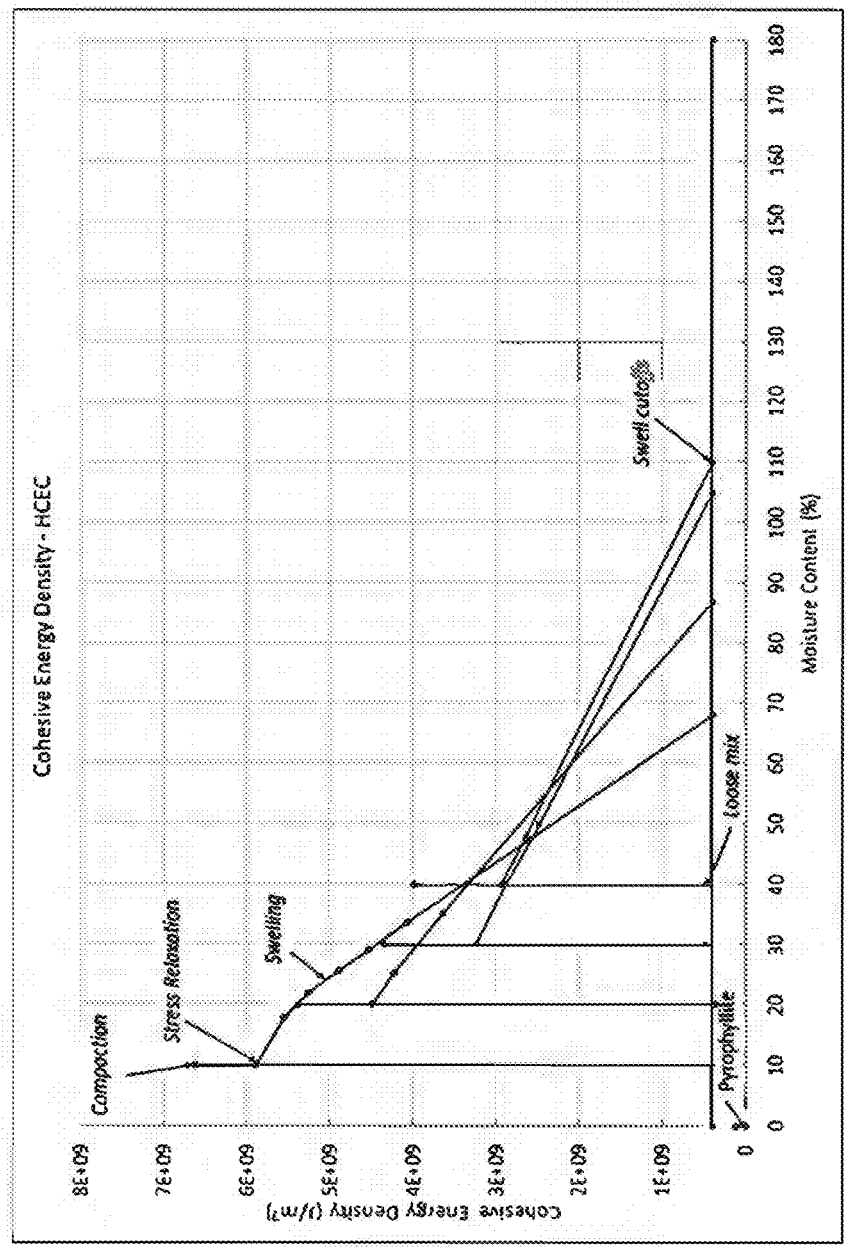
FIG. 56 is a graphical presentation of variation of cohesive energy density with moisture and density conditions for HCEC Na-montmorillonite.
Figure 57:
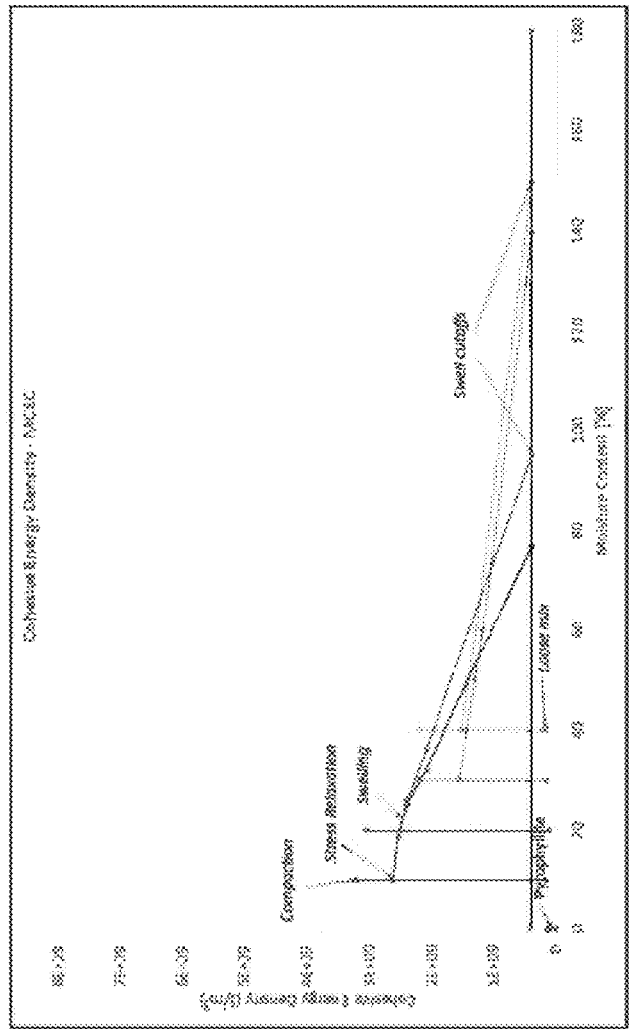
FIG. 57 is a graphical presentation of variation of cohesive energy density with moisture and density conditions for MCEC Na-montmorillonite.
Figure 58:
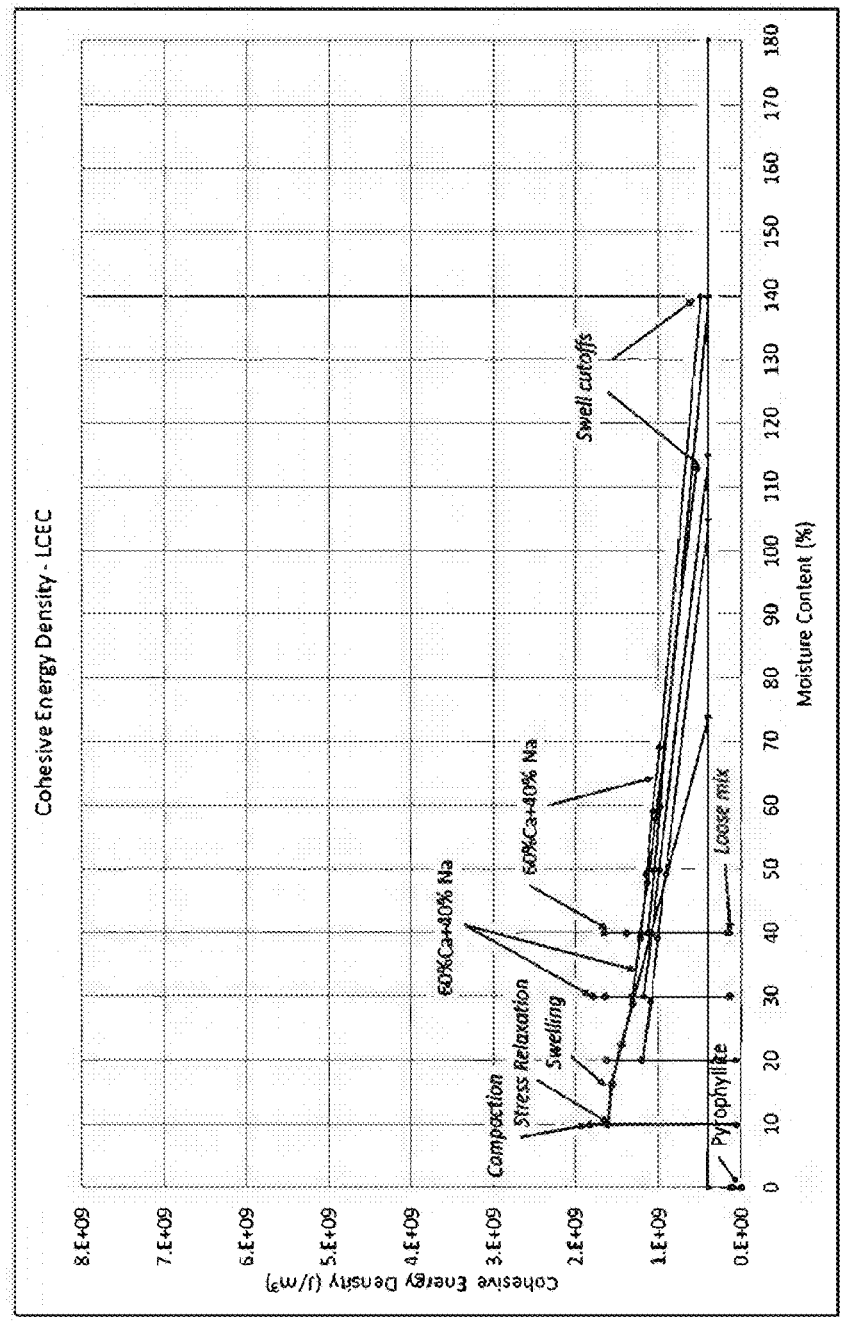
FIG. 58 is a graphical presentation of variation of cohesive energy density with moisture and density conditions for LCEC Na-montmorillonite.

Cohesive energy density was measured for all the simulation cases using Forcite module of the software. Total cohesive energy density was plotted against the moisture content for all the steps in each simulation case as loose mix, compaction, relaxation, and swelling/volume change with water. Typical variation of cohesive energy density for HCEC, MCEC, and LCEC Na-montmorillonite are shown in FIGS. 56, 57, and 58. See also FIGS. 210 to 226.

Forcefield plays a vital role in any molecular simulations study. It provides the relative interaction among the particles by defining the energy relationship for the system. Usually, in studies involved in the simulations of clay minerals, CLAYFF forcefield (Cygan et al.) and some others specifically prepared for the purpose have extensively been used.

Figure 59:
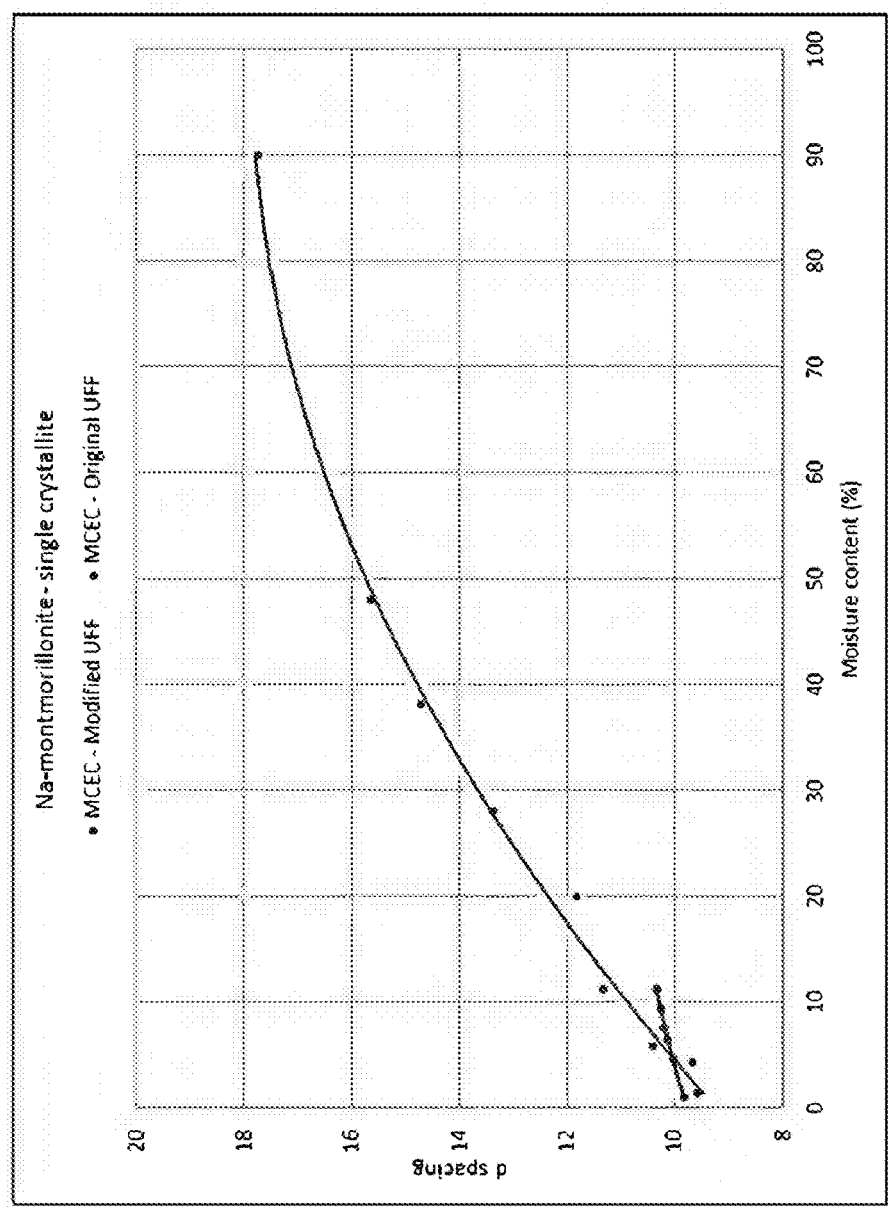
FIG. 59 is a graphical presentation of comparison of d-spacing change of a single Na-montmorillonite crystallite using original and modified UFF.

But all of these have been applied exclusively for a single clay unit molecule cell. For the scenarios of several crystallites in a unit cell as used in the present disclosure, these forcefields have limitations especially when the unit cells/single crystallites are converted to non-periodic superstructure for sorption purpose. Universal forcefield (UFF), the forcefield embedded in the software, consists of universal parameters to cover the entire periodic table and may be used for such scenarios. When UFF was applied to several scenarios formulated in the present disclosure, several well-known facts could not be verified. Therefore, it was planned to do changes and modifications to the UFF as per the requirements of a typical forcefield applicable to clay minerals interaction with water. So, several forcefield parameters in UFF were modified in the light of the parameters suggested in CLAYFF forcefield. The parameters for Na, Ca, Mg, Al, and Si were accordingly modified. The original and the corresponding modified parts of the Universal Forcefield (Original and Modified Universal Forcefields (UFF)) are shown below, while the comparison of the results of typical swell of Na-montmorillonite crystallite using the original and modified UFFs are shown in FIG. 59.

Original Universal Forcefield

| Atom Types | | | | | | | |
|---|---|---|---|---|---|---|---|
| Na | Na | 22.99000 | 0 | 0 | 0 | 0! | sodium |
| Mg3 + 2 | Mg | 24.31000 | 0 | 3 | 0 | 0! | magnesium, tetrahedral, +2 oxidation state |
| Al3 | Al | 26.98150 | 0 | 3 | 0 | 0! | aluminium, tetrahedral |
| Si3 | Si | 28.08600 | 0 | 3 | 0 | 0 | ! silicon, tetrahedral |
| K_ | K | 39.94800 | 0 | 0 | 0 | 0! | potassium |
| Ca6 + 2 | Ca | 40.08000 | 0 | 6 | 0 | 0! | calcium, octahedral, +2 oxidation state |

| Diagonal vdw | | | |
|---|---|---|---|
| Na | LJ_6_12 | 2.9830 | 0.3000E−01 |
| Mg3 + 2 | LJ_6_12 | 3.0210 | 0.1110E+00 |
| Al3 | LJ_6_12 | 4.4990 | 0.5050E+00 |
| Si3 | LJ_6_12 | 4.2950 | 0.4020E+00 |
| K_ | LJ_6_12 | 3.8120 | 0.3500E−01 |
| Ca6 + 2 | LJ_6_12 | 3.3990 | 0.2380E+00 |

| Atom typing rules | | | | | |
|---|---|---|---|---|---|
| Mg6 + 2 | Mg | 0 | 0 | 0 | 1 |
| Al3 | Al | 3 | 0 | 0 | 1 |
| Si3 | Si | 3 | 0 | 0 | 1 |

-continued

| | | | | Generators | | | | | | | |
|---|---|---|---|---|---|---|---|---|---|---|---|
| Na | 1.5390 | 180.0000 | 1.0809 | 0.0000 | 0.0000 | 0.0000 | 3 | −1 | 0.0000 | 2.84300 |
| Mg3 + 2 | 1.4210 | 109.4712 | 1.7866 | 0.0000 | 0.0000 | 0.0000 | 3 | −1 | 0.0000 | 3.95100 |
| Al3 | 1.2440 | 109.4712 | 1.7924 | 0.0000 | 0.0000 | 0.0000 | 3 | −1 | 0.0000 | 3.04100 |
| Si3 | 1.1170 | 109.4712 | 2.3232 | 0.0000 | 0.0000 | 0.0000 | 3 | −1 | 1.2250 | 4.16800 |

Modified Universal Forcefield

| | | | Atom Types | | | | |
|---|---|---|---|---|---|---|---|
| Na | Na | 22.99000 | 0.0000 | 0 | 0 | 0 | ! sodium |
| Mg6 + 2 | Mg | 24.31000 | 0.0000 | 6 | 0 | 0 | ! magnesium, octahedral, +2 oxidation state |
| Al6 | Al | 26.98150 | 0.0000 | 6 | 0 | 0 | ! aluminium, octahedral |
| Si3 | Si | 28.08600 | 0.0000 | 3 | 0 | 0 | ! silicon, tetrahedral |
| K_ | K | 39.94800 | 0.0000 | 0 | 0 | 0 | ! potassium |
| Ca6 + 2 | Ca | 40.08000 | 0.0000 | 6 | 0 | 0 | ! calcium, octahedral, +2 oxidation state |

| | Diagonal vdw | | |
|---|---|---|---|
| Na | LJ_6_12 | 2.6378 | 0.1301E+00 |
| Mg6 + 2 | LJ_6_12 | 5.9090 | 0.9029E−06 |
| Al6 | LJ_6_12 | 4.7943 | 0.1329E−05 |
| Si3 | LJ_6_12 | 3.7064 | 0.1841E−05 |
| K_ | LJ_6_12 | 3.7423 | 0.1000E+00 |
| Ca6 + 2 | LJ_6_12 | 3.3990 | 0.2380E+00 |

| | | Atom typing rules | | | |
|---|---|---|---|---|---|
| Mg6 + 2 | Mg | 0 | 0 | 0 | 1 |
| Al6 | Al | 3 | 0 | 0 | 1 |
| Si3 | Si | 3 | 0 | 0 | 1 |

| | | | | Generators | | | | | | | |
|---|---|---|---|---|---|---|---|---|---|---|---|
| Na | 1.5390 | 180.0000 | 1.0809 | 0.0000 | 0.0000 | 0.0000 | 3 | −1 | 0.0000 | 2.84300 |
| Mg6 + 2 | 1.4210 | 109.4712 | 1.7866 | 0.0000 | 0.0000 | 0.0000 | 3 | −1 | 0.0000 | 3.95100 |
| Al6 | 1.2440 | 109.4712 | 1.7924 | 0.0000 | 0.0000 | 0.0000 | 3 | −1 | 0.0000 | 3.04100 |
| Si3 | 1.1170 | 109.4712 | 2.3232 | 0.0000 | 0.0000 | 0.0000 | 3 | −1 | 1.2250 | 4.16800 |

Figure 32:
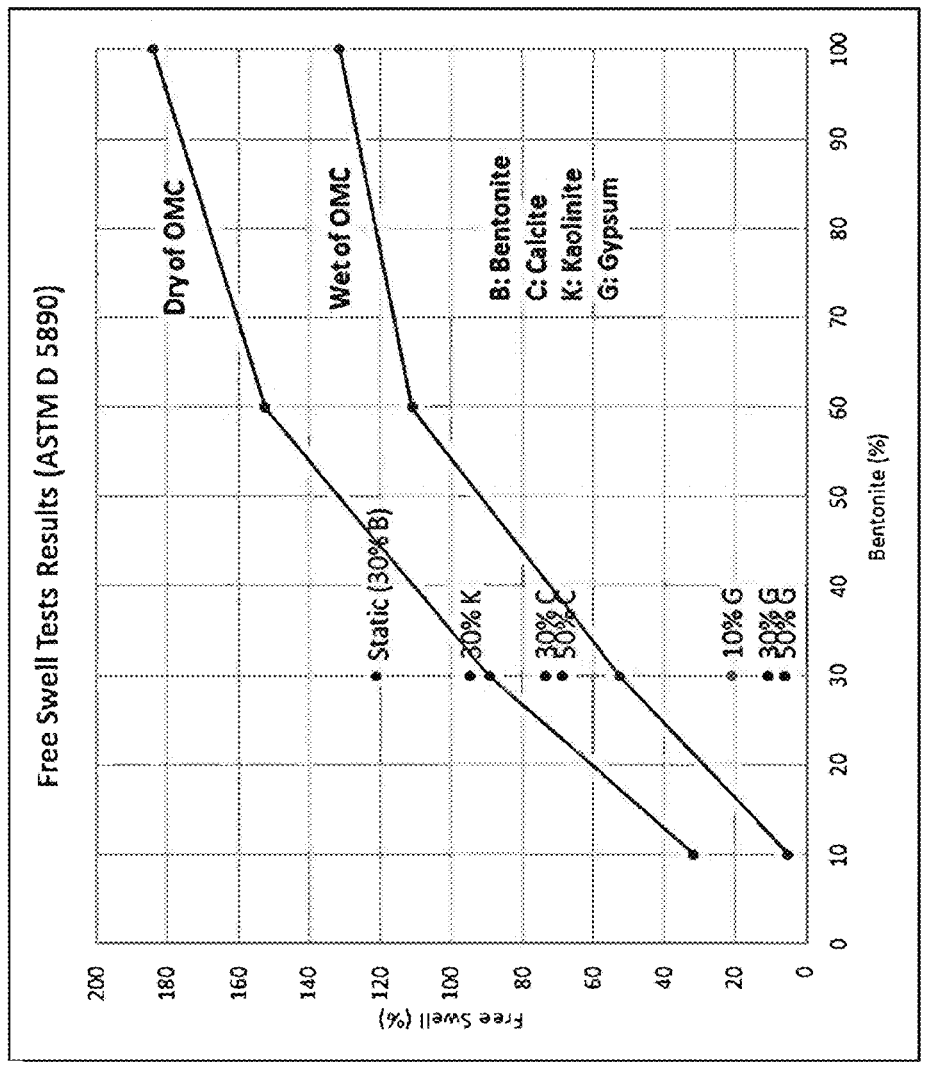
FIG. 32 is a graphical presentation of swell potential test results using laboratory oedometer tests.
Figure 60:
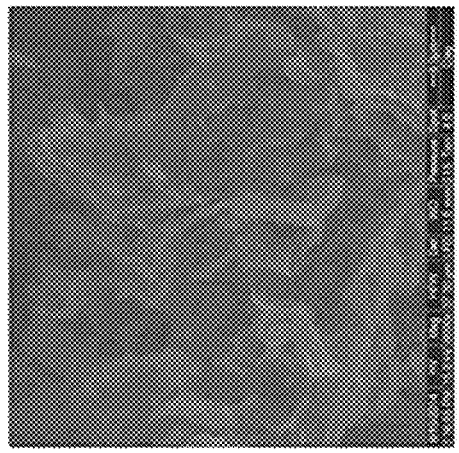
FIG. 60 is an ESEM image showing a closed fabric in a post swell sample comprising 100% bentonite.
Figure 61:
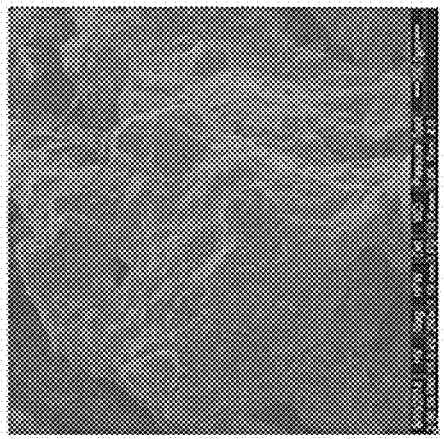
FIG. 61 is an ESEM image showing an open fabric in a post swell sample comprising 30% bentonite and 70% sand.
Figure 62:
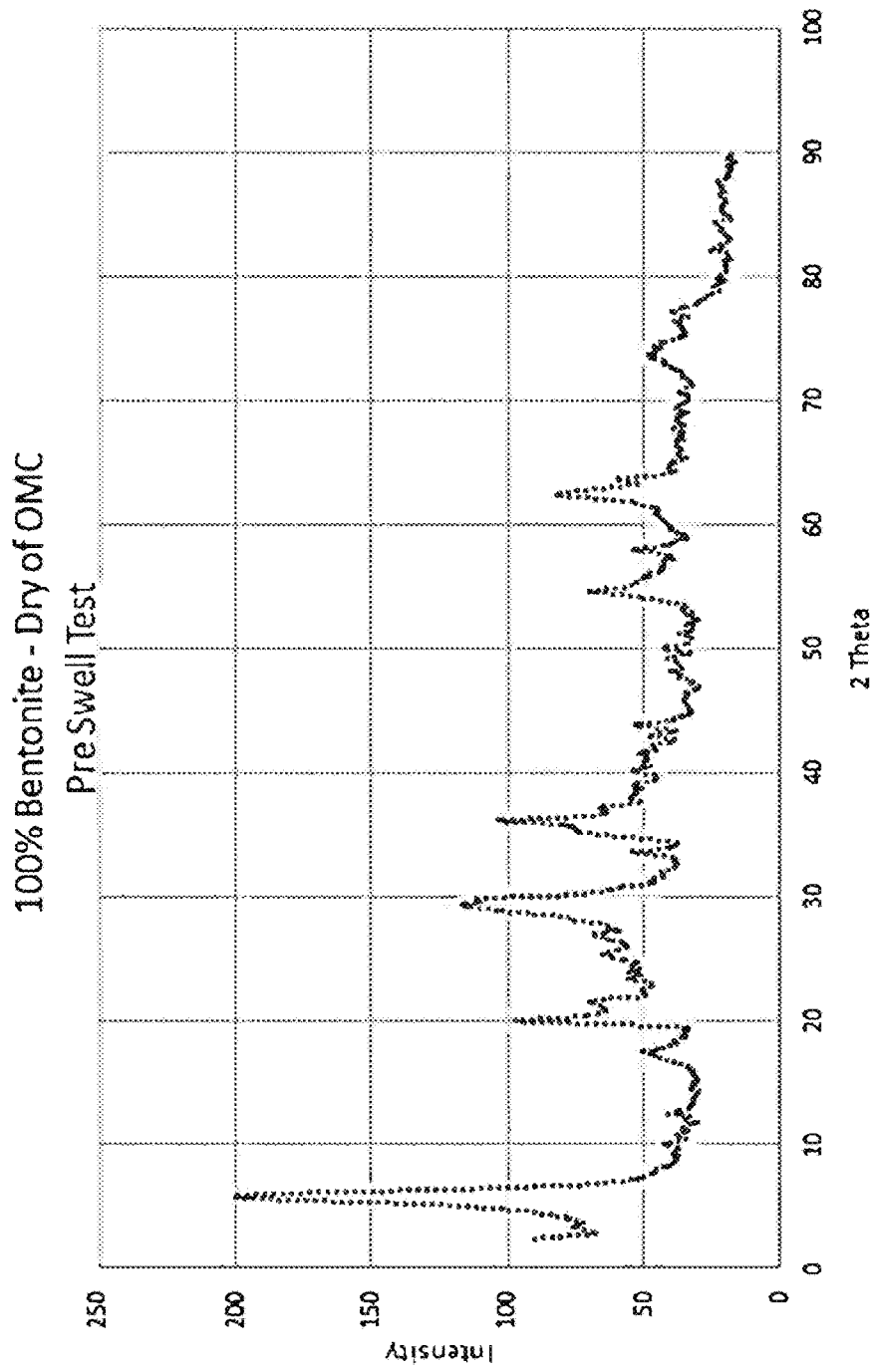
FIG. 62 is a graphical presentation of analysis of d-spacing in compacted 100% bentonite—dry of OMC showing the XRD pattern.
Figure 63:
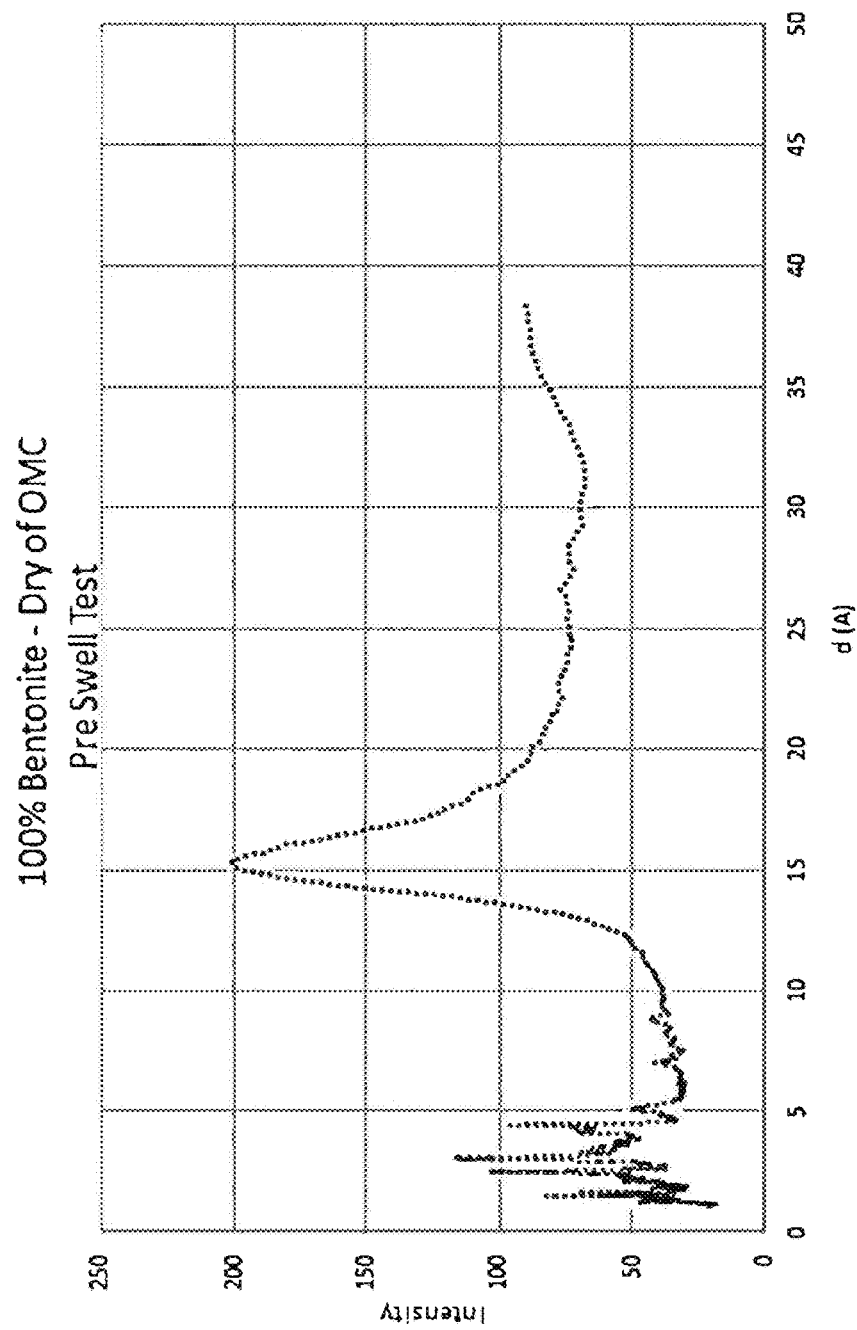
FIG. 63 is a graphical presentation of analysis of d-spacing in compacted 100% bentonite—dry of OMC showing the d-spacing.
Figure 64:
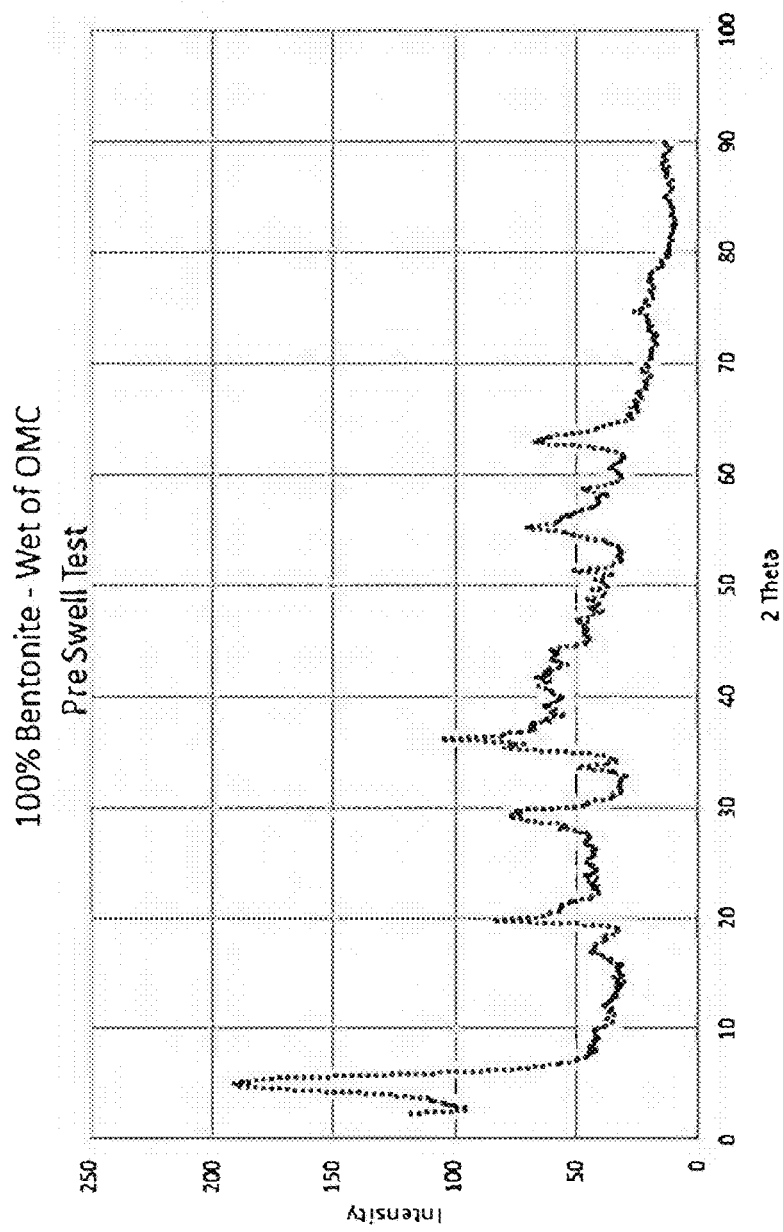
FIG. 64 is a graphical presentation of analysis of d-spacing in compacted 100% bentonite—wet of OMC showing the XRD pattern.
Figure 65:
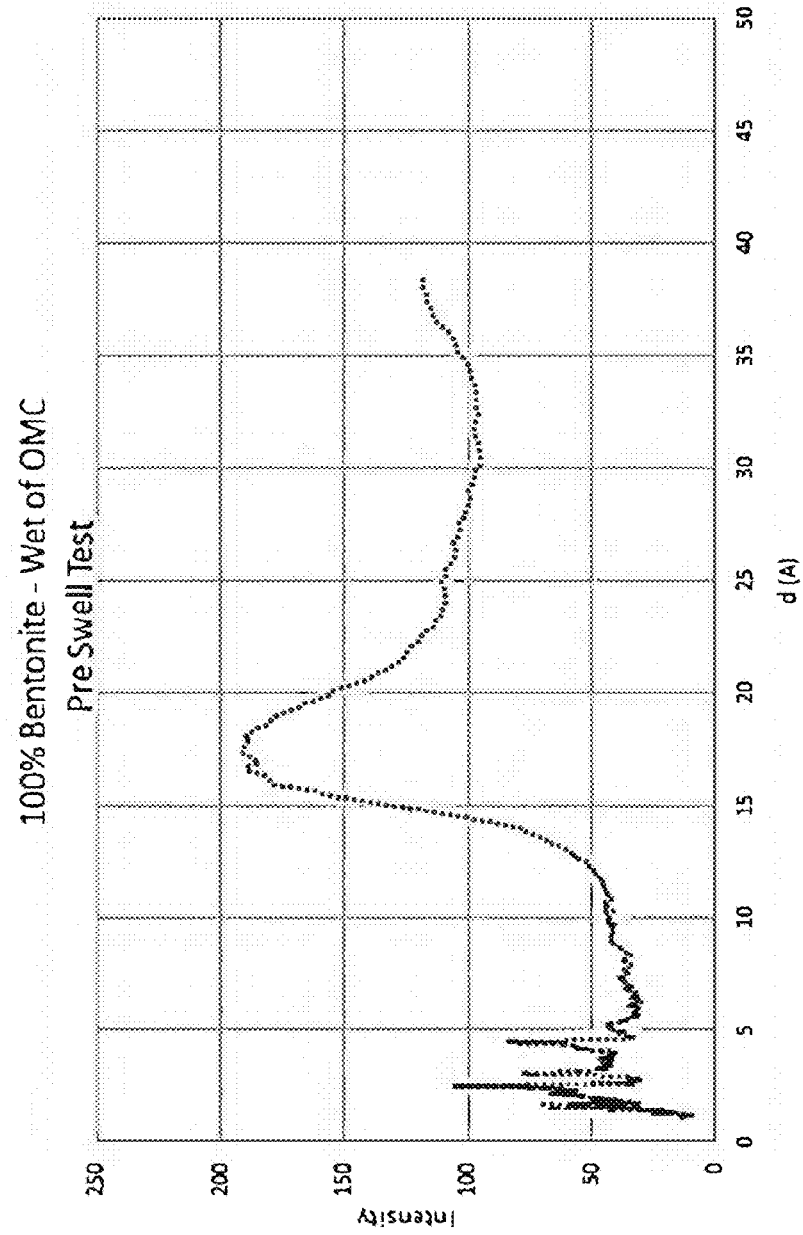
FIG. 65 is a graphical presentation of analysis of d-spacing in compacted 100% bentonite—wet of OMC showing the d-spacing.

This disclosure includes three major activities: macro level testing, micro level imaging and analysis, and molecular level simulation and modeling. These activities have led to the formulation of a volume change behavior model for the molecular/nano level structure of expansive clayey soils. The nano level model can be coupled with micro and macro level models to formulate a comprehensive volume change model for the expansive soils. The macro level behavior of the expansive soils have been studied through the free swell potential tests on various combinations of clay and non-clay minerals, undisturbed natural samples, compacted at various moisture and density conditions (Table 8). Free swell tests results tabulated in Table 9 and plotted in FIG. 32 reveal that there is a general increase in swell potential with increase in bentonite content, rate of increase in swelling is reduced as bentonite content increases to the maximum value of 100%. This decrease in rate of swell could be attributed to the reduced permeability or water intake capacity of the fabric of the compacted clay and sand mixes. As the swelling increases, more swollen particles start occupying the bigger pores, thus further impeding the water flow rate in the clay fabric. This fact can be qualitatively confirmed through the ESEM results of the typical fabrics of sand-bentonite mixes in FIGS. 60 and 61. This figure reveals very small size of pores for the 100% bentonite case while a relatively open fabric containing relatively large sized pores in case of higher percentages of sand. Based on the above facts, the aspect of permeability of the fabric should have a special consideration besides density, in the modeling of total swell potential of closed fabrics composed otherwise of high swell potential clay minerals. Relatively lower permeability may not allow the permeation of enough water required for the complete swelling of all the clay mineral particles present in the soil fabric. This phenomenon needs to be translated into a significant factor in the volume change modeling of the expansive clays. Permeability characteristics of the micro fabric should also be coupled with the macro fabric features such as fissures and stress cracks to define the water intake potential of the entire structure of the expansive clayey soils.

Use of static compaction to prepare the samples with the same density achieved through dynamic Proctor compaction has led to an equivalent static pressure of 1500 kPa. As the fabric created using the static compaction is less dispersed in nature (agglomerates are obvious in FIG. 189), it has resulted in higher swelling (121%) than it's dynamically (Proctor) compacted counterpart (89%). Although kaolinite is a non-expansive clay mineral, replacing sand partly with kaolinite resulted in reduced swelling (95%) as compared to the one with no replacement. This phenomenon may again be attributed to the low permeability of the fabric containing high percentage of fine grained kaolinite replacing part of coarse grained sand.

Referring to Table 9, replacing part of the sand by calcite and gypsum has resulted in substantial reduction in swelling of the bentonite/sand samples. There is a reduction of 82%, 90%, and 95% in the swelling potential when gypsum was added at 10%, 30%, and 50% to replace the sand, respectively. Similarly, there is a reduction of 40% and 44% in swelling upon part of the sand being replaced by 30% and 50% calcite, respectively. The phenomenon of decrease in swelling by addition of calcite and gypsum might be resulting from the binding effects produced by these compounds to the individual or group of clay particles. As calcite and gypsum in their powdered form were mixed with bentonite and water, these minerals get dissolved in the molding water to varying degree of dissolution. The resulting cations and anions dissolved in water get adsorbed on the surface and interlayer of the clay particles. This phenomenon provides additional binding forces to the individual and group of clay particles. As solubility of powdered gypsum in water is generally higher than calcite, it is causing more reduction in the swelling when added in equivalent quantities. This theory of the additional binding effects or cohesion provided by these compounds can be visualized through ESEM results in FIGS. 191 and 192 for gypsum and FIGS. 199 and 200 for calcite, respectively. These figures clearly show the closed fabrics due to additional bonding or cohesion created as a result of the presence of these compounds. As it is difficult to visualize the dissolved salts causing cohesion to the clay particles, this bonding/cohesion theory was further verified through molecular level simulations.

Presence of bonding/cohesion can also be imagined from the fact that although the CEC and the percentage of smectite in the natural undisturbed sample of Qatif-1 is almost same as those of the commercial bentonite (30/70 sand-bentonite mix), the difference in percent swell is large, i.e., 29% vs. 121%. This difference may be attributed to the cementation effects provided by the calcite, gypsum, and other similar compounds or salts present in the soil. To further investigate these results, in addition to the exchangeable cations, total cations were also determined for the bentonite and undisturbed samples. The reasoning provided above for the various phenomena responsible for the macro level behavior were further confirmed through micro level investigations. Some of the interpretations were confirmed through direct imaging techniques and other through the analysis of the data and results of these tests. The results acquired through these tests and the corresponding discussions and explanations are provided below.

X-Ray Diffraction (XRD) test is primarily used for the mineralogical analysis of crystalline samples. In the present disclosure, XRD has not only been used for the determination of the mineralogical composition of the laboratory compacted specimens and the undisturbed samples obtained from the natural deposits, but also for the study of change in lattice d-spacing in crystal lattice of clay mineral with water content. Change in d-spacing in the clay mineral structure was determined both on the specimens from the loose mix and the compacted samples.

Figure 41:
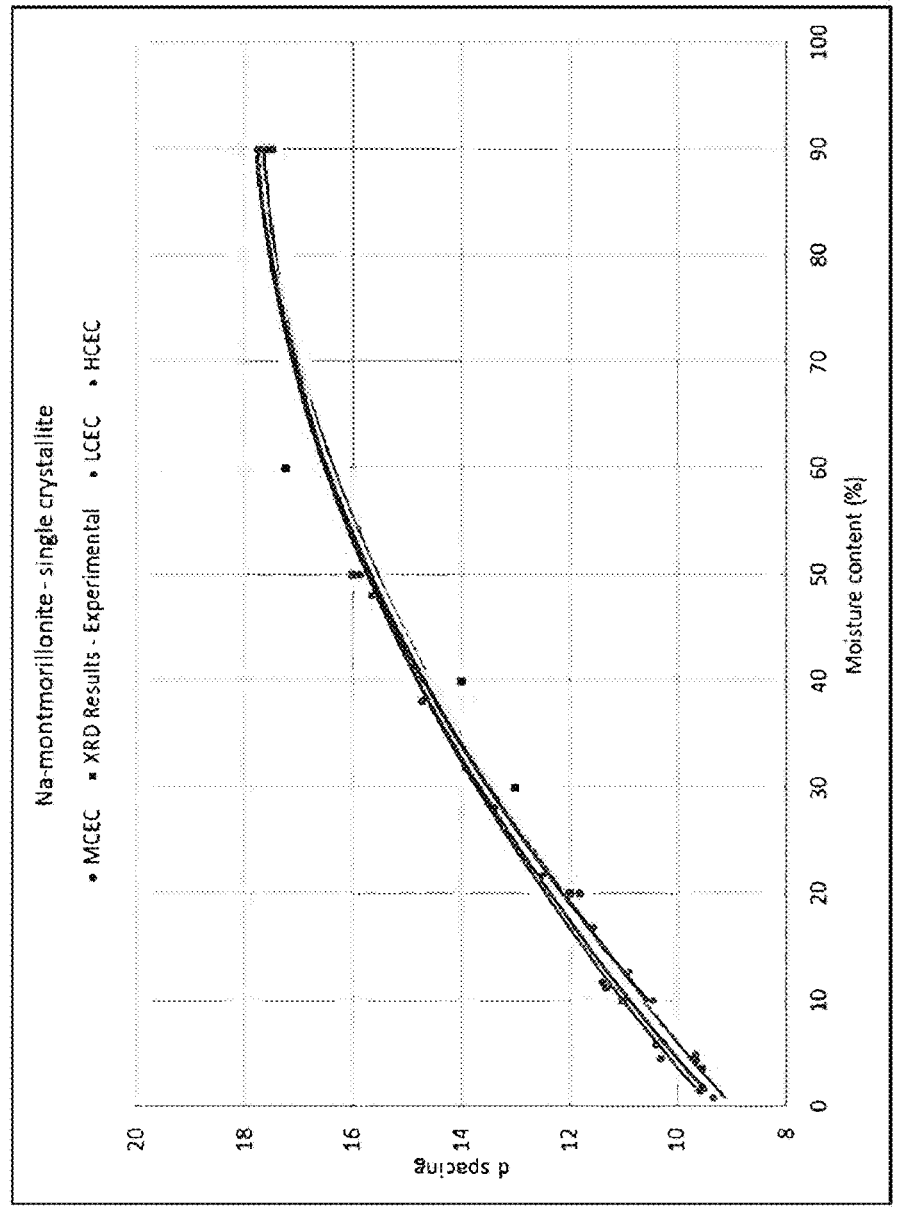
FIG. 41 is a graphical presentation of variation in d-spacing of MCEC Na-montmorillonite single crystallite during the water sorption process.

Loose mixture of bentonite samples were prepared by mixing the soil with different water contents ranging from 10 to 100%. XRD tests were performed on each of these samples and the resultant d-spacing as a function of water content is shown in FIG. 41, which is evident that there is an increase in lattice spacing with water content to a spacing of 17.5 Å at 60% water content and remains constant afterwards to a water content of 100%. As d-spacing of dry bentonite is 10 Å and each water layer occupies an approximate thickness of about 2.5 Å in the interlayer space, 17.5 Å indicates the presence of three water molecules layers in interlayer. Each water layer of about 2.5 Å in the interlayer constitutes about 10% water content. This indicates that the maximum water content accommodated in the interlayer space in clay minerals is about 30% and the rest of the water is adsorbed on the ends and edges of the clay mineral crystallites. This fact constitutes a significant aspect in the molecular level simulation and modeling.

In addition to the XRD tests on the specimens from the loose mixture at various water contents, these tests were also conducted on the samples compacted on the dry and wet side of OMC. FIGS. 62, 63, 64, and 65 indicate that d-spacing of about 15 Å (equivalent to two water layers or 20% water content) exists in the clay crystallites on the dry side of OMC while d-spacing of 17.5 Å occurs (equivalent to three water layers or 30% water content) on wet side of OMC. As the molding water content is respectively 30 and 40% for the dry and wet side of OMC, it is established that rest of the 10% water content for both the cases is adsorbed on the edges and ends of the crystallites. This fact has played a key role in the assessment of the fundamental size of the crystallite in the molecular level simulation.

Fundamental crystallite size was also assessed from the XRD data using Debye-Sherrer's method (Sherrer). See Scherrer, P. (1918), "Bestimmung der Grösse und der inneren Struktur von Kolloidteilchen mittels Röntgenstrahlen" Nachr. Ges. Wiss. Göttingen 26 (1918) pp. 98-100, incorporated herein by reference in its entirety. The mechanism based on the concept of inverse relationship between width of an X-Ray diffraction peak and the crystallite size is shown in FIG. 33. Using the Full Width at Half Maximum (FWHM) of the corresponding peaks in the XRD data, removal of background to obtain the net peak intensity have resulted in the assessment of the crystallite size in the range of 59 to 108 Å. This knowledge has been used in the selection of the size of the crystallite in molecular level modeling.

Environmental Scanning Electron Microscopy (ESEM) results have provided a clear conception of several features of the fabric of the pre and post swell samples. For the samples with 100% bentonite, particles have shown greater spacing in the post swell state (FIG. 172), while the ones having other minerals such as calcite and gypsum have shown closed fabric of the nano clay particles in the microstructure. These two features support several explanations regarding the specific behavior observed during the swell potential tests. For example, high swelling of 100% bentonite samples and highly reduced swelling for the samples containing gypsum or calcite.

Energy Dispersive Spectroscopy (EDS) was performed both on specific area or focused points of the specimens during the performance of ESEM. EDS results indicate the presence of $Na^+$ and $Ca^{2+}$ as two major cations in the bentonite. From the FIGS. 175 to 178, it can be observed that although intensity of peak for $Na^+$ cations is present both in pre and post swell samples, $Ca^{2+}$ peak is present in pre swell samples only and it diminishes in the post swell samples. Based on this observation, it could be inferred that not all the $Ca^{2+}$ cations may be exchangeable in nature, rather most of these may be associated with clay crystallites as non-exchangeable cations. These non-associated $Ca^{2+}$ cations after getting dissolved in water might have drained away in the free water and thus not appearing the EDS results of post swell samples.

In case of samples containing sand and other non-clay inclusions, clay particles have found to be coating the bigger non-clay particles. For the samples containing gypsum, ESEM in FIGS. 191 and 192 reveal the clay layers to be present as cohesive assemblages. On the other hand, based on the ESEM results of the samples containing Calcite (FIGS. 199 and 200), calcite has been found in crystal form on the specimens. From these results, relatively higher dissolution of gypsum in water as compared to calcite may be inferred.

Fourier Transform Infrared Spectroscopy (FTIR) has been extensively used for the investigations of the molecular level behavior contributing to the macro behavior of the expansive clays (Katti and Katti, 2010). See Katti, K. S. and Katti, D. R. (2010), "Fourier Transform Infrared Spectroscopy Studies of Clay and Shales", Indian Geotechnical Conference—2010, GEOtrendz, Dec. 16-18, 2010, 267-270, incorporated herein by reference in its entirety. In case of clays interacting with water, H—O—H bending vibration and O—H stretching vibration bands provide the vital information on the level of interactions at various interlayer water contents. Both the vibration bands under stable/dry form are 1694 $cm^{-1}$ and 3634 $cm^{-1}$, respectively (Katti and Katti, 2010). When water enters the interlayer of the clay crystallites, H—O—H bending band shifts to lower energy levels depending on the water content. In FIG. 146, it can be noticed that there is a reduction in H—O—H bending band from 1694 to 1650 $cm^{-1}$ in bentonite loose mixed samples with moisture content from 40 to 60% and remains same at higher moisture contents. This confirms the trend as observed in the XRD analysis of the bentonite samples mixed with varying percentages of water. Moreover, O—H stretching band achieves higher energy from 3634 to 3650 cm-1 as a result of the addition of water. A similar trend of reduction in the H—O—H bending band and O—H stretching band have been observed in all the post swell specimens. FTIR have proven to be a complementary technique for the investigations of nano level changes in the clay structure due to the interaction with water.

Presence of non-clay minerals and constituents in any natural or compacted expansive soils play a vital role towards the total swell potential. Most of the non-clay minerals such as calcite, gypsum, and other compounds or salts of sodium and potassium exist in cations and anions form when present in pore solution of these deposits. Part of the cations such as $Na^+$, $K^+$, $Ca^{2+}$, and $Mg^{2+}$ get adsorbed on the surfaces and interlayer of the charged clay mineral crystallites, while others exist either as isolated fabric or associated with the individual or group of clay crystallites by covering them on the surfaces, ends, and edges.

During the swell potential testing phase, it was observed that presence of non-clay minerals such as calcite and gypsum act as swell retarders. It was hypothesized at that stage that these non-clay minerals provide a sort of additional binding/cohesion to the individual and group of expansive clay particles. To find out a correlation among the type, nature, and quantity of non-clay cations and the swelling potential, both total and exchangeable cations were determined.

Results of the total and exchangeable cations, summarized in Table 5 provide an estimate of the non-exchangeable cations present in the samples. Comparison of the percentage of non-exchangeable cations with the percent of expansive clay minerals may provide a very close estimate of the swell retardation percent.

Owing to its micron level resolution, Micro Computed Tomography (Micro CT) is limited in its use for the nano/molecular level studies. In this study, micro CT has been used only to visualize and evaluate the micron level fabric of the pre and post swell samples using the contrasting attenuation property of the clay particles before and after the swell test. This concludes that CT could be used as a general tool for the assessment of the factors contributing to the swell potential of any compacted or natural clay matrix. Micro CT results indicate the agglomeration of the fine grained clay particles in the pre swell state while these become more dispersed in their post swell state (FIGS. 203A to 209B). Conclusion drawn in swell potential tests regarding the swell retardation caused by the non-clay constituents and visualized in ESEM results are also indicative through CT results. In FIGS. 203A to 209B, pre and post swell CT scans indicating several parts of the specimens showing no change in attenuation color are indicative of the particle assemblages restrained from swell through cohesion/bonding created by non-clay constituents such as calcite, gypsum, and other salts present in soils.

Molecular level modeling and simulations performed in the present disclosure are divided into various steps. Molecular level modeling techniques such as molecular mechanics (MM), molecular dynamics (MD), and Monte Carlo (MC) simulations have been used to study the processes and interactions occurring at the molecular level in the natural and compacted fabrics of the expansive clayey soils. These simulation techniques were used to study the interactions between clay and non-clay particles with various combinations of CEC, interlayer and intra layer cations, anions, and water under various fabric and structure conditions. Basic clay mineral was represented by a montmorillonite crystallite of 54×26×20 Å size.

Cohesive energy density (CED) concept has been used to explain various molecular level processes and interactions occurring at different levels of the volume change in expansive clayey soils. CED has been found sensitive to all the possible changes in the clay structure due to variation in CEC, interlayer and intra layer cations, anions, water, and density conditions. Total CED of any combination of molecules is contributed from two components, i.e., electrostatic and van der Waals forces. Contribution from van der Waals could either be repulsion or attraction in nature, while it is always attraction in nature from electrostatic forces. The results of each step are discussed and interpreted in the light of the CED concept.

Figure 66:
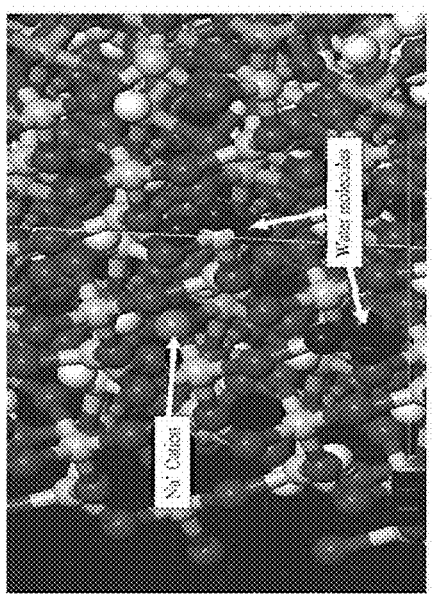
FIG. 66 is a graphical presentation of initial stage of sorption of water molecules onto montmorillonite crystallite showing $Na^+$ cation surrounded by two water molecules.
Figure 67:
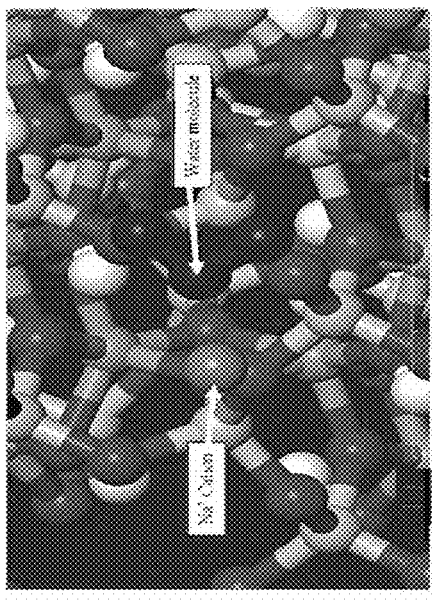
FIG. 67 is a graphical presentation of initial stage of sorption of water molecules onto montmorillonite crystallite showing a closer view of Na$^+$ cation with sorbed water molecule.
Figure 68:
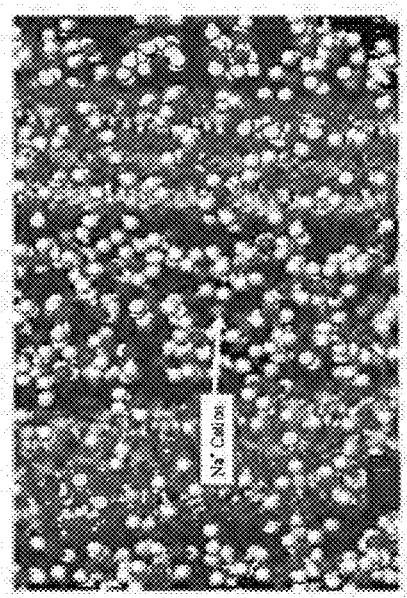
FIG. 68 is a graphical presentation of completely hydrated Na$^+$ cations providing a general view showing all the cations in the interlayer.
Figure 69:
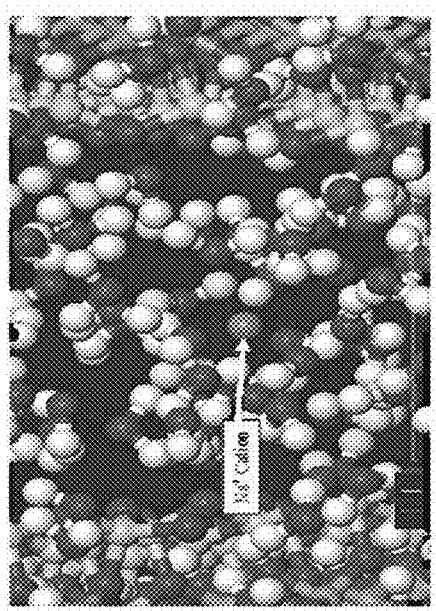
FIG. 69 is a graphical presentation of completely hydrated Na$^+$ cations providing a close up view of a single hydrated Na$^+$ cation.

The simulation of the sorption of water molecules onto a single crystallite of montmorillonite was carried out using Sorption module of the software. Each sorption phase consisted of 25,000 steps of Monte Carlo simulation followed by molecular mechanics and dynamics using Forcite module to achieve a stable configuration of the sorbed water molecules, cations, and the crystallite layers. It is evident from first sorption phase shown in FIGS. 66 and 67 that water molecules start occupying the locations next to $Na^+$ cations present in the interlayer. This phenomenon reveals that water molecules start hydrating the interlayer cations in the first instance. Completely hydrated $Na^+$ are shown in FIGS. 68 and 69. It was observed in the subsequent phases that water molecules start making bonds with the edges, ends, and interlayer to satisfy the crystalline swelling. It is important to observe that not all the water molecules occupy the interlayer, rather these equally get sorbed on the edges and ends of the crystallite. For instance, when the total sorbed water content on a single crystallite reaches 20%, lattice expansion (d-spacing) in FIGS. 39, 40, and 41 reveals only 10% water to be present in the interlayer. Similarly, this lag continues for the rest of the higher moisture contents and the water molecules sorption continues equally on the edges and the interlayer. This fact visualized in the molecular simulations have also been confirmed through the variation in lattice d-spacing with moisture content in XRD results shown in FIG. 41. Comparison between the lattice expansion in the modeling and the experimental values from XRD are showing an excellent agreement. This phenomenon leads to an important conclusion that clay mineral particles might exist in the form of bigger size crystallites of an order of 1000+ Å in the dry form, but start breaking up into much smaller crystallites once come in contact with water. During the compaction phase, these smaller crystallites join at the edges and ends to become larger particles with the water present in between the joined parts. Fabric created after the compaction process is discussed herein.

Based on the previous discussions, the parameters selected in the Sorption and Forcite modules including the modified Universal forcefield are confirmed. A comparison of the swelling results from the original and the modified Universal forcefields is shown in FIG. 59. The comparative plots clearly indicate the disability of the original Universal forcefield to predict the real swell behavior of single montmorillonite crystallite. Moreover, the concept of using 25,000 steps as threshold for the water molecules sorption and other parameters in Sorption Monte Carlo simulation have also proven to be accurate. To further confirm and verify the parameters and the procedure, same process of water sorption was adopted for the pyrophyllite crystallite. The procedure and parameters further confirms as no water molecule could be sorbed in pyrophyllite crystallite of the same size (54×26×20 Å) during the 25,000 steps of Monte Carlo simulation.

General trend and the quantitative change in lattice d-spacing is very similar for all the CECs in FIG. 41, but anomalously, LCEC has shown a slightly higher expansion than HCEC and MCEC especially at lower water contents. Difference is small; however, this anomalous behavior most probably owes to the availability of more space in the interlayer of LCEC due to lesser number of interlayer cations. This allows more water molecules to wedge in the interlayer and consequently causing a little higher expansion in the initial stages of water intake. On the other hand, amount of water molecules intake in the interlayer of HCEC in the initial stages is offset by more water intake required for the hydration of the more number of cations. This results in almost the same lattice expansion at higher water contents. Another important conclusion drawn from this study is that lattice expansion becomes constant to maximum of three layers of interlayer water (17.5 Å) after a certain total water content (60% in case of this study). Any further increase in water content takes place at the edges and ends of the crystallites. This phenomenon may be theorized by assuming that the swelling or hydration forces at this water content becomes smaller enough to cause the movement of the particles against the friction existing in the soil mix.

Figure 70:
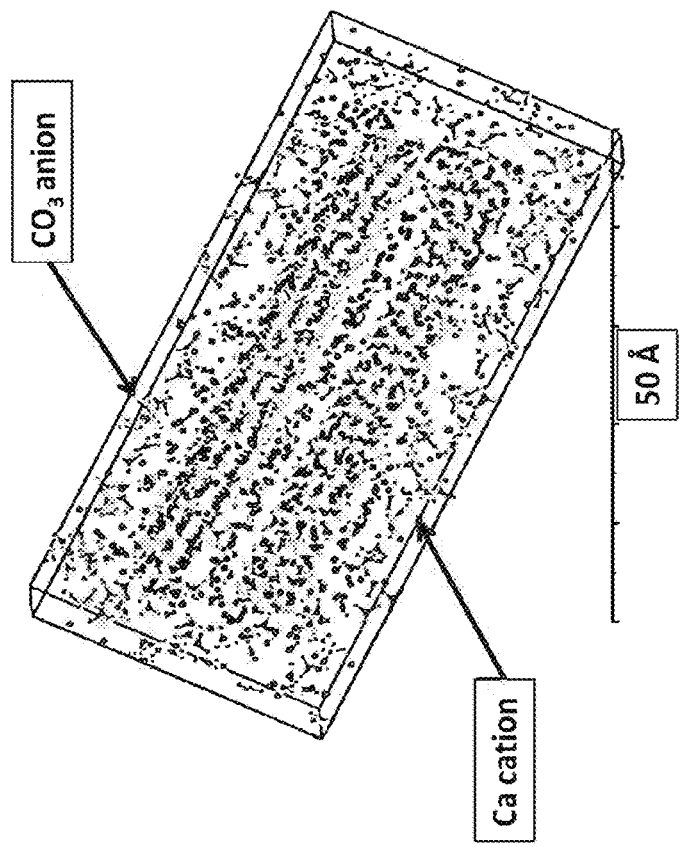
FIG. 70 is a graphical presentation of interaction of montmorillonite with calcite.
Figure 71:
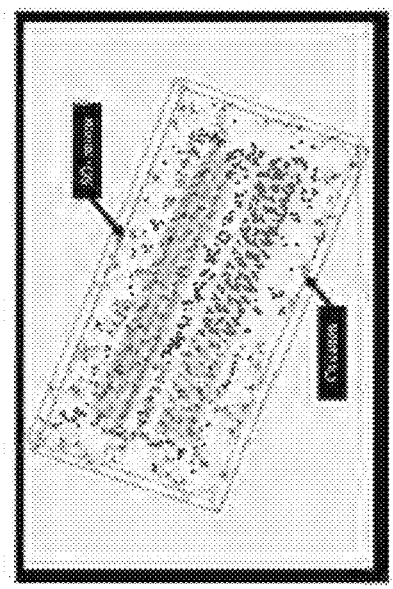
FIG. 71 is a graphical presentation of interaction of montmorillonite with gypsum.

For the molecules where cations/anions from other compounds such as calcite, gypsum, and KCl were sorbed, there was a general trend of sorption both in the interlayer and on the surfaces. Cations of relatively small sizes such as $Ca^{2+}$ enters the interlayer while bigger anions such as $SO_4^{2-}$, $Cl^-$, and $CO_3^{2-}$ remain enveloping the surface (FIGS. 70 and 71).

To simulate the effects of presence of the generally available non-swell particles in the expansive soils, calcite, gypsum, and potassium chloride molecules were formulated. These molecules were then sorbed onto a single Na-montmorillonite crystallite at different water contents. The montmorillonite crystallite with previously sorbed water molecules was further sorbed with equal number of cations and anions from these minerals as shown in FIGS. 70 and 71. Referring to FIGS. 70 and 71, the $Ca^{2+}$ cations got sorbed to some extent in the interlayer while the rest of $Ca^{2+}$ cations and the anions got sorbed around the crystallite surface. This scenario could be considered as closely representative of the generally imagined cementation effects produced by these particles in any soil mix. These non-swelling minerals sorbed crystallites were further used to create the compacted mass followed by the water sorption and the subsequent swelling simulation.

Figure 72:
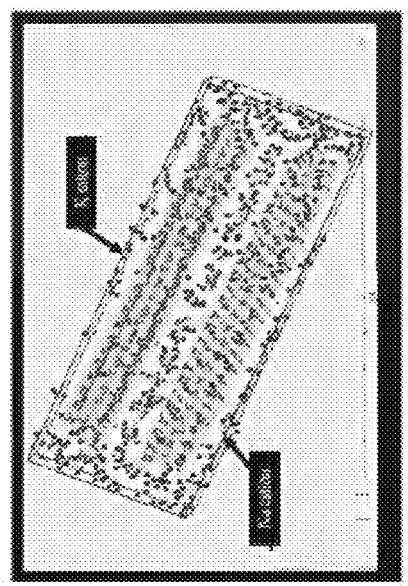
FIG. 72 is a graphical presentation of water molecules sorption (10%) to montmorillonite with 40% Na+60% K.
Figure 73:
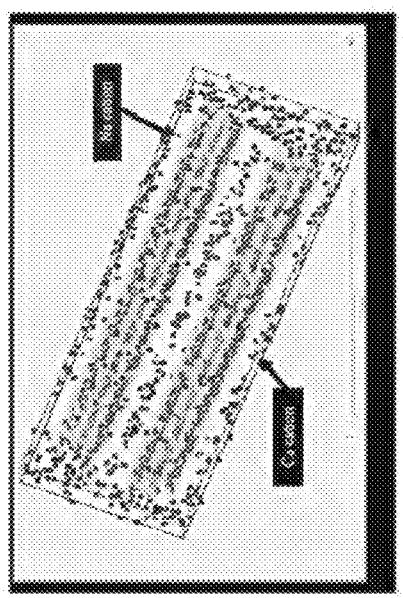
FIG. 73 is a graphical presentation of water molecules sorption (10%) to montmorillonite with 40% Na+60% Ca.

It is rare in nature to find montmorillonite with $Na^+$ as the sole exchangeable cation, rather a combination of $Na^+$, $K^+$, $Ca^{2+}$, and $Mg^{2+}$ exist naturally with at least one of these as the predominant exchangeable cation. Basic montmorillonite crystallite was transformed into various combinations of exchangeable cations as per Table 12. Sorption of water molecules was performed on these combinations in a similar way as was done for Na-montmorillonite (FIGS. 72 and 73). It was observed that general behavior of water molecules sorption was the same for these crystallites with multiple exchangeable cations. However, some angular shift of the crystallite in space was observed in case of multiple cations. This phenomenon most probably owes to the presence of exchangeable cations of different charges, sizes, and hydration radii and positioned at random locations in the interlayer. These cations while getting hydrated might generate different level of forces in the crystallite interlayer space and consequently cause an angular shift in the crystallite position in space.

Figure 74:
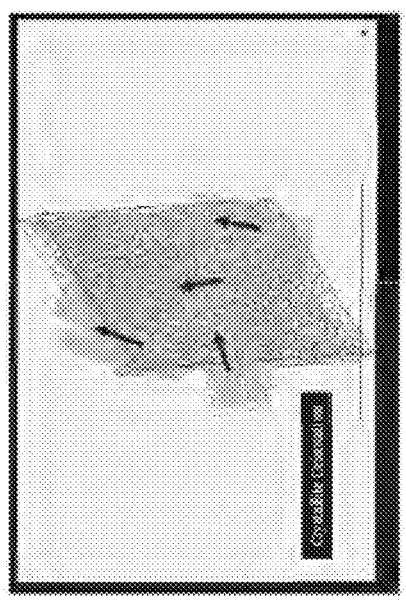
FIG. 74 is a graphical presentation of typical fabric of Na-montmorillonite after compaction at 30% water content.
Figure 75:
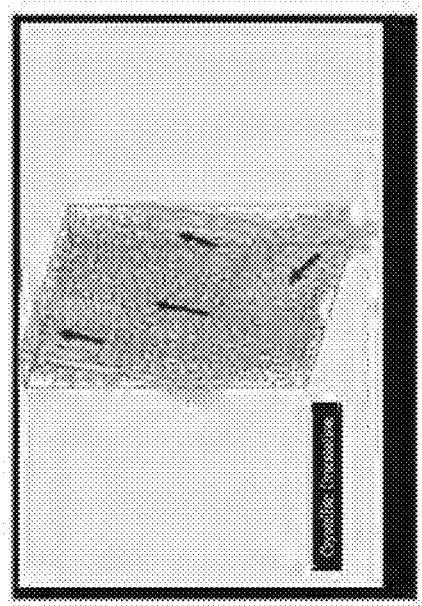
FIG. 75 is a graphical presentation of typical fabric of Na-montmorillonite after compaction at 40% water content.
Figure 76:
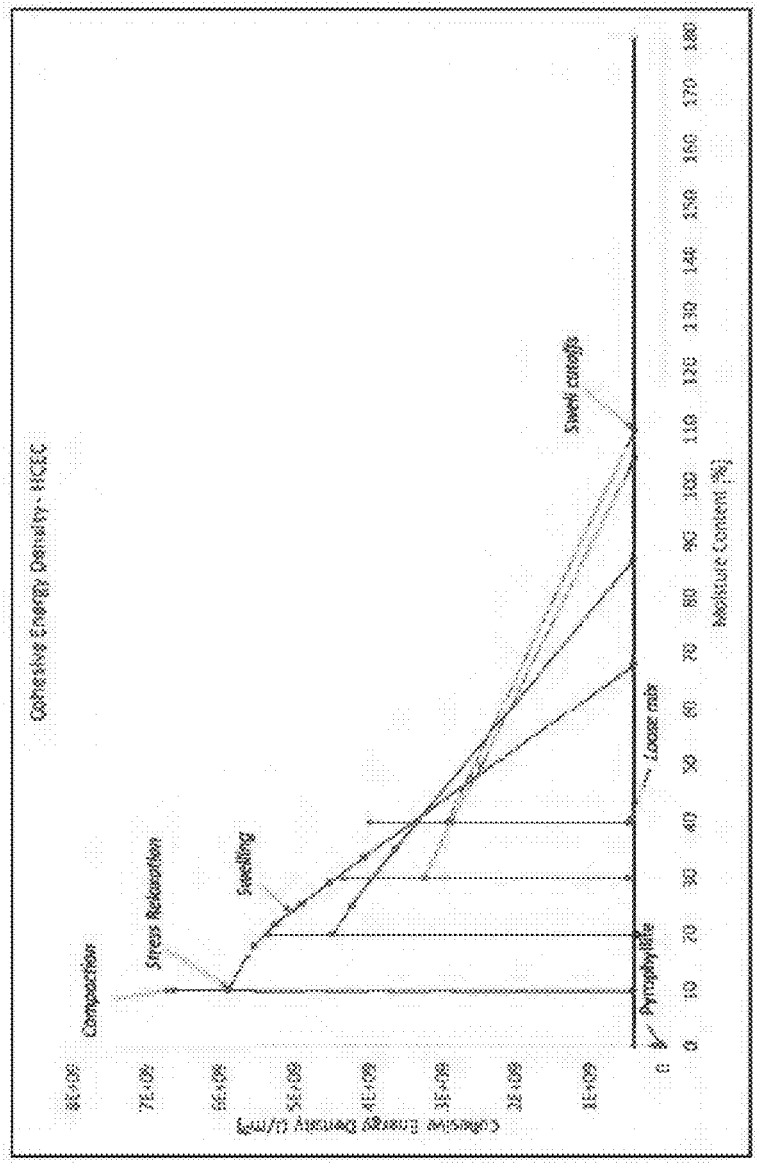
FIG. 76 is a graphical presentation of cohesive energy density plots for crystallites for all stages of simulations (loose, compacted, relaxed, and swelling) for HCEC.
Figure 77:
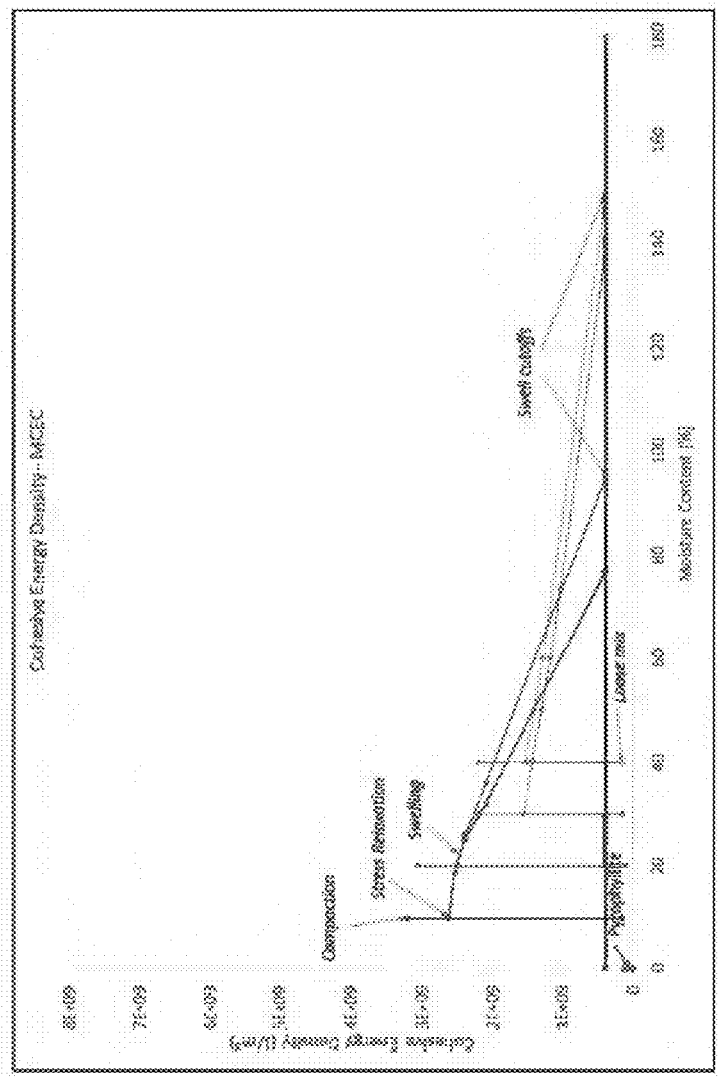
FIG. 77 is a graphical presentation of cohesive energy density plots for crystallites for all stages of simulations (loose, compacted, relaxed, and swelling) for MCEC.
Figure 78:
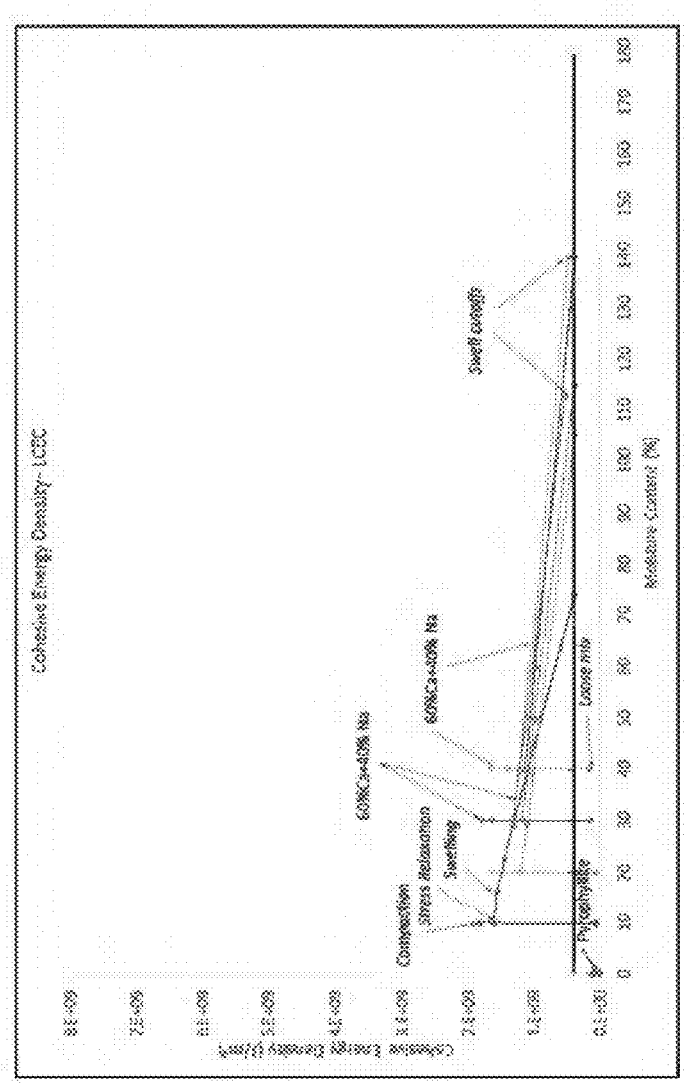
FIG. 78 is a graphical presentation of cohesive energy density plots for crystallites for all stages of simulations (loose, compacted, relaxed, and swelling) for LCEC.
Figure 79:
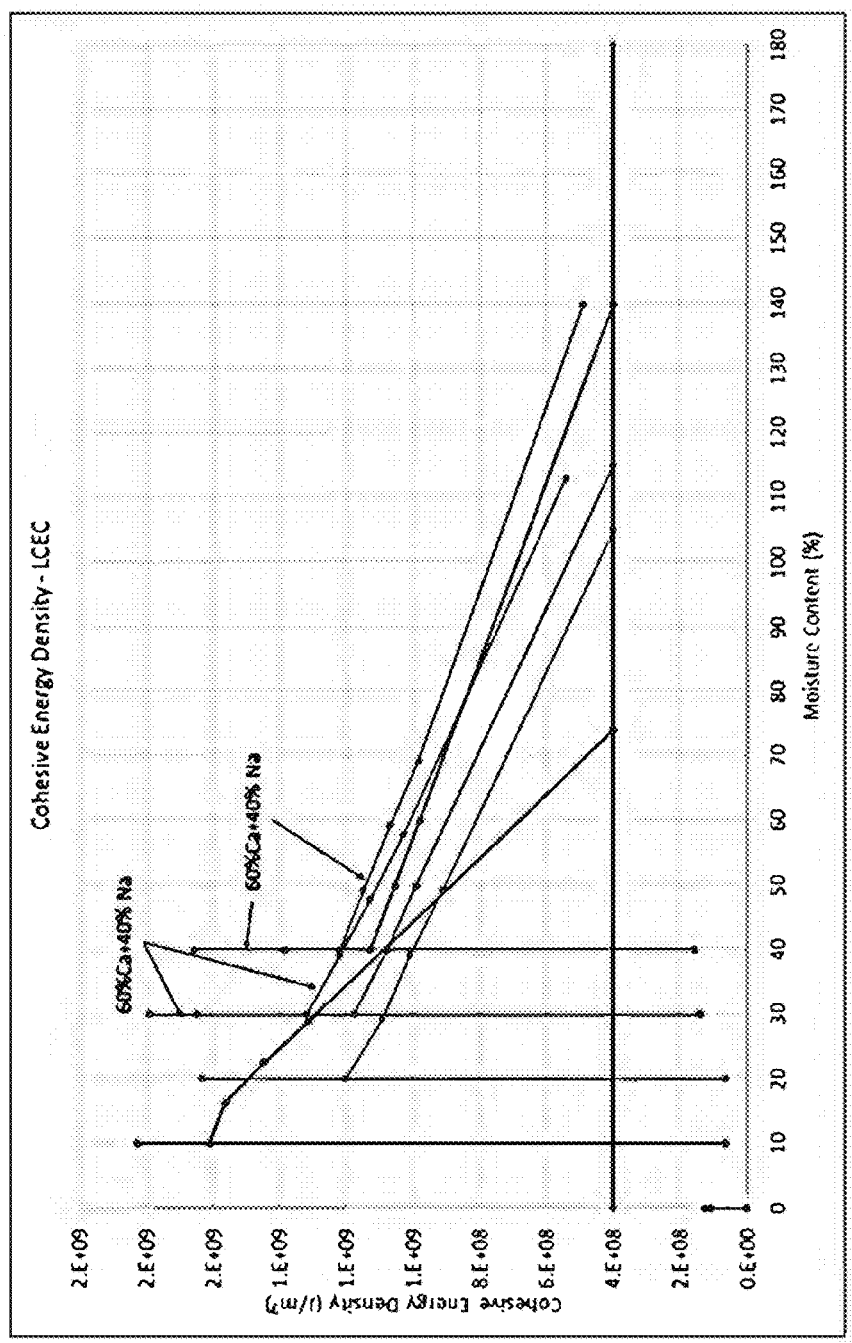
FIG. 79 is a graphical presentation of cohesive energy density plots for crystallites for all stages of simulations (loose, compacted, relaxed, and swelling) for LCEC (same as FIG. 78 with y scale).

Sorption module was used to simulate the assemblages of water sorbed crystallites when mixed together in the loose form before the compaction process. For the purpose, four crystallites were randomly sorbed in a 125×125×125 Å cubic unit cell (FIG. 43). Several cubic unit cells sizes ranging from 100 Å to 200 Å were experimented and 125 Å was finally selected. Bigger unit cells resulted in distances larger than the crystallite themselves and smaller ones caused overlapping of the crystallites. Based on the randomness analogy and the parameters used in the Monte Carlo simulation in Sorption module for the single crystallite, these four crystallites occupy relative positions in the cubic space (FIGS. 42 and 43). The relative positions are taken up by the crystallites either parallel to faces, edge to edge, edge to the face, or an intermediate form depending on the charge distribution on each crystallite and the moisture content. Typical fabric formation in loose mix form are shown in FIGS. 74 and 75. It could be noted that crystallite arrangement at lower water contents is more random and generally follows the face to edge/end configuration, while it becomes more oriented and adopts parallel configuration at higher water contents.

In the present disclosure, CED have been considered as a good indicator of the interaction of the soil structure to the water sorption and the consequent volume change. Simulated loose mixes of the soil were determined through the Forcite module of the software and plotted in the corresponding graphs in FIGS. 76 to 81. Total CED of the loose mixes varies from $1×10^8$ to $8×10$ J/m³. A general trend observed is that low CEC crystallites produce lesser cohesive energy while higher CEC and the crystallites sorbed with other compounds showed higher numbers.

Figure 82:
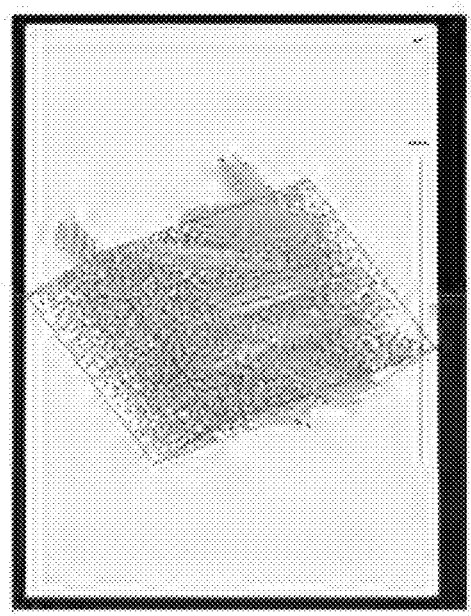
FIG. 82 is a graphical presentation of the compacted fabric created for Na-montmorillonite at 30% water content using Berendsen barostat.
Figure 83:
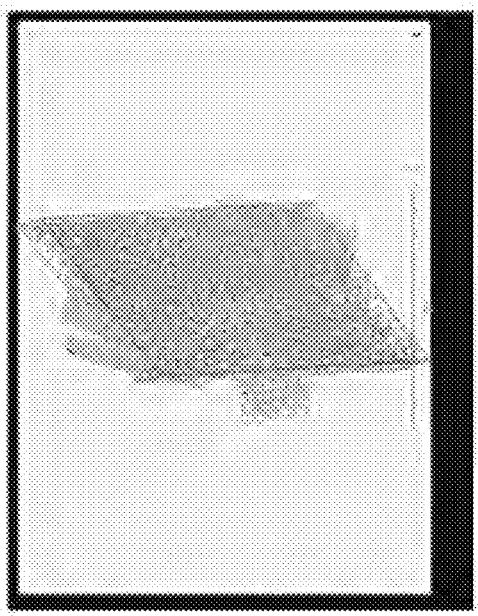
FIG. 83 is a graphical presentation of the compacted fabric created for Na-montmorillonite at 30% water content using Parrinello barostat.

To simulate the fabric and structure in the compacted specimens, unit cells consisting of the loose clay crystallites created in the previous step were compressed to the required density using Forcite molecular dynamics module. There are several barostats provided in the software for the control of applied pressure on the unit cell; Berendsen and Parrinello are two that could be considered suitable for the compaction simulation of naturally or manually compacted soil samples. In the compaction simulation, Berendsen thermostat was used as in the simulation of single crystallite, while Berendsen barostat was replaced by Parrinello barostat. As Berendsen barostat applies pressure in all the directions in a way to keep the unit cell dimensions equal, the corresponding reduction of volume on all the faces of the periodic boundary cell remains uniform. Therefore Berendsen barostat does not simulate the real compaction process in which stresses vary along the faces under a uniform compaction pressure process. A comparison of the compressed/compacted unit cells using Berendsen and Parrinello is shown in FIGS. 82 and 83. On the other hand, using Parrinello barostat has resulted in more realistic way of compaction by varying the stresses on the faces depending on the shear stresses generated in the unit cell. The resulting fabric is also more random and face to edge fabric on lower moisture content while more oriented and parallel fabric is created on higher moisture contents. The variation in relative positioning or configurations of the crystallites with water content is a well-established fact in compacted clays. FIG. 45 provides a 3-D view of the repetition of the unit cell in three dimensions in space. The repetition of unit cell provides the continuity of the crystallites to form soil particles. Since formulation of compacted crystallites/particles resemble the actual fabrics schematically visualized, it further confirms the selected parameters and procedures for the formulation and simulation of compacted fabric of soil particles.

Different confining or compaction pressures were used to simulate the several levels of geological and laboratory compaction pressures. Different pressures have resulted in different maximum densities of the unit cells (FIG. 44). It is evident from FIG. 44, high pressures of an order of 1 GPa causes quick compaction and may be closely representative of dynamic and static quick type of compaction using the laboratory and field equipment. On the other hand, low confining pressures of an order of 0.01 to 0.1 GPa result in slow compaction and hence may be simulating more closely slow compaction/consolidation pressures for the geological deposits. It could be noted from the plots that densities are also closely representative of the general range of field and laboratory densities.

Both total and van der Waals CED for each of the case were determined using Forcite module. Total cohesive energy density is plotted in the respective plots (FIGS. 76 to 81), while both total and van der Waals cohesive energy density are tabulated in Table 13. From the plots, it could be inferred that total CED for any compacted mix is sensitive to all the parameters being considered such as water content, density, CEC, cementation, and type and percentages of exchangeable and total cations.

From Table 13 and FIGS. 76 to 83, total CED has been found to be increasing with increase in CEC, density, cementation, and bivalent cations and decreasing with water content, while van der Waals cohesive energy density reduces and becomes repulsion in nature with the same variation of the above parameters.

TABLE 13

Summary of swell potential results for all the simulation cases

| Case no | Case | | | Initial water content (%) | Maximum density | | Relaxed density | |
|---|---|---|---|---|---|---|---|---|
| | | | | | Total cohesive energy density (J/cm$^3$) | van der Waals cohesive energy density (J/cm$^3$) | Total cohesive energy density (J/cm$^3$) | van der Waals cohesive energy density (J/cm$^3$) |
| 1 | HCEC | Na100 | — | 10 | 6636 | −145 | 5890 | −98 |
| 2 | | | | 20 | 5379 | −80 | 4500 | −33 |
| 3 | | | | 30 | 4360 | −35 | 3250 | 2 |
| 4 | | | | 40 | 3988 | −11 | 2945 | 20 |
| 5 | MCEC | Na100 | — | 10 | 3213 | −102 | 2640 | −62 |
| 6 | | | | 20 | 2750 | −50 | 2110 | −18 |
| 7 | | | | 30 | 2206 | 5 | 1615 | 28 |
| 8 | | | | 40 | 2212 | 5 | 1530 | 39 |
| 9 | LCEC | Na100 | — | 10 | 1828 | −77 | 1612 | −49 |
| 10 | | | | 20 | 1634 | −15 | 1333 | −1 |
| 11 | | | | 30 | 1650 | −13 | 1180 | 45 |
| 12 | | | | 40 | 1386 | −10 | 1130 | 59 |
| 13 | MCEC | Na100 | G20 | 10 | 8385 | −305 | 7336 | −224 |
| 14 | MCEC | Na100 | C10 | 10 | 10507 | −497 | 9476 | −125 |
| 15 | MCEC | Na100 | G20 | 20 | 7200 | −245 | 6437 | −162 |
| 16 | HCEC | Na100 | G20 | 10 | 11808 | −348 | 10586 | −260 |
| 17 | LCEC | Na100 | G20 | 10 | 7000 | −280 | 6308 | −211 |
| 18 | LCEC | Ca60Na40 | G20 | 12 | 3909 | −151 | 3363 | −105 |
| 19 | MCEC | Na100 | KCl10 | 10 | 0210 | −125 | 5450 | −79 |
| 20 | MCEC | Ca60Na40 | — | 10 | 3593 | −118 | 3138 | −87 |
| 21 | MCEC | K60Na40 | — | 10 | 3246 | −100 | 2748 | −64 |
| 22 | MCEC | Mg60Na40 | — | 10 | 3750 | −164 | 2930 | −121 |
| 23 | HCEC | Ca60Na40 | — | 10 | 7016 | −161 | 6388 | −123 |
| 24 | LCEC | Ca60Na40 | — | 30 | 1791 | −31 | 1320 | −4 |
| 25 | LCEC | Ca60Na40 | — | 40 | 1658 | −7 | 1207 | 18 |

| Case no | Final water content (%) | Maximum density (g/cm$^3$) | | Relaxed density (g/cm$^3$) | | Terminal density (g/cm$^3$) | | Swell (%) |
|---|---|---|---|---|---|---|---|---|
| | | Wet | Dry | Wet | Dry | Wet | Dry | |
| 1 | 68 | 2.432 | 2.211 | 2.132 | 1.938 | 0.571 | 0.340 | 470 |
| 2 | 87 | 2.112 | 1.760 | 1.762 | 1.468 | 0.617 | 0.330 | 345 |
| 3 | 105 | 1.831 | 1.408 | 1.382 | 1.063 | 0.656 | 0.320 | 232 |
| 4 | 110 | 1.731 | 1.236 | 1.309 | 0.935 | 0.651 | 0.310 | 202 |
| 5 | 77 | 2.359 | 2.145 | 1.903 | 1.730 | 0.602 | 0.340 | 409 |

TABLE 13-continued

Summary of swell potential results for all the simulation cases

|   |   |   |   |   |   |   |   |   |
|---|---|---|---|---|---|---|---|---|
| 6 | 95 | 2.226 | 1.855 | 1.600 | 1.333 | 0.663 | 0.340 | 292 |
| 7 | 140 | 1.683 | 1.295 | 1.260 | 0.969 | 0.792 | 0.330 | 194 |
| 8 | 150 | 1.686 | 1.204 | 1.204 | 0.860 | 0.800 | 0.320 | 169 |
| 9 | 74 | 2.441 | 2.219 | 2.073 | 1.885 | 0.592 | 0.340 | 454 |
| 10 | 105 | 1.967 | 1.639 | 1.677 | 1.398 | 0.697 | 0.340 | 311 |
| 11 | 115 | 2.000 | 1.538 | 1.444 | 1.111 | 0.710 | 0.330 | 237 |
| 12 | 140 | 1.700 | 1.214 | 1.290 | 0.921 | 0.768 | 0.320 | 188 |
| 13 | 33 | 2.510 | 2.282 | 2.195 | 1.995 | 1.820 | 1.368 | 46 |
| 14 | 26 | 2.636 | 2.396 | 2.367 | 2.152 | 2.050 | 1.630 | 32 |
| 15 | 39 | 2.218 | 1.848 | 1.955 | 1.629 | 1.700 | 1.223 | 33 |
| 16 | 29 | 2.588 | 2.352 | 2.459 | 2.236 | 1.727 | 1.368 | 53 |
| 17 | 32 | 2.597 | 2.361 | 2.391 | 2.174 | 1.789 | 1.368 | 51 |
| 18 | 60 | 2.294 | 2.048 | 1.947 | 1.738 | 2.168 | 1.355 | 28 |
| 19 | 29 | 2.225 | 2.025 | 1.923 | 1.748 | 1.790 | 1.388 | 20 |
| 20 | 50 | 2.422 | 2.202 | 2.075 | 1.886 | 0.915 | 0.610 | 209 |
| 21 | 40 | 2.454 | 2.231 | 2.037 | 1.852 | 0.574 | 0.410 | 352 |
| 22 | 55 | 2.408 | 2.189 | 1.815 | 1.650 | 0.791 | 0.510 | 224 |
| 23 | 44 | 2.497 | 2.270 | 2.325 | 2.113 | 0.868 | 0.610 | 240 |
| 24 | 113 | 1.969 | 1.515 | 1.480 | 1.138 | 0.843 | 0.396 | 187 |
| 25 | 138 | 1.798 | 1.284 | 1.343 | 0.959 | 0.935 | 0.393 | 144 |

Na: Sodium
Ca: Calcium
K: Potassium
Mg: Magnesium
G: Gypsum
C: Calcite
KCl: Potassium Chloride For the same CEC, lesser water content results in higher cohesive energy, but for same density/moisture, higher CEC crystallites achieve much higher cohesive energy. As cohesion in clay particles are a result of the hydrogen bonding between their surfaces and the water, more number of charge deficiency centers in higher CEC clay results in more number of hydrogen bonds and consequently raises the electrostatic attraction cohesive energy density. However, van der Waals repulsions increase due to the high vicinity of the crystallites. Therefore, higher total CED mixes have corresponding higher repulsion van der Waals. These additional repulsion forces play an important role in the expansion/swell behavior of the clay particles in addition to the hydration by water molecules. Similarly, interaction with gypsum and calcite also causes an increase in cohesive energy density due to the extra bonding created by the cations and anions. Although there is an increase in repulsion due to van der Waals forces, increase in attraction forces due to electrostatic component has much higher value and far outweighs the repulsion forces in these cases.

Figure 84:
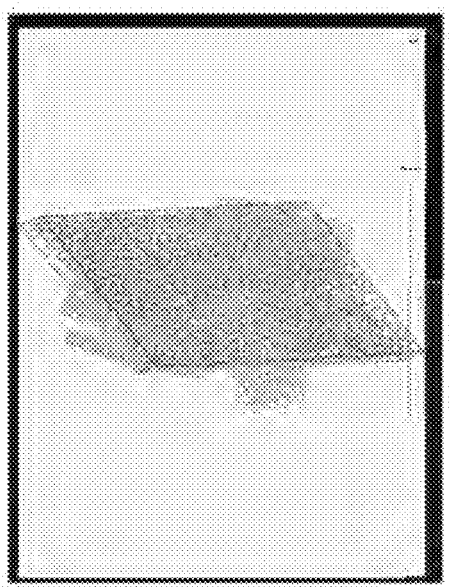
FIG. 84 is a graphical presentation of a fabric before the stress relief for Na-montmorillonite.
Figure 85:
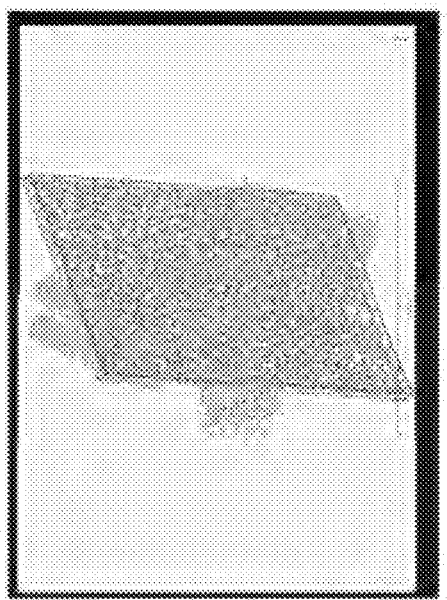
FIG. 85 is a graphical presentation of a fabric after the stress relief for Na-montmorillonite.

Natural expansive clay deposits usually form at deeper depths under consolidation pressures from the overlying geological formations. Once these clay layers are exposed closer to the ground surface due to removal of overlying layers, these layers become overconsolidated in nature as a result of this stress relief. Moreover, fabric and structure of these clay deposits also change as a result of the stress relief and several other features, such as fissures and voids, develop in the structure of these overconsolidated layers. To simulate the process of overconsolidation, compressed/compacted unit cells at higher pressures were dynamically run in the Forcite module using Parrinello barostat under a stress level of 1000 kPa. The pressure of 1000 kPa is a very close representation of the generally measured preconsolidation pressures of such deposits in the shallow subsurface. It is also representative of the compaction pressures of 1500 kPa used for the preparation of laboratory samples. As a result of stress relief simulation, the unit cells achieved a lesser density due to more void space and the corresponding change in lattice spacing of the crystallite layers. FIGS. 84 and 85 show typical unit cells before and after the stress relief simulation. Comparing the fabric before and after the stress relief shows not only an increase in pore space, but also an increase in the d-spacing of the crystallites. CED results in FIGS. 76 to 83 and Table 13 show a drop in cohesive energy as the structure relaxed. There is also a decrease in the repulsion forces due to van der Waals. This drop is indicative of the elastic recovery of the soil structure upon overburden stress relief.

Figure 86:
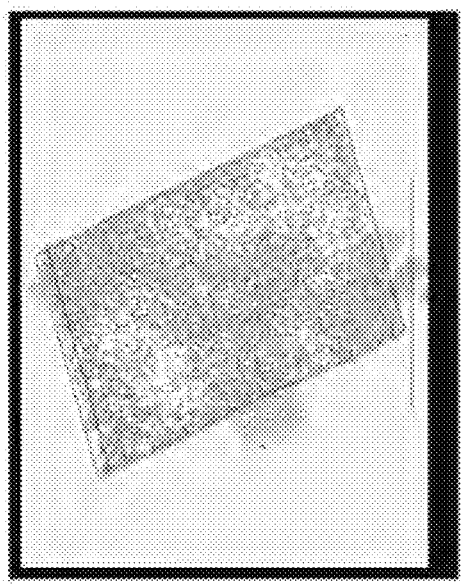
FIG. 86 is a graphical presentation of typical water molecules sorption in Na-montmorillonite crystallites compacted at 30% water content, with blue colored water molecules (in the original color figure) indicating the sorption in the current sorption step.

Relaxed unit cell for each of the case under study was then sorbed with water molecules. A typical water sorption of water molecules in Na-montmorillonite crystallites compacted with 30% water content is shown in FIG. 86. FIG. 86 shows that water molecules have occupied both inter and intra crystallite space. For each phase of Sorption, 25,000 steps were adopted to sorb the maximum number of water molecules. Depending on the initial water content, density, and other factors such as cementation and exchangeable cations, water sorption for a single step varied from as low as 2% to maximum of 10%. Very low water content is indicative of structure with very small pore space created either due to high density or cementation. Higher water content sorption on the other hand indicates an open pore space fabric and high interlayer deficiency. At the end of each sorption phase, the unit cell of crystallites were dynamically stabilized using Forcite module. Sorption steps were repeated in steps followed by stabilization through molecular dynamics until the swell cutoff was reached. Swell cutoffs have been defined based on the cohesive energy concept and are explained below on swelling of water sorbed various forms of crystallites.

Figure 87:
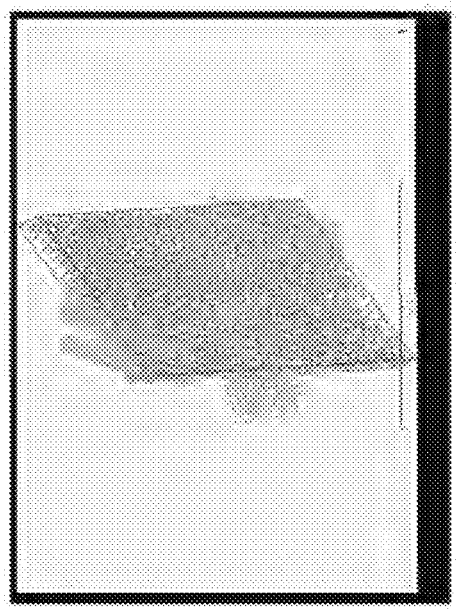
FIG. 87 is a graphical presentation of swelling simulation of crystallites unit cell of Na-montmorillonite showing pre swell fabric at 30% water content.
Figure 88:
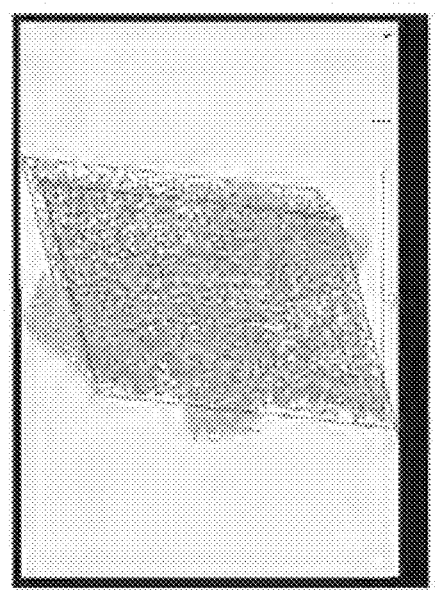
FIG. 88 is a graphical presentation of swelling simulation of crystallites unit cell of Na-montmorillonite showing post swell fabric at 40% water content.

Each unit cell consisting of four crystallites and sorbed with the maximum number of water molecules in 25,000 steps in the Sorption module was subjected to molecular dynamics using Forcite module. The dynamics module causes the movement of molecules to stable positions and result in a stable expanded structure under a pressure of 1000 kPa (FIGS. 87 and 88). It could be noted from FIGS. 87 and 88 that the volume change occurs both in the interlayer and intracrystallite space. The maximum expansion occurs in the intracrystallite space while the interlayer space continues to expand at slow pace until it reaches a maximum value of about 17.5 Å.

From the cohesive energy density plots shown in FIGS. 76 to 81, it is noted that each swelling phase causes reduction in cohesive energy density at a uniform rate for each CEC of Na-montmorillonite except for HCEC at 10% water content. All the cases, except those with cementation and exchangeable cations other than $Na^+$, a straight line plot between CED and water content is continued until it reaches a swell cutoff or terminal point. Swell cutoff points for all such cases were found to be terminating at a cohesive energy density of an order of 300 to 500 $J/cm^3$. By looking at the swell potential test results, terminal dry densities were found to be about 0.45 to 0.55 $g/cm^3$ for 100% bentonite samples. In the dynamics simulation, this density range has been found equivalent to the cohesive energy density range of 300 to 400 $J/cm^3$. In the absence of any other factor causing an early termination of swelling process such as cementation and/or exchangeable cations other than $Na^+$, all the swell lines terminate at a cohesive energy density of 400 $J/cm^3$. The termination points also indicate the terminal or post swell moisture content. For the other cases, terminal or swell cutoffs are discussed later herein.

Figure 89:
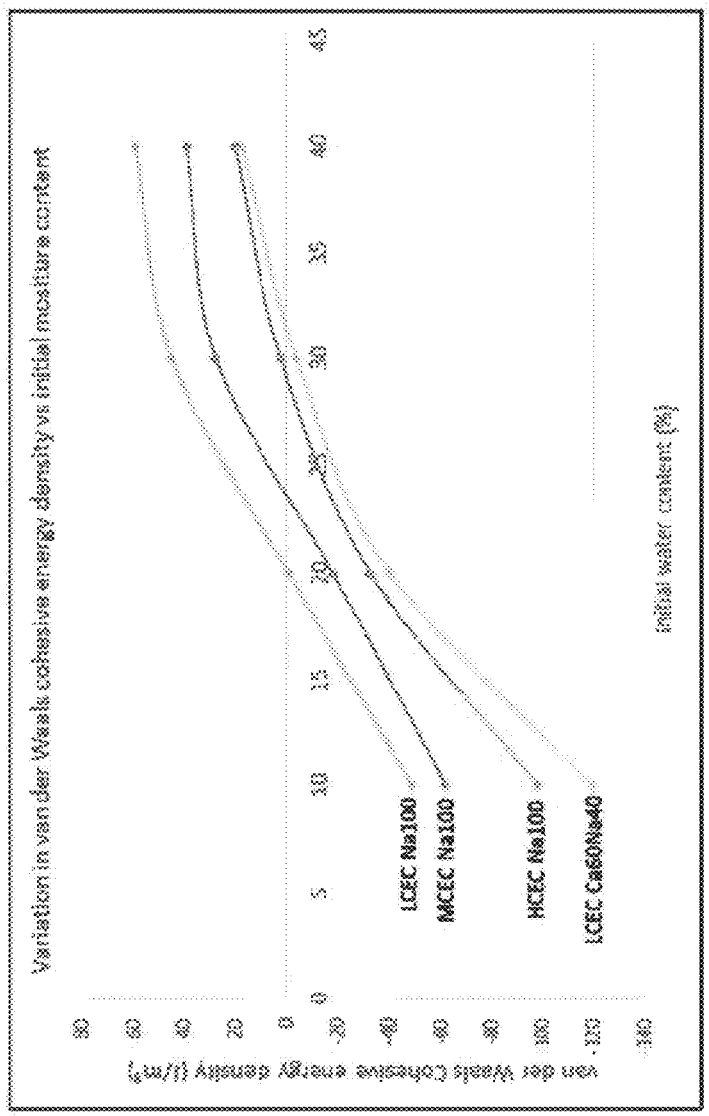
FIG. 89 is a graphical presentation of variation of van der Waals cohesive energy density with initial water content.
Figure 90:
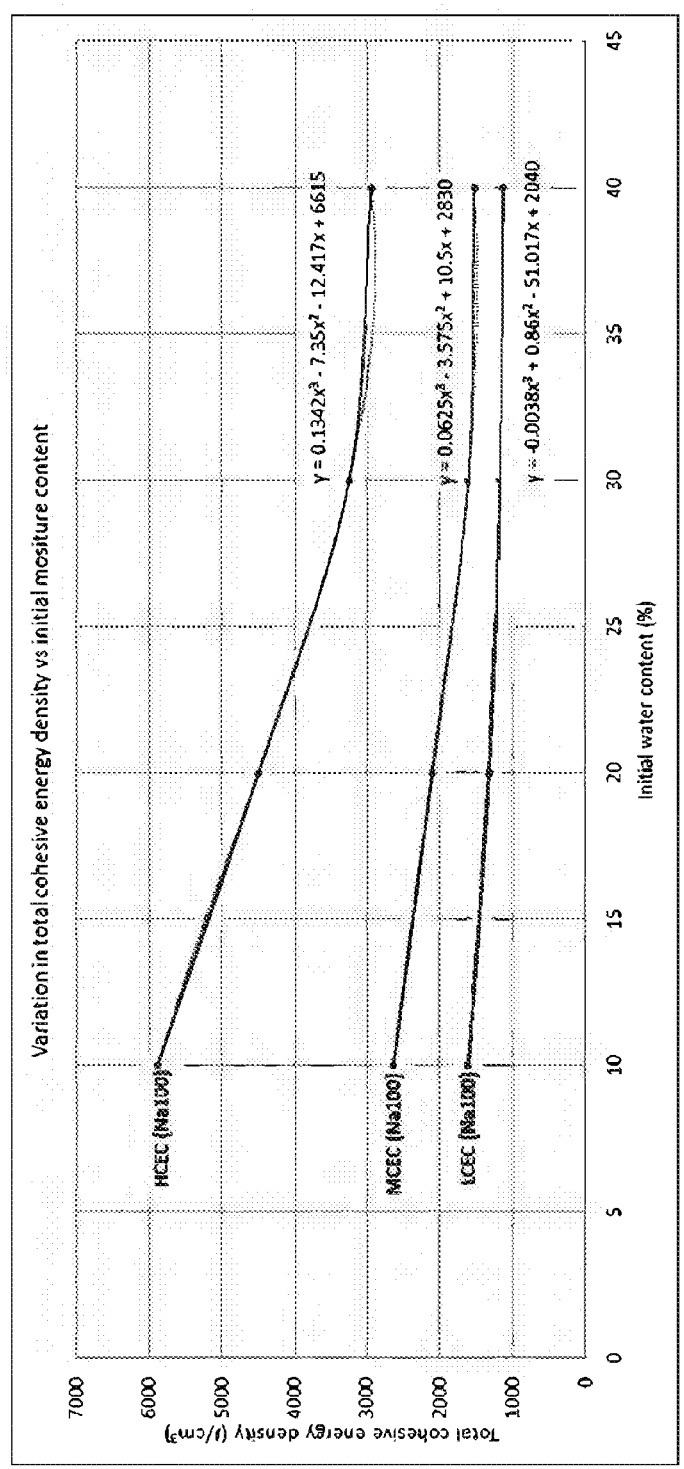
FIG. 90 is a graphical presentation of variation of total cohesive energy density of Na-montmorillonite crystallites of different CECs compacted at a range of initial water content.
Figure 91:
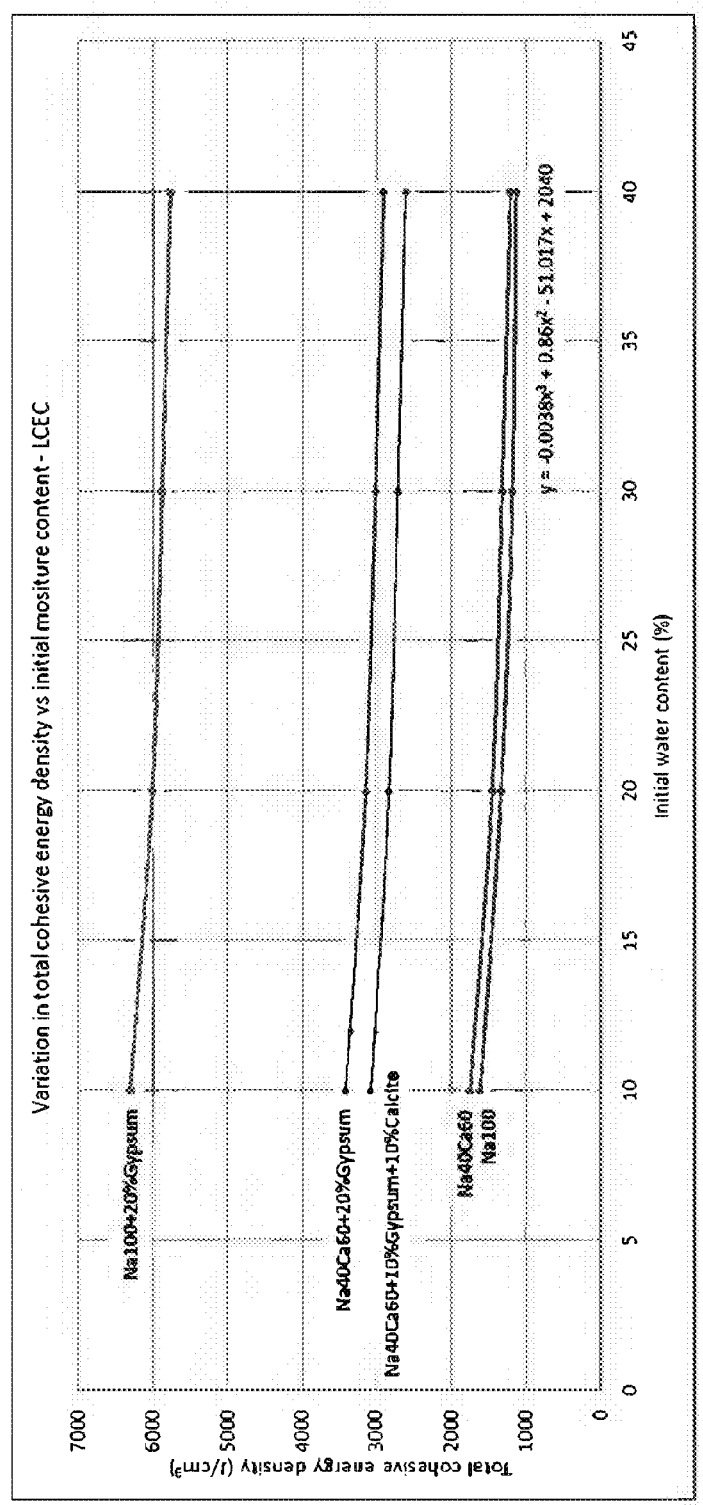
FIG. 91 is a graphical presentation of variation of total cohesive energy density of montmorillonite crystallites of LCEC compacted at a range of initial water content.
Figure 92:
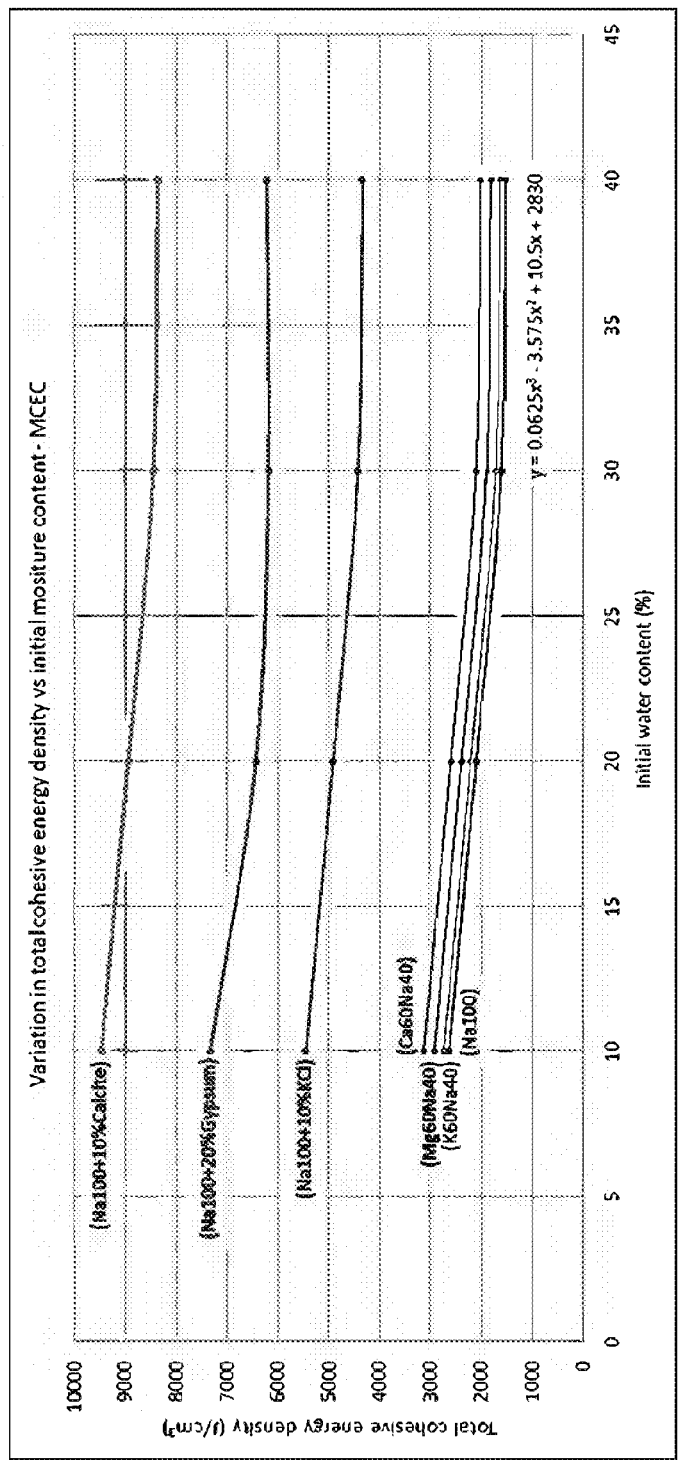
FIG. 92 is a graphical presentation of variation of total cohesive energy density of montmorillonite crystallites of MCEC compacted at a range of initial water content.
Figure 93:
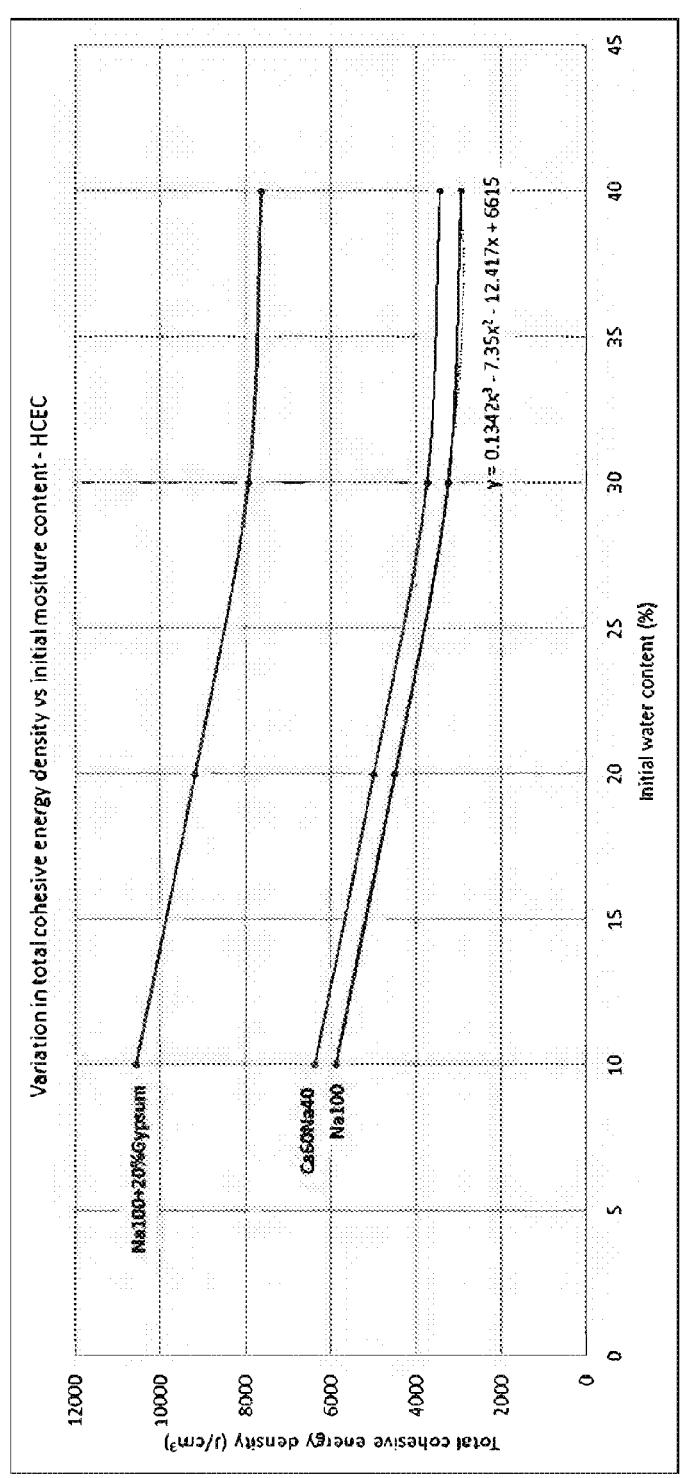
FIG. 93 is a graphical presentation of variation of total cohesive energy density of montmorillonite crystallites of HCEC compacted at a range of initial water content.

It could be observed from FIGS. 76 to 81 that terminal moisture content for high swell cases for each CEC is lesser than their low swell counterparts. For instance, swell line for 30% initial water content LCEC terminates at 113% while the one for 40% initial water content LCEC falls at 138%. A similar observation was also made during the swell potential tests (Table 9); terminal moisture content for initial moisture contents of 30% and 40% are 136% and 174% respectively. This anomalous phenomenon can be explained using the contribution of van der Waals to the cohesive energy density (FIG. 89). For these cases, in addition to the expansion caused by water molecules, the repulsion force due to van der Waals results in pushing the particles apart. Since these forces are higher in case of highly compacted specimens or lesser moisture contents, relatively higher swelling takes place at lower water content for such cases. The resulting swell potential determined from the swell simulations for all the cases under study are summarized in Table 13.

Figure 80:
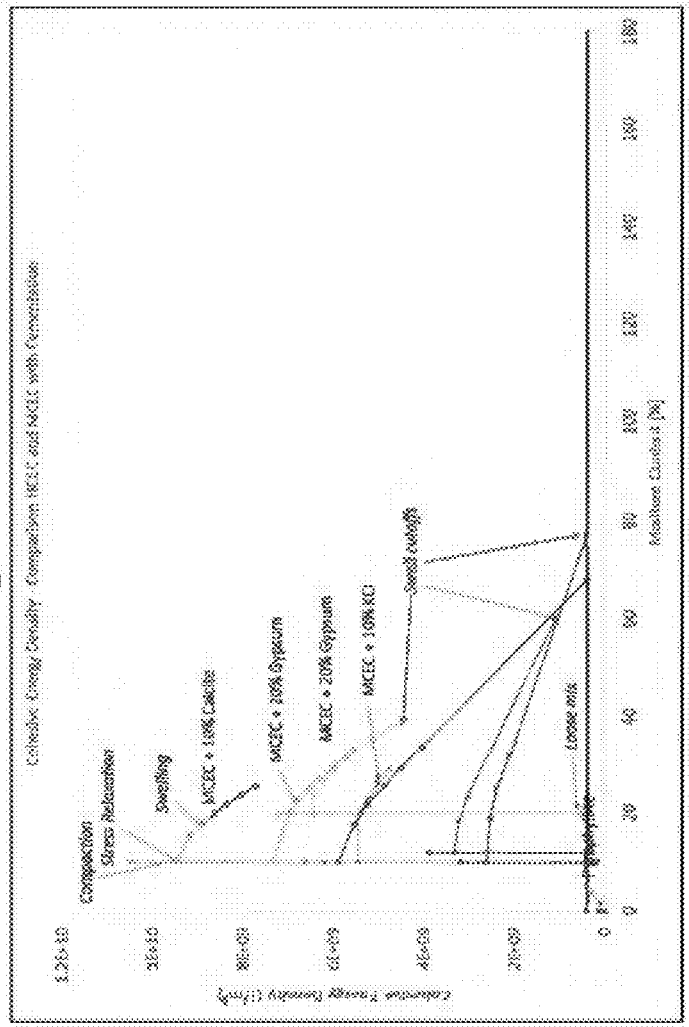
FIG. 80 is a graphical presentation of cohesive energy density plots for crystallites for all stages of simulations (loose, compacted, relaxed, and swelling) for changes in cementation compounds.
Figure 81:
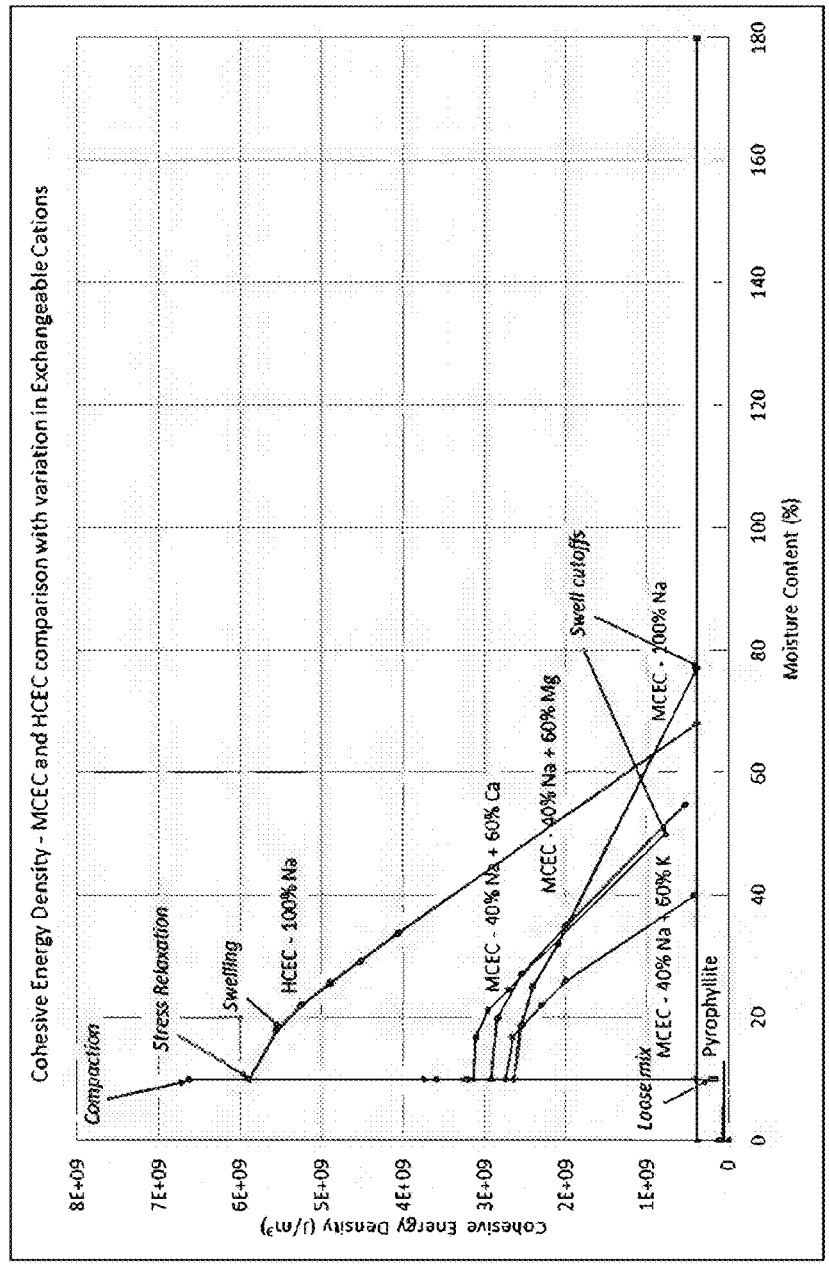
FIG. 81 is a graphical presentation of cohesive energy density plots for crystallites for all stages of simulations (loose, compacted, relaxed, and swelling) for changes in exchangeable cations.

The most common types of cementation produced in natural soil deposits are by calcite, gypsum, and potassium chloride. From FIGS. 76 to 81, it can be observed that there is a substantial increase in the cohesive energy density of an order of 20 to 300%. The CED contribution from van der Waals is repulsion in nature and is also higher than their counterparts. For all these cases, unlike Na-montmorillonite, the plot between CED and moisture content is not a straight line. The plot has an initial straight portion followed by a curvature and a straight line to the terminal or swell cutoff. Swell cutoff for these cases have been determined to be the point up to cohesive energy density equivalent to $4 \times 10$ $J/m^3$ plus CED difference between the specific case and its Na-montmorillonite counterpart. FIGS. 80 and 81 show the typical curved plots and the corresponding terminal or swell cutoff points and the corresponding swell potentials are summarized in Table 13.

Several combinations of exchangeable cations shown in Table 12 were transformed into respective unit cells and were simulated for swelling using all the steps described above. FIG. 81 provides the corresponding cohesive energy plots for these various combinations. Replacing 60% of exchangeable $Na^+$ cation with $K^+$ cation causes a reduction in swell by about 15%, while 60% replacement with $Ca^{2+}$ and $Mg^{2+}$ cations result in a reduction by 50% and 45% respectively. These results also indicate the sensitivity of these models to the change in percent and type of exchangeable cations. Bivalent cations such as $Ca^{2+}$ and $Mg^{2+}$ result in extra binding to the crystallite layers and hence cause a reduction in swell potential. Similarly, as compared to bivalent cations, monovalent $K^+$ cation does not provide binding forces enough to cause substantial reduction in swell potential.

Based on the CEC and the type of major exchangeable cations, LCEC with 60% Ca+40% Na could be considered as a close representative of the bentonite used in this study. Swell potential results of this combination very closely match the values obtained from swell potential tests. Considering that some part of post swell water content resides in the macro pores, the terminal moisture contents as assessed from simulations are also very close to the ones determined experimentally.

Figure 94:
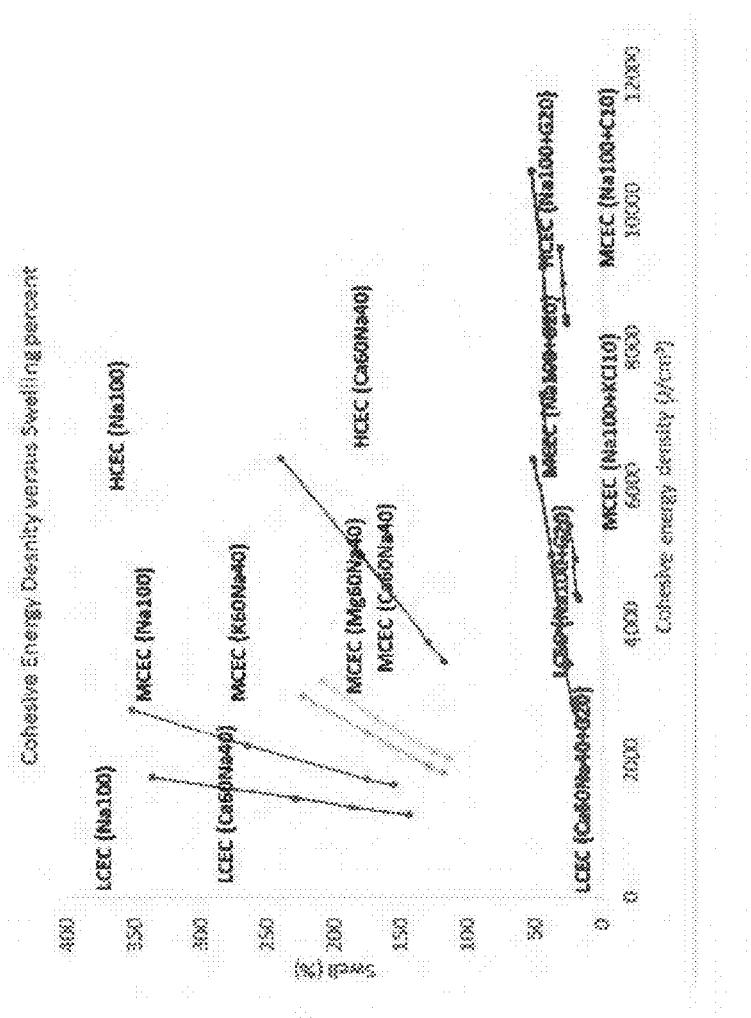
FIG. 94 is a graphical presentation of relationships between total cohesive energy density and swell potential for different cases of montmorillonite with variation in cations and non-clay cementation compounds.
Figure 95:
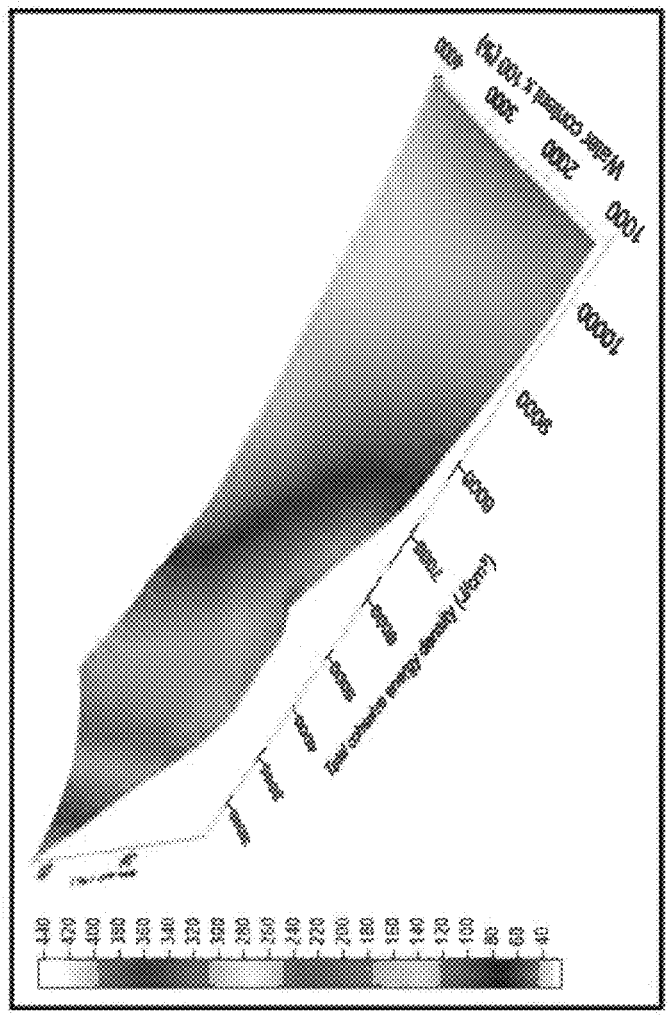
FIG. 95 is a graphical presentation of 3-D representation of constitutive surface of the Nano level model for expansive clays.

The results of the molecular level simulations of different CECs, moisture, density, exchangeable cations, and cementation effects were compiled to form two unified sets of plots. One set of plots consists of graphs between two state variables i.e., water content and the total CED for all the possible variations of the parameters for each CEC (FIGS. 90 to 93). Similarly, plots were prepared between CED and the third state variable, swell potential, for the various cases considered in Table 13 (FIGS. 94 and 95). In combination, these plots serve as a nano level constitutive model, a 3-D representation is provided in FIG. 95. These surfaces can be used to determine the swell potential of any natural or compacted expansive clays using the basic input parameters such as initial moisture content, CEC, exchangeable cations, and total cations/non-clay minerals.

The plots in FIGS. 90 to 93 show a general trend of decreasing CED with the water content until 30% and afterwards it remains almost constant. Any change in parameters like CEC, cementations, and cations, causes a shift in total CED and the shift remains constant throughout the moisture content range. To avoid cluttering of the data and for better visualization, several plots have been omitted in these figures. Development of an incremental form of constitutive relations is detailed later herein.

In addition to the total swell potential determination, the molecular level simulation results for all the parameters such as CEC, water content, density, exchangeable cations, and cementation compounds have also been used to develop the constitutive equations of a nano model relating the incremental intake water content to the corresponding change in the volume as:

$$d_v = \text{(slope for straight line or hyperbolic for curved plots)} d_{wc} \quad 4\text{-}1$$

where $d_v$ and $d_{wc}$ are change in volume and water content respectively $$\text{slope or slope change(hyperbolic)} = (IDD - FDD)/(FWC - IWC)$$

Figure 96:
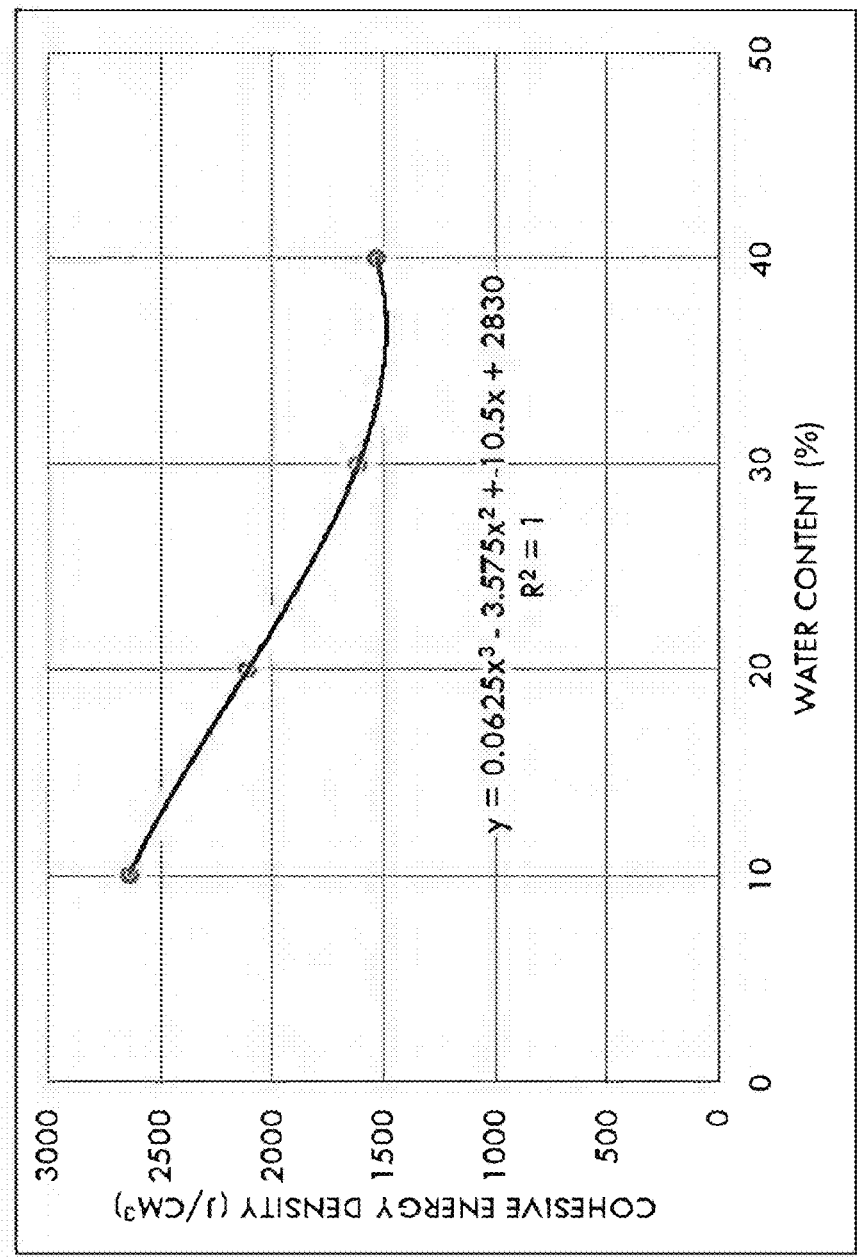
FIG. 96 is a graphical presentation of basic relationship between total cohesive energy density and initial water content.

IDD=initial dry density, FDD=final dry density, FWC=final water content, IWC=initial water content A basic equation relating the initial water content and the total cohesive energy density (TCED) is developed from FIG. 96 and is expressed as:

$$TCED = 0.0625(IWC)^3 - 3.575(IWC)^2 + 10.5(IWC) + 2830 \quad 4\text{-}2$$

Figure 97:
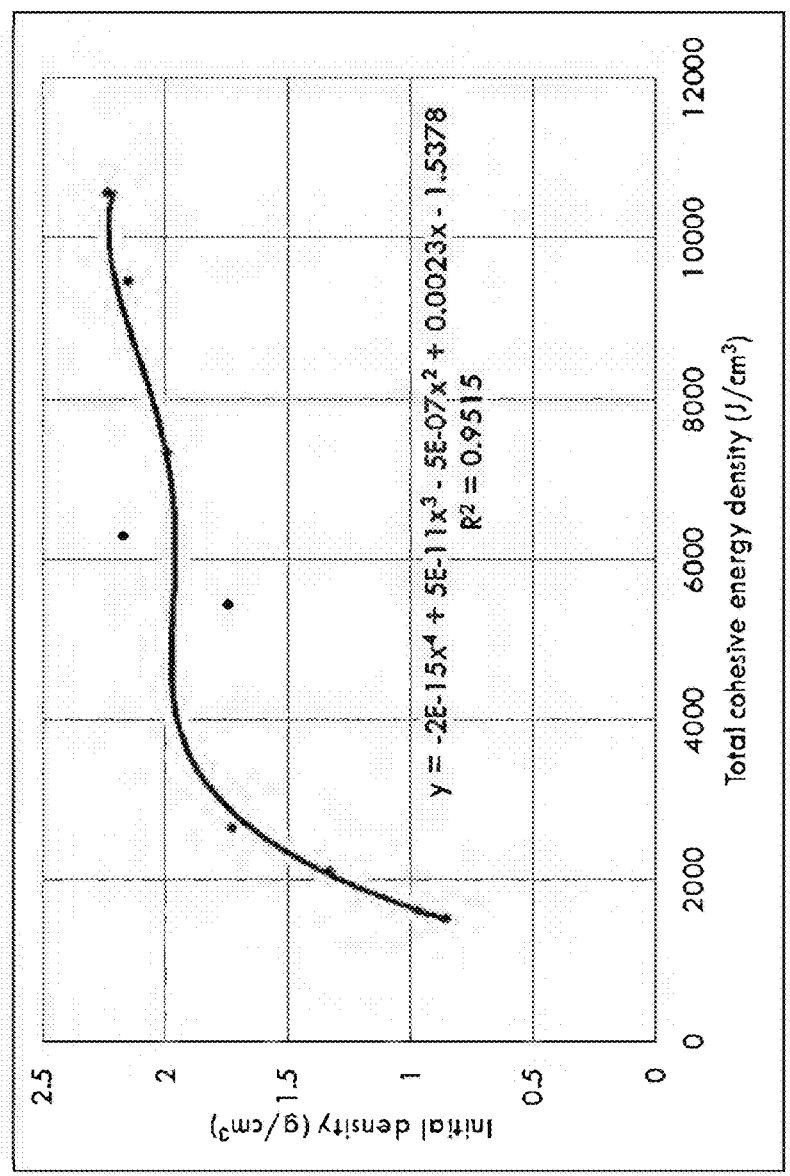
FIG. 97 is a graphical presentation of variation of initial density with total cohesive energy density.
Figure 98:
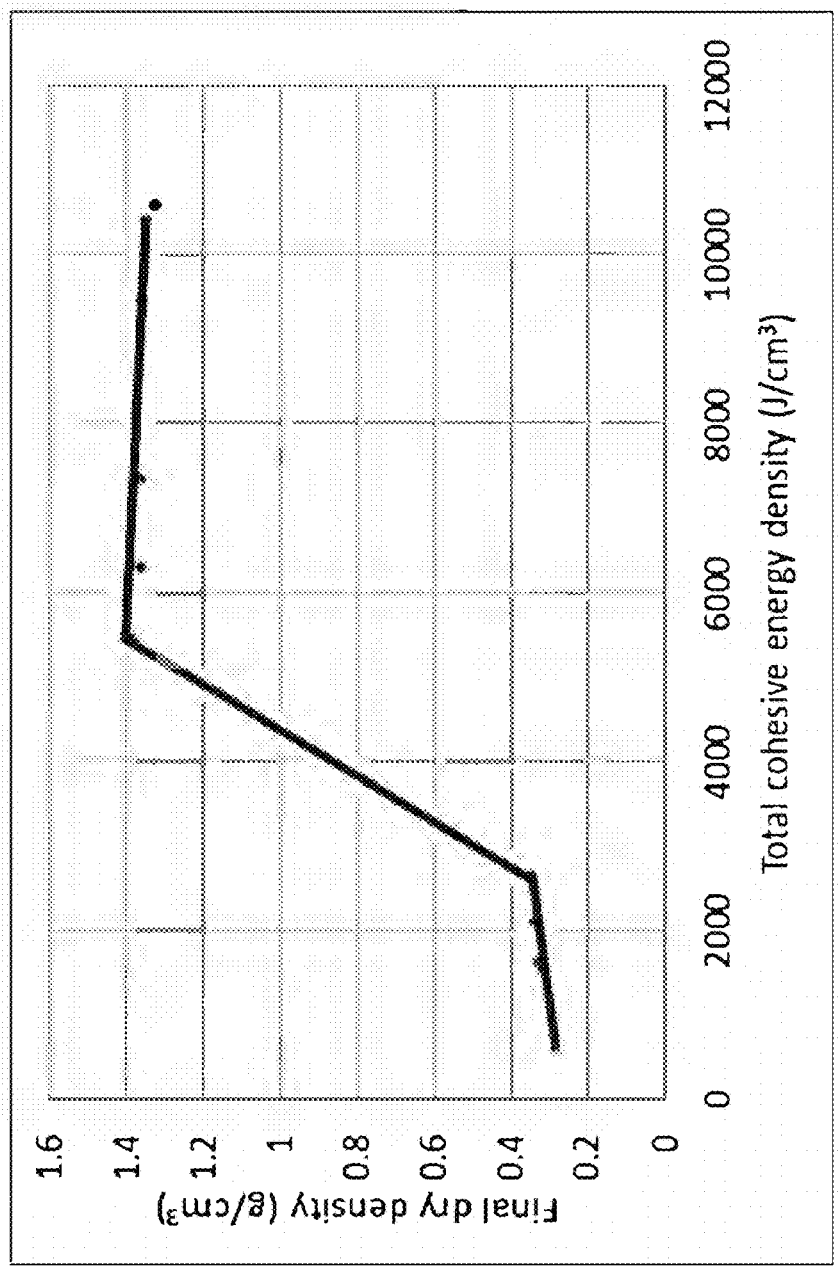
FIG. 98 is a graphical presentation of variation of final density with total cohesive energy density.
Figure 99:
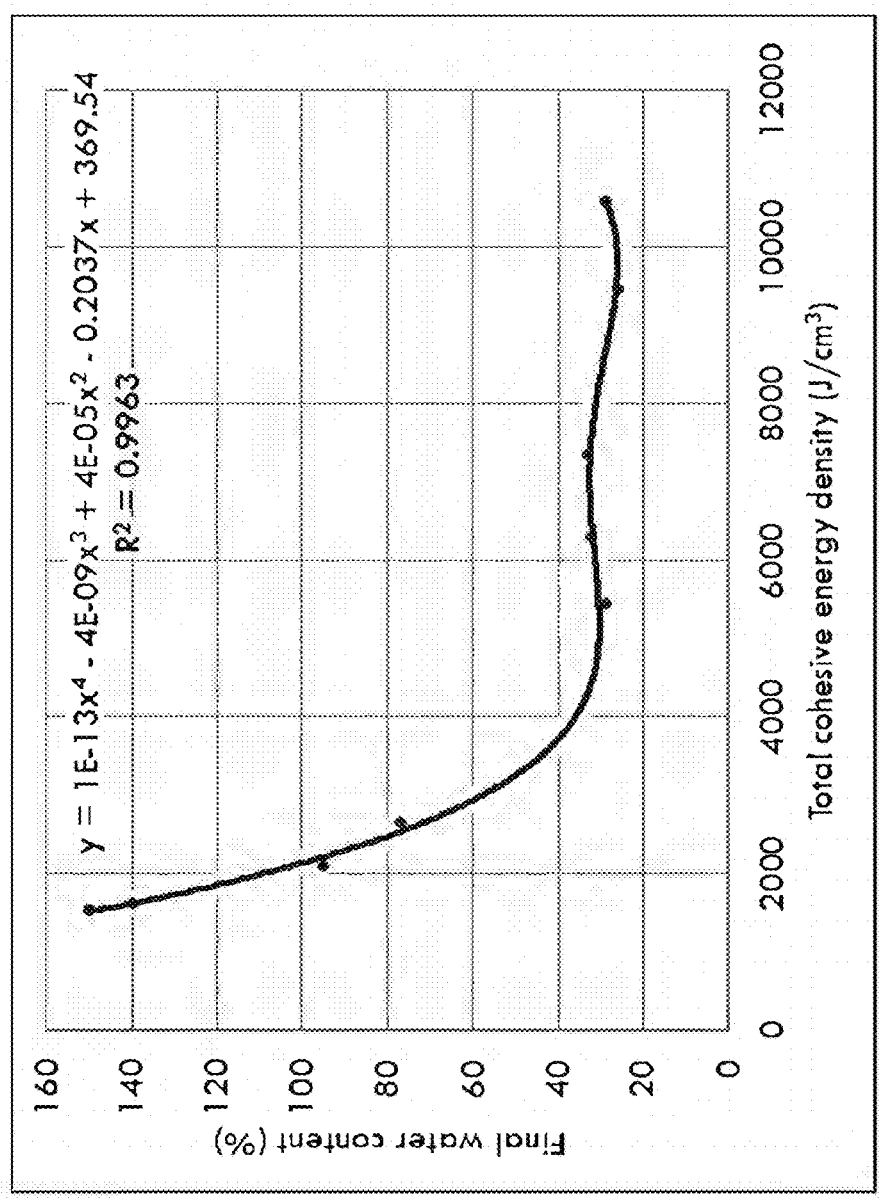
FIG. 99 is a graphical presentation of variation of final water content with the total cohesive energy density.

Considering a constant shift in total cohesive energy density by change in exchangeable cations and by addition of cementing agents, equation 4-2 has been modified as:

$$TCEDm = 0.0625(IWC)^3 - 3.575(IWC)^2 + 10.5(IWC) + 2830 + 7100(C/0.1) + 5050(G/0.2) + 3010(KCl/0.1) + Ca(500) + Mg(300) + K(100) \quad 4\text{-}3$$

where
TCEDm=modified TCED, C=Calcite, G=Gypsum, KCl=Potassium chloride, Ca=Calcium exchangeable cation, Mg=Magnesium exchangeable cation, K=Potassium exchangeable cation Using this comprehensive relationship for total cohesive energy density, other required start and end points in the equation 4-1 could be obtained from the relationships developed from FIGS. 97 to 99. The corresponding relationships for Initial Dry Density (IDD), Final Dry Density (FDD), and Final Water Content (FWC) are provided below:

$$IDD = \{-2E\text{-}15(TCED)^4 + 5E\text{-}11(TCED)^3 - 5E\text{-}07(TCED)^2 + 0.0023(TCED) - 1.5378\} * 1.85 * (ABS(CEC-90)/90) \quad 4\text{-}4$$

$$FDD = -2E\text{-}22(TCED)^6 + 5E\text{-}18(TCED)^5 - 6E\text{-}14(TCED)^4 + 3E\text{-}10(TCED)^3 - 7E\text{-}07(TCED)^2 + 0.0005(TCED) + 0.3747 \quad 4\text{-}5$$

$$FWC = \{1E\text{-}13(TCED)^4 - 4E\text{-}09(TCED)^3 + 4E\text{-}05(TCED)^2 - 0.2037TCED + 369.54\} * ABS(CEC2-90)/CEC2 * 0.82 \quad 4\text{-}6$$

The constitutive surface shown in FIGS. 68 and 69 can be expressed in the form of equations 4-4 to 4-6 to develop the equation for the constitutive surface:

$$\text{Swell (\%)} = (FDD - IDD)/FDD * 100 \quad 4\text{-}7$$

Figure 100:
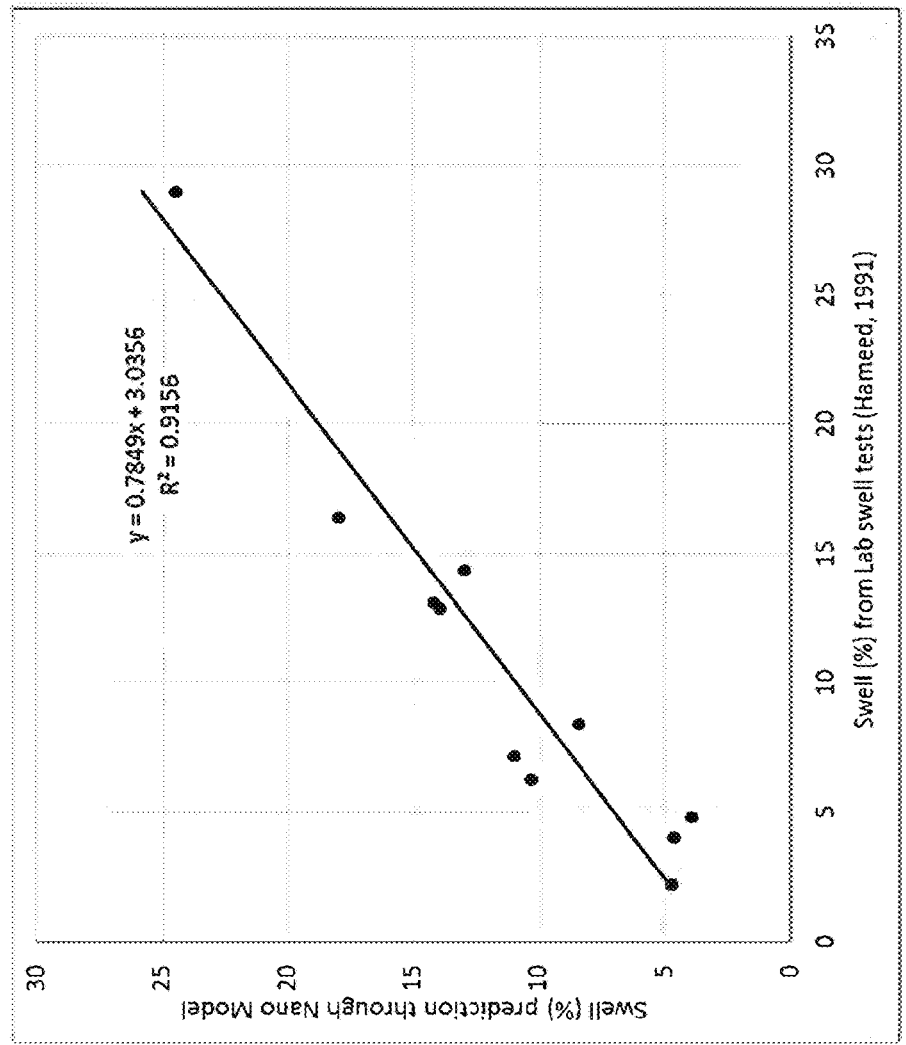
FIG. 100 is a graphical presentation showing comparison of swell potential tests results from Hameed (1991) and nano/molecular model predictions.

Using the above equations of the nano model, swell potential was determined for all the samples tested using swell potential tests in the present disclosure and are tabulated in Table 14. Similarly, swell potential was also assessed for the undisturbed samples from the Eastern region of KSA tested by Hameed and the results are tabulated in Table 15 and plotted in FIG. 100. See Hameed, R. A. (1991), "Characterization of Expansive Soils in the Eastern Province of Saudi Arabia", MS Thesis, KFUPM, Dhahran, Saudi Arabia, July 1991, incorporated herein by reference in its entirety.

TABLE 14

Summary of comparison of swell potential tests results in the current study and nano/molecular model predictions

| | | | | | | | | | Swell Tests | |
| --- | --- | --- | --- | --- | --- | --- | --- | --- | --- | --- |
| Sample No | Moisture Content State | NaM | CaM | Bentonite | Sand | Gypsum | Calcite | Kaolinite | Swell (%) | Initial Dry Desnity (g/cm$^3$) |
| 1 | Dry of OMC | — | — | 100 | — | — | — | — | 184 | 1.290 |
| 2 | Wet of OMC | — | — | 100 | — | — | — | — | 132 | 1.290 |
| 3 | Dry of OMC | — | — | 60 | 40 | — | — | — | 153 | 1.577 |
| 4 | Wet of OMC | — | — | 60 | 40 | — | — | — | 111 | 1.577 |
| 5 | Dry of OMC | — | — | 30 | 70 | — | — | — | 89 | 1.750 |
| 6 | Wet of OMC | — | — | 30 | 70 | — | — | — | 53 | 1.750 |
| 7 | Dry of OMC | — | — | 10 | 90 | — | — | — | 32 | 1.917 |
| 8 | Wet of OMC | — | — | 10 | 90 | — | — | — | 5 | 1.917 |
| 10 | Dry of OMC* | — | — | 30 | 60 | 10 | — | — | 21 | 1.750 |
| 11 | Dry of OMC* | — | — | 30 | 40 | 30 | — | — | 11 | 1.750 |
| 12 | Dry of OMC* | — | — | 30 | 20 | 50 | — | — | 6 | 1.750 |
| 13 | Dry of OMC* | — | — | 30 | 40 | — | 30 | — | 74 | 1.750 |
| 14 | Dry of OMC* | — | — | 30 | 20 | — | 50 | — | 68 | 1.750 |
| 25 | NMC | | | | Qatif (Q-1) | | | | 29 | 1.367 |

| | Swell Tests | | | | | Nano Model Prediction | | |
| --- | --- | --- | --- | --- | --- | --- | --- | --- |
| Sample No | IMC (%) | Initial Wet Desnity (g/cm$^3$) | FMC (%) | Final Dry Desnity (g/cm$^3$) | Final Wet Desnity (g/cm$^3$) | Swell (%) | Final Dry Desnity (g/cm$^3$) | FMC (%) |
| 1 | 29.5 | 1.67 | 136.0 | 0.45 | 1.07 | 187 | 0.396 | 113 |
| 2 | 39.0 | 1.79 | 174.0 | 0.56 | 1.52 | 144 | 0.393 | 138 |
| 3 | 19.5 | 1.88 | 93.0 | 0.62 | 1.20 | 155 | — | — |
| 4 | 26.0 | 1.99 | 103.0 | 0.75 | 1.52 | 121 | — | — |
| 5 | 11.3 | 1.95 | 72.0 | 0.93 | 1.59 | 90 | — | — |
| 6 | 18.8 | 2.08 | 82.0 | 1.14 | 2.08 | 58 | — | — |
| 7 | 5.2 | 2.02 | 18.0 | 1.45 | 1.71 | 33 | — | — |
| 8 | 13.4 | 2.17 | 22.0 | 1.83 | 2.23 | 5 | — | — |
| 10 | 12.0 | 1.96 | 56.0 | 1.45 | 2.26 | 28 | 1.355 | 60 |
| 11 | 12.0 | 1.96 | 27.0 | 1.58 | 2.00 | 9 | — | — |
| 12 | 12.0 | 1.96 | 19.0 | 1.65 | 1.96 | 6 | — | — |
| 13 | 12.0 | 1.96 | 80.0 | 1.01 | 1.81 | 32 | 1.63 | 26 |
| 14 | 12.0 | 1.96 | 66.0 | 1.04 | 1.73 | 29 | — | — |
| 25 | 7.2 | 1.47 | 55.6 | 1.06 | 1.65 | 28 | 1.355 | 60 |

*Static Compaction
NMC: Natural Moisture Content
IMC: Initial Moisture Content
FMC: Final Moisture Content

TABLE 15

Summary of comparison of swell potential tests results from Hameed (1991) and nano/molecular model predictions

| Sample No. | Location | BH/TP No. | Depth (m) | Smectite (%) | Non-swell cementitious minerals (%) | Non-swell cementitious associated (%) | Swell (%) from Swell tests* | Swell (%) from Nano Model** |
|---|---|---|---|---|---|---|---|---|
| 1 | Al-Khars, Al-Hasa | BH-9 | 2.5-2.7 | 7 | 50 | 3.5 | 2.2 | 4.7 |
| 2 | Mahasen-Aramco, Al-Hasa | BH-13 | 2.0-2.25 | 4 | 34 | 1.4 | 6.28 | 10.3 |
| 3 | Al-Hamadiya | BH-11 | 1.0-1.3 | 8 | 35 | 2.8 | 7.16 | 11.0 |
| 4 | Al-Salehiya | BH-12 | 2.4-2.7 | 6 | 64 | 3.8 | 4.84 | 3.9 |
| 5 | Al-Khars, Al-Hasa | TP-7 | 1.1 | 6 | 39 | 2.3 | 8.4 | 8.4 |
| 6 | Al-Naathel, Al-Hasa | TP-11 | 2.0-2.2 | 6 | 27 | 1.6 | 16.38 | 18.0 |
| 7 | Mahasen-Aramco, Al-Hasa | TP-11 | 2.0-2.2 | 4 | 32 | 1.3 | 13.11 | 14.2 |
| 8 | Housing Area | BH-1 | 3.8 | 30 | 40 | 12.0 | 29 | 24.5 |
| 9 | Housing Area | BH-3 | 1.8-2.1 | 13 | 48 | 6.2 | 4.06 | 4.6 |
| 10 | Umm Al-Sahek | BH-6 | 0.45-0.6 | 25 | 32 | 8.0 | 14.35 | 13.0 |
| 11 | Umm Al-Hamman | BH-8 | 5.6-5.75 | 39 | 39 | 15.2 | 12.88 | 13.9 |

*Hameed (1991)
**Current study

As observed from Tables 14 and 15, predictions of swell potential, final dry densities, and moisture contents for most of the cases are very close to the values obtained from the macro level tests. It can also be observed that major difference exists only in the measured and predicted values for samples with calcite as a non-clay mineral. This deviation can be attributed to very low solubility of calcite in distilled water as compared to gypsum that has a moderate solubility in water. As distilled water was used for the swell potential tests, very low percentages of calcite would have got interacted with the clay particles consequently causing only small reduction in swell potential. On the other hand, the molecular simulations for this case considers the interaction of entire 10% calcite with the clay crystallite. Therefore, the extent of the percent of non-clay mineral interacting with clay mineral in laboratory or natural samples should always be considered.

Minor deviations in some other cases could be attributed to the contributions from the macro level features in the samples. So for the cases where macro features dominate in controlling the water in flow and the volume change, it is required to consider the coupling of this nano model with micro and macro level models to assess the total swell potential of the real fabric and structure of the expansive clays.

Application of the nano model to the natural soils requires a knowledge of the quantity and distribution of the non-clay minerals in the matrix. This knowledge can be acquired from the XRD results and total cations analysis of these samples. Based on this close confirmation of swell potential for undisturbed samples by nano model, it can also quite effectively be used for the assessment of swell potential of natural expansive clay deposits.

Figure 101:
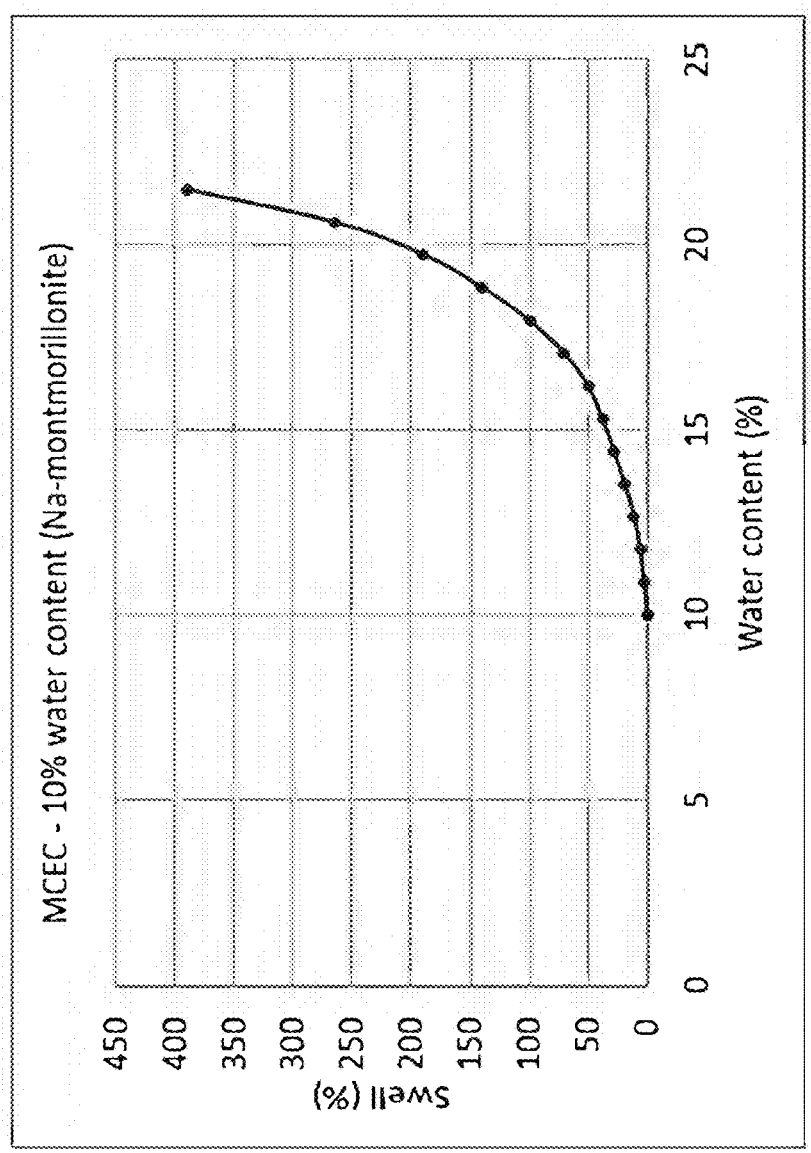
FIG. 101 is a graphical presentation of water content—swell relationship for Na-montmorillonite (MCEC).
Figure 102:
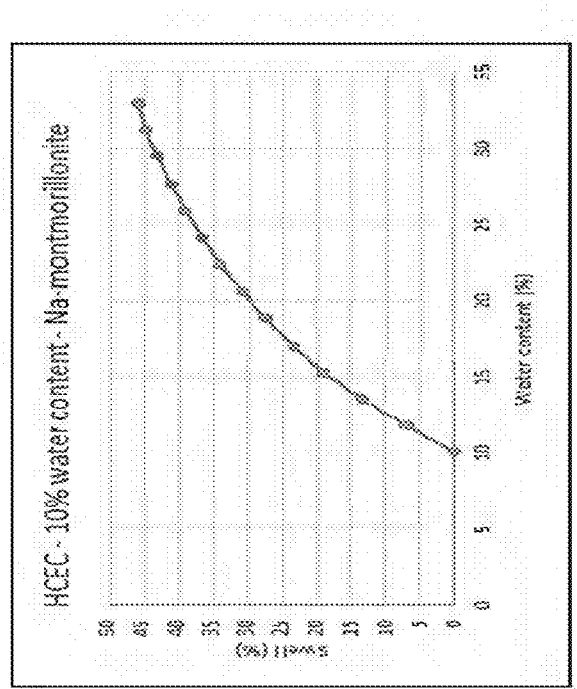
FIG. 102 is a graphical presentation of water content—swell relationship for Na-montmorillonite (HCEC).
Figure 103:
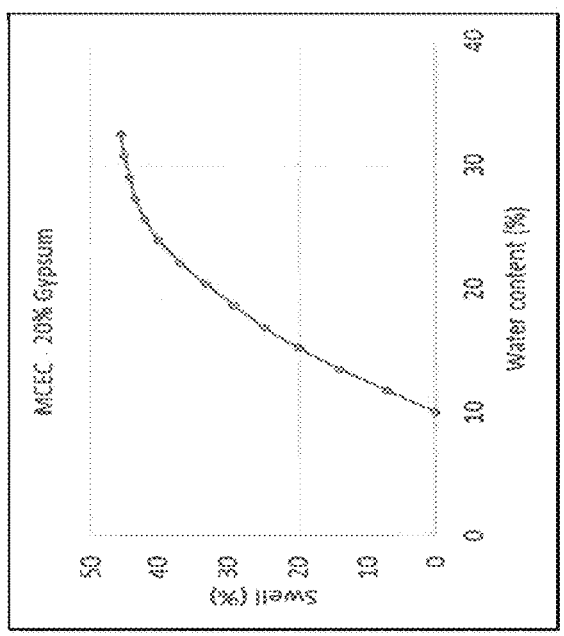
FIG. 103 is a graphical presentation of water content—swell relationship for 20% Gypsum (MCEC).
Figure 104:
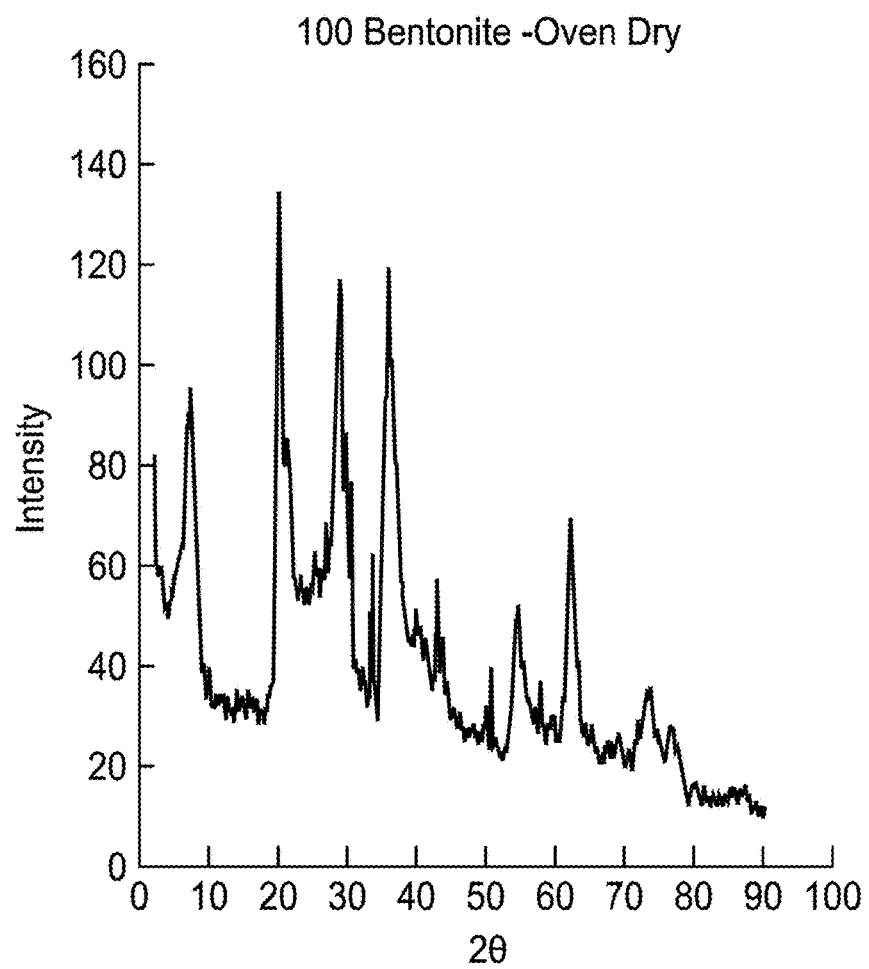
FIG. 104 is a graphical presentation of XRD results of dry bentonite sample.
Figure 105:
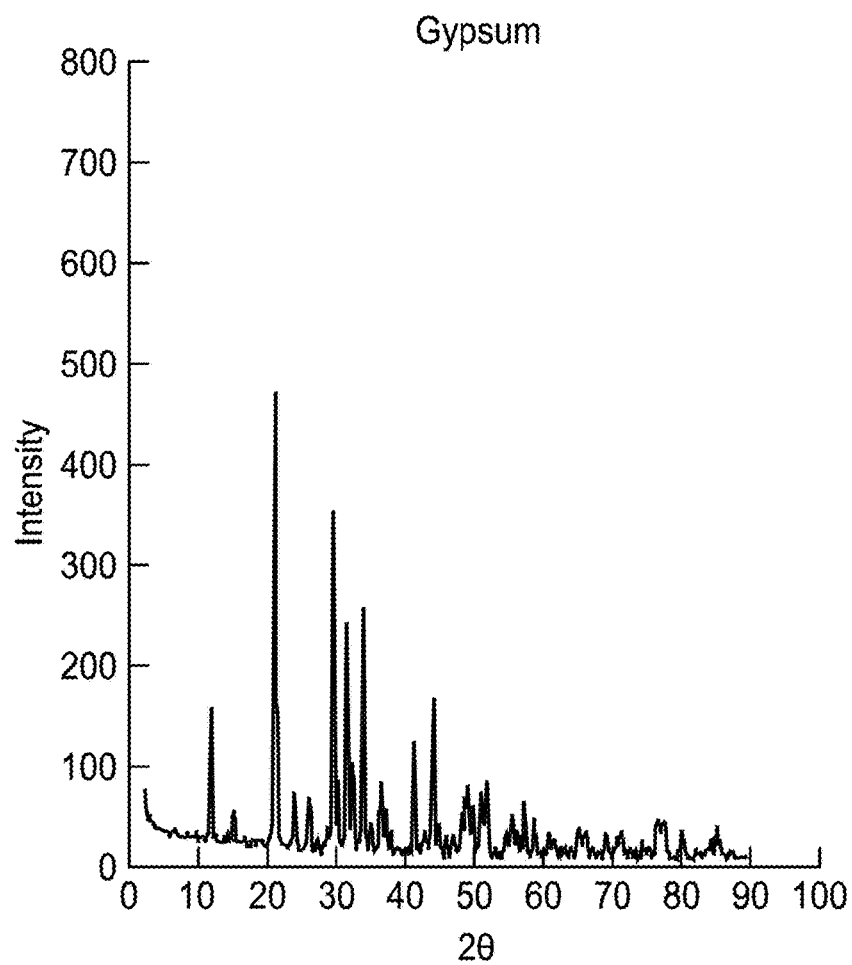
FIG. 105 is a graphical presentation of XRD results of gypsum sample.
Figure 106:
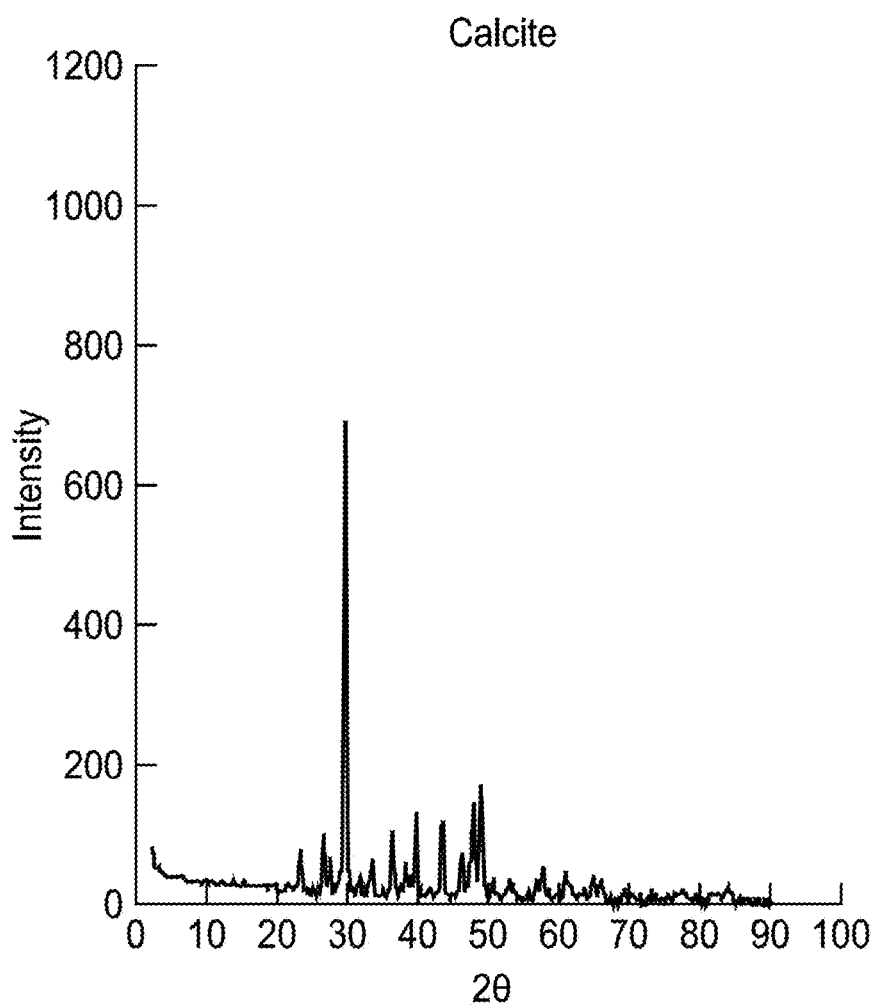
FIG. 106 is a graphical presentation of XRD results of Calcium Carbonate sample.
Figure 107:
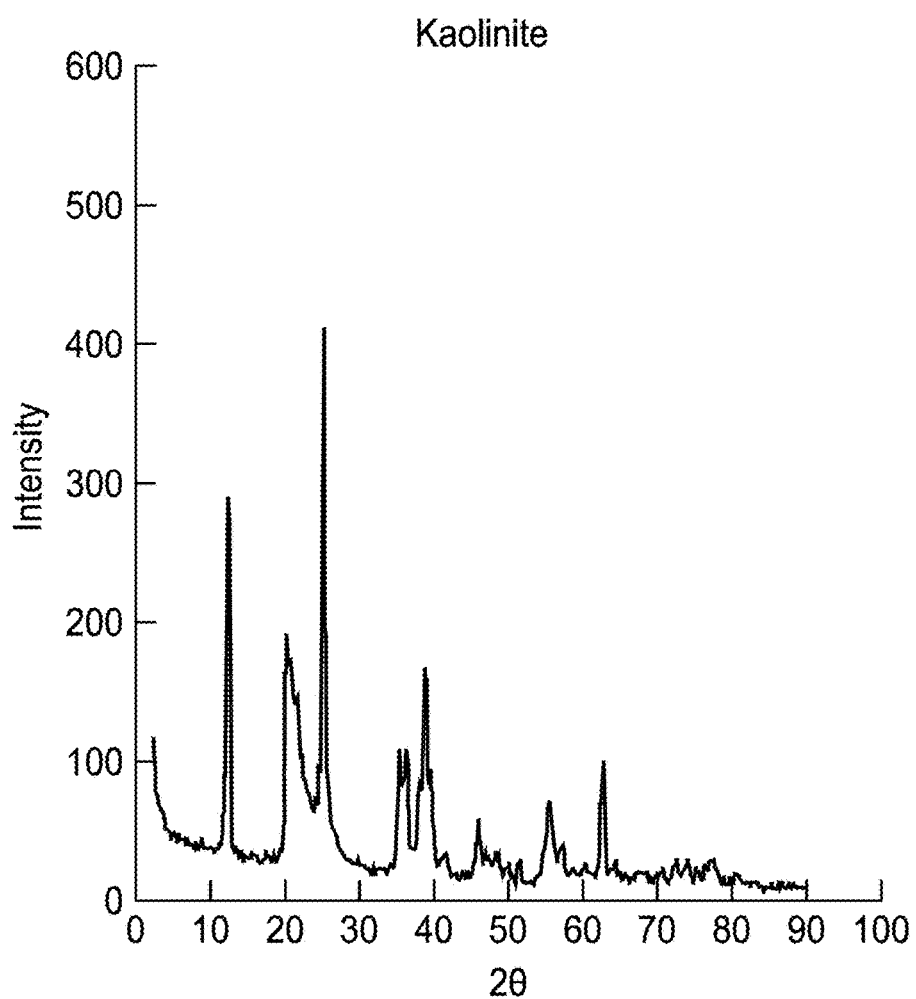
FIG. 107 is a graphical presentation of XRD results of kaolinite sample.
Figure 108:
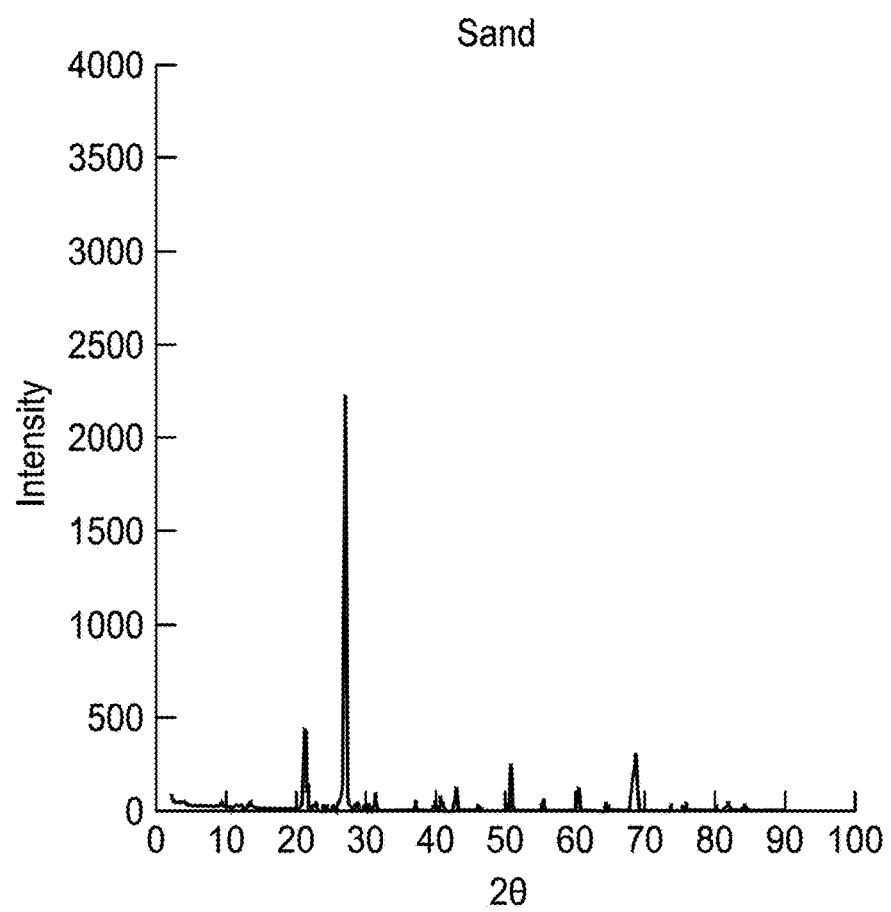
FIG. 108 is a graphical presentation of XRD results of sand sample.
Figure 109:
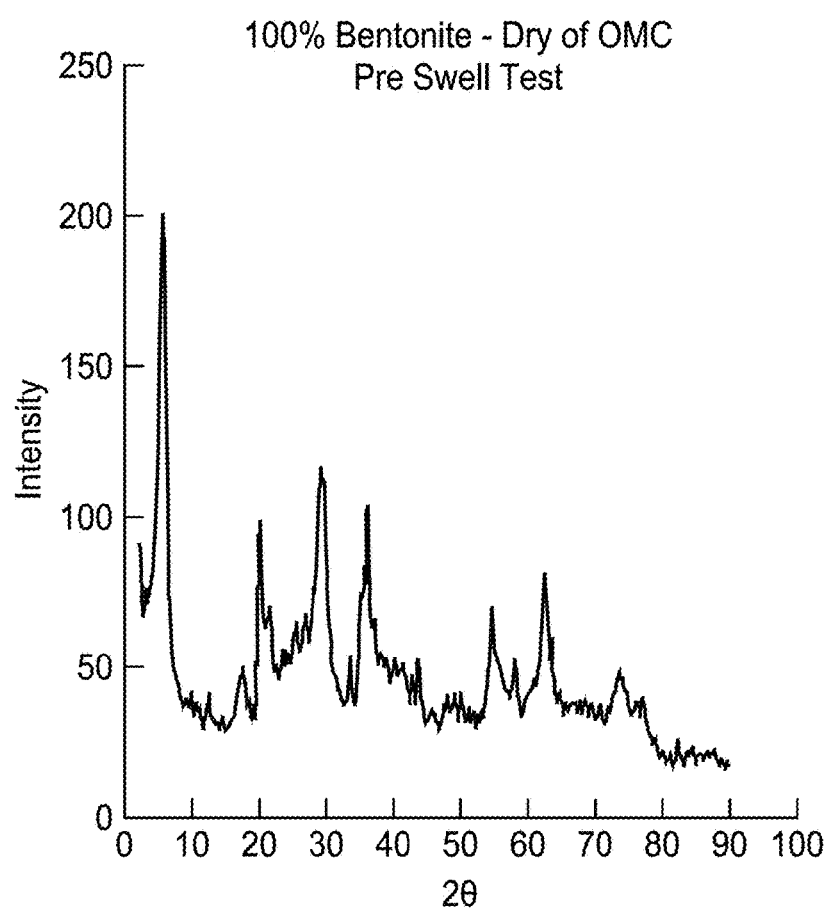
Figure 110:
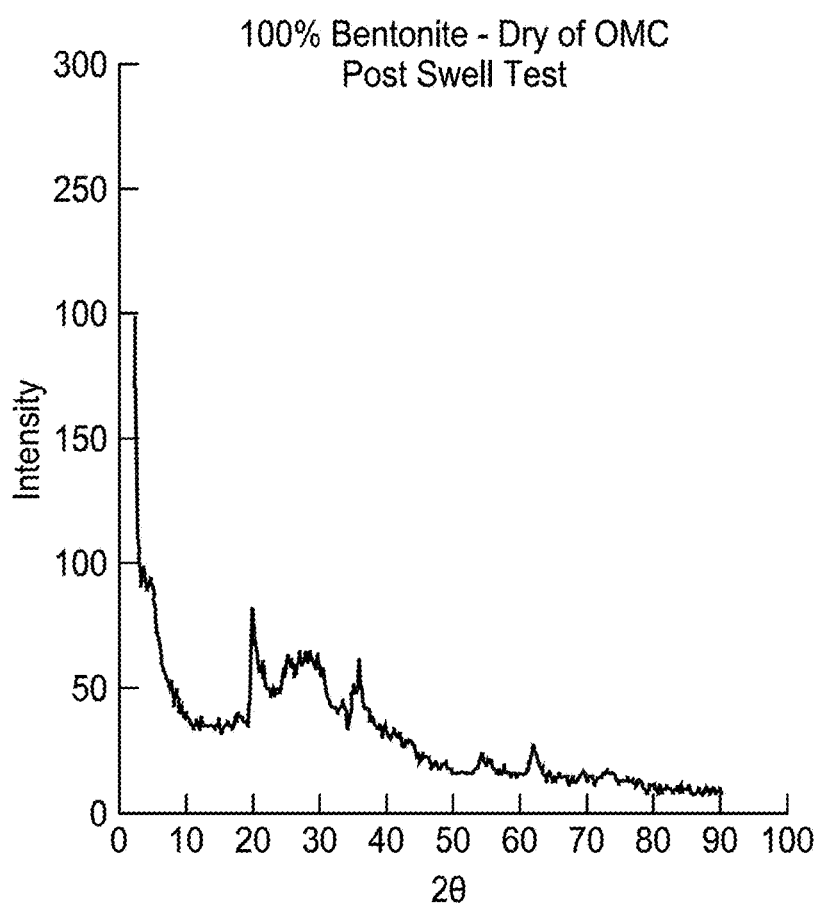
Figure 111:
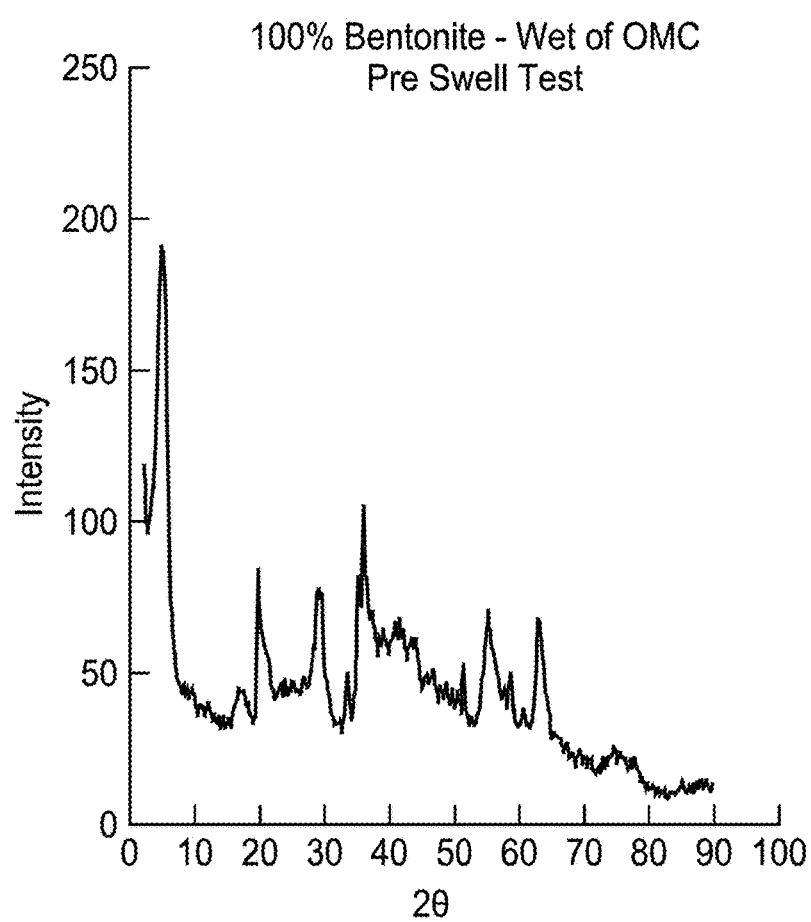
Figure 112:
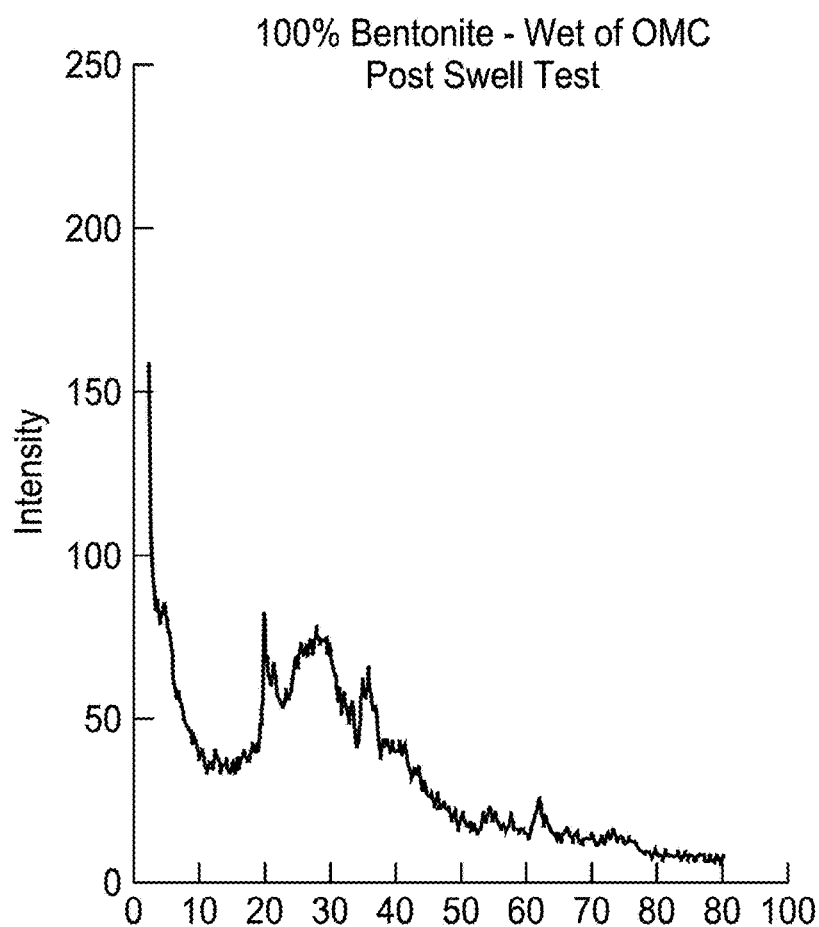
Figure 113:
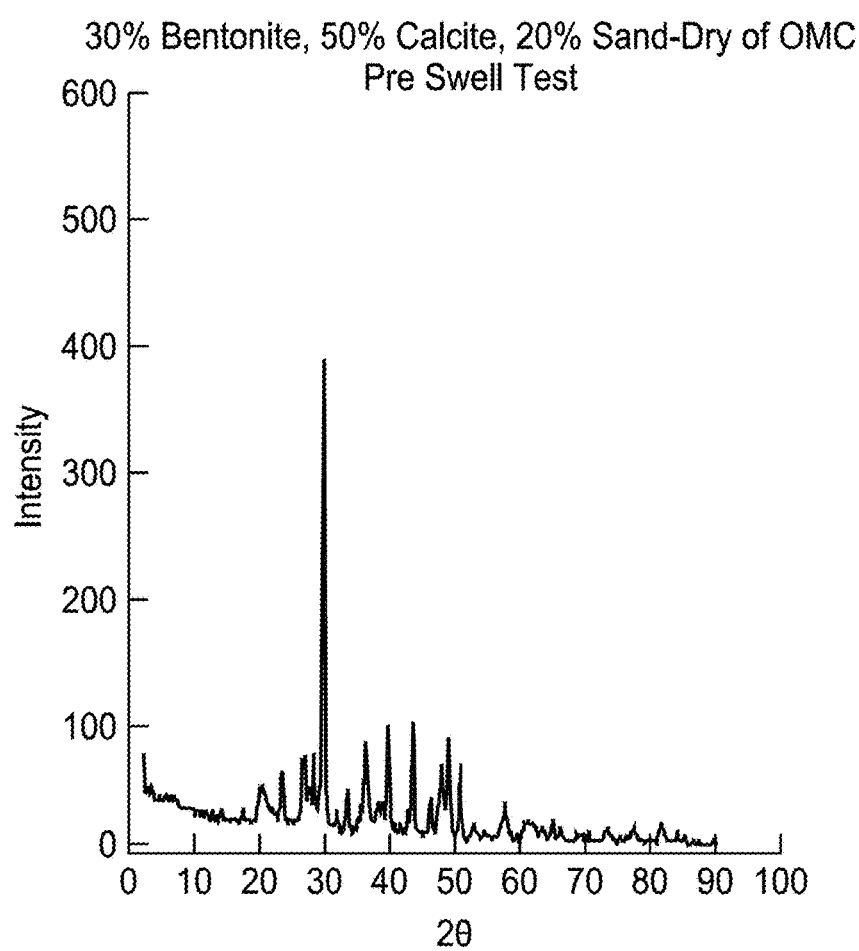
Figure 114:
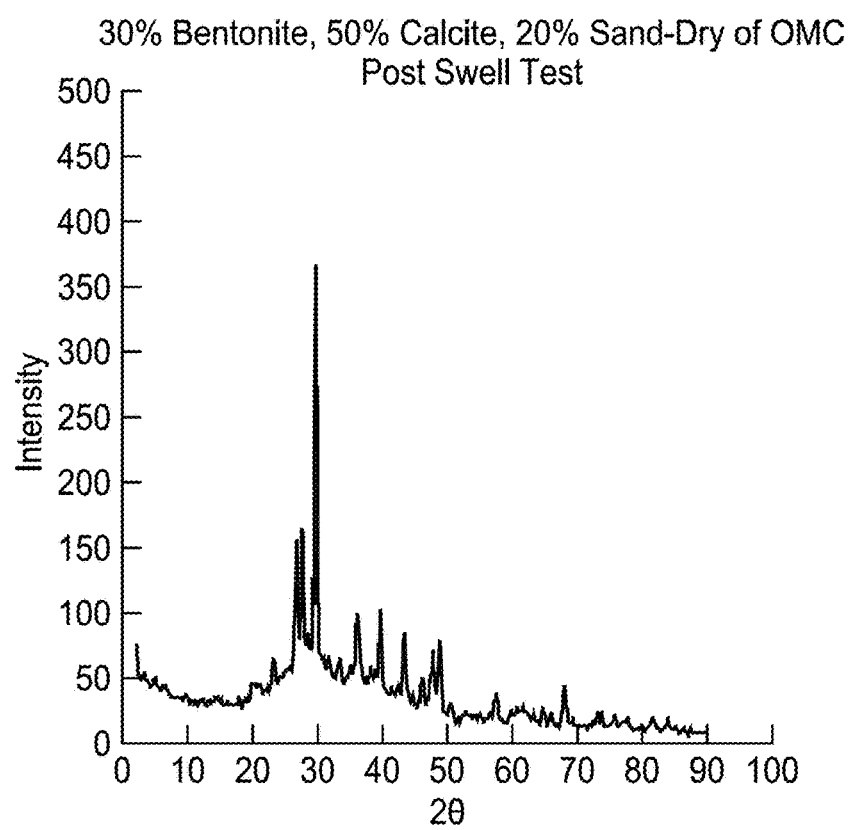
Figure 115:
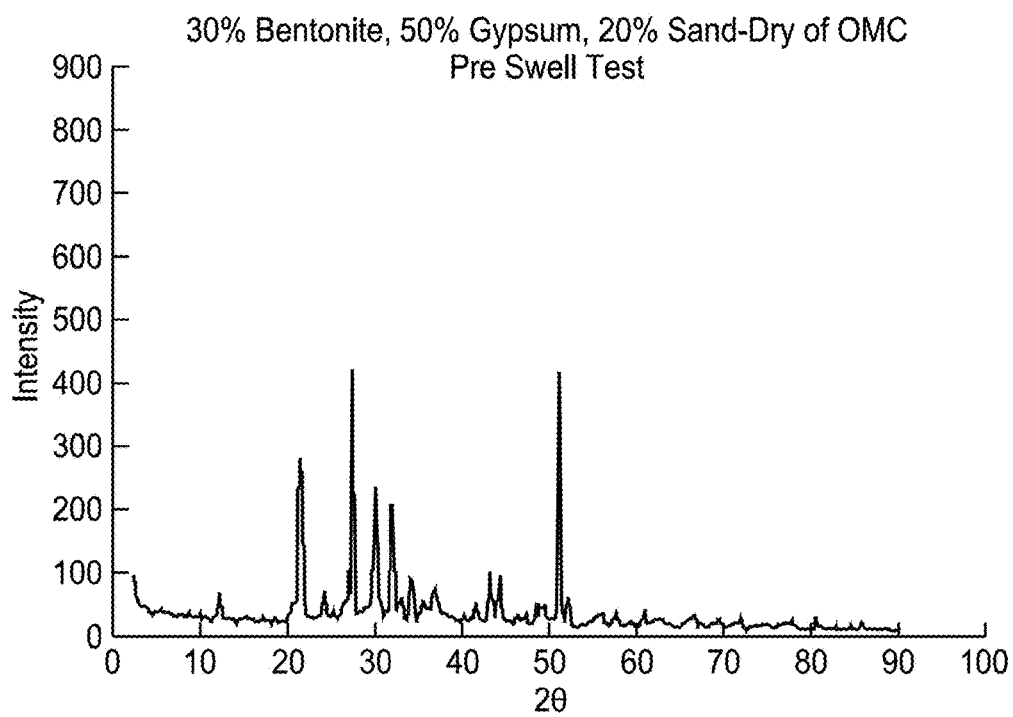
Figure 116:
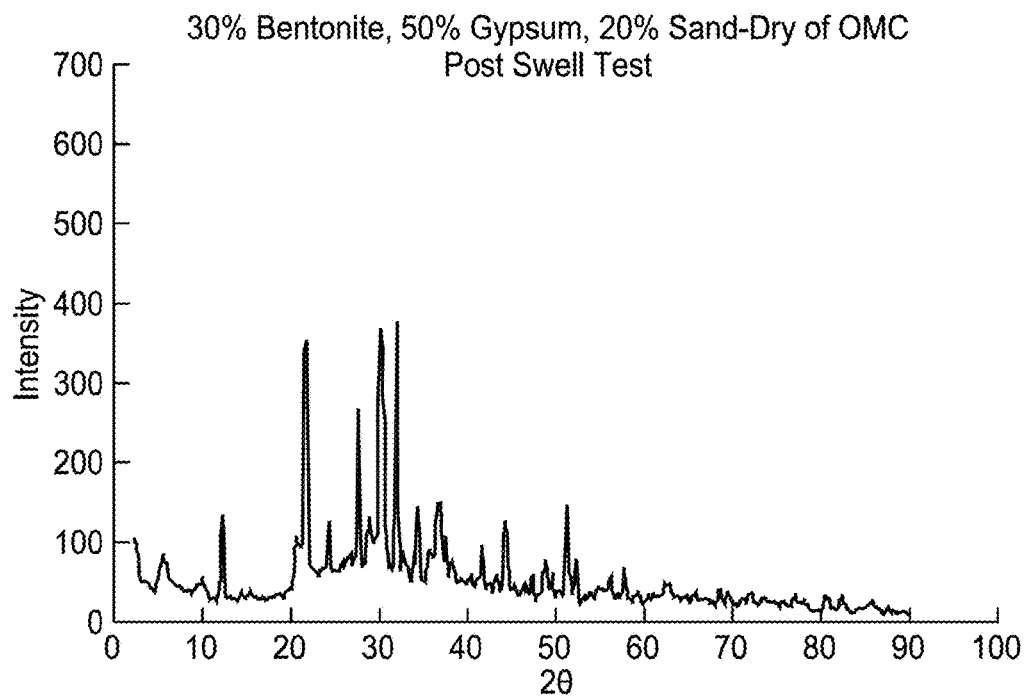
Figure 117:
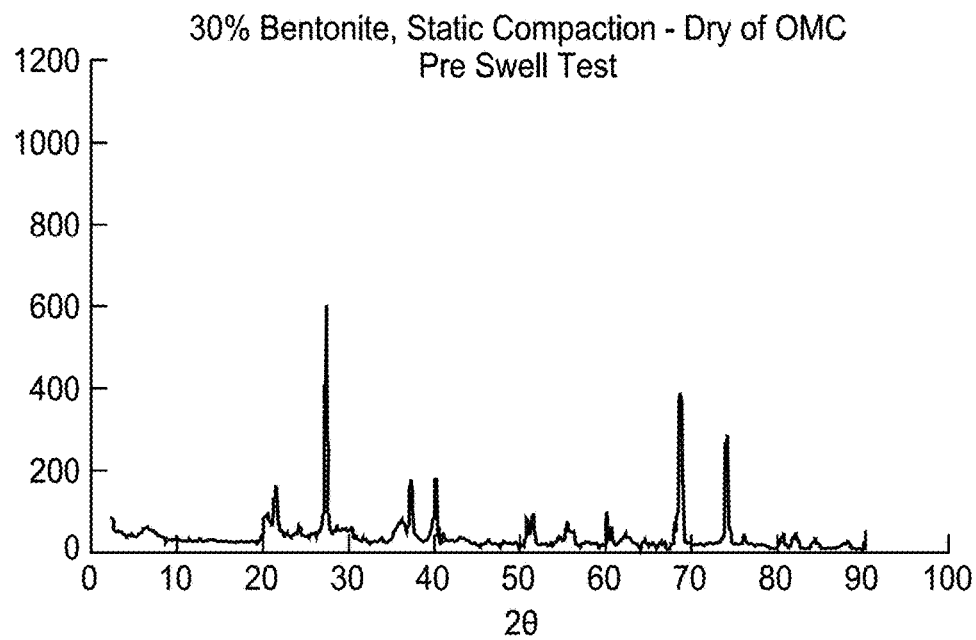
Figure 118:
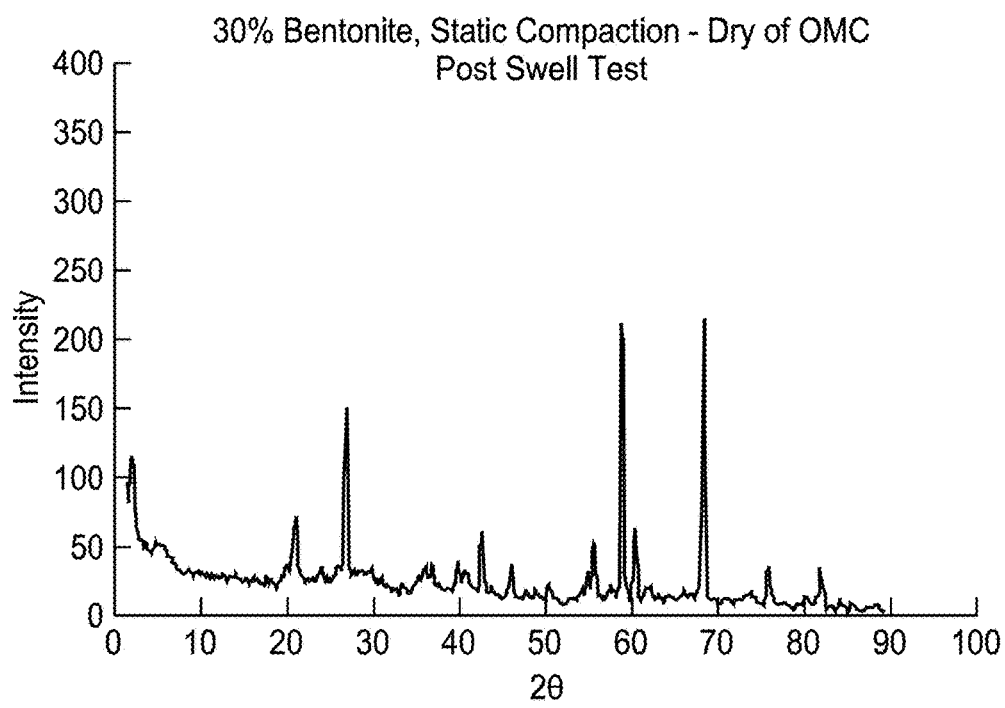
Figure 119:
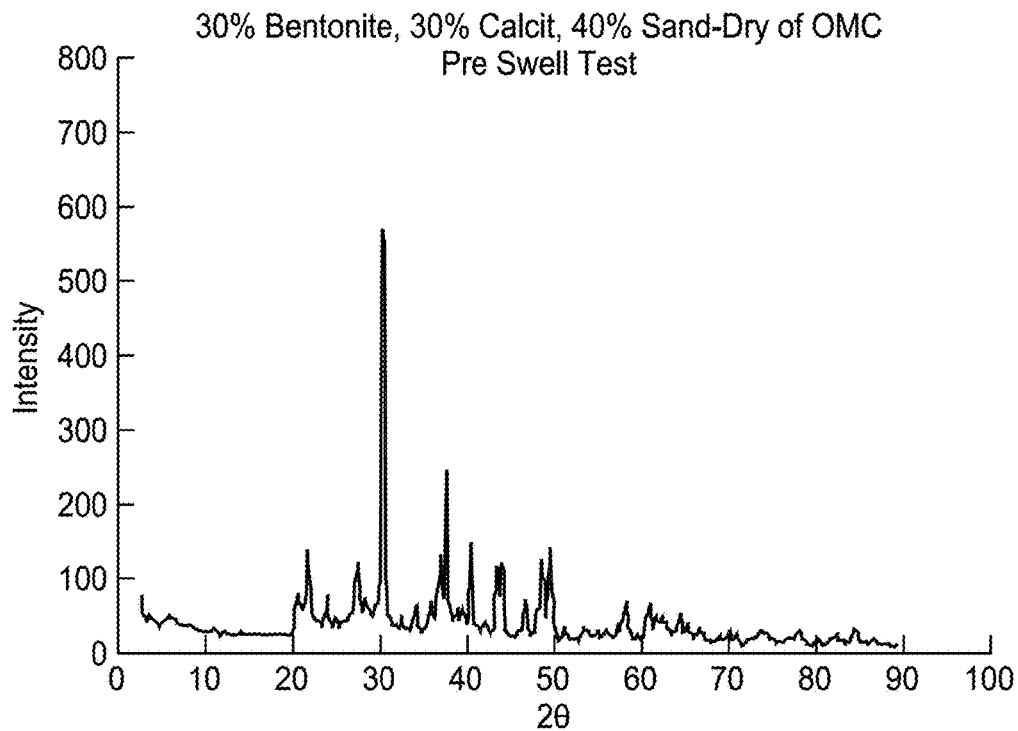
Figure 120:
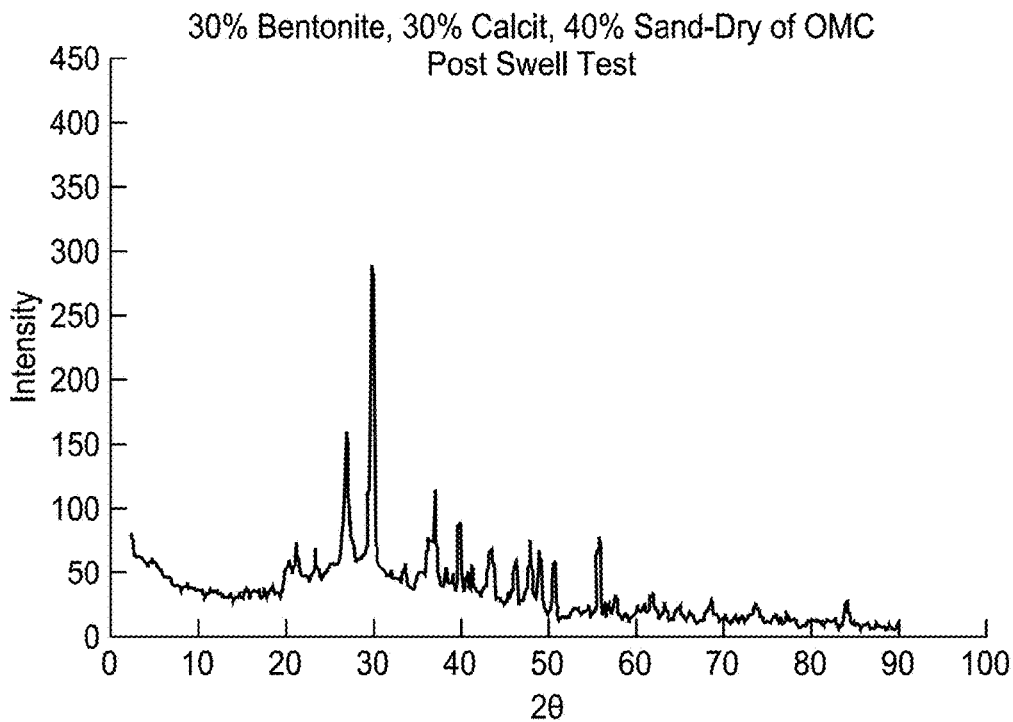

Using equation 4-1, typical plots showing swell versus water have been plotted using straight line and hyperbolic variation in density and shown in FIGS. 101 to 103. FIG. 101 typically represents the swell behavior of Na-montmorillonite without any other constraint and it shows a complete separation of particles at higher water contents. On the other hand, FIGS. 102 and 103 depict the volume change response of expansive clay minerals restrained by other factors such as additional binding from very high CEC, cementation from non-clay salts, and/or exchangeable cations other than sodium. These typical behaviors also mark the validity of the developed model and the constitutive relationships.

Among micro investigation techniques for the determination of the input parameters in the molecular level simulations, powder XRD has provided vital information on the crystallite size and the relationship of the lattice (d-spacing) expansion with water content. Results from CT, FTIR, and ESEM are more qualitative in nature and provide complementary information to XRD results.

Replacing part of the sand by calcite and gypsum in the swell potential test on bentonite/sand samples has resulted in substantial reduction in swelling as shown in Table 9. There is a reduction of 82%, 90%, and 95% in the swelling potential when 10%, 30%, and 50% gypsum was added to replace the sand, respectively. There is also a reduction of 40% and 44% in swelling upon part of the sand being replaced by 30% and 50% calcite, respectively. The phenomenon of decrease in swelling by addition of calcite and gypsum might be resulting from the binding effects produced by these compounds to the individual or group of clay particles.

Although CEC and the percentage of smectite in the natural undisturbed sample of Qatif-1 is almost the same as of the commercial bentonite (30/70 sand-bentonite mix), the difference in percent swell is large, i.e., 29% vs. 121%. This difference might be closely attributed to the cementation effects provided by the calcite, gypsum, and other similar compounds or salts present in the soil.

For the determination of the fundamental crystallite size from the XRD data using Debye-Sherrer's method, various widths of the corresponding peaks in the XRD data, removal of background, and leveling of the peaks have resulted in the assessment of the crystallite size in the range of 59 to 108 Å. This knowledge has been used in the selection of the size of the crystallite in molecular level modeling.

XRD tests conducted on the specimens at various water contents conducted on the samples compacted on the dry and wet side of OMC indicated that d-spacing of about 15 Å (equivalent to two water layers or 20% water content) exists in the clay crystallites on the dry side of OMC while d-spacing of 17.5 Å occurs (equivalent to three water layers or 30% water content) on wet side of OMC. As the molding water content is respectively 30 and 40% for the dry and wet side of OMC specimens, it is established that rest of the 10% water content for both the cases is adsorbed on the edges and ends of the crystallites. This fact has played a key role in the assessment of the fundamental size of the crystallite in the molecular level simulation.

Owing to its micrometer level resolution, micro CT testing is limited in its use for the nano/molecular level studies. Therefore, in the present disclosure, micro CT has been used to visualize and evaluate only the micron level fabric of the pre and post swell samples using the contrasting attenuation property of the clay particles before and after the swell test.

For the static compaction of the specimens to the modified Proctor density in the Odometer rings, an equivalent static pressure has been determined as 1500 kPa. To achieve the modified Proctor density, a static pressure of 1500 kPa could be used to compact the specimens in two layers in the Odometer rings of 70 mm diameter and 19 mm height.

In addition to the exchangeable cations, total cations have also been determined for the natural and bentonite samples. Non-exchangeable cations, which are difference of these two, provide useful information on the contribution of non-clay minerals in the soil to the molecular level volume change behavior.

In Sorption simulation in the Materials studio software, optimum number of Monte Carlo steps to cause a realistic number of water molecules adsorption have been determined to be 25000. After experimenting several energy cut off levels, 25000 steps cut off was adopted as the threshold limit for the realistic sorption. Simulation beyond 25000 steps resulted in the occupation of higher energy sites by water molecules and consequently occurrence of an unrealistically high volume change.

For the simulation purpose, Metropolis Monte Carlo method has been selected in the Sorption module of Materials Studio software. In this method, parameters selected for ratios of exchange, conformer, rotate, translate, and regrow have been selected as 0.39, 0.2, 0.2, 0.2, 0.2 respectively, while the corresponding probabilities are 0.39, 0.2, 0.2, 0.2, and 0.2. Amplitudes adopted for rotation and translation are 5° and 1 Å respectively.

Universal force field, one of the force fields in-built in the Materials Studio software has been modified in this research. Several force field parameters in UFF such as atom types, atom typing rules, diagonal van der Waals, and generators were modified for Na, Ca, Mg, Al, and Si in the light of the parameters suggested in CLAYFF force field. Modified Universal force field has successfully been used for carrying out sorption and molecular dynamics simulations on clay minerals in the present disclosure.

Different confining or compaction pressures used to simulate the several levels of geological and laboratory compaction pressures have shown that high pressures of an order of 1 GPa cause quick compaction and may be closely representative of dynamic and static quick type of compaction using the laboratory and field equipment. On the other hand, low confining pressures of an order of 0.01 to 0.1 GPa result in slow compaction and hence might be simulating more closely slow compaction/consolidation pressures for the geological deposits.

In the present disclosure, cohesive energy density (CED) has been considered as an excellent indicator of the interaction of the soil structure to the water sorption and the consequent volume change. CED has been found highly sensitive to various volume change variables such as water content, density, CEC, type and percentage of exchangeable and non-exchangeable cations.

A general trend observed in the present disclosure is that low CEC crystallites produced lesser CED, while higher CEC and the crystallites sorbed with other compounds showed higher values.

Total CED has been found to be increasing with increase in CEC, density, cementation, and bivalent cations and decreasing with water content, while van der Waals CED reduces and becomes repulsion in nature with the same variation of the above parameters.

For the same CEC, lesser water content results in higher cohesive energy, but for same density/moisture, higher CEC crystallites achieve much higher cohesive energy. As cohesion in clay particles is a result of the hydrogen bonding between their surfaces and the water, more number of charge deficiency centers in higher CEC clay result in more number of hydrogen bonds and consequently raise the electrostatic attraction CED. However, at the same time, van der Waals repulsions increase due to the high vicinity of the crystallites. Therefore, higher total cohesive energy mixes have corresponding higher repulsion van der Waals. These additional repulsion forces play an important role in the expansion/swell behavior of the clay particles in addition to the hydration by water molecules. Similarly, interaction with gypsum and calcite also causes an increase in cohesive energy density due to the extra bonding created by the cations and anions. Although there is an increase in repulsion due to van der Waals forces, increase in attraction forces due to electrostatic component has much higher value and far outweighs the repulsion forces in these cases.

All the combination cases, except those with cementation and exchangeable cations other than Na, a straight line plot between CED and water content is continued until it reaches a swell cutoff or terminal point. Swell cutoff points for all such cases were found to be terminating at a CED of an order of 300 to 500 J/cm$^3$. By looking at the swell potential test results, terminal dry densities were found to be about 0.45 to 0.55 g/cm$^3$ for 100% bentonite samples. In the dynamics simulation, this density range has been found equivalent to the cohesive energy density range of 300 to 400 J/cm$^3$. Therefore, in the absence of any other factor causing an early termination of swelling process such as cementation and/or exchangeable cations other than sodium, all the swell lines terminate at a cohesive energy density of 400 J/cm$^3$. The termination points also indicate the terminal or post swell moisture content.

For all the cases with cations other than Na and ones with non-clay minerals, plots between CED and moisture content is not a straight line. The plot has an initial straight portion followed by a curvature and a straight line to the terminal or swell cutoff. Swell cutoff for these cases have been determined to be the point up to CED equivalent to $4 \times 10^8$ J/m$^3$ plus CED difference between the specific case and its Na-montmorillonite counterpart.

Terminal moisture content for high swell cases for each CEC is lesser than their low swell counterparts. For instance, swell line for 30% initial water content LCEC terminates at 113% while the one for 40% initial water content LCEC falls at 138%. A similar observation was also made during the swell potential tests; terminal moisture content for initial moisture contents of 30% and 40% are 136% and 174%, respectively. This anomalous phenomenon can be explained using the contribution of additional expansion caused by the repulsion van der Waals forces. For these cases, in addition to the expansion caused by water molecules, the repulsion van der Waal forces result in an additional expansion. As swelling progresses, the repulsion force due to van der Waals result in pushing the particles apart. Since these forces are higher in case of highly compacted specimens or lesser moisture contents, relatively higher swelling takes place at lower water content for such cases.

The results of the molecular level simulations of different CECs, moisture, density, exchangeable cations, and cementation effects were compiled to form a nano model to determine the swell potential of expansive soils. Predictions of swell potential, final dry densities, and final moisture contents using the nano model have been found to be very close to the values obtained from the macro level tests both for laboratory control samples and undisturbed natural samples. Therefore, these constitutive surfaces and equations can be comprehensively used for the expansive soils with both clay and non-clay minerals and all the possible combinations of CEC, water content, density, total cations, and exchangeable cations.

Molecular level models have been developed for the fabric and structure of both natural and compacted soils containing both clay and non-clay minerals. These molecular level models with the suggested parameters and procedures can be used for any combination of clay minerals and other interacting compounds. These models can also be used to model the soil behavior in other industrial fields such as pharmaceutical, agriculture, petroleum, and waste management.

The invention claimed is:

1. A method of preparing a site having an expansive clayey soil comprising at least one expansive clay mineral to build a structure, the proportion of the weight of the at least one expansive clay mineral relative to the total weight of the expansive clayey soil being $P_{ECM}$, the expansive clayey soil having a swell potential $S_{soil}$ at or above a pre-set limit $T^*$, a first water content, and a cation exchange capacity (CEC) expressed in meq/100 g dry expansive clayey soil, the method comprising:

(a) assessing the site to build the structure by calculating a first amount of a swelling reduction agent to be incorporated into the expansive clayey soil to form a first swelling reduction agent comprising gypsum incorporated expansive clayey soil with a reduced swell potential $S_{1i(soil)}$ that is no greater than the pre-set limit $T^*$ with a nano-level constitutive modeling based on the first water content as an initial water content (IWC) and the cation exchange capacity (CEC) of the expansive clayey soil, wherein the first swelling reduction agent incorporated expansive clayey soil comprises a first swelling reduction agent incorporated at least one expansive clay mineral having a swell potential represented by $S_{1i(ECM)}$, wherein the swelling reduction agent is at least one selected from the group consisting of calcite, gypsum, potassium chloride, a composition comprising exchangeable $K^+$, a composition comprising exchangeable $Ca^{2+}$, and a composition comprising exchangeable $Mg^{2+}$, wherein the incorporation of the first amount of the swelling reduction agent produces a modified total cohesive energy density (TCEDm) of the first swelling reduction agent incorporated at least one expansive clay mineral calculated according to Equation (6):

$$TCEDm = 0.0625(IWC)^3 - 3.575(IWC)^2 + 10.5(IWC) + 2830 + 7100(C/0.1) + 5050(G/0.2) + 3010(KCl/0.1) + Ca(500) + Mg(300) + K(100) \quad (6)$$

where TCEDm=modified TCED, C=Proportion of calcite weight relative to the total weight of the first swelling reduction agent incorporated expansive clayey soil×$P_{ECM}$, G=Proportion of gypsum weight relative to the total weight of the first swelling reduction agent incorporated expansive clayey soil×$P_{ECM}$, KCl Proportion of potassium chloride weight relative to the total weight of the first swelling reduction agent incorporated expansive clayey soil×$P_{ECM}$, Ca=Proportion of the number of calcium exchangeable cation relative to the total number of exchangeable cations in the first swelling reduction agent incorporated expansive clayey soil, Mg=Proportion of the number of magnesium exchangeable cation relative to the total number of exchangeable cations in the first swelling reduction agent incorporated expansive clayey soil, K=Proportion of the number of potassium exchangeable cation relative to the total number of exchangeable cations in the first swelling reduction agent incorporated expansive clayey soil, IWC=initial water content, wherein the TCEDm of the first swelling reduction agent incorporated at least one expansive clay mineral results in $S_{1i(ECM)}$ calculated according to Equations (2), (3), and (5):

$$IDD = \{-2E-15(TCEDm)^4 + 5E-11(TCEDm)^3 - 5E-07(TCEDm)^2 + 0.0023(TCEDm) - 1.5378\} * 1.85 * (ABS(CEC-90)/90) \quad (2)$$

where IDD is initial dry density of the first swelling reduction agent incorporated at least one expansive clay mineral, $$FDD = -2E-22(TCEDm)^6 + 5E-18(TCEDm)^5 - 6E-14(TCEDm)^4 + 3E-10(TCEDm)^3 - 7E-07(TCEDm)^2 + 0.0005(TCEDm) + 0.3747 \quad (3)$$

where FDD is final dry density of the first swelling reduction agent incorporated at least one expansive clay mineral when the first swelling reduction agent incorporated at least one expansive clay mineral reaches the swell potential $S_{1i(ECM)}$, $$S_{1i(ECM)}(\%) = (FDD - IDD)/FDD * 100 \quad (5); \text{ and}$$

wherein the reduced swell potential of the first swelling reduction agent incorporated expansive clayey soil $S_{1i(soil)}$ equals $S_{1i(ECM)} \times P_{ECM}$, and then (b) incorporating the first amount of the swelling reduction agent into the expansive clayey soil at the site to form the first swelling reduction agent incorporated expansive clayey soil, then (c) building the structure on the expansive clayey soil at the site.

2. The method of claim 1, wherein the gypsum is at least one selected from the group consisting of a white gypsum; a red gypsum, and a mixture of white gypsum and red gypsum.

3. The method of claim 1, further comprising incorporating into the expansive clayey soil or the first swelling reduction agent incorporated expansive clayey soil a soil stabilizing composition comprising at least one material selected from the group consisting of ground granulated blastfurnace slag (GGBS), cement, resins, fly ash, lime, pozzolana, and a mixture of lime and pozzolana to form a stabilized expansive clayey soil or a stabilized first swelling reduction agent incorporated expansive clayey soil.

4. The method of claim 3, wherein the swelling reduction agent comprises gypsum, the soil stabilizing composition comprises ground granulated blastfurnace slag (GGBS), wherein a mixture of the gypsum and the GGBS is incorporated into the expansive clayey soil, and wherein the weight ratio of the gypsum: the GGBS in the mixture lies in the range of 1:3 to 3:2.

5. The method of claim 3, wherein the soil stabilizing composition further comprises lime to adjust the pH of the mixture of the gypsum and the GGBS to be greater than 10.5.

6. The method of claim 1, wherein the at least one expansive clay mineral is at least one selected from the group consisting of smectite, bentonite, montmorillonite, beidellite, vermiculite, attapulgite, nontronite, illite, and chlorite.

7. The method of claim 1, wherein the expansive clayey soil further comprises sand and the method further comprises removing all or a portion of the sand from the expansive clayey soil prior to the incorporating the first amount of the swelling reduction agent into the expansive clayey soil to form the first swelling reduction agent incorporated expansive clayey soil.

8. The method of claim 1, wherein the structure is selected from the group consisting of a building foundation, a railway line foundation, a pipe, a footing, a landfill liner, a nuclear waste storage containment liner, a swimming pool, a wall, a driveway, a road, a pavement, a basement floor, and a wellbore.

\* \* \* \* \*